United States Patent
Zhang et al.

(10) Patent No.: US 12,431,588 B2
(45) Date of Patent: Sep. 30, 2025

(54) COMPOSITE-TYPE STACKED CHEMICALLY-CROSSLINKED SEPARATOR

(71) Applicant: Asahi Kasei Battery Separator Corporation, Tokyo (JP)

(72) Inventors: Xun Zhang, Tokyo (JP); Yusuke Akita, Tokyo (JP); Hayato Matsuyama, Tokyo (JP); Hiromi Kobayashi, Tokyo (JP)

(73) Assignee: Asahi Kasei Battery Separator Corporation, Tokyo (JP)

( * ) Notice: Subject to any disclaimer, the term of this patent is extended or adjusted under 35 U.S.C. 154(b) by 723 days.

(21) Appl. No.: 17/631,616

(22) PCT Filed: Mar. 12, 2021

(86) PCT No.: PCT/JP2021/010231
§ 371 (c)(1),
(2) Date: Jan. 31, 2022

(87) PCT Pub. No.: WO2021/210317
PCT Pub. Date: Oct. 21, 2021

(65) Prior Publication Data
US 2022/0294080 A1    Sep. 15, 2022

(30) Foreign Application Priority Data

Apr. 13, 2020  (JP) .................................. 2020-071808
Oct. 30, 2020  (JP) .................................. 2020-183261

(51) Int. Cl.
*H01M 50/457*   (2021.01)
*C08L 23/06*    (2006.01)
(Continued)

(52) U.S. Cl.
CPC ........... *H01M 50/457* (2021.01); *C08L 23/06* (2013.01); *H01G 11/52* (2013.01);
(Continued)

(58) Field of Classification Search
CPC .. H01M 50/547; H01M 50/54; H01M 50/417; H01M 50/426
See application file for complete search history.

(56) References Cited

U.S. PATENT DOCUMENTS

| 5,998,065 A | 12/1999 | Tsutsumi et al. |
| 9,331,323 B2 | 5/2016 | Huang |

(Continued)

FOREIGN PATENT DOCUMENTS

| CN | 110014711 A | 7/2019 |
| EP | 1120850 A1 | 8/2001 |

(Continued)

OTHER PUBLICATIONS

International Preliminary Report on Patentability and Written Opinion issued in corresponding International Patent Application No. PCT/JP2021/010231 dated Oct. 27, 2022.

(Continued)

*Primary Examiner* — Kenneth J Douyette
(74) *Attorney, Agent, or Firm* — Morgan, Lewis & Bockius LLP

(57) ABSTRACT

The purpose of the present disclosure is to provide: a safer polyolefin microporous membrane; an electricity storage device separator, electricity storage device assembly kit, and electricity storage device using the polyolefin microporous membrane; and an electricity storage device. In one embodiment, the polyolefin microporous membrane comprises at least one of each of a layer A and a layer B, a polyolefin contained in at least one of the layer A and the layer B has one or more types of functional groups, and a crosslinked structure is formed by (1) the functional groups undergoing condensation reactions with each other, (2) the functional group reacting with a chemical substance inside the electricity storage device, or (3) the functional group reacting (Continued)

with a different type of functional group, after accommodation in the electricity storage device.

20 Claims, 10 Drawing Sheets

(51) Int. Cl.
 *H01G 11/52* (2013.01)
 *H01M 50/417* (2021.01)
 *H01M 50/42* (2021.01)
 *H01M 50/426* (2021.01)
 *H01M 50/434* (2021.01)
 *H01M 50/443* (2021.01)
 *H01M 50/451* (2021.01)
 *H01M 50/491* (2021.01)

(52) U.S. Cl.
 CPC ......... *H01M 50/417* (2021.01); *H01M 50/42* (2021.01); *H01M 50/426* (2021.01); *H01M 50/434* (2021.01); *H01M 50/443* (2021.01); *H01M 50/451* (2021.01); *H01M 50/491* (2021.01); *C08L 2203/16* (2013.01); *C08L 2203/20* (2013.01); *C08L 2205/025* (2013.01); *C08L 2312/08* (2013.01)

(56) References Cited

U.S. PATENT DOCUMENTS

| | | | |
|---|---|---|---|
| 2007/0111105 A1* | 5/2007 | Zaghib | H01M 10/0567 429/322 |
| 2007/0184340 A1 | 8/2007 | Ichikawa et al. | |
| 2010/0221965 A1 | 9/2010 | Katayama et al. | |
| 2012/0115008 A1 | 5/2012 | Sano et al. | |
| 2012/0145468 A1* | 6/2012 | Pekala | H01M 10/52 429/251 |
| 2014/0186680 A1* | 7/2014 | Kim | H01M 50/42 429/144 |
| 2015/0056492 A1 | 2/2015 | Huang | |
| 2015/0194654 A1 | 7/2015 | Oh et al. | |
| 2016/0126518 A1 | 5/2016 | Park et al. | |
| 2017/0033346 A1* | 2/2017 | Zhang | H01M 50/494 |
| 2017/0237119 A1* | 8/2017 | Zhang | C08L 61/22 429/303 |
| 2018/0108945 A1* | 4/2018 | Su | H01M 10/058 |
| 2018/0233730 A1 | 8/2018 | Ohya et al. | |
| 2020/0006737 A1 | 1/2020 | Lee | |
| 2020/0335755 A1 | 10/2020 | Zhang et al. | |
| 2021/0057701 A1 | 2/2021 | Zhang et al. | |
| 2021/0057703 A1 | 2/2021 | Hamada et al. | |

FOREIGN PATENT DOCUMENTS

| | | |
|---|---|---|
| EP | 3340342 A1 | 6/2018 |
| JP | H09-216964 A | 8/1997 |
| JP | H10-261435 A | 9/1998 |
| JP | H11-144700 A | 5/1999 |
| JP | H11-172036 A | 6/1999 |
| JP | 2000-77103 A | 3/2000 |
| JP | 2000-319441 A | 11/2000 |
| JP | 2001-176484 A | 6/2001 |
| JP | 2002-343326 A | 11/2002 |
| JP | 2005-158671 A | 6/2005 |
| JP | 2006-179279 A | 7/2006 |
| JP | 2006-289657 A | 10/2006 |
| JP | 2007-123254 A | 5/2007 |
| JP | 2009-193742 A | 8/2009 |
| JP | 2011-071128 A | 4/2011 |
| JP | 2011-192565 A | 9/2011 |
| JP | 2014-056843 A | 3/2014 |
| JP | 2015-056305 A | 3/2015 |
| JP | 2015-062174 A | 4/2015 |
| JP | 6187650 B2 | 8/2017 |
| JP | 2017-203145 A | 11/2017 |
| JP | 6367453 B2 | 8/2018 |
| JP | 2019-179698 A | 10/2019 |
| JP | 2020-511736 A | 4/2020 |
| JP | 2020-176260 A | 10/2020 |
| KR | 10-2016-0052332 A | 5/2016 |
| KR | 10-2016-0131761 A | 11/2016 |
| KR | 10-2017-0044996 A | 4/2017 |
| KR | 102067717 B1 | 1/2020 |
| KR | 10-2020-0012787 A | 2/2020 |
| KR | 10-2020-0026756 A | 3/2020 |
| KR | 10-2020-0032931 A | 3/2020 |
| WO | 97/44839 A1 | 11/1997 |
| WO | 2011/118660 A1 | 9/2011 |
| WO | 2019/130994 A1 | 7/2019 |
| WO | 2019/151812 A1 | 8/2019 |
| WO | 2020/075865 A1 | 4/2020 |
| WO | 2020/075866 A1 | 4/2020 |
| WO | 2021/049648 A1 | 3/2021 |

OTHER PUBLICATIONS

Lithium-ion Secondary Battery (2nd Ed.), Nikkan Kogyo Shimbun, Ltd., 28-30 (Mar. 29, 1996) (see partial English translation).
Basic Polymer Chemistry, Tokyo Chemical Dojin, 173 (Jul. 1, 2006) (see partial English translation).
Bak et al., "Structural Changes and Thermal Stability of Charged LiNixMnyCozO2 Cathode Materials Studied by Combined In situ Time-Resolved XRD and Mass Spectroscopy," ACS Applied Materials & Interfaces, 6: 22594-22601 (2014).
Pyykko et al., "Molecular Single-Bond Covalent Radii for Elements 1-118," Chem: A European Journal, 15: 186-197 (2009).
Walsh, "Bond dissociation energy values in silicon-containing compounds and some of their implications," Accounts of Chemical Research, 14: 246-252 (1981).
Becerra, "Thermochemistry," The Chemistry of Organic Silicon Compounds, Rappoport, ed. vol. 2, Chapter 4 (1998).
International Search Report issued in corresponding International Patent Application No. PCT/JP2021/010231 dated Jun. 1, 2021.
Extended European Search Report issued in European Patent Application No. 24220984.9 dated May 7, 2025.

* cited by examiner

FIG. 3
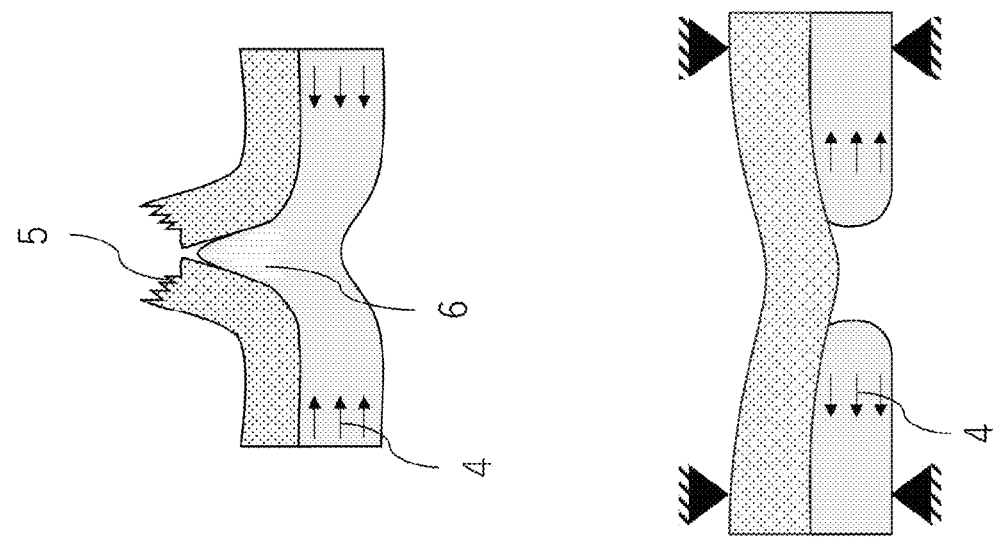
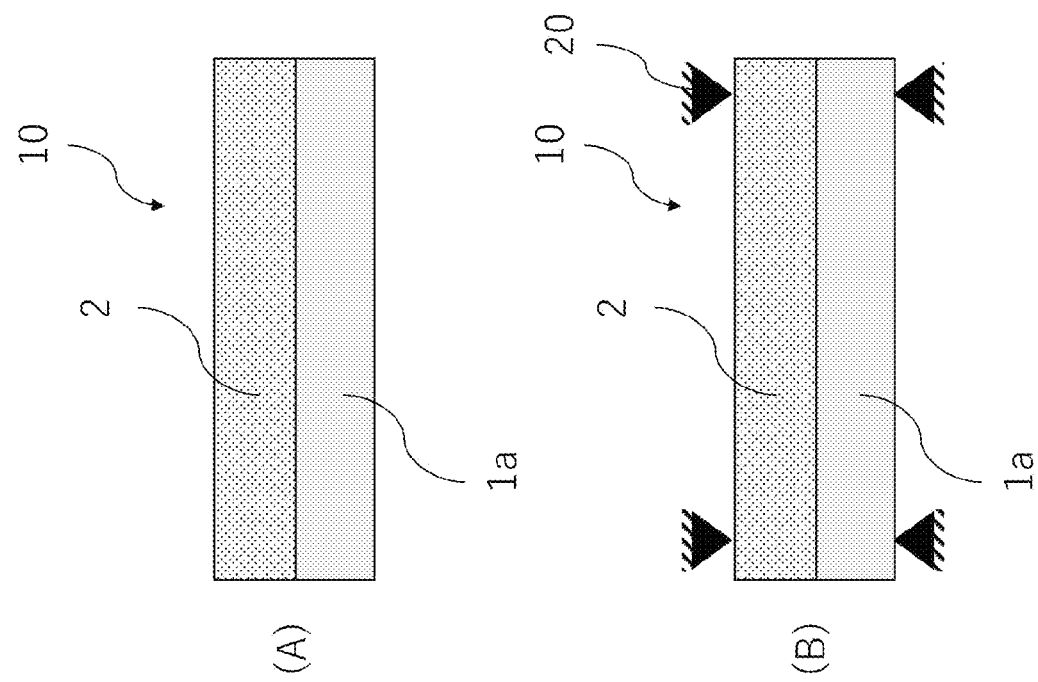

FIG. 5
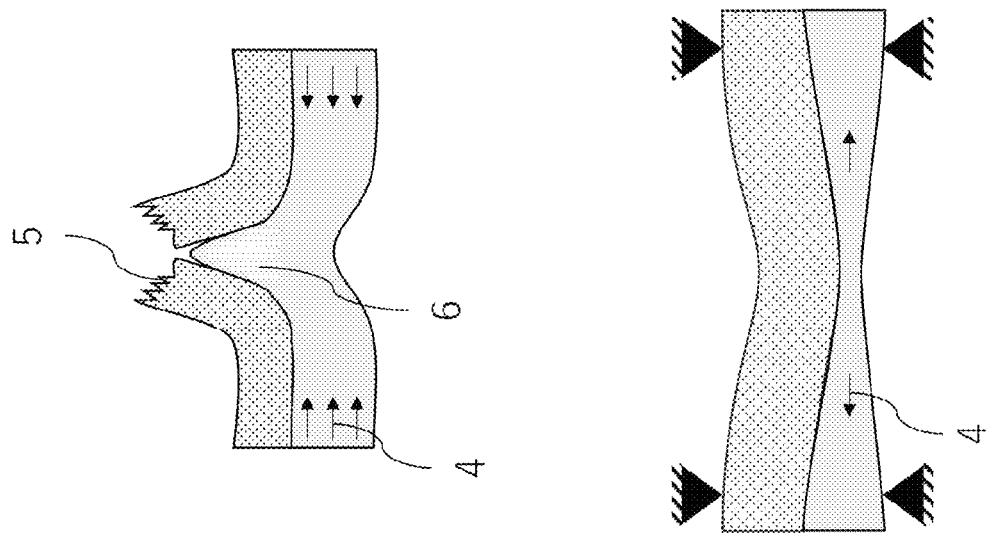
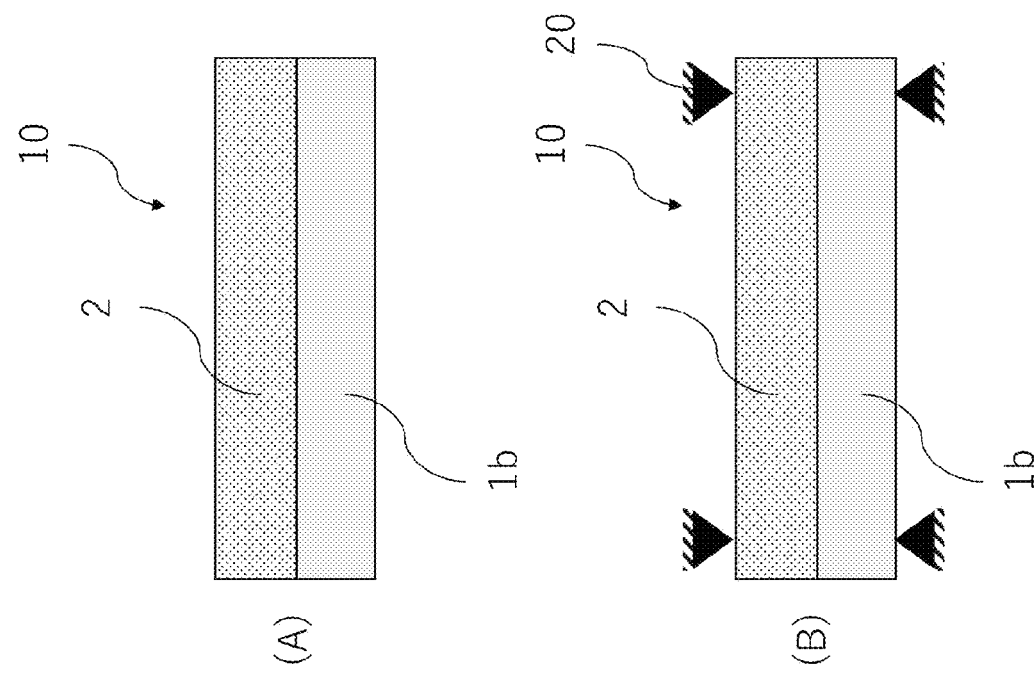

COMPOSITE-TYPE STACKED CHEMICALLY-CROSSLINKED SEPARATOR

FIELD

The present disclosure relates to a polyolefin microporous membrane, and a separator for an electricity storage device and an electricity storage device using the same.

BACKGROUND

Microporous membranes are widely used as membranes for separation or selective permeation and separation of various substances, and isolating materials, and some examples of their uses include microfiltration membranes, separators for a fuel cell and a capacitor, or matrices for functional membranes or separators for an electricity storage device, which exhibit new functions by packing functional materials into their pores. In particular, polyolefin microporous membranes are suitably used as separators for a lithium ion battery, which are widely used in laptops, mobile phones and digital cameras.

There have been made trials of achieving both activation of a shutdown function and an improvement in membrane breaking temperature by forming a crosslinked structure in the separator for ensuring battery safety (PTLs 1 to 8). For example, PTLs 1 to 6 mention a silane crosslinked structure formed by contact of a silane-modified polyolefin-containing separator with water. PTL 7 mentions a crosslinked structure formed from ring-opening of norbornene by irradiation with ultraviolet rays, electron beams, etc. PTL 8 mentions that an insulating layer of a separator contains a (meth)acrylic acid copolymer having a crosslinked structure, a styrene-butadiene rubber binder, etc.

The members used in a lithium ion battery are a positive electrode, a negative electrode material, an electrolyte solution and a separator. Of these members, the separator must be inactive to an electrochemical reaction and peripheral members, because of its role as an insulating material. Meanwhile, there has been established a technique in which decomposition of an electrolyte solution on the surface of a negative electrode is suppressed by forming a solid electrolyte interface (SEI) due to a chemical reaction during initial charge from the beginning of the development of a negative electrode material of the lithium ion battery (NPL 1). There have been reported some cases where, even when a polyolefin resin is used as the separator, oxidation reaction is induced on the surface of a positive electrode at high voltage, resulting in blackening or surface deterioration of the separator.

For this reason, the materials used for an electricity storage device separator are designed with chemical structures which are inactive in electrochemical reactions or other chemical reactions, and as a result, polyolefin microporous membranes have become widely developed and implemented.

It has also been proposed to form, as a separator for an electricity storage device, a polyolefin microporous membrane having a laminated structure by stacking a plurality of polyolefin resin layers (PTLs 10 and 11).

However, as long as a polyolefin is employed as the resin, there is a limit in performance improvement even if the mechanical microporous structure of the separator is improved. For example, since the affinity or liquid retention with the electrolyte solution is insufficient depending on the heat stability of the separator at a temperature of the melting point or higher of the polyolefin, or the electronegativity of the olefin unit, it is impossible to satisfy the permeability of Li ion or solvated ion cluster in the separator.

In recent years, there has been a demand for higher output, higher energy density and improved cycle characteristics of an electricity storage device, especially for small electronic devices and electric vehicles. Accordingly, standards have also become more rigorous for safety of the electricity storage device, and there is a demand for a safer electricity storage device which does not cause thermal runaway even if local short circuit occurs.

PTL 13 mentions a laminated porous film in which a porous layer containing a filler is stacked on at least one side of a polyolefin porous film containing a polypropylene, and the total lift amount measured under specific conditions is 10 mm or less, for the purpose of providing an electricity storage device which can suppress the occurrence of warpage and has high liquid absorption properties of an electrolyte solution, and also exhibits satisfactory performance.

PTL 14 mentions a laminated porous film which includes a polyolefin porous film including two or more polypropylene layers, for the purpose of improving the heat resistance and cycle characteristics of the electricity storage device.

PTL 15 mentions a separator for an electricity storage device, comprising a silane-modified polyolefin in which a silane crosslinking reaction of the silane-modified polyolefin is started when the separator comes into contact with an electrolyte solution, for the purposes of achieving both shutdown function and high-temperature fracture resistance, and ensuring safety, output and/or cycle stability of the electricity storage device.

PTL 16 mentions a separator for electricity storage devices, comprising a polyolefin multilayer microporous membrane containing a polyethylene and a polypropylene, and an active layer disposed on at least one side of the porous membrane, the active layer containing inorganic particles, for the purpose of ensuring excellent peel strength between a substrate and a modified layer, battery windability, hot-cold shock properties and low-temperature cycle characteristics, and improving a balance of each performance.

CITATION LIST

Patent Literature

[PTL 1] JP 9-216964 A
[PTL 2] WO 97/44839 A
[PTL 3] JP 11-144700 A
[PTL 4] JP 11-172036 A
[PTL 5] JP 2001-176484 A
[PTL 6] JP 2000-319441 A
[PTL 7] JP 2011-071128 A
[PTL 8] JP 2014-056843 A
[PTL 9] JP 10-261435 A
[PTL 10] U.S. Pat. No. 9,331,323
[PTL 11] WO 2019/151812 A
[PTL 12] Korean Patent Publication No. 10-2020-0032931
[PTL 13] JP 6187650 B2
[PTL 14] Chinese Patent Publication No. 110014711
[PTL 15] WO 2020/075866 A
[PTL 16] JP 6367453 B2

Non-Patent Literature

[NPL 1] Lithium Ion Secondary Batteries (Second Edition), issued by Nikkan Kogyo Shimbun, Ltd.
[NPL 2] Kiso Kobunshi Kagaku, issued by Tokyo Kagaku Dojin
[NPL 3] ACS Appl. Mater. Interfaces 2014, 6, 22594-22601.
[NPL 4] written by Pekka Pyykko and Michiko Atsumi, "Molecular Single-Bond Covalent Radii for Elements 1-118", Chem. Eur. J., 2009, 15, 186-197
[NPL 5] written by Robin Walsh, "Bond dissociation energy values in silicon-containing compounds and some of their implications", Acc. Chem. Res., 1981, 14, 246-252
[NPL 6] The Chemistry of Organic Silicon Compounds Vol. 2, Wiley (1998), Chap. 4

SUMMARY

Technical Problem

With the increasing high output and high energy density of lithium ion secondary batteries for mobile devices and vehicles in recent years, there is ongoing demand for smaller battery cell sizes and for stable cycle charge-discharge performance at long-term use. It is therefore considered necessary for the separators used to be thin-membranes (for example, 15 m or less) with high quality (for example, homogeneous physical properties and free of resin aggregates). Standards have also become more rigorous for battery safety, and as also mentioned in PTLs 1 and 2, there is a need for a shutdown function and high-temperature membrane rupture properties, while expectations are also high for development of separator resin compositions which can be stably produced, and production methods for them. In this regard, the level for shutdown temperature is preferably as far below 150° C. as possible, while the membrane rupture temperature is preferably as high a temperature as possible.

However, the crosslinking methods mentioned in PTLs 1 to 8 are all in-processes for separator membrane formation, or are carried out in a batch process immediately after separator membrane formation. After formation of a crosslinked structure as mentioned in PTLs 1 to 8, it is necessary to coat or to form slits in the separator, which increases the internal stress at the time of the subsequent stacking and winding steps with the electrodes and can lead to deformation of the fabricated battery. For example, when a crosslinked structure is formed by heating, internal stress in the separator with the crosslinked structure often increases at ordinary temperature or room temperature. When a cross-linked structure is formed by photoirradiation of ultraviolet rays or electron beams, the light irradiation may be nonuniform and the crosslinked structure may become nonhomogeneous. This is believed to occur because the peripheries of the crystals of the resin forming the separator tend to become crosslinked by electron beams.

PTL 9 mentions a technique for improving the cycle characteristics of a lithium ion secondary battery by addition of succinimides to the electrolyte solution. However, the technique mentioned in PTL 9 improves the cycle characteristics not by specifying the structure of the separator.

The conventional laminated polyolefin microporous membranes mentioned in PTLs 10 and 11 have problems with heat resistance, and there is room for improvement in a heat resistance test (for example, hot box test at high temperature of 200° C. or higher) of an electricity storage device including a laminated polyolefin microporous membrane as a separator. The multilayer separation membrane including a multilayer structure mentioned in PTL 12 only has a crosslinked structure of a polyolefin matrix, and there are still problems with the homogeneity of the crosslinked structure, which is smaller than the size of the crosslinked matrix. Therefore, there is still room for improvement in the heat resistance of the electricity storage device including a laminated separation membrane as the separator.

As shown in NPL 3, the achievement of a high nickel NMC type positive electrode has been attracting attention as one of the leading candidates for increasing the capacity of the LIB battery. However, as the ratio of NMC becomes (4:3:3), (6:2:2), (8:1:1), etc. from the conventional (1:1:1), the heat resistance of the positive electrode crystal structure deteriorates (for example, crystal decomposition and $O_2$ release at about 250° C.), and $O_2$ is easily released together with pyrolysis, and the organic substance in the battery is continuously ignited or exploded. In particular, in the case of high nickel NMC (622) or NMC (811) positive electrode, the start of the decomposition is observed from about 150° C. to 160° C. Currently, studies have been made to stabilize the crystal structure of high nickel-containing NMC by the research agencies or companies of each country, and although the improvement is observed in the surface treatment of NMC particles or the adjustment of trace impurities, heat generation from crystal decomposition at 150° C. to 160° C. and $O_2$ release cannot be fundamentally solved. In a similar trend, besides NMC, there is a problem of crystal instability (pyrolysis) in constituent positive electrodes such as an LAC type positive electrode. When a high energy density LIB using such a positive electrode material is developed towards on-vehicle applications, it is an issue to ensure safety in a vehicle collision accident in the case of an emergency. Specifically, it is required that, when the battery structure is broken by an external force, the battery does not explode even in a high-temperature state such as fire. Therefore, studies have been required to improve battery safety in which crystal decomposition from a temperature of 150° C. is assumed under the most severe conditions.

The separators for an electricity storage device mentioned in PTLs 13 to 16 had room for further improvement in safety when local short circuit occurs.

Thus, it is an object of the present disclosure to provide a safer polyolefin microporous membrane; a separator for an electricity storage device, an electricity storage device assembly kit and an electricity storage device using the same; and an electricity storage device.

In a first embodiment, in view of the above problems, it is an object of the present disclosure to provide a polyolefin microporous membrane capable of improving the heat resistance of an electricity storage device; a separator for an electricity storage device, an electricity storage device assembly kit and an electricity storage device using the same; and a method for producing an electricity storage device.

In a second embodiment, it is an object of the present disclosure to provide a safer separator for an electricity storage device in which the possibility of thermal runaway due to local short circuit is reduced; an electricity storage device assembly kit and an electricity storage device using the same; and an electricity storage device.

Solution to Problem

Examples of embodiments of the present disclosure are listed in the following items.

[1]
A polyolefin microporous membrane having a laminated structure, including at least each one of layer A containing a polyolefin and layer B containing a polyolefin, wherein the polyolefin contained in at least one of the layer A and the layer B has one or more types of functional groups, and after housing in an electricity storage device, (1) the functional groups undergo a condensation reaction with each other, (2) the functional groups react with a chemical substance inside the electricity storage device, or (3) the functional groups react with other types of functional groups, to form a crosslinked structure.

[2]

The polyolefin microporous membrane according to item 1, wherein the chemical substance is any of an electrolyte contained in the polyolefin microporous membrane, an electrolyte solution, an electrode active material, an additive or decomposition products thereof.

[3]

The polyolefin microporous membrane according to item 1 or 2, wherein the layer A or the layer B is a layer having no functional group, and a ratio of the thickness of the layer having the functional group to the thickness of the layer having no functional group is 0.08 to 6.50.

[4]

The polyolefin microporous membrane according to any one of items 1 to 3, wherein the layer A or the layer B is a layer having no functional group, a polyethylene is contained in the layer having no functional group, and the polyethylene has a degree of crystallinity of 60% to 99%.

[5]

The polyolefin microporous membrane according to item 4, wherein the polyethylene has a crystallite size of 10 nm to 50 nm.

[6]

The polyolefin microporous membrane according to any one of items 1 to 5, wherein the crosslinked structure is an amorphous crosslinked structure in which the amorphous portion of the polyolefin is crosslinked.

[7]

The polyolefin microporous membrane according to item 6, wherein the amorphous portion is selectively crosslinked.

[8]

The polyolefin microporous membrane according to any one of items 1 to 7, wherein the polyolefin is a functional group-modified polyolefin, or a polyolefin in which a monomer having a functional group is copolymerized.

[9]

The polyolefin microporous membrane according to any one of items 1 to 8, wherein the crosslinked structure is formed by a reaction via any of covalent bonding, hydrogen bonding or coordinate bonding.

[10]

The polyolefin microporous membrane according to item 9, wherein the reaction via covalent bonding is at least one selected from the group consisting of the following reactions (I) to (IV):

(I) condensation reaction of a plurality of identical functional groups;
(II) reaction between a plurality of different functional groups;
(III) chain condensation reaction between a functional group and an electrolyte solution; and
(IV) reaction of a functional group with an additive.

[11]

The polyolefin microporous membrane according to item 10, wherein the reaction via coordinate bonding includes the following reaction (V):

(V) reaction in which a plurality of the same functional groups crosslink via coordinate bonding with metal ions.

[12]

The polyolefin microporous membrane according to item 10, wherein the reaction(s)(I) and/or (II) is/are catalytically accelerated by a chemical substance inside the electricity storage device.

[13]

The polyolefin microporous membrane according to item 10, wherein the reaction (I) is a condensation reaction of a plurality of silanol groups.

[14]

The polyolefin microporous membrane according to item 10, wherein the reaction (IV) is a nucleophilic substitution reaction, a nucleophilic addition reaction or a ring-opening reaction between a compound Rx constituting the separator for an electricity storage device and a compound Ry constituting the additive, the compound Rx has a functional group x, and the compound Ry includes a linking reaction unit $y_1$.

[15]

The polyolefin microporous membrane according to item 14, wherein the reaction (IV) is a nucleophilic substitution reaction,
the functional group x of the compound Rx is at least one selected from the group consisting of —OH, —NH$_2$, —NH—, —COOH and —SH, and
the linking reaction unit $y_1$ of the compound Ry is at least two selected from the group consisting of CH$_3$SO$_2$—, CF$_3$SO$_2$—, ArSO$_2$—, CH$_3$SO$_3$—, CF$_3$SO$_3$—, ArSO$_3$—, and a monovalent group represented by the following formulas ($y_1$-1) to ($y_1$-6):

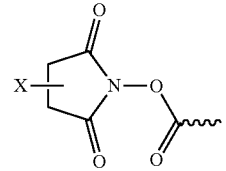

($y_1$-1)

wherein X is a hydrogen atom or a monovalent substituent;

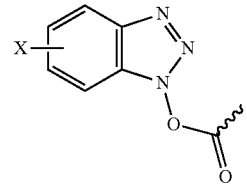

($y_1$-2)

wherein X is a hydrogen atom or a monovalent substituent;

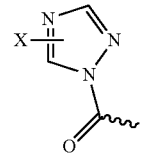

($y_1$-3)

wherein X is a hydrogen atom or a monovalent substituent;

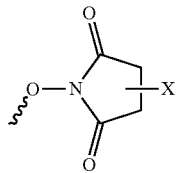 (y₁-4)

wherein X is a hydrogen atom or a monovalent substituent;

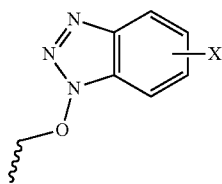 (y₁-5)

wherein X is a hydrogen atom or a monovalent substituent; and

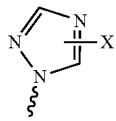 (y₁-6)

wherein X is a hydrogen atom or a monovalent substituent.

[16] The polyolefin microporous membrane according to item 14 or 15, wherein
the reaction (IV) is a nucleophilic substitution reaction,
the compound Ry includes a straight-chain unit $y_2$ in addition to the linking reaction unit $y_1$, and
the straight-chain unit $y_2$ is at least one selected from the group consisting of divalent groups represented by the following formulas (y₂-1) to (y₂-6):

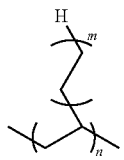 (y₂-1)

wherein m is an integer of 0 to 20, and n is an integer of 1 to 20;

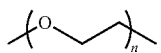 (y₂-2)

wherein n is an integer of 1 to 20;

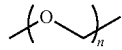 (y₂-3)

wherein n is an integer of 1 to 20;

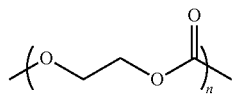 (y₂-4)

wherein n is an integer of 1 to 20;

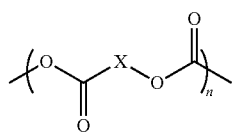 (y₂-5)

wherein X is an alkylene group having 1 to 20 carbon atoms or an arylene group, and n is an integer of 1 to 20; and

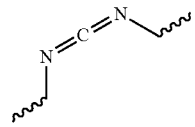 (y₂-6)

wherein X is an alkylene group having 1 to 20 carbon atoms or an arylene group, and n is an integer of 1 to 20.

[17] The polyolefin microporous membrane according to item 14, wherein
the reaction (IV) is a nucleophilic addition reaction,
the functional group x of the compound Rx is at least one selected from the group consisting of —OH, —NH₂, —NH—, —COOH and —SH, and
the linking reaction unit $y_1$ of the compound Ry is at least one selected from the group consisting of groups represented by the following formulas (Ay₁-1) to (Ay₁-6):

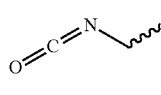 (Ay₁-1)

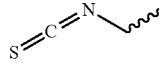 (Ay₁-2)

 (Ay₁-3)

(Ay₁-4)

wherein R is a hydrogen atom or a monovalent organic group;

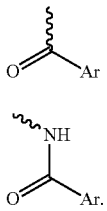

(Ay₁-5)

(Ay₁-6)

[18]

The polyolefin microporous membrane according to item 14, wherein
the reaction (IV) is a ring-opening reaction,
the functional group x of the compound Rx is at least one selected from the group consisting of —OH, —NH₂, —NH—, —COOH and —SH, and
the linking reaction unit y₁ of the compound Ry is at least two groups represented by the following formula (ROy₁-1):

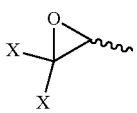

(ROy₁-1)

wherein a plurality of X are each independently a hydrogen atom or a monovalent substituent.

[19]

The polyolefin microporous membrane according to item 11, wherein, in the reaction (V), the metal ion is at least one selected from the group consisting of $Zn^{2+}$, $Mn^{2+}$, $Co^{3+}$, $Ni^{2+}$ and $Li^{+}$.

[20]

A separator for an electricity storage device, including the polyolefin microporous membrane according to any one of items 1 to 19.

[21]

A separator for an electricity storage device, including at least each one of layer A containing a polyolefin, layer B containing a polyolefin, and layer C containing inorganic particles, wherein
the polyolefin contained in at least one of the layer A and the layer B has one or more types of functional groups, and the functional groups comprise functional groups which undergo a condensation reaction with each other in the electricity storage device to form a crosslinked structure by a siloxane bond.

[22]

The separator for an electricity storage device according to item 21, wherein one or more island structures containing an alkali metal and/or an alkaline earth metal are detected when TOF-SIMS measurement is carried out on the layer A or the layer B over an area of 100 μm square, and the size of the island structure has a region of 9 μm² or more and 245 μm² or less.

[23]

The separator for an electricity storage device according to item 22, wherein two or more island structures containing an alkali metal and/or an alkaline earth metal are present in the separator, and both a minimum value and a maximum value of a distance between the weighted centers of gravity positions of each of the island structures are 6 μm or more and 135 μm or less.

[24]

The separator for an electricity storage device according to item 22 or 23, wherein the island structure contains an alkaline earth metal, and the alkaline earth metal is calcium.

[25]

The separator for an electricity storage device according to item 22 or 23, wherein the alkali metal and/or the alkaline earth metal is/are at least one selected from the group consisting of lithium, sodium, magnesium, potassium and strontium.

[26]

The separator for an electricity storage device according to any one of items 21 to 24, wherein the layer C is an inorganic porous layer containing inorganic particles and a resin binder.

[27]

The separator for an electricity storage device according to item 26, wherein the resin binder has a glass transition temperature (Tg) of −50° C. to 90° C.

[28]

The separator for an electricity storage device according to any one of items 21 to 27, wherein the content of inorganic particles in the layer C is 5 wt % to 99 wt % based on the total weight of the layer C.

[29]

The separator for an electricity storage device according to any one of items 21 to 28, wherein the inorganic particles are at least one selected from the group consisting of alumina, silica, titania, zirconia, magnesia, ceria, yttria, zinc oxide, iron oxide, silicon nitride, titanium nitride, boron nitride, silicon carbide, aluminum hydroxide oxide, talc, kaolinite, dickite, nacrite, halloysite, pyrophyllite, montmorillonite, sericite, mica, amesite, bentonite, asbestos, zeolite, diatomaceous earth, silica sand and glass fiber.

[30]

The separator for an electricity storage device according to any one of items 21 to 29, wherein layer D containing a thermoplastic polymer is stacked on the surface of the layer C, which is not in contact with the layer A or the layer B.

[31]

The separator for an electricity storage device according to any one of items 21 to 30, wherein the thermoplastic polymer contained in the layer D includes (meth)acrylic acid ester or (meth)acrylic acid as a polymerization unit.

[32]

The separator for an electricity storage device according to item 30 or 31, wherein a ratio of an area in which the layer D covers the layer C is 5% to 98%.

[33]

The separator for an electricity storage device according to any one of items 30 to 32, wherein the thermoplastic polymer contained in the layer D contains at least one fluorine atom-containing vinyl compound selected from the group consisting of polyvinylidene fluoride-hexafluoropropylene (PVDF-HFP) and polyvinylidene fluoride-chlorotrifluoroethylene (PVDF-CTFE).

[34]

The separator for an electricity storage device according to any one of items 21 to 33, wherein a thermal response index obtained when the separator for an electricity storage device is heated to 150° C. at 2° C./min after immersion in an electrolyte solution is fitted to formula (1) using the least squares approximation method, the range of rate is 3.5≤rate≤150.

$$\text{(Thermal Response Index)} = \frac{\max}{1 + \exp\frac{T_0 - T}{\text{rate}}} \quad \text{Formula (1)}$$

The separator for an electricity storage device according to any one of items 21 to 34, wherein a thermal response index obtained when the separator for an electricity storage device is heated to 150° C. at 2° C./min after immersion in an electrolyte solution is fitted to formula (1) using the least squares approximation method, the range of $T_0$ is 110≤$T_0$≤150 and the range of max is 0.1≤max≤30.

[36]

The separator for an electricity storage device according to any one of items 1 to 35, wherein the polyolefin having the functional groups is not a master batch resin containing a dehydrating condensation catalyst which forms a cross-linked structure of the functional groups.

[37]

An electricity storage device assembly kit, including:
(A) an exterior body housing a laminated body or a wound body of electrodes and the separator for an electricity storage device according to any one of items 20 to 36; and
(B) a container housing a nonaqueous electrolyte solution.

[38]

An electricity storage device, including a positive electrode, a negative electrode, the separator for an electricity storage device according to any one of items 20 to 36, and a nonaqueous electrolyte solution.

[39]

An electricity storage device, including a positive electrode, a negative electrode, the separator for an electricity storage device according to any one of items 20 to 36, and a nonaqueous electrolyte solution, wherein the positive electrode is at least one selected from the group consisting of a nickel-manganese-cobalt (NMC)-based lithium-containing positive electrode, an olivine-type lithium iron phosphate (LFP)-based positive electrode, a lithium cobaltate (LCO) positive electrode, a nickel-cobalt-aluminum (NCA)-based lithium-containing positive electrode and a lithium manganate (LMO)-based positive electrode.

Advantageous Effects of Invention

According to the present disclosure, it is possible to provide a safer polyolefin microporous membrane; a separator for an electricity storage device, an electricity storage device assembly kit and an electricity storage device using the same; and an electricity storage device.

In a first embodiment, according to the present disclosure, it is possible to provide a polyolefin microporous membrane capable of improving the heat resistance of an electricity storage device; a separator for an electricity storage device, an electricity storage device assembly kit and an electricity storage device using the same; and a method for producing an electricity storage device.

In a second embodiment, according to the present disclosure, it is possible to provide a safer separator for an electricity storage device in which the possibility of thermal runaway due to local short circuit is reduced; an electricity storage device assembly kit and an electricity storage device using the same; and an electricity storage device.

BRIEF DESCRIPTION OF DRAWINGS

FIG. 3(A) is a schematic diagram illustrating behavior when both ends of a separator for an electricity storage device including a non-crosslinked polyolefin substrate layer and an inorganic particle layer are heat-shrunk in an open state. FIG. 3(B) is a schematic diagram illustrating behavior when both ends of a separator for an electricity storage device including a non-crosslinked polyolefin substrate layer and an inorganic particle layer are heat-shrunk in a fixed state.

FIG. 5(A) is a schematic diagram illustrating behavior when both ends of a separator for an electricity storage device including a crosslinked polyolefin substrate layer and an inorganic particle layer are heat-shrunk in an open state. FIG. 5(B) is a schematic diagram illustrating behavior when both ends of a separator for an electricity storage device including a crosslinked polyolefin substrate layer and an inorganic particle layer are heat-shrunk in a fixed state.

DESCRIPTION OF EMBODIMENTS

Figure 1:
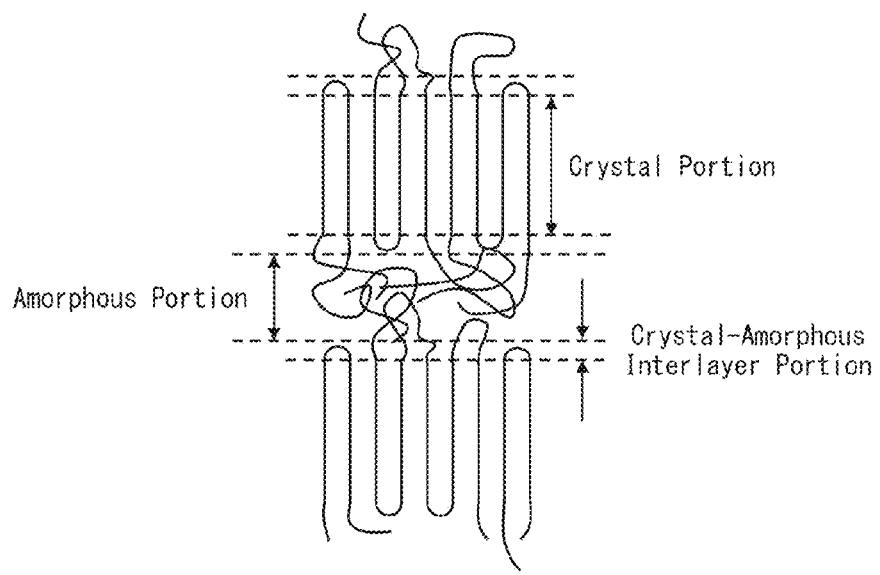
FIG. 1 is a schematic diagram for explaining a crystalline polymer having a higher-order structure divided into a lamellar (crystal portion), an amorphous portion and an intermediate layer portion therebetween.

I. Polyolefin Microporous Membrane in First Embodiment, and Separator for Electricity Storage Device Using Same <<Polyolefin Microporous Membrane>>

The polyolefin microporous membrane can be used as a microfiltration membrane, a separator for a fuel cell, a separator for a capacitor, a separator for an electricity storage device, an electrolysis membrane, or constituent materials thereof.

When the polyolefin microporous membrane is used as a separator for an electricity storage device or constituent materials thereof, particularly a separator for LIB or constituent materials thereof, the microporous membrane itself may be used as a separator, or a separator including another layer or film formed on at least one side of the microporous membrane may be used as a separator. The microporous membrane to be used for the separator for an electricity storage device is preferably a microporous membrane having low electron conductivity, ionic conductivity, high resistance to an organic solvent, and a fine pore size.

From the viewpoint of the shutdown characteristics when the polyolefin microporous membrane is used as a separator for an electricity storage device, it is preferable that 50 wt % or more and 100 wt % or less of the polyolefin microporous membrane is formed of a polyolefin (PO), and the PO ratio is more preferably 60 wt % and 100 wt % or less, and still more preferably 70 wt % or more and 100 wt % or less. From the viewpoint of the heat membrane rupture resistance and decrease in pore size, the microporous membrane preferably contains a polyethylene (PE) and/or a polypropylene (PP) as PO.

<Laminated Structure and Chemical Crosslinkability>

In the first embodiment, the polyolefin microporous membrane has a laminated structure including at least each one of layer A containing a polyolefin and layer B containing a polyolefin, the polyolefin contained in at least one of the layer A and the layer B has one or more types of functional groups, and after housing in an electricity storage device, (1) the functional groups undergo a condensation reaction with each other, (2) the functional groups react with a chemical substance inside the electricity storage device, or (3) the functional groups react with other types of functional groups, to form a crosslinked structure.

By a laminated structure having at least one chemically crosslinkable layer capable of forming a crosslinked structure by any of the above reactions (1) to (3) after housing the polyolefin microporous membrane in the electricity storage device, it is not only effective for crosslinking gelation of the chemically crosslinkable layer, but also effective for preventing short circuit according to the positional relationship with the electrodes in the electricity storage device, thus enabling an improvement in heat resistance of the electricity storage device.

In the Hot Box test, it is important that the microporous membrane made of a polyolefin such as a polyethylene (PE) provides an isolation layer between the positive and negative electrodes after crystal melting. By providing a crosslinked structure in the PE microporous membrane, it is possible to improve the shape retention after melting. It was found that by utilizing the phenomenon that the PE microporous membrane having no crosslinked structure permeates into the electrode at the time of melting, leading to significant improvement in passing rate of the hot box test. The separator with such configuration can be designed so that it will not ignite or explode even if exothermic decomposition of the positive electrode progresses or $O_2$ gas is present in the system, in the electricity storage device, especially in the case of the positive electrode which is likely to cause thermal decomposition or $O_2$ gas generation, such as NMC positive electrode. This is because PE permeated between the electrode particles can nullify the ionic conductivity.

Meanwhile, the entangled structure of the polyethylene resin in the molten state differs greatly depending on whether or not it has a crosslinked structure, and mixing between the resin having a crosslinked structure and the resin having no crosslinked structure hardly progress in an entropy manner. Utilizing this phenomenon, a multilayer (for example, two-, three- or four-layer) separator, in which a microporous membrane made of a polyolefin such as PE, having a crosslinked structure, is directed to face the positive electrode and/or the negative electrode, and a polyolefin microporous membrane having no crosslinked structure is formed in an intermediate layer between both electrodes, have significantly high ability to ensure the distance between electrodes at the time of melting, and is capable of suppressing short circuit at high temperature and achieving satisfactory passing rate in the hot box test.

<Laminated Structure>

The polyolefin microporous membrane has a laminated structure of two or more layers including at least each one of layer A containing polyolefin and layer B containing polyolefin.

The polyolefin microporous membrane preferably has a two-layer structure or a three-layer structure, more preferably a one-type two-layer structure, a two-type two-layer structure, a one-type three-layer structure, a two-type three-layer structure or a three-type three-layer structure, and still more preferably a two-type two-layer structure or a two-type three-layer structure.

Specific examples of the two-layer structure are "layer A-layer B", and specific examples of the three-layer structure are "layer A-layer B", "layer A-layer B-layer B", "layer B-layer A-layer B" or "layer A-layer B-layer A". For example, in the polyolefin microporous membrane, one or plural additional layer(s) may be formed on one or both layer A(s), on one or both layer B(s), or between the layer A and the layer B. Examples of the additional layer include a layer containing a polyolefin, a layer containing a resin other than the polyolefin, a layer containing inorganic particles or a heat-resistant resin, and an adhesive layer containing an adhesive polymer.

In relation to the chemical crosslinkability described above, in the case of a two-layer structure, even when housed in an electricity storage device in a high temperature (for example, 200° C. or higher) environment, at least one chemically crosslinkable porous layer of two layers does not penetrate into the electrodes facing the porous layer, thus making it possible to contribute to the prevention of short circuit between the electrodes.

In the case of a three-layer structure (both surface layers are chemically crosslinkable porous layers), the chemically crosslinkable porous layer does not permeate into both electrodes, and is more effective for the prevention of short circuit at high temperature of the electricity storage device compared with the two-layer structure.

Furthermore, in the case of a three-layer structure (the intermediate layer is a chemically crosslinkable porous layer), the surface layer can be positively penetrated into the electrode even if it is housed in the electricity storage device at high temperature, so that it can have the effect of preventing short circuit between the electrodes due to the chemical crosslinkability of the intermediate layer, in addition to the effect of stopping the electrical conduction inside the intermediate layer.

Therefore, one of the layer A and the layer B is preferably a layer which does not have a functional group involved in any of the above reactions (1) to (3). From the viewpoint of the presence or absence of penetration into the electrodes and the prevention of short circuit between the electrodes at high temperatures, in the polyolefin microporous membrane having a laminated structure, a ratio of the thickness of the layer containing a functional group to that of the layer having no functional group is preferably 0.08 to 6.50. From the same viewpoint, it is preferable that polyethylene is contained in the layer having no functional group of the layer A and the layer B.

In the layer having no functional group, a polyethylene (PE) alone has a degree of crystallinity of preferably 60% to 99%, more preferably 60% to 80%, and still more preferably 62% to 77%, from the viewpoint of a swollen state due to the electrolyte solution in the battery. The electrolyte solution in which the PE single layer is swollen enables uniform penetration (supply) of the electrolyte solution into the crosslinking unit-containing layer, which is important for constructing a uniform crosslinked structure. In line with this trend, the PE crystallite size is preferably 10 nm to 50 nm, more preferably 15 nm to 40 nm, still more preferably 16 nm to 39 nm, and particularly preferably 20 nm to 38 nm.

Meanwhile, it is known from the study of the strength of materials that a PE single layer having no crosslinked structure has a physically entangled structure via crystals. It is known that such a physically entangled structure cannot be instantly relaxed even after crystal melting, and the entire entangled structure is viscoelastically maintained. It was clarified that, by constructing a crystal structure having a degree of crystallinity and a crystallite size adjusted for the layer containing no functional group, as mentioned in the above (Laminated Structure and Chemical Crosslinkability), it is possible to suppress the fusion with the microporous membrane layer having a crosslinked structure at the time of melting, which is satisfactory for suppressing short circuit between the electrodes. The crystallite size of PE alone can be adjusted within the above numerical range by, for example, controlling the PE form or the PE starting material charging method in the production process of the microporous membrane, and specifying the ratio of the PE starting material to the polypropylene (PP) starting material.

<Storage Modulus, Loss Modulus, Membrane Softening Transition Temperature and Membrane Rupture Temperature>

The viscoelasticity as mentioned above can be measured and observed by, for example, the following method. The solid viscoelasticity of the separator is measured using a dynamic viscoelasticity measurement apparatus, and the storage elastic modulus (E'), the loss modulus (E") and the membrane softening transition temperature can be calculated. The conditions for the solid viscoelasticity measurement were the following (i) to (iv).

(i) The dynamic viscoelasticity measurement is carried out under the following conditions:
Measuring apparatus used: RSA-G2 (manufactured by TA Instruments)
Sample thickness: from 200 μm to 400 μm (if the thickness of the sample alone is less than 200 μm, a plurality of samples are stacked so as to have a total thickness within a range of 200 μm to 400 μm, and the dynamic viscoelasticity measurement is carried out.)
Measuring temperature range: −50 to 250° C.
Temperature-elevating rate: 10° C./min
Measuring frequency: 1 Hz
Transform mode: sine wave tension mode (linear tension)
Initial static tensile load: 0.2 N
Initial gap distance (at 25° C.): 10 mm
Auto strain adjustment: Disabled (ii) The static tensile load refers to the median value of the maximum stress and minimum stress for each periodic motion, and the sine wave load refers to the vibrational stress centered on the static tensile load.

(iii) Sine wave tension mode refers to the measurement of the vibrational stress while carrying out periodic motion at a fixed amplitude of 0.1%, during which the vibrational stress was measured while varying the gap distance and static tensile load so that the difference between the static tensile load and the sine wave load is within 5%. When the sine wave load was 0.1 N or less, the vibrational stress is measured while fixing the static tensile load to 0.1 N.

(iv) The storage modulus (E') and loss modulus (E") are calculated from the relationship between the obtained sine wave load and amplitude value, and the following equations:

$$\sigma^* = \sigma_0 \cdot \mathrm{Exp}[i(\omega t + \delta)],$$

$$\varepsilon^* = \varepsilon_0 \cdot \mathrm{Exp}(i\omega t),$$

$$\sigma^* = E^* \cdot \varepsilon^*$$

$$E^* = E' + iE''$$

where $\sigma^*$: vibrational stress, $\varepsilon^*$: strain, i: imaginary number unit, $\omega$: angular frequency, t: time, $\delta$: phase difference between vibrational stress and strain, $E^*$: complex modulus, $E'$: storage modulus, $E''$: loss modulus, vibrational stress: sine wave load/initial cross-sectional area static tensile load: load at minimum point of vibrational stress for each period (minimum point of gap distance for each period)

sine wave load: difference between measured vibrational stress and static tensile load. The average value of the maximum and minimum of E' is calculated as the average E' ($E'_{ave}$), and the mean value of the maximum and minimum of E" is calculated as the average E" ($E''_{ave}$).

For E' and E", the maximum and minimum were calculated for each storage modulus or loss modulus at −50° C. to 250° C. among the dynamic viscoelasticity measurement data. More specifically, when no sample rupture (abrupt reduction in elastic modulus) was observed at −50° C. to 250° C., the maximum and minimum at −50° C. to 250° C. were calculated, and the value at the temperature where sample rupture was observed at −50° C. to 250° C. was defined as the minimum. In the relevant technical field, the storage modulus and loss modulus are interchangeable as represented by the following equation:

$$\tan \delta = E''/E'$$

where tan $\delta$ represents the loss tangent, E' represents the storage modulus, and E" represents the loss modulus.

The membrane softening transition temperature is the minimum temperature among the dynamic viscoelasticity measurement data at which the curve for the gap distance of the sample is obtained as a first derivation. The membrane rupture temperature is the temperature at which sample rupture (abrupt reduction in elastic modulus) is observed, among the dynamic viscoelasticity measurement data, with the measurement limit temperature sometimes being established at 250° C. from the viewpoint of progression of the thermal decomposition reaction of the polyolefin resin. However, since the same phenomenon can be understood even with measurement at a temperature higher than 250° C., a microporous membrane or a separator for an electricity storage device with a membrane rupture temperature of 180° C. or higher can be implemented.

<Layer A and Layer B>

For convenience of explanation, constituent elements of the layer A and the layer B are shown below for the case of a two-type three-layer structure having each one of layer B on both sides (both surfaces) of layer A, but are not limited thereto.

The layer A and the layer B contain a polyolefin and are preferably composed of the polyolefin. The form of the polyolefin of the layer A and the layer B may be a microporous body of the polyolefin, for example, a woven fabric of a polyolefin-based fiber (woven fabric) or a non-woven fabric of a polyolefin-based fiber. Examples of the polyolefin include homopolymers, copolymers or multistage polymers obtained by using, for example, ethylene, propylene, 1-butene, 4-methyl-1-pentene, 1-hexene and 1-octene as monomer, and these polymers may be used alone or in combination of two or more thereof. The polyolefin is preferably at least one selected from the group consisting of polyethylene, polypropylene, and copolymers thereof from the viewpoint of the shutdown and meltdown characteristics of the separator.

Specific examples of the polyethylene include low-density polyethylene (LDPE), linear low-density polyethylene (LLDPE), medium-density polyethylene (MDPE), high-density polyethylene (HDPE), high molecular weight polyethylene (HMWPE) and ultra-high molecular weight polyethylene (UHMWPE).

As used herein, the high molecular weight polyethylene (HMWPE) means a polyethylene having a viscosity-average molecular weight (Mv) of 100,000 or more. In general, Mv of the ultra-high molecular weight polyethylene (UHMWPE) is 1,000,000 or more, so that the high molecular weight polyethylene (HMWPE) as used herein includes UHMWPE by definition.

As used herein, the high-density polyethylene means a polyethylene having a density of 0.942 to 0.970 g/cm$^3$. As used herein, the density of the polyethylene means the value measured in accordance with D) density gradient tube method mentioned in JIS K7112 (1999).

Specific examples of the polypropylene include isotactic polypropylene, syndiotactic polypropylene and atactic polypropylene.

Specific examples of the copolymer of ethylene and propylene include an ethylene-propylene random copolymer and an ethylene-propylene rubber.

The amount of the polypropylene contained in the layer A is preferably 0 wt % or more and less than 3 wt %, and more preferably 0 wt % or more and less than 1 wt %, based on the total weight of the resin components constituting the layer A. Most preferably, the layer A contains no polypropylene. When the polypropylene contained in the layer A is less than 3 wt %, the mechanical strength and elongation of the polyolefin microporous membrane become satisfactory.

When the polyolefin contained in the layer A contains a polyethylene, the amount of the polyethylene is preferably 90 wt % or more and 100 wt % or less, and more preferably 97 wt % or more and 100 wt % or less, based on the total weight of the resin components constituting the layer A. Most preferably, the layer A is composed of the polyethylene. High proportion of the polyethylene contained in the layer A improves the shutdown function of the polyolefin microporous membrane.

The ratio of the thickness of the layer A to the thickness of the entire polyolefin microporous membrane (total thickness) is 40% or more and 90% or less, preferably 50% or more and 90% or less, more preferably 55% or more and 85% or less, and still more preferably 60% or more and 80% or less. When the ratio of the thickness of the layer A is 90% or less, the melting point of the entire polyolefin microporous membrane does not decrease excessively, and the heat shrinkage of the separator can be suppressed. Further, it is possible to suppress pore-closing in layer A during hot pressing and the deterioration of permeability. Since the layer A has a low content of the polypropylene compared with the layer B, the toughness tends to be higher and the melting point tends to be lower compared with the layer B. Therefore, when the ratio of the thickness of the layer A is 50% or more, the layer A serves as a substrate of the polyolefin microporous membrane, and the mechanical strength and elongation of the polyolefin microporous membrane become satisfactory, and the shutdown function can be ensured.

The layer B contains a large amount of the polypropylene compared with the layer A. In other words, when the proportion of the polypropylene contained in the layer A is PPA (wt %) and the proportion of the polypropylene contained in the layer B is PPB (wt %), PPB>PPA. The lower limit of the amount of the polypropylene contained in the layer B is preferably 1 wt % or more, more preferably 3 wt % or more, still more preferably 4 wt % or more, yet more preferably 5 wt % or more, and most preferably 10 wt % or more, based on the total weight of the resin components constituting the layer B. The upper limit of the amount of the polypropylene contained in the layer B is preferably 30 wt % or less, more preferably 27 wt % or less, still more preferably 25 wt % or less, yet more preferably 20 wt % or less, and most preferably 18 wt % or less, based on the total weight of the resin components constituting the layer B. The amount of the polypropylene contained in the layer B is, for example, within a range of 1 wt % or more and 30 wt % or less, 1 wt % or more and less than 30 wt %, preferably 5 wt % or more and less than 30 wt %, and more preferably 5 wt % or more and 25 wt % or less, and still more preferably 10 wt % or more and 20 wt % or less. Since the layer A ensures the strength and elongation, and the polypropylene contained in the layer B is within the above range, when hot-pressing is carried out in the MD (machine direction of continuous molding of the microporous membrane) of the polyolefin microporous membrane with a certain tension applied, heat shrinkage in the TD (direction across MD at an angle of 90°) can be suppressed, thus enabling suppression of strain. Further, since the polypropylene has a high melting point compared with the polyethylene, the presence of the polypropylene within the above range in the layer B enables the prevention of deterioration of the permeability due to melting of the surface layer during hot pressing while ensuring the shutdown function of the separator.

When the polyolefin contained in the layer B contains a polyethylene, the amount of the polyethylene is preferably 60 wt % or more and 99 wt % or less, more preferably 70 wt % or more and 95 wt % or less, and still more preferably 75 wt % or more and 90 wt % or less, based on the total weight of the resin components constituting the layer B. Most preferably, the layer B is composed of the polypropylene and the polyethylene.

The viscosity-average molecular weight of the polyethylene contained in the layer A and the layer B is preferably 50,000 or more and 10,000,000 or less, more preferably 100,000 or more and 5,000,000 or less, still more preferably 120,000 or more and 3,000,000 or less, and most preferably 150,000 or more and 1,000,000 or less. When the molecular weight is 50,000 or more, a polyolefin microporous membrane having sufficient strength can be obtained, and when the molecular weight is 10,000,000 or less, the internal stress during stretching does not increase excessively, thus enabling the suppression of excessive heat shrinkage. The molecular weight distribution (Mw/Mn) of the polyethylene is preferably 20 or less, more preferably 17 or less, still more preferably 14 or less, yet more preferably 10 or less, and most preferably 8 or less, and is preferably 2 or more, more preferably 3 or more, and still more preferably 4 or more. When the molecular weight distribution is 20 or less, it is possible to prevent a decrease in breaking strength due to a low molecular weight component and to prevent an increase in residual stress due to a high molecular weight component. When the molecular weight distribution is 2 or more, the increase in residual stress can be suppressed.

When the polyolefin microporous membrane contains an ultra-high molecular weight polyethylene (UHMWPE), it is preferable that the layer A contains UHMWPE. When the layer A contains UHMWPE, the amount of UHMWPE is preferably 5 wt % or more, and more preferably 10 wt % or more, and is preferably 70 wt % or less, and more preferably 60 wt % or less, based on the total weight of the polyolefin of the layer A. When the layer A contains UHMWPE, it is possible to improve the breaking elongation of the polyolefin microporous membrane having a laminated structure as the substrate. The layer B may contain UHMPWE. When the layer B contains UHMPWE, the amount of UHMWPE is preferably less than 30 wt %, more preferably less than 20 wt %, and still more preferably less than 10 wt %, based on the total weight of the polyolefin of the layer B.

When the layer B contains UHMWPE, by setting the amount of UHMWPE in the layer B at 30 wt % or less, the melt viscosity does not increase excessively at the time of temperature rise, and the shutdown response time does not decrease excessively. This effect becomes remarkable when including the structure of the layer B-layer A-layer B in which heat is transferred to the layer B first. The ratio of UHMWPE to the total weight of the polyolefin in the entire polyolefin microporous membrane is preferably less than 45 wt %, more preferably less than 35 wt %, and still more preferably less than 25 wt %. When the ratio of UHMWPE to the total weight of the polyolefin in the entire polyolefin microporous membrane is less than 45%, it is possible to suppress an increase in heat shrinkage due to residual stress.

When the polyolefin microporous membrane contains a low-density polyethylene (LDPE) as the polyolefin, it is preferable that the layer B contains LDPE. When the layer B contains LDPE, the amount of LDPE is preferably 3 wt % or more, and more preferably 5 wt % or more, based on the total weight of the polyolefin of the layer B. When the layer B contains low LDPE, the shutdown temperature and the shutdown response time can be decreased. This effect becomes remarkable when including the structure of the layer B-layer A-layer B in which heat is transferred to the layer B first. The layer A may contain LDPE. When the layer A contains LDPE, the amount of LDPE is preferably 25 wt % or less, more preferably 20 wt % or less, still more preferably 15 wt % or less, and yet more preferably 10 wt % or less, based on the total weight of the polyolefin of the layer A. When the layer A contains LDPE, a decrease in elongation at break and mechanical strength can be suppressed by setting the proportion of LDPE at 25 wt % or less. This effect becomes remarkable when the layer A contains the structure of the layer B-layer A-layer B which ensures the mechanical strength as the substrate. The ratio of LDPE to the total weight of the polyolefin in the entire polyolefin microporous membrane is preferably 25 wt % or less, more preferably 18 wt % or less, and still more preferably 13 wt % or less. When the ratio of LDPE to the total weight of polyolefin in the entire polyolefin microporous membrane is 25 wt % or less, excessive deterioration of crystallinity is prevented, thus enabling the suppression of problems such as an increase in thermal shrinkage due to shrinkage of the amorphous portion below the melting point due to residual stress, and deterioration of the permeability and cycle characteristics. This effect is remarkable when used as a separator for a laminate secondary battery, which requires a step of fusing a separator having an adhesive layer to an electrode by a hot press.

The lower limit of the viscosity-average molecular weight of the polypropylene contained in the layer A and the layer B is preferably 50,000 or more, more preferably 100,000 or more, still more preferably 150,000 or more, still more preferably 300,000 or more, and most preferably 350,000 or more. The upper limit of the viscosity-average molecular weight of the polypropylene contained in the layer A and the layer B is preferably 10,000,000 or less, more preferably 5,000,000 or less, still more preferably 1,000,000 or less, and most preferably 800,000 or less. The viscosity-average molecular weight of the polypropylene contained in the layer A and the layer B is within a range of 50,000 or more and 10,000,000 or less, more preferably 100,000 or more and 5,000,000 or less, and most preferably 150,000 or more and 1,000,000 or less.

When the molecular weight of polypropylene is 50,000 or more, the melt index of the polyolefin microporous membrane does not increase excessively, thus enabling the prevention of melting during hot pressing. Further, it is possible to provide a polyolefin microporous membrane having excellent short circuit resistance of a battery in a nail penetration test. The reason is not limited to theory, but is considered that, even if the battery is short-circuited due to membrane rupture and the temperature of the battery rises, abrupt deterioration of the insulating properties can be prevented because of low fluidity of the separator melted due to the entanglement of the molecular chains. Excellent short circuit resistance of the battery under such harsh conditions is advantageous in a field where higher safety is required, for example, a separator for an in-vehicle battery.

When the molecular weight of the polypropylene is 10,000,000 or less, the internal stress during stretching does not increase excessively, thus enabling the suppression of excessive heat shrinkage.

The molecular weight distribution (Mw/Mn) of the polypropylene is preferably 30 or less, more preferably 24 or less, and most preferably 12 or less. When the molecular weight distribution of polypropylene is 30 or less, low content of the low molecular weight polypropylene component leads to satisfactory miscibility with the polyethylene, thus making it possible to obtain a polyolefin microporous membrane having higher heat resistance than that derived from the polypropylene.

The polypropylene contained in the layer A and the layer B is preferably a homopolymer. The amount of the homopolymer is preferably 90 wt % or more, more preferably 95 wt % or more, still more preferably 98 wt % or more, and most preferably 100 wt % (all), based on the total weight of the polypropylene in the entire polyolefin microporous membrane. When the content of the homopolymer is 90 wt % or more, it is possible to suppress further melting of the microporous membrane due to temperature rise at the time of short circuit. Since the homopolymer has high crystallinity, phase separation from the plasticizer tends to proceed easily, and a membrane having satisfactory porosity and high permeability tends to be obtained. Therefore, favorable effect on the output and cycle characteristics can be exerted. Furthermore, since the homopolymer has few amorphous portions, it is possible to suppress an increase in thermal shrinkage caused by shrinkage of the amorphous portions due to application of heat below the melting point or residual stress, and to suppress problems such as deterioration of the permeability and cycle characteristics. Although not limited in application, this effect is remarkable in a separator for a laminated secondary battery, which requires a step of fusing a separator having an adhesive layer to an electrode by a hot press.

The ratio of the thickness of the layer B to the total thickness of the polyolefin microporous membrane is preferably 10% or more and 50% or less, more preferably 15% or more and 45% or less, and still more preferably 20% or more and 40% or less.

The layer A and the layer B may contain, in addition to the polyolefins listed above, resins such as polyethylene terephthalate, polycycloolefin, polyether sulfone, polyamide, polyimide, polyimideamide, polyaramid, nylon, polytetrafluoroethylene and polyvinylidene fluoride.

<GPC Measurement>

The proportion of molecules having a molecular weight of 3,000,000 or more in an integral curve of the gel permeation chromatography (GPC) measurement of a polyolefin microporous membrane is preferably 10 wt % or less, more preferably 9 wt % or less, and still more preferably 8 wt % or less, and is preferably 3 wt % or more, and more preferably 5 wt % or more. The proportion of molecules having a molecular weight of 30,000 or less in an integral curve of the gel permeation chromatography (GPC) measurement of a polyolefin microporous membrane is preferably 3 wt % or less, more preferably 2.8 wt % or less, and most preferably 2.5 wt % or less, and is preferably 0.5 wt % or more, and more preferably 0.8 wt % or more. When the content of the high molecular weight polyethylene component is 10 wt % or less, the viscosity of the polyolefin microporous membrane does not increase excessively, and the shutdown function can be ensured. When the content of the low molecular weight polyethylene component is 3.0 wt % or less, it is possible to suppress deterioration of the permeability due to pore-closing of the polyolefin microporous membrane during hot pressing.

<Inorganic Particles>

The content of the inorganic particles in the layer B is preferably less than 5 wt %, and more preferably less than 3 wt %. Most preferably, no inorganic particles are contained. When the content of the inorganic particles is less than 5 wt %, it is possible to effectively suppress swelling of the battery due to the generation of gas. This effect becomes more remarkable in the laminated battery in which the exterior body is susceptible to deformation. When 5 wt % or more of the inorganic particles are present in the layer B, the inorganic particles act as the starting point for rupture to easily cause a reduction in elongation leading to deterioration of the mechanical safety, and cycle characteristics easily deteriorate due to disturbance in uniformity of the pores, which is not preferable.

Examples of the inorganic particles include, but are not particularly limited to, oxide-based ceramics such as alumina, silica (silicon oxide), titania, zirconia, magnesia, ceria, yttria, zinc oxide and iron oxide; nitride-based ceramics such as silicon nitride, titanium nitride and boron nitride; ceramics such as silicon carbide, calcium carbonate, aluminum sulfate, barium sulfate, aluminum hydroxide, aluminum hydroxide oxide, potassium titanate, talc, kaolinite, halloysite, pyrophyllite, montmorillonite, sericite, mica, amesite, bentonite, asbestos, zeolite, calcium silicate, magnesium silicate, diatomaceous earth and quartz sand; and glass fibers. These may be used alone, or two or more thereof may be used in combination. Of these, from the viewpoint of the electrochemical stability, at least one selected from the group consisting of silica, alumina and barium sulfate is preferable as the inorganic particles.

<Chemical Crosslinkability>

Since the functional groups included in the polyolefin constituting the layer A or the layer B are considered to be crosslinked in the amorphous portions without being incorporated into the crystal portions of the polyolefin, the polyolefin microporous membrane is housed in an electricity storage device, and then a crosslinked structure is formed by using a surrounding environment or a chemical substance in the electricity storage device, thereby suppressing an increase in internal stress or deformation of the fabricated electricity storage device, thus enabling an improvement in, for example, heat resistance in a hot box test.

(1) The condensation reaction between the functional groups of the polyolefin can be, for example, a reaction via a covalent bond of two or more functional groups A included in the polyolefin. (3) The reaction between the functional group of the polyolefin and other types of functional groups can be, for example, a reaction via a covalent bond between the functional group A and the functional group B included in the polyolefin.

(2) In the reaction between the functional group of the polyolefin and the chemical substance inside the electricity storage device, for example, the functional group A included in the polyolefin can form a covalent bond or a coordinate bond with any of an electrolyte, an electrolyte solution, an electrode active material or an additive, or decomposition products thereof, which are included in the electricity storage device, or any of an electrolyte, an electrolyte solution, an electrode active material or an additive, or decomposition products thereof, which are included in the polyolefin microporous membrane as the substrate, Timing of including any of an electrolyte, an electrolyte, an electrode active material, an additive in the polyolefin microporous membrane, or a decomposition product thereof is not restricted, and may be before, during or after the housing of the polyolefin microporous membrane into the electricity storage device. According to the reaction (2), a crosslinked structure is formed not only the inside of the polyolefin microporous membrane, but also between the polyolefin microporous membrane and the electrode or between the polyolefin microporous membrane and the solid electrolyte interface (SEI), thus enabling an improvement in strength between the plurality of members of the electricity storage device.

The crosslinked structure formed by any of the reactions (1) to (3) is preferably an amorphous crosslinked structure in which the amorphous portion of the polyolefin is crosslinked. Since it is believed that the functional groups in the polyolefin constituting the layer A or the layer B are not incorporated into the crystal portion of the polyolefin but are instead crosslinked in the amorphous portions, it is possible to suppress an increase in internal stress or the deformation of the fabricated electricity storage device while achieving both a shutdown function and high-temperature membrane rupture resistance, as compared to a conventional crosslinked polyolefin microporous membrane in which the crystal portion and its periphery are easily crosslinked, and can therefore improve hot box testability. From the same viewpoint, the amorphous portion of the polyolefin is more preferably selectively crosslinked, and still more preferably it is significantly more crosslinked than the crystal portion. The gelation degree of the polyolefin microporous membrane having an amorphous crosslinked structure such as a silane crosslinked structure is preferably 30% or more, and more preferably 70% or more.

The crosslinking reaction mechanism and crosslinked structure are not fully understood, but are considered by the present inventors to be as follows.

(1) Crystal Structure of High-Density Polyethylene Microporous Membrane

A polyolefin resin, which is typically high-density polyethylene, is generally a crystalline polymer, and as shown in FIG. 1, it has a higher-order structure divided into the lamella of the crystal structure (crystal portion), an amorphous portion and an interlayer portion between them. The polymer chain mobility is low in the crystal portion and in the interlayer portion between the crystal portion and amorphous portion, making it difficult to separate, but in solid viscoelasticity measurement it is possible to observe a relaxation phenomenon within a range of 0 to 120° C. The amorphous portion, on the other hand, has very high polymer chain mobility, with the phenomenon being observed within a range of −150 to −100° C. in solid viscoelasticity measurement. This is closely related to the radical relaxation or radical transfer reaction or crosslinking reaction mentioned below.

Figure 2:
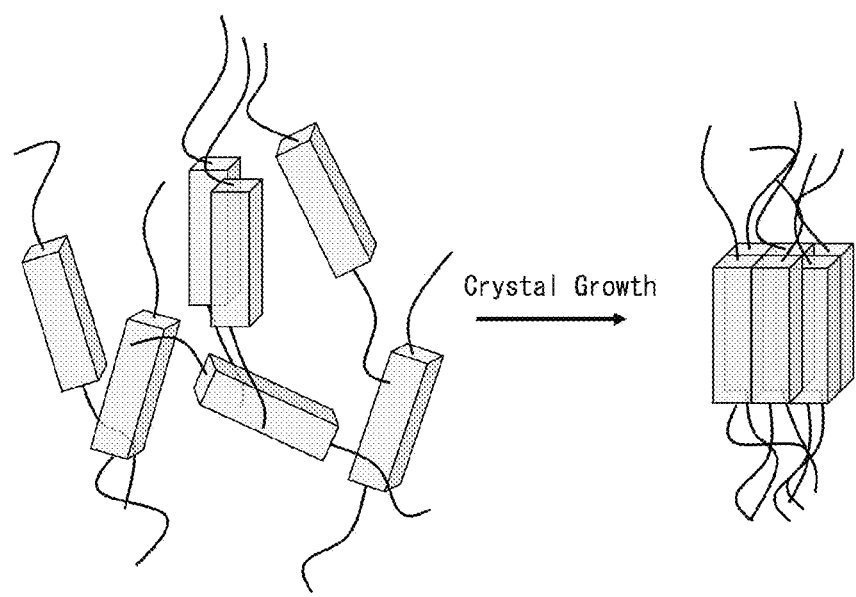
FIG. 2 is a schematic diagram for explaining the crystal growth of a polyolefin molecule.

Moreover, the polyolefin molecules constituting the crystals are not simple but rather, as shown in FIG. 2, a plurality of polymer chains forming small lamella which then aggregate, forming crystals. It is difficult to observe this phenomenon directly. It has become evident, however, as recent simulations have advanced academic research in the field. For the purpose mentioned herein, a "crystal" is the minimum crystal unit measured by X-ray structural analysis, being a unit that can be calculated as crystallite size. Thus, even the crystal portion (lamella interior) is partially unconstrained at the time of crystallization, so that portions with somewhat high mobility are predicted to be present.

(2) Crosslinking Reaction Mechanism by Electron Beam

The reaction mechanism of electron beam crosslinking (hereinafter abbreviated as EB crosslinking) of polymers is as follows. (i) Irradiation of an electron beam of several tens of kGy to several hundred kGy, (ii) permeation of the electron beam into the reaction target (polymer) and secondary electron generation, (iii) hydrogen withdrawal reaction and radical generation in the polymer chains by the secondary electrons, (iv) withdrawal of adjacent hydrogens by radicals and migration of the active sites, and (v) crosslinking reaction or polyene formation by recombination between radicals. Because radicals generated in the crystal portion have poor mobility, they are present for long periods, while impurities, etc. are unable to infiltrate into the crystals, and therefore the probability of reaction or quenching is low. Such radical species are known as stable radicals, and they remain for long periods of several months, lifetime thereof having been elucidated by ESR measurement. This is thought to result in poor crosslinking reaction within the crystals. However, in the unconstrained molecular chains or the peripheral crystal-amorphous interlayer portions which are present in small amounts inside the crystals, the generated radicals have somewhat longer lifetimes. These radical species are known as Persistent Radicals, and in mobile environments they are thought to promote crosslinking reaction between molecular chains with high probability. The amorphous portions have very high mobility, and therefore generated radical species have a short lifetime and are thought to promote not only crosslinking reaction between molecular chains but also polyene reaction within individual molecular chains, with high probability.

In a micro visual field on the level of crystals, therefore, crosslinking reaction by EB crosslinking can be assumed to be localized within the crystals or at peripheries thereof.

(3) Crosslinking Reaction Mechanism by Chemical Reaction

The functional groups in the polyolefin resin and the chemical substances in the electricity storage device or the polyolefin microporous membrane are preferably reacted, or the chemical substances in the electricity storage device or the polyolefin microporous membrane are preferably used as catalysts.

As mentioned above, crystal portions and amorphous portions are present in a polyolefin resin. Due to steric hindrance, however, the functional groups are not present in the crystals and are localized in the amorphous portions. This is generally known, and even though units such as methyl groups that are present in small amounts in polyethylene chains are incorporated into the crystals, grafts that are bulkier than ethyl groups are not incorporated (NPL 2). Therefore, crosslinking points due to different reactions than the electron beam crosslinking are only localized at the amorphous portions.

(4) Relationship Between Differences in Crosslinked Structure and Effects Thereof The reaction products in the crosslinking reactions by chemical reactions within the battery have different morphologies. In the research leading to the present disclosure, the following experimentation was carried out in order to elucidate crosslinked structures and to characterize the changes in physical properties of microporous membranes that result from structural changes.

First, the mechanical properties of a membrane were examined by a tensile rupture test. Simultaneously with the tensile rupture test, in situ X-ray structural analysis was carried out using emitted light to analyze changes in crystal structure. As shown in FIG. 3, when compared to a membrane without EB crosslinking or chemical crosslinking (before), the EB crosslinked membrane had reduced fragmentation of the crystal portion as the strain increased. This is because the crystal interiors or peripheries had been selectively crosslinked. The Young's modulus and breaking strength markedly increased during this time, allowing high mechanical strength to be exhibited. Meanwhile, the chemical crosslinked membrane showed no difference in fragmentation of the crystals before and after crosslinking reaction, thus suggesting that the amorphous portion has been selectively crosslinked. There was also no change in mechanical strength before and after crosslinking reaction.

The crystal melt behavior of both was then examined in a fuse/meltdown characteristics test. As a result, the EB crosslinked membrane had a notably higher fuse temperature, and the meltdown temperature increased to 200° C. or higher. The chemical crosslinked membrane, on the other hand, showed no change in fuse temperature before and after crosslinking treatment, and the meltdown temperature was confirmed to have increased to 200° C. or higher. This suggests that the fuse properties resulting from crystal melting had resulted from a higher melting temperature and lower melting speed due to crosslinking of the EB crosslinked membrane at the peripheries of the crystal portions. It was also concluded that no change was caused in the fuse properties because the chemical crosslinked membrane had no crosslinked structure at the crystal portions. In the high temperature range of around 200° C., both had a crosslinked structure after crystal melting, and therefore the resin as a whole was stabilized in a gel state and satisfactory meltdown characteristics are obtained.

The above findings are summarized in the following table.

TABLE 1

| Item | Electron beam crosslinking | Chemical reactive crosslinking |
|---|---|---|
| Crosslinking site | Within crystals and at crystal-amorphous interlayer portions | Amorphous portions |
| Film strength | Increased | No change |
| Fuse function | Function impaired or lost | No change |
| Meltdown resistance | Gradual increase with dose | Definitely improved |

<Polyolefin Having One or More Types of Functional Groups>

From the viewpoint of formation of a crosslinked structure, redox degradation resistance and a small and homogeneous porous structure, the polyolefin microporous membrane preferably includes a functional group-modified polyolefin or a polyolefin in which monomers having functional groups are copolymerized, as the polyolefin with one or more types of functional groups. As used herein, a functional group-modified polyolefin is a compound in which the functional groups are bonded after production of the polyolefin. The functional groups may be bonded to the polyolefin backbone or they may be ones that can be introduced into a comonomer, and preferably they contribute to selective crosslinking of the amorphous portion of the polyolefin, with examples including at least one selected from the group consisting of carboxyl, hydroxy, carbonyl, polymerizable unsaturated hydrocarbon, isocyanate, epoxy, silanol, hydrazide, carbodiimide, oxazoline, acetoacetyl, aziridine, ester, active ester, carbonate, azide, straight-chain or cyclic heteroatom-containing hydrocarbon, amino, sulfhydryl, metal chelating and halogen-containing groups.

From the viewpoint of the strength, ion permeability, redox degradation resistance and a small and homogeneous porous structure, the polyolefin microporous membrane preferably includes both a polyolefin having one or more types of functional groups and UHMWPE. When a polyolefin having one or more types of functional groups and UHMWPE are used in combination, preferably the weight ratio of the polyolefin with one or more types of functional groups and UHMWPE in the separator (weight of polyolefin having one or more types of functional groups/weight of ultra-high molecular weight polyethylene) is 0.05/0.95 to 0.80/0.20.

(Crosslinked Structure)

The crosslinked structure of the polyolefin included in the layer A or the layer B contributes to, for example, the heat resistance in a hot box test, and is preferably formed in the amorphous portion of the polyolefin. The crosslinked structure can be formed, for example, by reaction via covalent bonding, hydrogen bonding or coordinate bonding. The reaction via covalent bonding is preferably at least one selected from the group consisting of the following reactions (I) to (IV):
(I) condensation reaction of a plurality of the same functional groups,
(II) reaction between a plurality of different functional groups,
(III) chain condensation reaction between a functional group and the electrolyte solution, and
(IV) chain condensation reaction between a functional group and an additive.

The reaction via coordinate bonding is preferably the following reaction (V):
(V) reaction in which a plurality of the same functional groups crosslink via coordinate bonding with eluting metal ions.

When the polyolefin microporous membrane is used as a separator for an electricity storage device, the reactions (I) to (V) will be described below.

Reaction (I)

A schematic scheme and specific example of reaction (I) are shown below, with the first functional group of the separator represented as A.

Schematic scheme for reaction (I)

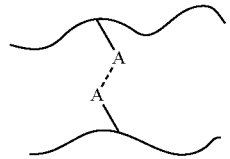

Example of Functional Group A

Silanol group, etc.

Specific example of reaction (I)

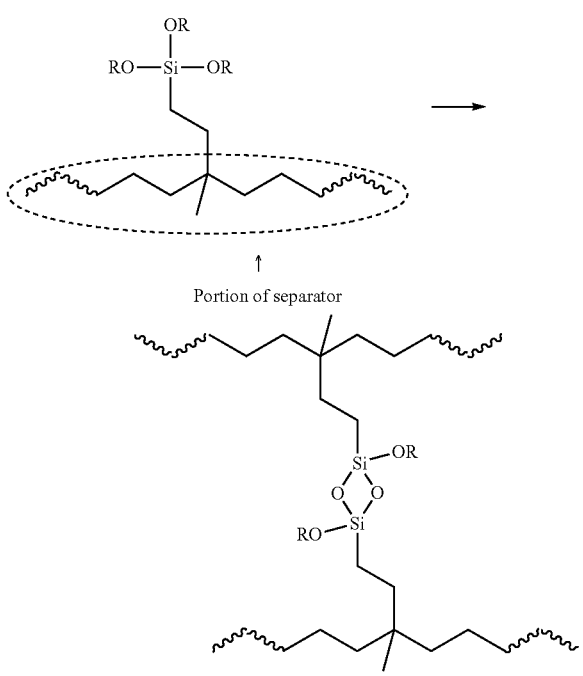

wherein R is an optionally substituted alkyl group having 1 to 20 carbon atoms, or a heteroalkyl group.

When functional group A for reaction (I) is a silanol group, the polyolefin is preferably silane graft-modified. A silane graft-modified polyolefin is composed with a structure having a polyolefin as the main chain and alkoxysilyl groups grafted on the main chain. Examples of the alkoxide substituted on the alkoxysilyl group include methoxide, ethoxide or butoxide. For example, R in the formula may be methyl, ethyl, n-propyl, isopropyl, n-butyl, sec-butyl, isobutyl or tert-butyl. The main chain and grafts may be linked by covalent bonding, for an alkyl, ether, glycol or ester structure. In consideration of the production process for the separator, the silane graft-modified polyolefin has a silicon-to-carbon ratio (Si/C) of preferably 0.2 to 1.8%, and more preferably 0.5 to 1.7%, at the stage before the crosslinking treatment step.

A preferable silane graft-modified polyolefin is one with a density of 0.90 to 0.96 g/cm$^3$ and a melt flow rate (MFR) of 0.2 to 5 g/min at 190° C. From the viewpoint of suppressing generation of resin aggregates during the production process for the separator, and maintaining silane crosslinkability until contact with the electrolyte solution, the silane graft-modified polyolefin is preferably not a master batch resin containing a dehydrating condensation catalyst. Dehydrating condensation catalysts are also known to function as catalysts for siloxane bond-forming reactions with alkoxysilyl group-containing resins. As used herein, a master batch resin refers to a compounded product obtained by preliminarily adding a dehydrating condensation catalyst (for example, an organometallic catalyst) to an alkoxysilyl group-containing resin or other kneading resins in a continuous process of kneading a resin using an extruder.

Reaction (II)

A schematic scheme and specific examples of reaction (II) are shown below, with the first functional group of the separator represented as A and the second functional group represented as B.

Schematic scheme for reaction (II)

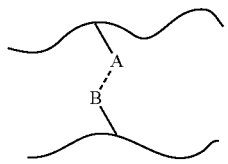

Examples for Combination of Functional Groups A and B

Hydroxyl group and carboxyl group (esterification);

Carbonyl group and alkyl group (aldol condensation);

Halogen and carboxyl group (intramolecular condensation)

Alkoxy group and alkyl group (Claisen reaction);

Carbonyl group and acid anhydride group (Perkin reaction;

Amino group and halogen;

Isocyanate group and hydroxyl group (formation of urethane bonds); and

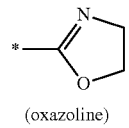

(oxazoline)

and hydroxy group, etc.

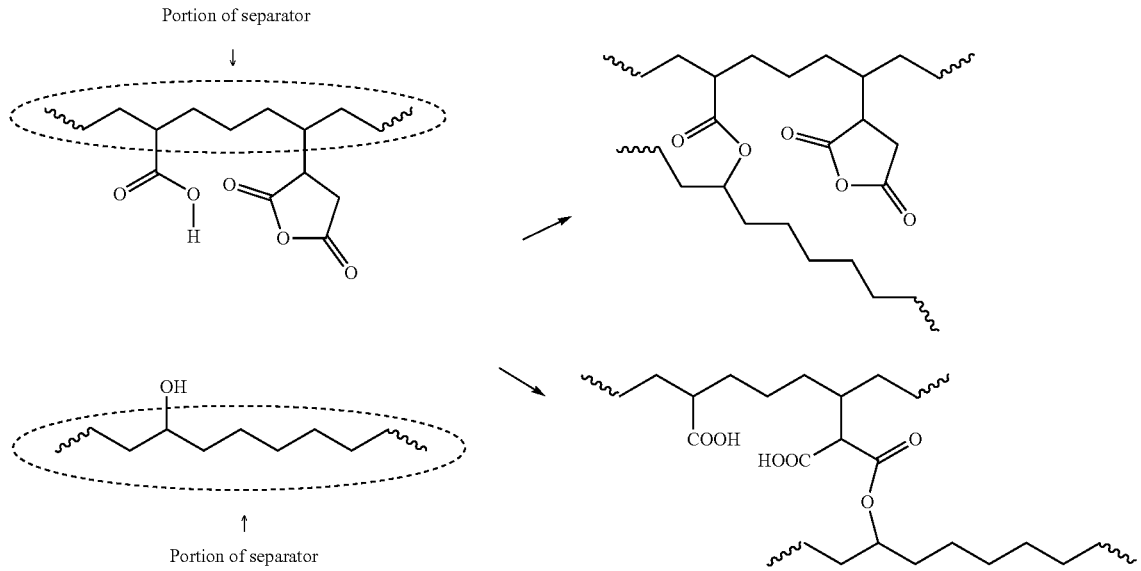

Specific example 1 of reaction (II)

Specific example 2 of reaction (II)

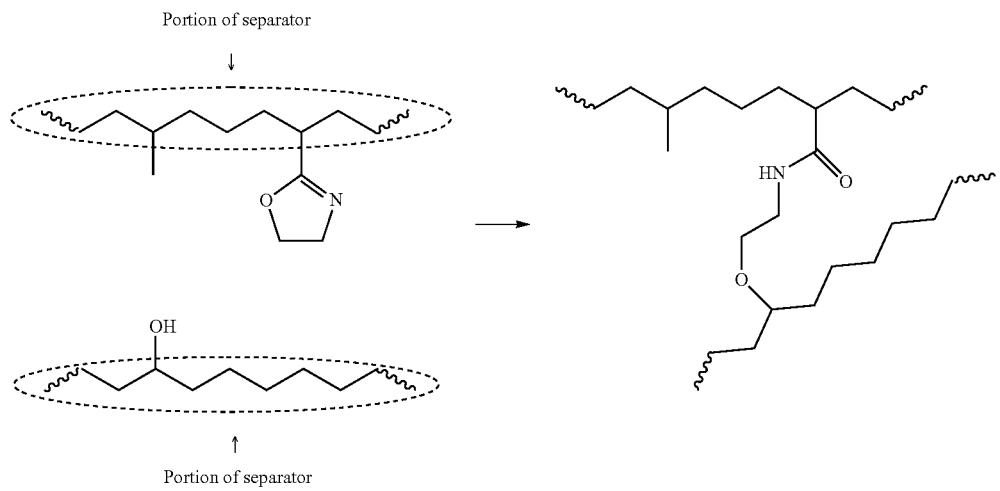

The reactions (I) and (II) can be subjected to catalytic action, and for example, they can be catalytically accelerated by a chemical substance inside the electricity storage device in which the separator is incorporated. The chemical substance may be, for example, any of an electrolyte, an electrolyte solution, an electrode active material or an additive, or decomposition products thereof, which are included in the electricity storage device.

Reaction (III)

A schematic scheme and specific examples of reaction (III) are shown below, with the first functional group of the separator represented as A, and the electrolyte solution represented as Sol.

Schematic scheme for reaction (III)

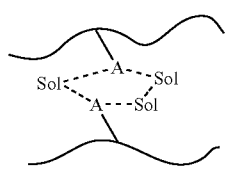

Examples for Functional Group A

Hydroxyl, carboxyl amino, carbonyl, ether and isocyanate groups, etc.

Examples for Electrolyte Solution

Electrolytes: $LiPF_6$, $LiBF_4$, $LiN(SO_2CF_3)_2$, $LiSO_3CF_3$, $LiBC_4O_8$ (LiBOB), etc.

Nonaqueous solvents: ethylene carbonate, ethylmethyl carbonate and their mixtures, etc.

Specific example 1 of reaction (III)

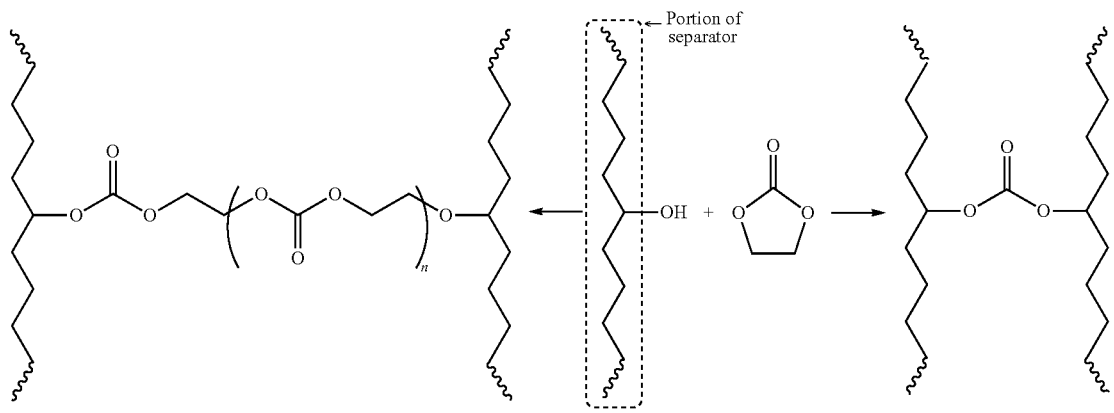

Specific example 2 of reaction (III)

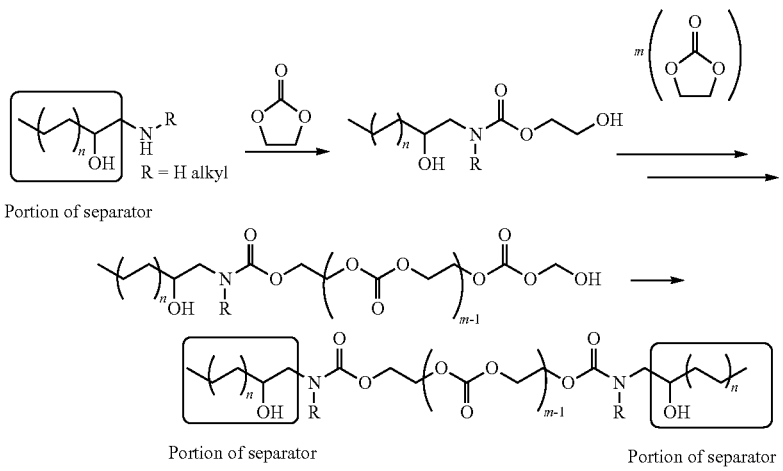

Portion of separator

Reaction (IV)

A schematic scheme for reaction (IV) is shown below, with the first functional group of the separator represented as A, the optionally incorporated second functional group as B and an additive as Add.

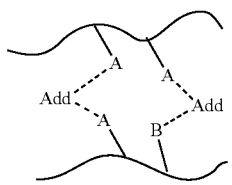

From the viewpoint of forming the covalent bonds represented by the dotted lines in the scheme, the reaction (IV) is preferably nucleophilic substitution reaction, nucleophilic addition reaction or ring-opening reaction between the compound Rx constituting the separator and the compound Ry constituting the additive (Add). The compound Rx may be the polyolefin in the separator, such as polyethylene or polypropylene, and preferably the polyolefin is modified with a functional group x, for example, modified with at least one selected from the group consisting of —OH, —NH$_2$, —NH—, —COOH and —SH.

Since a plurality of compounds Rx are crosslinked by compound Ry as the additive, the compound Ry preferably has two or more linking reaction units $y_1$. The plurality of linking reaction units $y_1$ may be any groups with any structure so long as they are able to participate in nucleophilic substitution reaction, nucleophilic addition reaction or ring-opening reaction with the functional group x of the compound Rx, and they may be substituted or unsubstituted, may contain heteroatoms or inorganic materials, and may be the same or different from each other. When the compound Ry has a straight-chain structure, the plurality of linking reaction units $y_1$ may each independently be end groups or groups incorporated into the main chain, or side chain or pendant groups.

When the reaction (IV) is a nucleophilic substitution reaction, it may be as follows, considering the functional group x of the compound Rx to be the nucleophilic group and the linking reaction unit $y_1$ of the compound Ry to be the leaving group, but this is only an example, and for the purpose of this embodiment the functional group x and linking reaction unit $y_1$ may both be leaving groups, depending on nucleophilicity thereof.

From the viewpoint of the nucleophilic reagent, the functional group x of the compound Rx is preferably an oxygen-based nucleophilic group, nitrogen-based nucleophilic group or sulfur-based nucleophilic group. Examples of oxygen-based nucleophilic groups include hydroxyl, alkoxy, ether and carboxyl groups, of which —OH and —COOH are preferable. Examples of nitrogen-based nucleophilic groups include ammonium groups, primary amino groups and secondary amino groups, of which —NH$_2$ and —NH— are preferable. Sulfur-based nucleophilic groups include —SH and thioether groups, for example, with —SH being preferable.

When the reaction (IV) is a nucleophilic substitution reaction, from the viewpoint of the leaving group, the linking reaction unit $y_1$ of the compound Ry is preferably an alkylsulfonyl group such as CH$_3$SO$_2$—, CH$_3$CH$_2$SO$_2$—; an arylsulfonyl group (—ArSO$_2$—); a haloalkylsulfonyl group such as CF$_3$SO$_2$— or CCl$_3$SO$_3$—; an alkyl sulfonate group such as CH$_3$SO$_3^-$ or CH$_3$CH$_2$SO$_3$—; an aryl sulfonate group (ArSO$_3$—); a haloalkyl sulfonate group such as CF$_3$SO$_3$— or CCl$_3$SO$_3$—; or a heterocyclic group, any of which may be used alone or in combinations of two or more thereof. Heteroatoms in a heterocyclic ring include nitrogen atoms, oxygen atoms and sulfur atoms, with nitrogen atoms being preferable from the viewpoint of dissociability. The leaving group containing a nitrogen atom in the heterocyclic ring is preferably a monovalent group represented by one of the following formulas ($y_1$-1) to ($y_1$-6):

($y_1$-1)

wherein X is a hydrogen atom or a monovalent substituent;

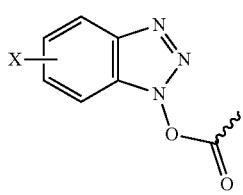
(y₁-2)

wherein X is a hydrogen atom or a monovalent substituent;

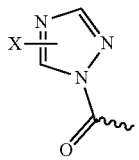
(y₁-3)

wherein X is a hydrogen atom or a monovalent substituent;

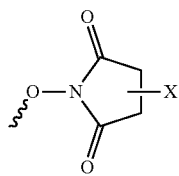
(y₁-4)

wherein X is a hydrogen atom or a monovalent substituent;

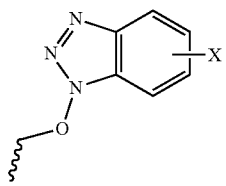
(y₁-5)

wherein X is a hydrogen atom or a monovalent substituent; and

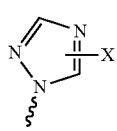
(y₁-6)

wherein X is a hydrogen atom or a monovalent substituent.

In formulas ($y_1$-1) to ($y_1$-6), X is hydrogen or a monovalent substituent. Examples of monovalent substituents include alkyl groups, haloalkyl groups, alkoxyl groups and halogen atoms.

When the reaction (IV) is a nucleophilic substitution reaction and the compound Ry has a straight-chain structure, the compound Ry preferably has, as a straight-chain unit $y_2$ in addition to the linking reaction unit $y_1$, at least one selected from the group consisting of divalent groups represented by the following formulas ($y_2$-1) to ($y_2$-6):

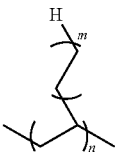
($y_2$-1)

wherein m is an integer of 0 to 20, and n is an integer of 1 to 20;

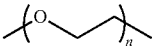
($y_2$-2)

wherein n is an integer of 1 to 20;

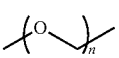
($y_2$-3)

wherein n is an integer of 1 to 20;

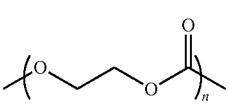
($y_2$-4)

wherein n is an integer of 1 to 20;

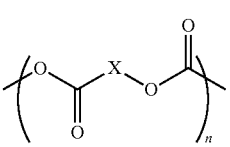
($y_2$-5)

wherein X is an alkylene group having 1 to 20 carbon atoms or an arylene group, and n is an integer of 1 to 20;

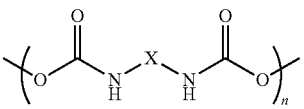
($y_2$-6)

wherein X is an alkylene group having 1 to 20 carbon atoms or an arylene group, and n is an integer of 1 to 20. When the compound Ry includes a plurality of straight-chain unit $y_2$, they may be the same or different, and sequences thereof may be either block or random.

In formula ($y_2$-1), m is an integer of 0 to 20, and from the viewpoint of the crosslinked network it is preferably 1 to 18. In formulas ($y_2$-1) to ($y_2$-6), n is an integer of 1 to 20, and from the viewpoint of the crosslinked network it is preferably 2 to 19 or 3 to 16. In formulas ($y_2$-5) to ($y_2$-6), X is an alkylene having 1 to 20 carbon atoms or an arylene group, and from the viewpoint of stability of the straight-chain structure it is preferably a methylene, ethylene, n-propylene, n-butylene, n-hexylene, n-heptylene, n-octylene, n-dodecylene, o-phenylene, m-phenylene or p-phenylene group.

Tables 2 to 4 below show preferable combinations for the functional group x of the compound Rx and the linking reaction unit $y_1$ and straight-chain unit $y_2$ of the compound Ry, when reaction (IV) is a nucleophilic substitution reaction.

TABLE 2

Nucleophilic substitution reaction (preferred combination I)

| Separator functional group | Additive (compound Ry) | |
|---|---|---|
| (functional group x of compound Rx) | Straight-chain unit (y2) | Two or more linking reaction units (y1) Both terminals |
| —OH | (structure with n = 1 to 20, m = 0 to 20) | (N-hydroxysuccinimide ester structure, X—) |
| —NH₂ | | (benzotriazole acetate structure, X—) |
| —NH— | | (triazole acetate structure, X—) X = H or monovalent substituent |
| —COOH —SH | | |

TABLE 3

Nucleophilic substitution reaction (preferred combination II)

| Separator functional group | Additive (compound Ry) | |
|---|---|---|
| (functional group x of compound Rx) | Straight-chain unit (y2) | Two or more linking reaction units (y1) Both terminals |
| —OH | (structure with n = 1 to 20, m = 0 to 20) | $CF_3SO_2$— |
| —NH₂ —NH— —COOH —SH | | $CH_3SO_2$— $ArSO_2$— $CF_3SO_3^-$— $CH_3SO_3^-$— $ArSO_3^-$— |

TABLE 4

| Separator functional group (functional group x of compound 12x) | Additive (compound Ry) | | |
|---|---|---|---|
| | | Two or more linking reaction units (y1) | |
| | Straight-chain unit (y2) | Terminal 1 | Terminal 2 |
| —OH | 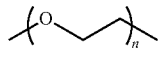 | 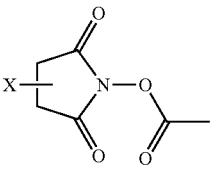 | |
| —NH₂ | 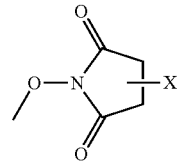 | 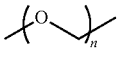 | |
| —NH— | 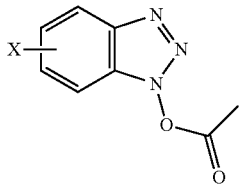 | 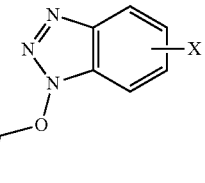 X = H or monovalent substituent | 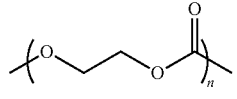 X = H or monovalent substituent |
| —COOH | 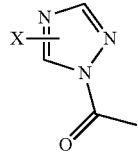 | | |
| —SH | 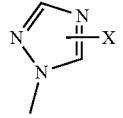 | | | n = 1-20,
X = $C_{1-20}$ alkylene or arylene group

The following is a reaction scheme as Specific Example 1 of the nucleophilic substitution reaction, where the functional group x of the polyolefin is —NH₂, the linking reaction unit $y_1$ of the additive (compound Ry) is the backbone of a succinimide, and the straight-chain unit $y_2$ is —(O—C₂H₅)$_n$—.

Specific example 1
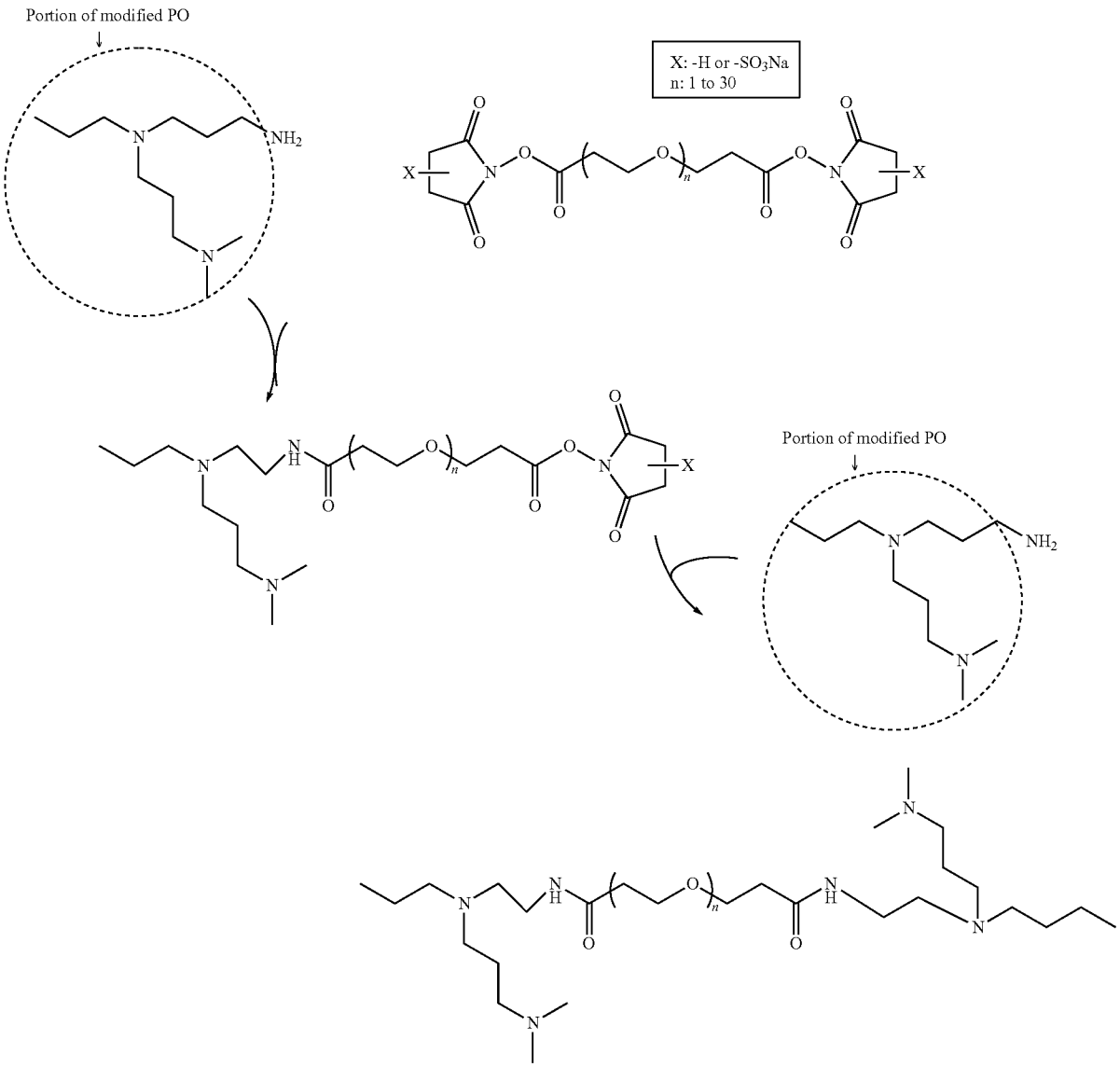
The following is a reaction scheme as Specific Example 2 of the nucleophilic substitution reaction, where the functional groups x of the polyolefin are —SH and —NH₂, the linking reaction unit $y_1$ of the additive (compound Ry) is a nitrogen-containing cyclic backbone, and the straight-chain unit $y_2$ is o-phenylene.

Specific example 2

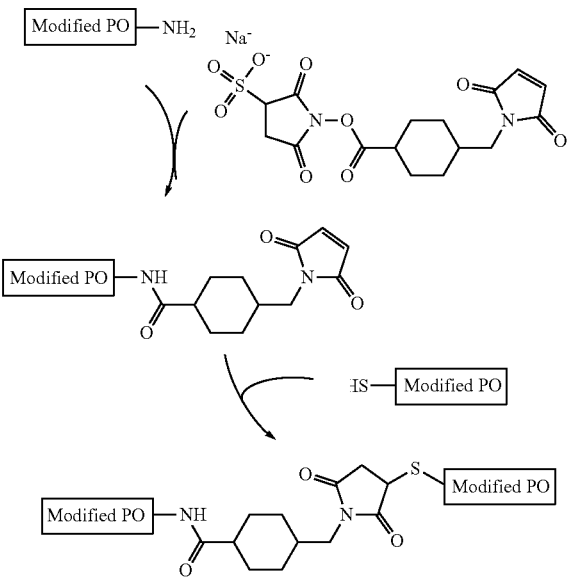

When the reaction (IV) is a nucleophilic addition reaction, the functional group x of the compound Rx and the linking reaction unit $y_1$ of the compound Ry may participate in addition reaction. For nucleophilic addition reaction, the functional group x of the compound Rx is preferably an oxygen-based nucleophilic group, nitrogen-based nucleophilic group or sulfur-based nucleophilic group. Examples of oxygen-based nucleophilic groups include hydroxyl, alkoxy, ether and carboxyl groups, of which —OH and —COOH are preferable. Examples of nitrogen-based nucleophilic groups include ammonium groups, primary amino groups and secondary amino groups, of which —NH$_2$ and —NH— are preferable. Sulfur-based nucleophilic groups include —SH and thioether groups, for example, with —SH being preferable.

In nucleophilic addition reaction, from the viewpoint of the addition reactivity and ready availability of starting materials, the linking reaction unit $y_1$ of the compound Ry is preferably at least one selected from the group consisting of groups represented by the following formulas (Ay$_1$-1) to (Ay$_1$-6):

wherein R is a hydrogen atom or a monovalent organic group;

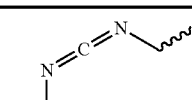

In formula (Ay$_1$-4), R is a hydrogen atom or a monovalent organic group, preferably a hydrogen atom or a C$_{1-20}$ alkyl, alicyclic or aromatic group, and more preferably a hydrogen atom or a methyl, ethyl, cyclohexyl or phenyl group.

Tables 5 and 6 below show preferable combinations for the functional group x of the compound Rx and the linking reaction unit $y_1$ of the compound Ry, when the reaction (IV) is a nucleophilic addition reaction.

TABLE 5

| Nucleophilic addition reaction (preferred combination I) | |
|---|---|
| Separator functional group (functional group x of compound Rx) | Additive (compound Ry) Two or more linking reaction units (y1) |
| —OH | 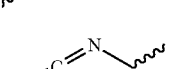 |
| —NH2 | 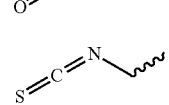 |
| —NH— |  |
| —COOH —SH | |

TABLE 6

| Nucleophilic addition reaction (preferred combination II) | |
|---|---|
| Separator functional group (functional group x of compound Rx) | Additive (compound Ry) Two or more linking reaction units (y1) |
| —OH |  R = H or monovalent organic group |
| —NH$_2$ | |

TABLE 6-continued

Nucleophilic addition reaction (preferred combination II)

| Separator functional group (functional group x of compound Rx) | Additive (compound Ry) Two or more linking reaction units (y1) |
|---|---|
| —NH— |  |
| —COOH |  |
| —SH |  |

The following is a reaction scheme as a specific example of the nucleophilic addition reaction, where the functional group x of the separator is —OH and the linking reaction unit $y_1$ of the additive (compound Ry) is —NCO.

Specific example

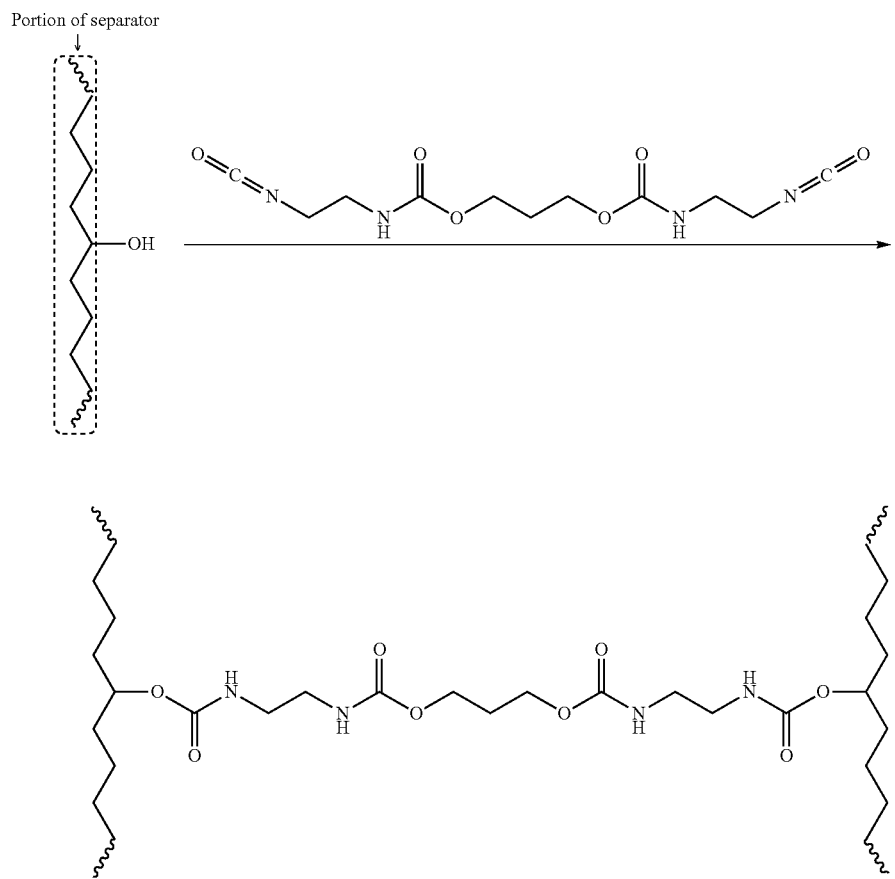

When the reaction (IV) is a ring-opening reaction, the functional group x of the compound Rx and the linking reaction unit $y_1$ of the compound Ry may participate in ring-opening reaction, and from the viewpoint of ready availability of starting materials, it is preferable to open the cyclic structure on the linking reaction unit $y_1$. From the same viewpoint, the linking reaction unit $y_1$ is more preferably an epoxy group, still more preferably compound Ry has two or more epoxy groups, and yet more preferably is a diepoxy compound.

When the reaction (IV) is a ring-opening reaction, the functional group x of the compound Rx is preferably at least one selected from the group consisting of —OH, —NH₂, —NH—, —COOH and —SH, and/or the linking reaction unit $y_1$ of the compound Ry is preferably at least two groups represented by the following formulas (ROy₁-1):

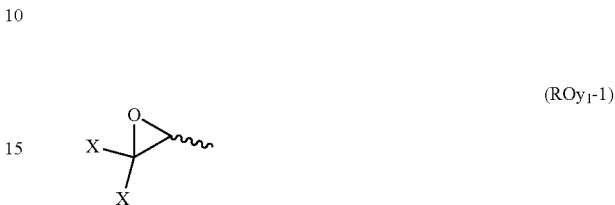

(ROy₁-1)

wherein a plurality of X are each independently a hydrogen atom or a monovalent substituent. In formula (ROy₁-1), the plurality of X groups are each independently a hydrogen atom or a monovalent substituent, preferably a hydrogen atom or a $C_{1-20}$ alkyl, alicyclic or aromatic group, and more preferably a hydrogen atom or a methyl, ethyl, cyclohexyl or phenyl group. Table 7 below shows preferable combinations for the functional group x of the compound Rx and the linking reaction unit $y_1$ of the compound Ry for an epoxy ring-opening reaction.

TABLE 7

| Epoxy ring-opening reaction (preferred combination) |  |
| --- | --- |
| Additive (compound Ry) | |
| Two or more linking reaction units (y1) | |
| —OH | X = H or monovalent substituent |
| —NH$_2$<br>—NH—<br>—COOH<br>—SH | |

Reaction (V)

A schematic scheme for reaction (V) and an example of functional group A are shown below, with the first functional group of the separator represented as A and the metal ion represented as M$^{n+}$.

Schematic scheme for reaction (V)

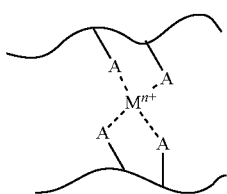

Examples for functional group A: —CHO, —COOH, acid anhydride, —COO—, etc.

In this scheme, the metal ion M$^{n+}$ is preferably one eluted from the electricity storage device (hereinafter also referred to as "eluting metal ion"), and it may be, for example, at least one selected from the group consisting of Zn$^{2+}$, Mn$^{2+}$, Co$^{3+}$, Ni$^{2+}$ and Li$^+$. The following is an example of coordinate bonding when functional group A is —COO$^-$.

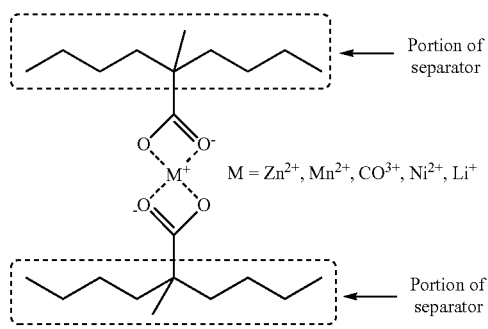

A specific scheme for reaction (V) is shown below, where the functional group A is —COOH and the eluting metal ion is Zn$^{2+}$.

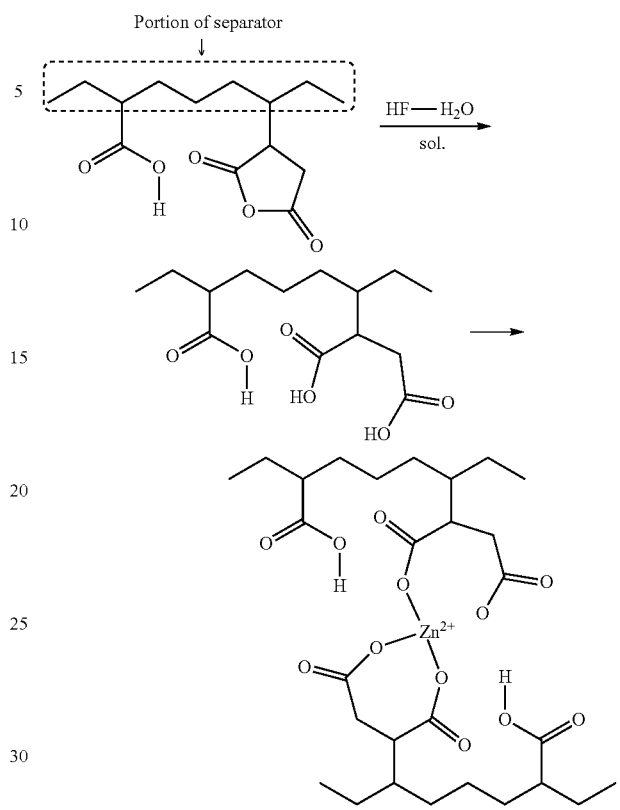

In this scheme, hydrofluoric acid (HF) may be derived from an electrolyte, an electrolyte solution, an electrode active material or an additive, or decomposition products or water-absorbed products thereof, which are included in the electricity storage device, depending on the charge-discharge cycle of the electricity storage device.

<Other Components>

The polyolefin microporous membrane may optionally contain known additives such as dehydrating condensation catalysts, metal soaps such as calcium stearate or zinc stearate, ultraviolet absorbers, light stabilizers, antistatic agents, anti-fogging agents, dyes, inorganic fillers and inorganic particles, in addition to the polyolefin.

<Properties of Polyolefin Microporous Membrane>

The polyolefin microporous membrane has a TD heat shrinkage rate of 10% or more and 40% or less at 120° C. measured with a constant load applied to MD, preferably 15% or more and 35% or less, and more preferably 20% or more and 30% or less. For example, in a laminate battery including a wound body in which a laminated body of an electrode and a separator is wound flat on MD, the separator is wound on MD and is therefore subjected to a heat press while being restrained by MD. Therefore, when the heat shrinkage of TD measured as mentioned above is 40% or less, it is possible to effectively suppress the occurrence of short circuit during adhesive press. When the heat shrinkage is 10% or more, the deflection of the microporous polyolefin film or the defects in battery molding can be effectively suppressed.

The porosity of the polyolefin microporous membrane is preferably 20% or more, more preferably 30% or more, and still more preferably 32% or more or 35% or more. When the porosity of the microporous membrane is 20% or more, the followability to rapid movement of lithium ions tends to be further improved. Meanwhile, the porosity of the microporous membrane is preferably 90% or less, more preferably 80% or less, and still more preferably 50% or less. When the porosity of the microporous membrane is 90% or less, the membrane strength is further improved, and self-discharge tends to be further suppressed. The porosity of the microporous membrane can be measured by the method mentioned in the Examples.

The air permeability of the polyolefin microporous membrane is preferably 1 second or more, more preferably 50 seconds or more, still more preferably 55 seconds or more, and yet more preferably 70 seconds or more, 90 seconds or more or 110 seconds or more, per 100 cm$^3$ of the volume of the membrane. When the air permeability of the microporous membrane is 1 second or more, the balance between the membrane thickness, the porosity and the mean pore size tends to be further improved. The air permeability of the microporous membrane is preferably 400 seconds or less, more preferably 300 seconds or less, and still more preferably 270 seconds or less. When the air permeability of the microporous membrane is 400 seconds or less, the ion permeability tends to be further improved. The air permeability of the microporous membrane can be measured by the method mentioned in the Examples.

The tensile strength of the polyolefin microporous membrane is preferably 1,000 kgf/cm$^2$ or more, more preferably 1,050 kgf/cm$^2$ or more, and still more preferably 1,100 kgf/cm$^2$ or more, in both directions of MD and TD (direction perpendicular to MD, membrane transverse direction). When the tensile strength is 1,000 kgf/cm$^2$ or more, the breakage at the time of winding of the slit or electricity storage device tends to be further suppressed, or the short circuit due to foreign material in the electricity storage device tends to be further suppressed. Meanwhile, the tensile strength of the microporous membrane is preferably 5,000 kgf/cm$^2$ or less, more preferably 4,500 kgf/cm$^2$ or less, and still more preferably 4,000 kgf/cm$^2$ or less. When the microporous membrane has a tensile strength of 5,000 kgf/cm$^2$ or less, the microporous membrane tends to be relaxed at an early stage during a heating test, so that the contractive force is reduced, and as a result, the safety tends to increase.

The tensile elastic modulus of the polyolefin microporous membrane is preferably 120 N/cm or less, more preferably 100 N/cm or less, and still more preferably 90 N/cm or less, in both the MD and TD directions. The tensile elastic modulus of 120 N/cm or less indicates that the separator for a lithium ion secondary battery is not extremely oriented, and in a heating test, when an obstructive agent such as polyethylene melts and contracts, the polyethylene causes stress relaxation at an early stage, thereby suppressing contraction of the separator in the battery, and thus there is a tendency that short circuit between the electrodes tends to be prevented. Specifically, the safety of the separator during heating can be further improved. Such a microporous membrane having low tensile elastic modulus can be easily achieved by containing a polyethylene having a weight-average molecular weight of 500,000 or less in the polyolefin which forms a microporous membrane. Meanwhile, the lower limit value of the tensile elastic modulus of the microporous membrane is not particularly limited, and is preferably 10 N/cm or more, more preferably 30 N/cm or more, and still more preferably 50 N/cm or more. The ratio of the tensile elastic modulus in the MD and TD directions of the polyolefin microporous membrane made (tensile elastic modulus in the MD direction/tensile elastic modulus in the TD direction) is preferably 0.2 to 3.0, more preferably 0.5 to 2.0, and still more preferably 0.8 to 1.2. When the ratio of the tensile elastic modulus in the MD and TD directions of the polyolefin microporous membrane is within such a range, the contractive force in the MD and TD directions becomes homogeneous when the obstructive agent such as polyethylene melts and contracts. As a result, when the separator is heat-shrunk in the battery, the shear stress applied to the electrode adjacent to the separator is also homogeneous in the MD and TD directions, and the fracture of the laminated body of the electrode and the separator tends to be prevented. Specifically, the safety of the separator during heating can be further improved. The tensile elastic modulus of the microporous membrane can be appropriately adjusted by adjusting the degree of stretching, or relaxing after stretching as needed.

The membrane thickness of the polyolefin microporous membrane is preferably 1.0 μm or more, more preferably 2.0 μm or more, and still more preferably 3.0 μm or more, 4.0 μm or more or 5.5 μm or more. When the membrane thickness of the microporous membrane is 1.0 μm or more, the membrane strength tends to be further improved. The membrane thickness of the microporous membrane is preferably 500 μm or less, more preferably 100 μm or less, and still more preferably 80 μm or less, 22 μm or less or 19 μm or less. When the membrane thickness of the microporous membrane is 500 μm or less, the ion permeability tends to be further improved. The membrane thickness of the microporous membrane can be measured by the method mentioned in the Examples.

In the case of a separator used in a lithium ion secondary battery having a relatively high capacity in recent years, the thickness of the polyolefin microporous membrane is preferably 25 μm or less, more preferably 22 μm or less or 20 μm or less, still more preferably 18 μm or less, and particularly preferably 16 μm or less. In this case, since the membrane thickness of the microporous membrane is 25 μm or less, the permeability tends to be further improved. In this case, the lower limit value of the membrane thickness of the microporous membrane may be 1.0 μm or more, 3.0 μm or more, 4.0 μm or more, or 5.5 μm or more.

<<Separator for Electricity Storage Device>>

The separator for an electricity storage device is required to have insulating properties and lithium ion permeability, and therefore it is generally formed of an insulating material sheet having a porous body structure, a polyolefin nonwoven fabric or a resin microporous membrane. Particularly suited for a lithium ion battery is a polyolefin microporous membrane that allows construction of a small and homogeneous porous structure with redox degradation resistance of the separator.

The polyolefin microporous membrane having the layer structure described above, or the polyolefin microporous membrane obtained by a method including various steps described above can be used as a separator for an electricity storage device, particularly a separator for a lithium battery or a lithium ion secondary battery.

II. Regarding Separator for Electricity Storage Device in Second Embodiment

<<Separator for Electricity Storage Device>>

The separator for an electricity storage device includes at least each one of layer A containing polyolefin, layer B containing polyolefin, and layer C containing inorganic particles. The thickness of the entire separator for an electricity storage device (total thickness) is preferably 2 μm or more, and more preferably 4 μm or more, from the viewpoint of ensuring the insulation properties. The total thickness of the separator for an electricity storage device is preferably 40 μm or less, and more preferably 20 μm or less, from the viewpoint of increasing the ion permeability and the energy density of the electricity storage device.

<Polyolefin Substrate Layer>

As used herein, the polyolefin substrate layer in which at least each one of layer A and layer B is laminated is also simply referred to as "polyolefin substrate layer". The number and stacking order of the layer A and the layer B are not limited, and the polyolefin substrate layer may have a two-layer laminated structure including each one of layer A and layer B, or a three-layer laminated structure including two layers of either one of the layer A and the layer B and one layer of the other one. The three-layer laminated structure may be, for example, a structure in which the layer A, the layer B and the layer A are stacked in this order.

The polyolefin substrate layer is typically a microporous membrane containing a polyolefin as a main component, and is preferably a polyolefin microporous membrane. "Containing as a main component" means that the target component is contained in an amount of 50 wt % or more based on the total weight. The polyolefin contained in the polyolefin substrate layer may be, for example, 50 wt % or more, 60 wt % or more, 70 wt % or more, 80 wt % or more, 90 wt % or more, 99 wt % or more, or 100 wt %, based on the total weight of the resin components constituting the microporous membrane. The polyolefin contained in the layer A and the polyolefin contained in the layer B may be the same type of a polyolefin having the same structure and properties, and may be a different type of a polyolefin having at least one difference in structures and properties, such as type and ratio of monomers, molecular weight, glass transition temperature, melting point, and viscosity at the time of melting.

The polyolefin is not particularly limited, and may be preferably a polyolefin including 3 to 10 carbon atoms as a monomer unit. Examples of such polyolefin include a homopolymer of ethylene or propylene, and a copolymer formed from at least two olefin monomers selected from the group consisting of ethylene, propylene, 1-butene, 4-methyl-1-pentene, 1-hexene, 1-octene and norbornene, and are preferably polyethylene, polypropylene, and combinations thereof.

Of polyethylenes, low-density polyethylene (LDPE), medium-density polyethylene (MDPE), high-density polyethylene (HDPE) and ultra-high molecular weight polyethylene (UHMWPE) are exemplified, and high-density polyethylene (HDPE) and ultra-high molecular weight polyethylene (UHMWPE) are preferable from the viewpoint of carrying out heat setting (may be abbreviated as "HS") at higher temperature without obstructing micropores. In general, the low-density polyethylene (LDPE) is polyethylene having a density of less than 0.925 $g/cm^3$ the medium-density polyethylene (MDPE) is polyethylene having a density of 0.925 $g/cm^3$ or more and less than 0.942 $g/cm^3$, high-density polyethylene (HDPE) is polyethylene having a density of 0.942 $g/cm^3$ or more and less than 0.970 $g/cm^3$, and ultra-high molecular weight polyethylene (UHMWPE) is polyethylene having a density of 0.970 $g/cm^3$ or more and having a weight-average molecular weight (Mw) of 1,000,000 or more. The density of the polyethylene can be measured in accordance with "D) density gradient tube method" mentioned in JIS K7112 (1999).

Examples of the polypropylene include isotactic polypropylene, syndiotactic polypropylene and atactic polypropylene. Examples of the copolymer of ethylene and propylene include an ethylene-propylene random copolymer and an ethylene-propylene rubber.

The polyolefin contained in at least one of the layer A and the layer B includes a polyolefin having one or more types of functional groups which undergo a condensation reaction with each other in the electricity storage device to form a crosslinked structure by a siloxane bond (hereinafter also referred to as "crosslinkable functional group" as used herein). When the polyolefin substrate layer has a three-layer laminated structure of layer A-layer B-layer A, it is preferable that either one of the layer A and the layer B contains a polyolefin having a crosslinkable functional group, and the other one does not contain a polyolefin having a crosslinkable functional group. When the polyolefin substrate layer has a three-layer laminated structure of layer A-layer B-layer A, it is preferable that the layer A located on the outside contains a polyolefin having a crosslinkable functional group, and the layer B located on the inside does not contain a polyolefin having a functional group.

The crosslinkable functional group is preferably grafted to the main chain of the polyolefin. The crosslinkable functional group is a crosslinkable silane group, for example, a trialkoxysilyl group (—Si(OR)$_3$) and/or a dialkoxysilyl group (—Si(OR)$_2$), wherein R is, for example, methyl, ethyl, n-propyl, isopropyl, n-butyl, sec-butyl, isobutyl, tert-butyl, or a combination thereof, and is preferably methyl, ethyl, n-propyl, or a combination thereof. The crosslinkable silane group is more preferably a methoxysilyl group and an ethoxysilyl group, and more preferably a trimethoxysilane group (—Si(OMe)$_3$). The alkoxysilyl group is converted into a silanol group through a hydrolysis reaction with water, thereby causing a condensation reaction to form a siloxane bond in the battery. An example of a crosslinking reaction in the case where R is methyl is shown below. The ratio of changing from T0 structure to T1 structure, T2 structure or T3 structure is arbitrary.

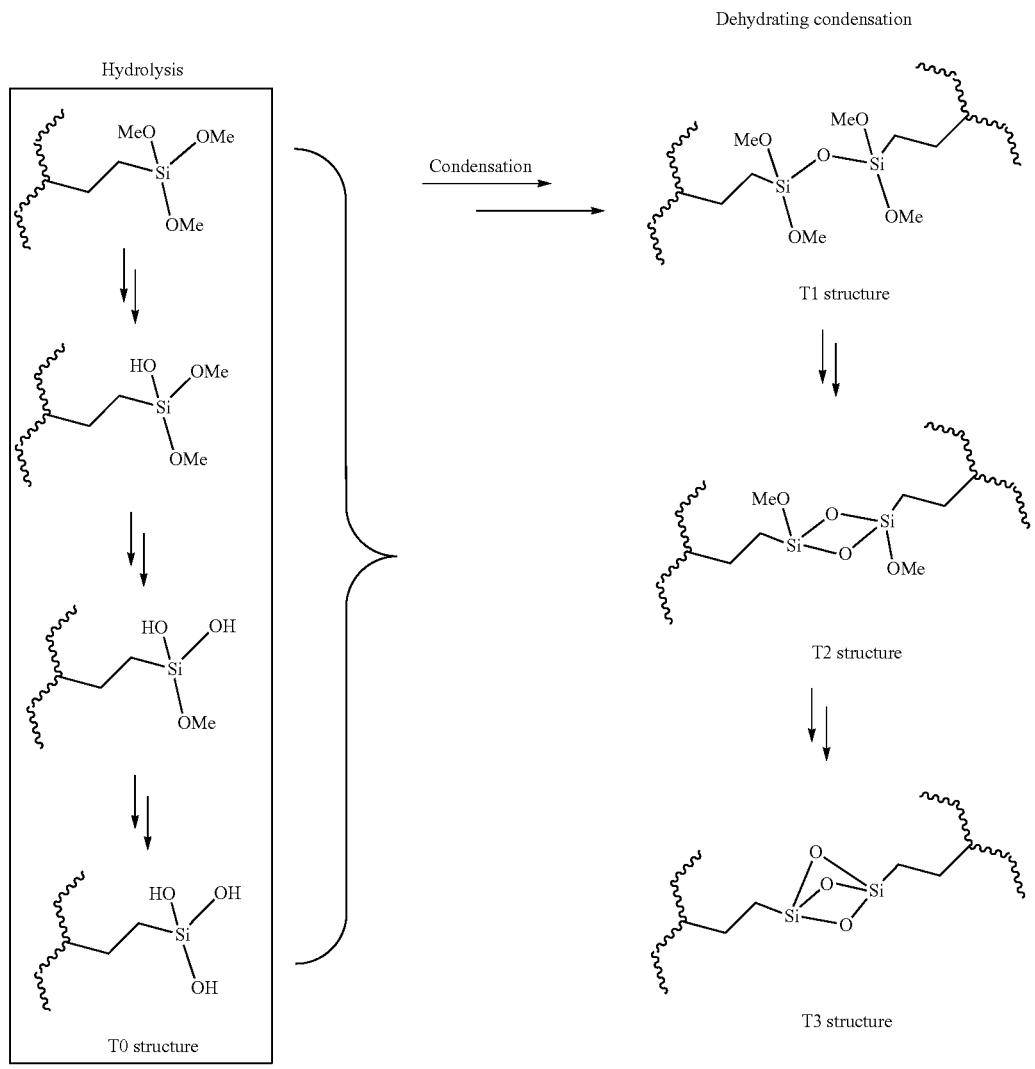

In the silane-modified polyolefin (hereinafter also referred to as "resin a"), the main chain and the graft are connected by a covalent bond. Examples of the structure for forming a covalent bond include, but are not particularly limited to, alkyl, ether, glycol, and ester.

From the viewpoint of the arrangement of the uniform Si-containing molecular structure and the lifetime of the equilibrium state of the Li ion coordination intermediate, in the stage before the crosslinking reaction of the resin a is carried out, the resin a is preferably contained in an amount of 0.03 to 1.0 mol %, i.e., the silanol unit modification rate is preferably 0.03 to 1.0 mol %. The silanol unit modification rate is preferably 0.05 to 0.35 mol %, more preferably 0.07 to 0.32 mol %, particularly preferably 0.08 to 0.30 mol %, and most preferably 0.12 to 0.28 mol %. The inventors of the present application have found that the silane-modified unit is mainly present in the amorphous portions of the separator, and more preferably only the amorphous portions, and by focusing on the distance between the silane-modified units, and the thermal vibration motion at −10° C. to 80° C., the resin a tends to have a molecular structure which facilitates the construction of the crosslinking reaction. All of T0, T1, T2 and T3 structures can form a coordination intermediate with Li ions, but it is considered that Li ions are coordinated between Si atoms in the amorphous portions, and the coordination desorption and the rearrangement are considered to proceed at random, so that a more remarkable effect can be obtained by adjusting the amount of the silanol unit modification of the resin a within the above range.

From the viewpoint of the arrangement of a uniform Si-containing molecular structure and the lifetime of the equilibrium state of the Li ion coordination intermediate, the resin a is preferably modified by 0.01 to 2.0 mol % of a propylene ($C_3$) unit, 0.01 to 2.0 mol % of a butene ($C_4$) unit, or 0.01 to 2.0 mol % in total of a $C_3$ unit and a $C_4$ unit. In this case, the number of carbon atoms takes into consideration both of the R group and the linking group in the above formula.

From the same viewpoint, the $C_3$ unit modification rate of the resin a is more preferably 0.01 to 1.2 mol %, still more preferably 0.01 to 0.75 mol %, particularly preferably 0.02 to 0.60 mol %, and most preferably 0.05 to 0.30 mol %.

From the viewpoint of the arrangement of the uniform Si-containing molecular structure and the lifetime of the equilibrium state of the Li ion coordination intermediate, the $C_4$ unit modification rate of the resin a is preferably 0.01 to 1.0 mol %, more preferably 0.30 to 0.70 mol %, and particularly preferably 0.48 to 0.65 mol % in the stage before the crosslinking reaction is carried out. Meanwhile, in the heat setting (HS) step at the time of formation of the separator membrane, the $C_4$ unit modification rate of the resin a is preferably 0.43 mol % or less, more preferably 0.40 mol % or less, and still more preferably 0.1 mol % or less.

From the viewpoint of the arrangement of the uniform Si-containing molecular structure and the lifetime of the equilibrium state of the Li ion coordination intermediate, the total modification rate of the $C_3$ unit and the $C_4$ unit of the resin a is more preferably 1.5 mol % or less, still more preferably 1.0 mol % or less, particularly preferably 0.6 mol % or less, and most preferably 0.3 mol % or less.

From the viewpoint of the cycle characteristics and safety of the electricity storage device, the number-average molecular weight (Mn) of the resin a is preferably 10,000 to 20,000, more preferably 16,000 or less, and still more preferably 15,000 or less. From the same viewpoint, the weight-average molecular weight (Mw) of the resin a is preferably 45,000 to 200,000, more preferably 140,000 or less, still more preferably 129,000 or less, yet more preferably 100,000 or less, and most preferably 7,000 or less. From the same viewpoint, Mw/Mn of the resin a is preferably 3.0 to 12, more preferably 4.0 to 9.0, and still more preferably 4.1 to 8.0.

The resin a is not limited, but the viscosity-average molecular weight (Mv) may be, for example, 20,000 to 150,000, and the density thereof may be, for example, 0.90 to 0.97 g/cm$^3$ and the melt mass flow rate (MFR) at 190° C. may be, for example, 0.1 to 15 g/min.

The polyethylene constituting the silane-grafted modified polyethylene may be composed of one type of ethylene, or may be composed of two or more types of ethylenes. Two or more types of silane graft-modified polyethylenes composed of different ethylene may be used in combination.

The condensation reaction may spontaneously occur in an environment in the electricity storage device, or may be caused by external stimulation. Examples of the external stimulus include heat and light, for example, ultraviolet rays. Preferably, the condensation reaction is accelerated as a catalyst reaction under conditions in which an acidic condition, an alkaline condition, and a base with low nucleophilicity are present. Siloxane bonds formed by condensation have high thermodynamic stability. While C—C bond energy is 86 kcal·mol$^{-1}$ and C—Si bond energy is 74 kcal·mol$^{-1}$, the Si—O bond energy of is 128 kcal·mol$^{-1}$. As a result, the thermodynamic stability of the siloxane bond is suggested (NPLs 4 and 5). Therefore, for example, by the presence of hydrogen fluoride (HF) or $H_2SO_4$ having a constant concentration in the reaction system, the condensation reaction of the silane-modified polyolefin in the polymer structure of the separator to the siloxane bond is accelerated in a high yield, and thus a highly heat-resistant structure can be constructed in the separator.

Since the Si compound has a high reactivity with F anion, the crosslinking point formed by the siloxane bond may be decomposed by the F anion having a high concentration. The bond energy of Si—F is very high as 160 kcal·mol$^{-1}$ and the Si—F bond has high thermodynamic stability, so it is considered that the F anion continues to be consumed until the concentration in the system becomes equal to or less than a certain level in the equilibrium reaction (NPLs 4 and 5). The decomposition reaction of the crosslinking point by the F anion is estimated to be the cleavage reaction of the C—Si bond or Si—OSi bond of the siloxane bond. In the experiment in which the bond dissociation energy of Si—X is estimated using the compound Me3Si—X, it has been reported that the bond dissociation energy D of Si—X is D=394±8 kJ/mol when X=Me, D=513±11 kJ/mol when X=OMe, and D=638±5 kJ/mol when X=F (NPL 6). Under the acidic condition, considering the stability of the product after the C—Si bond or Si—OSi bond cleavage of the siloxane bond, it is estimated that the Si—OSi bond is easily cleaved to convert into Si—F and HO—Si. Therefore, when the F anion concentration in the reaction system becomes equal to or higher than a certain level, it is considered that the siloxane bond at the crosslinking point is decomposed, leading to deterioration of the heat resistance of the separator.

In the present disclosure, it has been found that the concentration of HF can promote the crosslinking reaction to the siloxane bond and control the in-battery crosslinking reaction of the separator having high heat resistance utilizing the fact that $PF_6$ has $PF_5$ and HF present in equilibrium by the Jahn-Teller effect. Since $PF_5$ and HF are present in equilibrium, the crosslinking reaction of the siloxane bond can be continuously raised for a long period of time, and the probability of the crosslinking reaction can be greatly improved. The non-crystalline structure of the polyethylene has a high entanglement structure, and the entropy elasticity of the polyethylene is remarkably increased only by forming a partial crosslinked structure. Therefore, the molecular mobility of the amorphous portion is lowered, and it is difficult to form a siloxane bond for all the silanol units. In the present disclosure, the addition under a plurality of conditions is considered, and thus the problem could be fundamentally solved.

When the polyolefin of the layer A and/or the layer B, in addition to the layer C containing a thermoplastic polymer mentioned later, contains a polyolefin having a crosslinkable functional group as described above, it is possible to provide a safer separator for an electricity storage device, in which the possibility of a local short circuit leading to thermal runaway mentioned below is reduced. The reason for this is not limited to theory and the aspect of the drawings, and will be described below with reference to the drawings.

Figure 4:
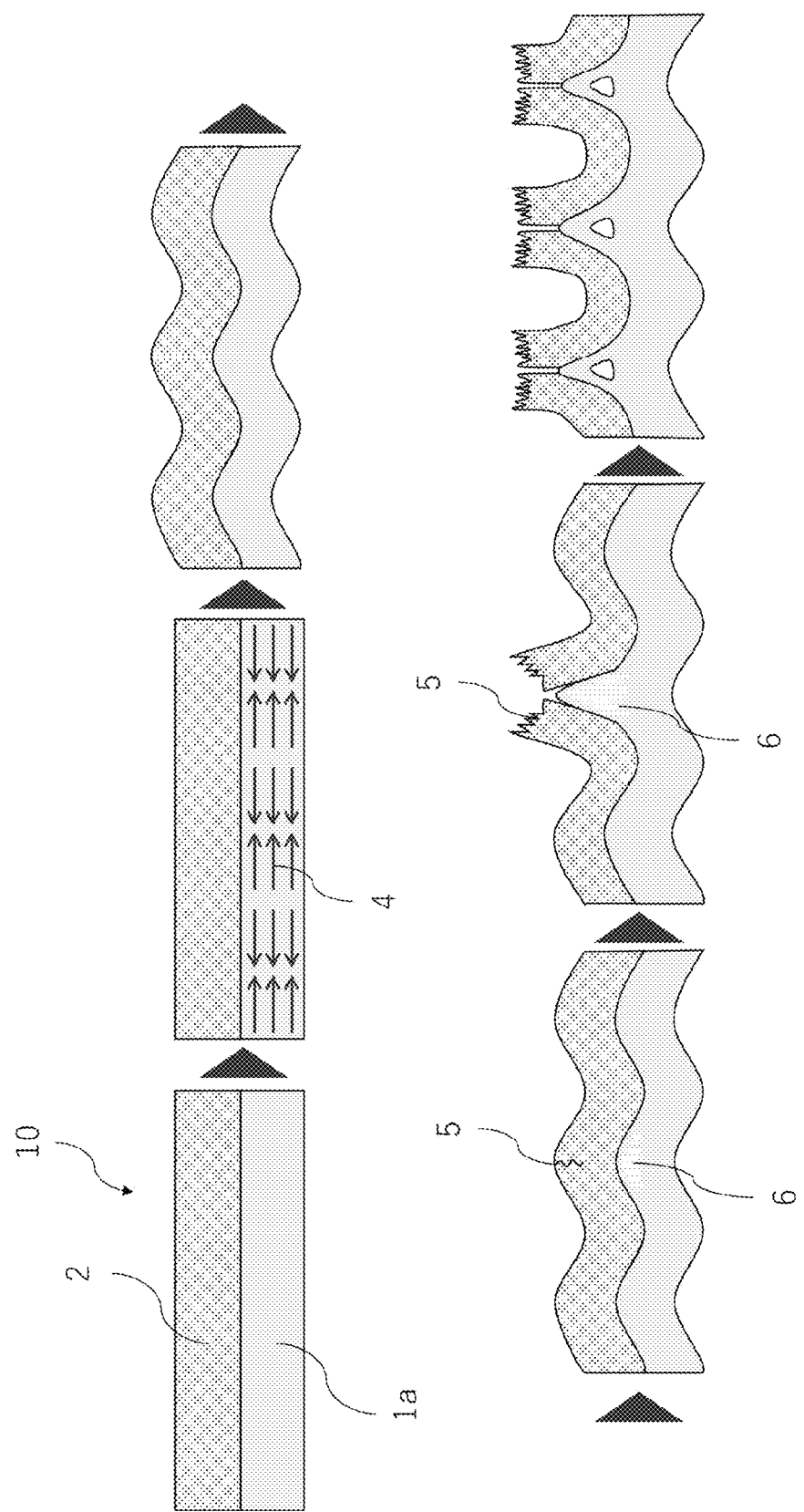
FIG. 4 is a schematic diagram illustrating behavior when local short circuit occurs in an electricity storage device including a separator for an electricity storage device, the separator including a non-crosslinked polyolefin substrate layer, an inorganic particle layer and a thermoplastic polymer layer.

FIG. 3(A) is a schematic diagram illustrating behavior when both ends of a separator (10) for an electricity storage device including a non-crosslinked polyolefin substrate layer (1a) and an inorganic particle layer (2) are heat-shrunk in an open state. In a state in which both ends are opened, the substrate layer contracted by the stress (4) due to the thermal contraction lifts the inorganic particle layer to cause buckling fracture (5) of the inorganic particle layer, and the substrate layer pulled by the protruding inorganic particle layer generates tensile fracture (6). FIG. 4 is a diagram illustrating this behavior in a stepwise manner. When both ends of the separator for an electricity storage device having the non-crosslinked polyolefin substrate layer (1a) and the inorganic particle layer (2) are heat-shrunk in an open state, a portion where the vector of stress (4) due to heat shrinkage concentrates on the substrate layer and a sparse portion are generated, thereby deforming the separator for an electricity storage device into a waveform. At this time, buckling fracture (crack) is generated at the apex of the inorganic particle layer formed into a waveform (5), and the substrate layer is pulled to the inorganic particle layer (6). When the deformation progresses, a plurality of cracks occur and the substrate layer is subjected to tensile fracture (6) to generate voids. Returning to FIG. 3 again, FIG. 3(B) is a schematic diagram illustrating behavior when both ends of a separator (10) for an electricity storage device including a non-crosslinked polyolefin substrate layer (1a) and an inorganic particle layer (2) are heat-shrunk in a fixed state. The state in which both ends are fixed simulates a state in which the electricity storage device separator is stored in the electricity storage device. In a state in which both ends are fixed, the polyolefin substrate layer is broken between the fixing jigs (20) by the stress (4) due to heat shrinkage, and the gap increases as the heat shrinkage progresses. Accordingly, the inorganic particle layer is deformed so as to fall into the gap of the polyolefin substrate layer.

FIG. 5(A) is a schematic diagram illustrating behavior when both ends of a separator (10) for an electricity storage device including a crosslinked polyolefin substrate layer (1b) and an inorganic particle layer (2) are heat-shrunk in an open state. In the case of the crosslinked polyolefin substrate layer, as in FIG. 3(A) and FIG. 4, the buckling fracture (5) of the inorganic particle layer and the tensile fracture (6) of the substrate layer are generated by the stress (4) due to the heat shrinkage. However, in a state where both ends are fixed as shown in FIG. 5(B), the crosslinked polyolefin substrate layer (1b) tends to be extended between the fixing jigs (20) without breaking.

Figure 6:
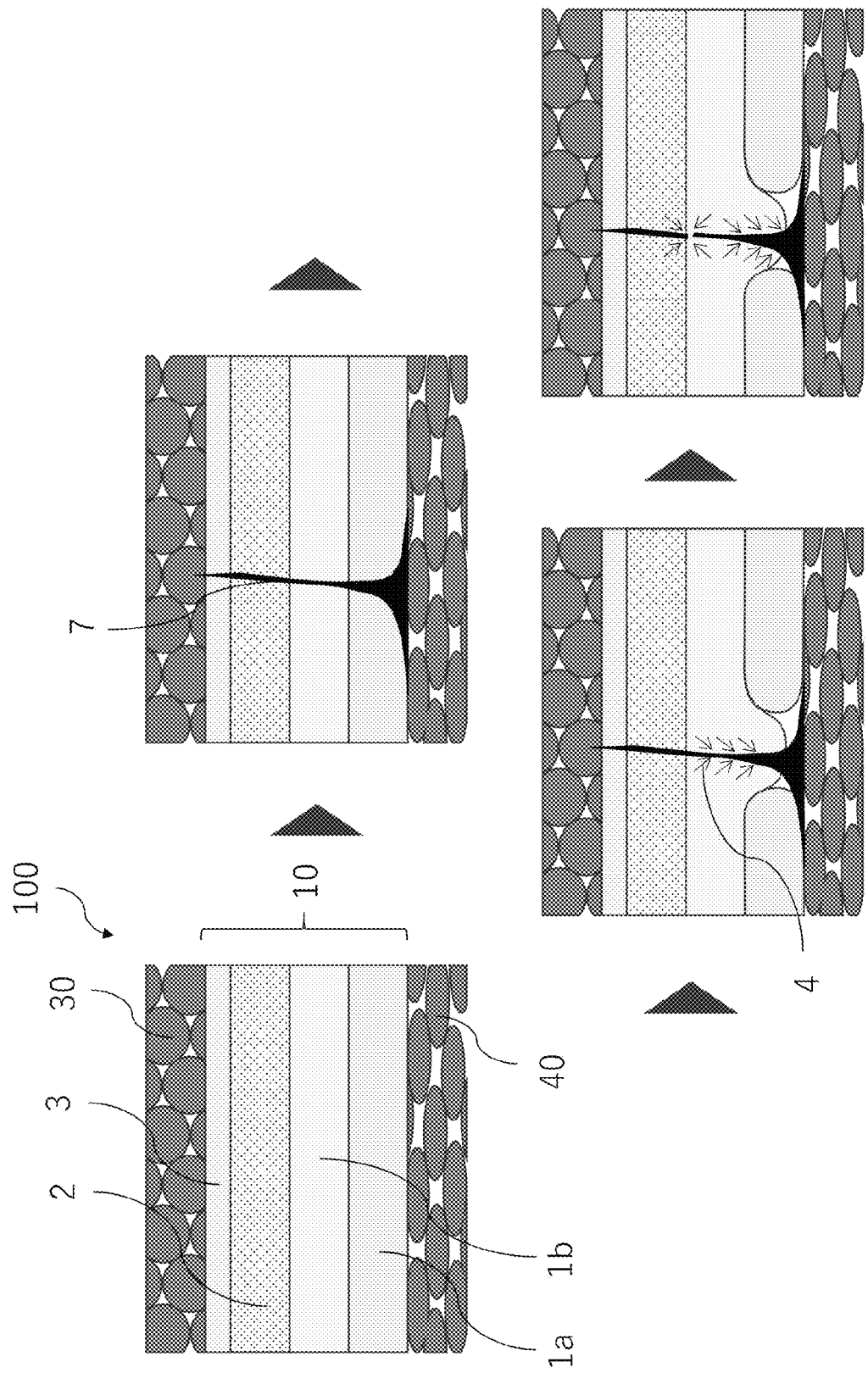
FIG. 6 is a schematic diagram illustrating behavior when local short circuit occurs in an electricity storage device including a separator for an electricity storage device, the separator having a non-crosslinked polyolefin substrate layer, a crosslinked polyolefin substrate layer, an inorganic particle layer and a thermoplastic polymer layer.

FIG. 6 is a schematic diagram illustrating behavior when local short circuit (7) occurs in an electricity storage device (100) including a separator (10) for an electricity storage device, the separator including a non-crosslinked polyolefin substrate layer (1a), a crosslinked polyolefin substrate layer (1b), an inorganic particle layer (2) and a thermoplastic polymer layer (3). The local short circuit may be caused by lithium dendrite grown from the negative electrode active material layer by repeating charge and discharge cycles at low temperature in the case of a lithium ion secondary battery. As shown in FIG. 6, after a low-temperature charge-discharge cycle is carried out on the electricity storage device, the local short circuit (7) is likely to occur when a pressure is applied. When local short circuit occurs, the short circuit portion generates heat, and the surrounding cross-linked polyolefin substrate layer tends to shrink. As described with reference to FIGS. 3 and 2, the non-crosslinked polyolefin substrate layer is broken and forms voids around the local short circuit, and the cross-linked polyolefin substrate layer is deformed so as to be drawn into the voids. However, as described in FIG. 5, breakage of the crosslinked polyolefin substrate layer is unlikely to occur, and since the inorganic particle layer is fixed to the positive electrode by the thermoplastic polymer layer, deformation of the inorganic particle layer is unlikely to occur. Therefore, the stress (4) due to the heat shrinkage concentrates on the interface between the polyolefin substrate layer and the inorganic particle layer and the local short circuit is cut, thus preventing thermal runaway.

Figure 7:
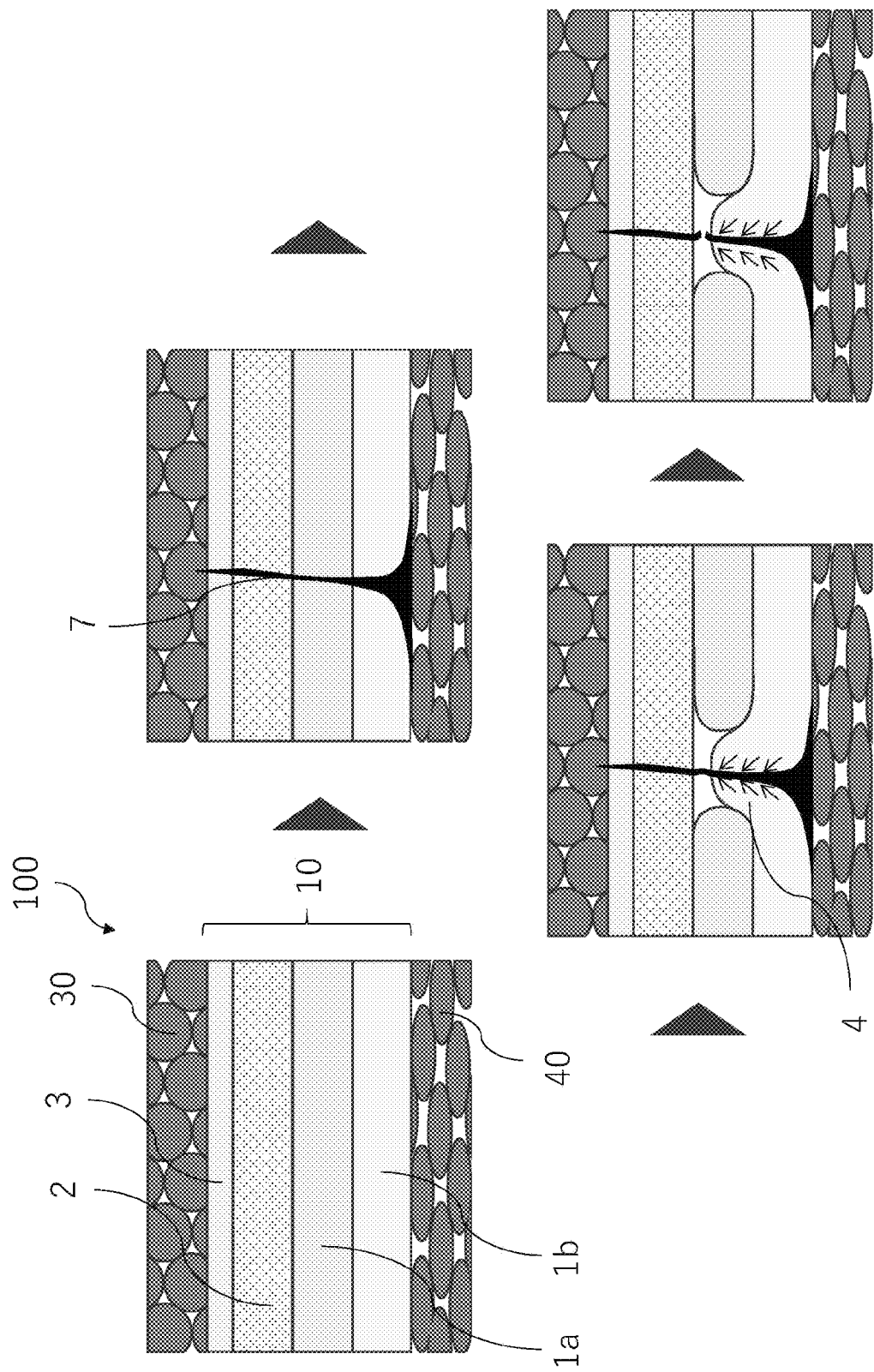
FIG. 7 is a schematic diagram illustrating behavior when local short circuit occurs in an electricity storage device including a separator for an electricity storage device, the separator having a crosslinked polyolefin substrate layer, a non-crosslinked polyolefin substrate layer, an inorganic particle layer and a thermoplastic polymer layer.

FIG. 7 is a schematic diagram illustrating behavior when local short circuit (7) occurs in an electricity storage device (100) including a separator (10) for an electricity storage device, the separator including a crosslinked polyolefin substrate layer (1b), a non-crosslinked polyolefin substrate layer (1a), an inorganic particle layer (2) and a thermoplastic polymer layer (3). The local short circuit may be caused by lithium dendrite grown from the negative electrode active material layer by repeating charge and discharge cycles at low temperature in the case of a lithium ion secondary battery. As shown in FIG. 7, after a low-temperature charge-discharge cycle is carried out on the electricity storage device, the local short circuit (7) is likely to occur when a pressure is applied. When local short circuit occurs, the short circuit portion generates heat, and the surrounding cross-linked polyolefin substrate layer tends to shrink. As described with reference to FIGS. 3 and 2, the non-crosslinked polyolefin substrate layer is broken and forms voids around the local short circuit, and the cross-linked polyolefin substrate layer is deformed so as to be drawn into the voids. However, as described in FIG. 5, breakage of the crosslinked polyolefin substrate layer is unlikely to occur, and since the inorganic particle layer is fixed to the positive electrode by the thermoplastic polymer layer, deformation of the inorganic particle layer is unlikely to occur. Therefore, the stress (4) due to the heat shrinkage concentrates on the interface between the voids formed by the breakage of the non-crosslinked polyolefin substrate layer and the inorganic particle layer and the local short circuit is cut, thus preventing thermal runaway.

Figure 8:
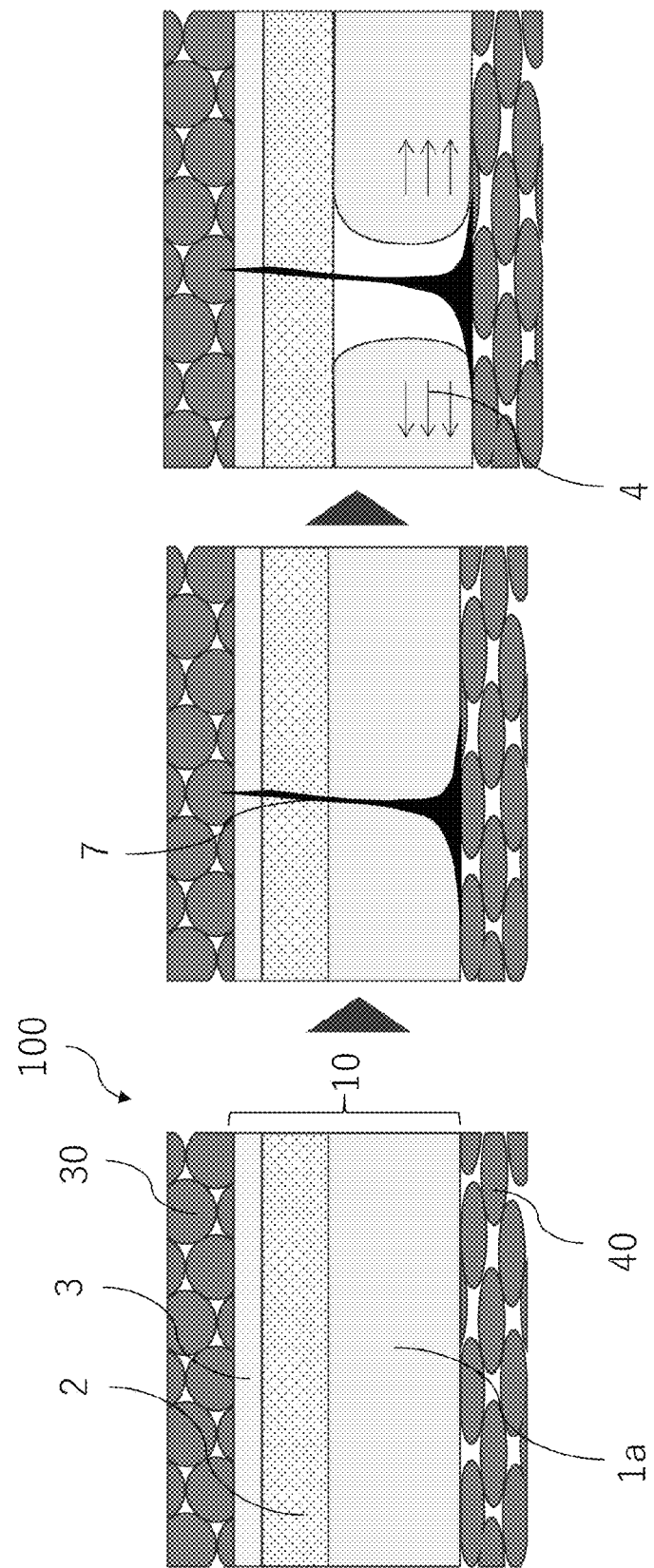
FIG. 8 is a schematic diagram illustrating behavior when local short circuit occurs in an electricity storage device including a separator for an electricity storage device, the separator having a crosslinked polyolefin substrate layer, an inorganic particle layer and a thermoplastic polymer layer.

FIG. 8 is a schematic diagram illustrating behavior when local short circuit (7) occurs by applying low-temperature charge/discharge cycle and pressure to an electricity storage device (100) in the same manner as in FIG. 6, except that the crosslinked polyolefin substrate layer is not used. Since the polyolefin substrate layer is non-crosslinked, as described in FIGS. 3 and 2, the non-crosslinked polyolefin substrate layer (1a) is broken and forms voids around the local short circuit. Therefore, the stress (4) due to heat shrinkage does not concentrate on the interface between the polyolefin substrate layer and the inorganic particle layer, and thus it is difficult to cut the local short circuit.

Figure 9:
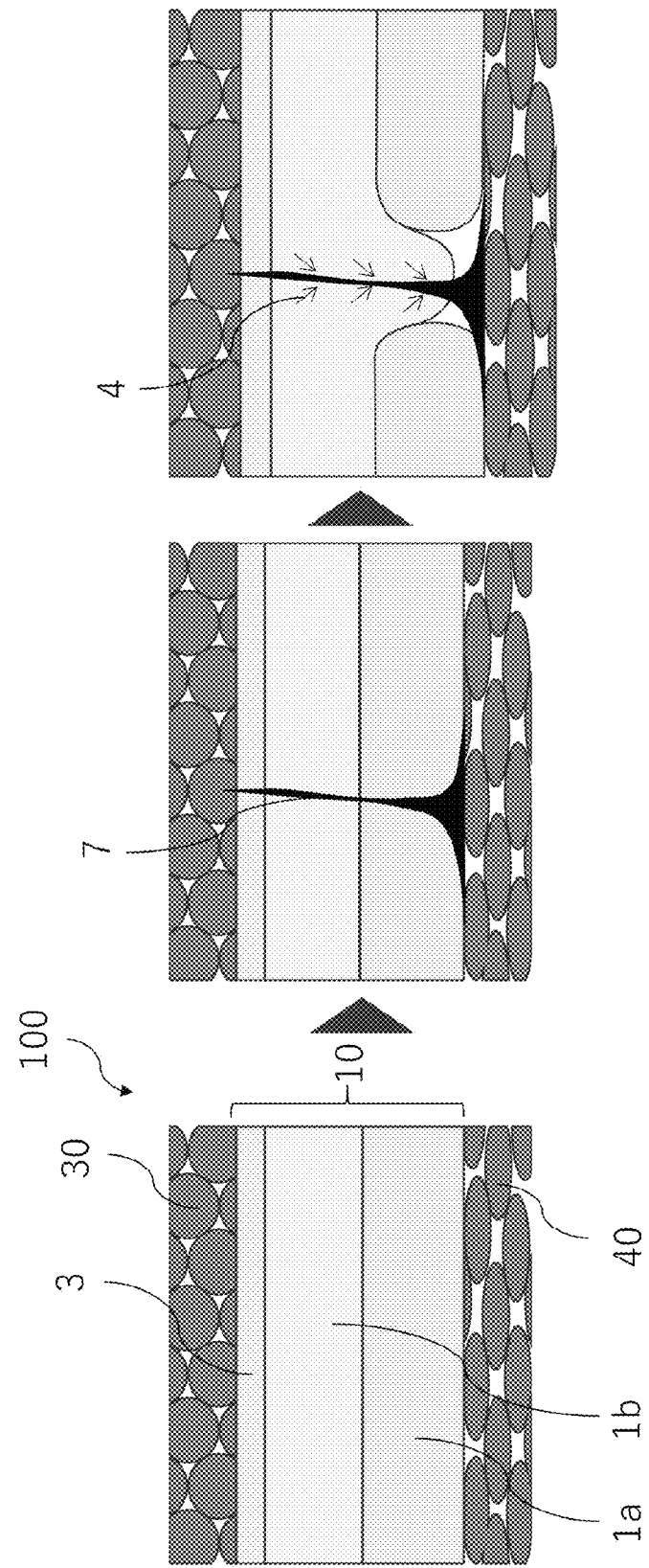
FIG. 9 is a schematic diagram illustrating behavior when local short circuit occurs in an electricity storage device including a separator for an electricity storage device, the separator having a non-crosslinked polyolefin substrate layer, a crosslinked polyolefin substrate layer and a thermoplastic polymer layer.

FIG. 9 is a schematic diagram illustrating behavior when local short circuit (7) occurs by applying low-temperature charge/discharge cycle and pressure to an electricity storage device (100) in the same manner as in FIG. 6, except that the inorganic particle layer is not included. Similar to FIG. 6, the non-crosslinked polyolefin substrate layer (1a) is broken and forms voids around the local short circuit, and the cross-linked polyolefin substrate layer (1b) is deformed so as to be drawn into the voids. However, since the inorganic particle layer is not included, the stress (4) due to heat shrinkage does not concentrate, and thus it is difficult to cut the local short circuit.

Figure 10:
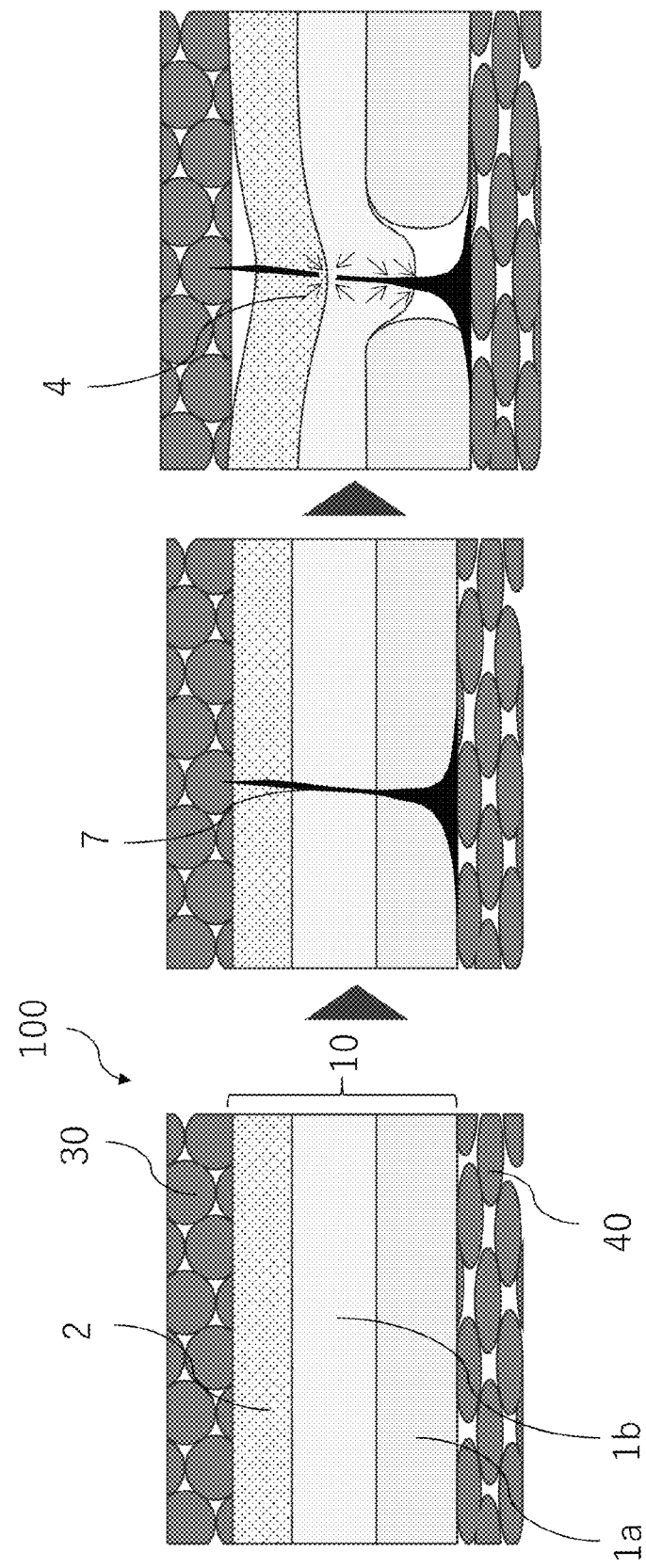
FIG. 10 is a schematic diagram illustrating behavior when local short circuit occurs in an electricity storage device including a separator for an electricity storage device, the separator having a non-crosslinked polyolefin substrate layer, a crosslinked polyolefin substrate layer and an inorganic particle layer.

FIG. 10 is a schematic diagram illustrating behavior when local short circuit (7) occurs by applying low-temperature charge/discharge cycle and pressure to an electricity storage device (100) in the same manner as in FIG. 6, except that the thermoplastic polymer layer is not included. Similar to FIG. 6, the non-crosslinked polyolefin substrate layer (1a) is broken and forms voids around the local short circuit, and the cross-linked polyolefin substrate layer (1b) is deformed so as to be drawn into the voids. Since the plastic polymer layer is not included, the inorganic particle layer also deforms and absorbs a part of the stress (4) due to heat shrinkage. However, stress concentrates on the interface between the crosslinked polyolefin substrate layer and the inorganic particle layer and the local short circuit is cut, thus preventing thermal runaway.

The polyolefin substrate layer preferably contains both of a silane-modified polyolefin and a polyolefin other than the silane-modified polyolefin (hereinafter also referred to as "silane-unmodified polyolefin") in order to obtain redox degradation resistance and a small and homogeneous porous structure. The silane-unmodified polyethylene to be combined with the silane-modified polyolefin (hereinafter abbreviated as "resin a") is preferably a polyolefin having a viscosity-average molecular weight (Mv) of 2,000,000 or more (hereinafter abbreviated as "resin b"), a polyolefin having Mv of less than 2,000,000 (hereinafter abbreviated as "resin c"), or combinations thereof. By combining two types of silane-unmodified polyolefin having a molecular weight in a specific range with the resin a, it is possible to obtain an electricity storage device in which local short circuit due to stress concentration is easily cut and which is excellent in safety. The resin b is more preferably a polyethylene having a viscosity-average molecular weight (Mv) of 2,100,000 or more and 8,500,000 or less, and the resin c is more preferably a polyethylene having Mv of 300,000 or more and 1,600,000 or less.

From the viewpoint of the cycle characteristics and safety of the electricity storage device, the number-average molecular weight (Mn) of the resin b is preferably 200,000 to 1,400,000, more preferably 210,000 to 1,200,000, and still more preferably 250,000 to 1,000,000. From the same viewpoint, the weight-average molecular weight (Mw) of the resin b is preferably 1,760,000 to 8,800,000, more preferably 1,900,000 to 7,100,000, and still more preferably 2,000,000 to 6,200,000. From the same viewpoint, Mw/Mn is preferably 3.0 to 12, more preferably 4.0 to 9.0, and still more preferably 6.0 to 8.8. From the same viewpoint, Mv of the resin b is preferably 2,000,000 to 10,000,000, more preferably 2,100,000 to 8,500,000, still more preferably 3,000,000 to 7,800,000, and yet more preferably 3,300,000 to 6,500,000.

From the viewpoint of the cycle characteristics and safety of the electricity storage device, the number-average molecular weight (Mn) of the resin c is preferably 20,000 to 250,000, more preferably 30,000 to 200,000, still more preferably 32,000 to 150,000, and yet more preferably 40,000 to 110,000. From the same viewpoint, the weight-average molecular weight (Mw) of the resin c is preferably 230,000 to 2,000,000, more preferably 280,000 to 1,600,000, still more preferably 320,000 to 1,200,000, and yet more preferably 400,000 to 1,000,000. From the same viewpoint, Mw/Mn of the resin c is preferably 3.0 to 12, more preferably 4.0 to 9.0, and still more preferably 6.0 to 8.8. From the same viewpoint, Mv of the resin c is preferably 250,000 to 2,500,000, more preferably 300,000 to 1,600,000, still more preferably 320,000 to 1,100,000, and yet more preferably 450,000 to 800,000.

From the viewpoint of the safety of the electricity storage device, the content of the resin a in the layer A or the layer B is preferably from 3 wt % to 70 wt %, more preferably 5 wt % to 60 wt %, and still more preferably 10 wt % to 50 wt %, based on the total weight of the solid component of the polyolefin starting material. From the viewpoint of high ion permeability and high safety, the total content of the silane-unmodified polyolefin in the layer A or the layer B is preferably from 40 wt % to 95 wt %, more preferably 50 wt % to 90 wt %, and still more preferably 60 wt % to 80 wt %, based on the total weight of the solid component of the polyolefin starting material of the layer A or the layer B.

From the same viewpoint, the content of the resin b in the polyolefin starting material is preferably from 3 wt % to 70 wt %, more preferably 5 wt % to 60 wt %, and still more preferably 5 wt % to 40 wt %, based on the total weight of the solid component of the polyolefin starting material.

From the same viewpoint, the content of the resin c in the polyolefin starting material is preferably 1 wt % to 90 wt %, more preferably 5 wt % to 60 wt %, and still more preferably 5 wt % to 50 wt %, based on the total weight of the solid component of the polyolefin starting material.

From the same viewpoint, the weight ratio of the resin a to the resin b in the polyolefin starting material (weight of resin a/weight of resin b) is preferably 0.07 to 12.00, more preferably 0.10 to 11.00, and still more preferably 0.50 to 10.00.

From the same viewpoint, the weight ratio of the resin a to the resin c in the polyolefin starting material (weight of resin a/weight of resin c) is preferably 0.07 to 12.00, more preferably 0.10 to 11.00, and still more preferably 0.20 to 10.00.

From the same viewpoint, the weight ratio of the resin b to the resin c in the polyolefin starting material (weight of resin b/weight of resin c) is preferably 0.06 to 7.00, more preferably 0.10 to 7.00, and still more preferably 0.12 to 6.90.

The thickness of the polyolefin substrate layer is preferably 1.0 µm or more, more preferably 2.0 µm or more, and still more preferably 3.0 µm or more. When the thickness of the polyolefin substrate layer is 1.0 µm or more, the membrane strength tends to be further improved. The thickness of the polyolefin substrate layer is preferably 100 µm or less, more preferably 50 µm or less, and still more preferably 30 µm or less. When the thickness of the polyolefin substrate layer is 100 µm or less, the ion permeability tends to be further improved.

The heat shrinkage factor at 150° C. of the layer A or the layer B having a larger heat shrinkage rate in a single layer is preferably 10% or more, more preferably 15% or more, and still more preferably 20% or more. When the heat shrinkage factor at 150° C. is 10% or more, the stress applied at the time of heat shrinkage increases, so that the local short circuit can be easily cut and the thermal runaway can be more effectively prevented.

<Inorganic Particle Layer>

The separator for an electricity storage device further includes a layer containing inorganic particles (hereinafter also referred to as "inorganic particle layer" as used herein).

The inorganic particle is preferably at least one selected from the group consisting of alumina, silica, titania, zirconia, magnesia, ceria, yttria, zinc oxide, iron oxide, silicon nitride, titanium nitride, boron nitride, silicon carbide, aluminum hydroxide oxide, talc, kaolinite, dickite, nacrite, halloysite, pyrophyllite, montmorillonite, sericite, mica, amesite, bentonite, asbestos, zeolite, diatomaceous earth, silica sand and glass fiber. Examples of alumina include alumina such as α-alumina, β-alumina or γ-alumina; and alumina hydrate such as boehmite. In view of high stability to an electrolyte to be used in a lithium ion battery, α-alumina or boehmite is preferable.

The content of the inorganic particles in the inorganic particle layer is preferably 5 wt % to 99 wt %, more preferably 10 wt % to 99 wt %, still more preferably 50 wt % to 98 wt %, and yet more preferably 90 wt % to 97 wt %, based on the total weight of the inorganic particle layer. When the content of the inorganic particles is 5 wt % or more, the elastic modulus of the separator can be increased, and a separator having higher heat resistance can be obtained. When the content of the inorganic particles is 99 wt % or less, dust fall-off from the separator can be prevented.

The inorganic particle layer is preferably an inorganic porous layer containing a resin binder in addition to the inorganic particles. It is possible to use, as the resin binder, a resin material such as a styrene-butadiene resin, an acrylic acid ester resin, a methacrylic acid ester resin, and a fluororesin such as polyvinylidene fluoride. The content of the resin binder in the inorganic particle layer is preferably 1 wt % to 50 wt %, and more preferably 3 wt % to 10 wt %, based on the total weight of the inorganic particle layer. When the content of the resin binder is 1 wt % or more, dust fall-off from the separator can be prevented. When the content of the inorganic particles is 50 wt % or less, the elastic modulus of the separator can be increased, and a separator having higher heat resistance can be obtained.

The glass transition temperature (Tg) of the resin binder is preferably −50° C. to 90° C., and more preferably −30° C. to −10° C. When the glass transition temperature (Tg) of the resin binder is −50° C. or higher, the adhesion is excellent, and when the glass transition temperature (Tg) of the resin binder is 90° C. or lower, the ion permeability tends to be excellent.

The thickness of the inorganic particle layer is preferably 0.5 µm or more, more preferably 1.0 µm or more, and still more preferably 2.0 µm or more. By having a thickness of 0.5 µm or more for the inorganic particle layer, a separator having higher heat resistance can be obtained. The thickness of the inorganic particle layer is preferably 20 µm or less, more preferably 10 µm or less, and still more preferably 6 µm or less. By having a thickness of 20 µm or less for the inorganic particle layer, the ion permeability tends to be further improved.

The elastic modulus of the inorganic particle layer is preferably 0.05 GPa or more, and more preferably 0.1 GPa or more. When the elastic modulus of the inorganic particle layer is 0.05 GPa or more, stress concentration is likely to occur at the interface between the inorganic particle layer and the polyolefin substrate layer at the time of local short circuit formation, and thermal runaway can be more effectively prevented. The elastic modulus of the inorganic particle layer is preferably 10 GPa or less, more preferably 5 GPa or less, and still more preferably 2 GPa or less. When the elastic modulus of the inorganic particle layer is 10 GPa or less, the handleability of the separator is improved.

<Thermoplastic Polymer Layer>

The separator for an electricity storage device preferably further includes a layer D containing a thermoplastic polymer (hereinafter also referred to as "thermoplastic polymer layer" as used herein). The thermoplastic polymer layer is preferably stacked on a surface of the inorganic particle layer which is not in contact with the polyolefin substrate layer.

Examples of the thermoplastic polymer include polyolefin resins such as polyethylene, polypropylene and α-polyolefin; fluorine-based polymers such as polyvinylidene fluoride and polytetrafluoroethylene, or copolymers containing the same; diene-based polymers including conjugated dienes such as butadiene and isoprene as a monomer unit, or copolymers containing the same, or hydrides thereof; acrylic polymers including (meth)acrylate or (meth)acrylic acid as a monomer unit, including acrylic polymer, (meth)acrylate, or (meth)acrylic acid including no polyalkylene glycol unit as a monomer unit, and including one or more polyalkylene glycol units, or copolymers containing the same, or hydrides thereof; rubbers such as ethylene-propylene rubber, polyvinyl alcohol and vinyl polyacetate; polyalkylene glycols having no polymerizable functional group, such as polyethylene glycol and polypropylene glycol; resins such as polyphenylene ether, polyphenylene sulfide and polyester; copolymers including an ethylenically unsaturated monomer including three or more alkylene glycol units as a copolymerization unit; and combinations thereof. From the viewpoint of improving the safety of the electricity storage device, the thermoplastic polymer is preferably an acrylic polymer, and more preferably a polymer including a polymerization unit of (meth)acrylic acid ester or (meth)acrylic acid as a polymerization unit.

From the viewpoint of improving the safety of the electricity storage device, it is also preferable that the thermoplastic polymer also contains at least one fluorine atom-containing vinyl compound selected from the group consisting of polyvinylidene fluoride-hexafluoropropylene (PVDF-HFP) and polyvinylidene fluoride-chlorotrifluoroethylene (PVDF-CTFE).

The glass transition temperature (Tg) of the thermoplastic polymer is preferably −50° C. to 150° C. When the glass transition temperature (Tg) of the thermoplastic polymer is −50° C. or higher, the adhesion is excellent, and when the glass transition temperature (Tg) of the thermoplastic polymer is 150° C. or lower, the ion permeability tends to be excellent.

The area ratio of the thermoplastic polymer layer covering the surface of the inorganic particle layer is preferably 5% or more, more preferably 20% or more, and still more preferably 50% or more. When the area ratio of the thermoplastic polymer layer is 5% or more, the adhesion to the electrode can be improved. The area ratio of the thermoplastic polymer layer covering the surface of the inorganic particle layer is preferably 98% or less. As a result, closed holes of the polyolefin substrate layer can be suppressed, and high air permeability can be maintained.

The peel strength (180° peel strength) when the thermoplastic polymer layer is peeled from the inorganic particle layer so as to form an angle of 180° is preferably 0.01 N/m or more, and more preferably 0.5 N/m or more. When the 180° peel strength of the thermoplastic polymer layer is 0.01 N/m or more, it is possible to obtain a separator for an electricity storage device which is excellent in adhesive force and therefore suppresses the deformation of the inorganic particle layer, and is excellent in safety. From the viewpoint of the handleability, the 180° peel strength of the thermoplastic polymer layer is preferably 30 N/m or less, and more preferably 10 N/m or less.

The thickness of the thermoplastic polymer layer is preferably 0.1 µm or more, and more preferably 0.5 µm or more. When the thickness of the thermoplastic polymer layer is 0.1 µm or more, it is possible to obtain a separator for an electricity storage device which is excellent in adhesive force and therefore suppresses the deformation of the inorganic particle layer, and is excellent in safety. The thickness of the thermoplastic polymer layer is preferably 3 µm or less, and more preferably 1 µm or less, from the viewpoint of enhancing the ion permeability.

<Island Structure>

Figure 11:
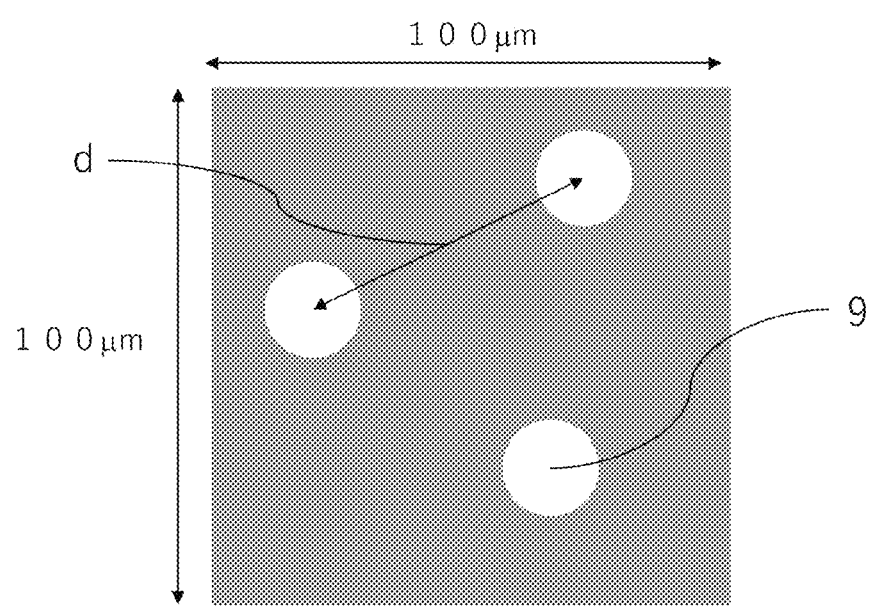
FIG. 11 is a schematic diagram of an island structure containing an alkali metal and/or an alkaline earth metal in TOF-SIMS measurement.

It is preferable that at least one island structure containing an alkali metal and/or an alkaline earth metal is detected in the layer A and the layer B when TOF-SIMS measurement is carried out in a 100 µm square area. The size of the island structure is preferably from 9 µm$^2$ to 245 µm$^2$, more preferably 10 µm$^2$ to 230 µm$^2$, and still more preferably 11 µm$^2$ to 214 µm$^2$. It is preferable that two or more island structures containing calcium are detected in the electricity storage device when TOF-SIMS measurement is carried out in a 100 µm square area. At this time, a distance between centers of gravity of the island structure is preferably 6 µm to 135 µm, more preferably 8 µm to 130 µm, and still more preferably 10 µm to 125 µm. FIG. 11 is a schematic diagram of an island structure containing an alkali metal and/or an alkaline earth metal in TOF-SIMS measurement. As schematically illustrated in FIG. 11, the distance (d) between the island structures (9) can be measured in a 100 µm square area. Examples of the method for controlling the size of the island structure and the distance between centers of gravity include adjusting the number of rotations of the extruder, the molecular weight of the polyolefin resin starting material, etc.

When an electricity storage device using an electrolyte solution containing LiFSO$_3$ is fabricated, it is possible for an excess amount of HF to be present in the battery due to a variation in the amount of moisture carried by each member. HF can be trapped as a salt of an alkali metal and/or an alkaline earth metal by homogeneously distributing an alkali metal and/or an alkaline earth metal in an island structure in which the alkali metal and/or the alkaline earth metal is/are aggregated in the polyolefin substrate layer. Since the alkali metal and/or the alkaline earth metal is/are consumed stepwise from the surface of the island structure, the trap effect can be maintained for a long period of time. As a result, deterioration of the battery can be suppressed for a long period of time, which is preferable. The siloxane-crosslinked separator may catalyze a cleavage reaction, which is a reverse reaction of the crosslinking reaction, when excess HF is present after crosslinking. Therefore, it is presumed that the cleavage reaction is suppressed by continuously trapping HF with the heterogeneously distributed alkali metal and/or alkaline earth metal, thus making it possible to improve the long-term stability of the crosslinked structure of the silane crosslinked separator.

Examples of the alkali metal include lithium, sodium and potassium, and examples of the alkaline earth metal include magnesium, calcium and strontium. The island structure preferably contains an alkaline earth metal, and the alkaline earth metal is preferably calcium. By heterogeneously distributing calcium in the form of an island structure in the polyolefin substrate layer, calcium consumes HF in the system consumed as $CaF_2$, thus making it possible to more efficiently control the HF concentration. Since calcium is gradually consumed from the surface of the island structure, it is presumed that the trap effect can be maintained for a long period of time without being consumed completely in a short period of time. Thus, deterioration of the battery can be suppressed for a long period of time, which is preferable. The siloxane-crosslinked separator may catalyze the cleavage reaction, which is a reverse reaction of the crosslinking reaction, when excess HF is present after crosslinking. Therefore, it is presumed that the cleavage reaction is suppressed by continuously trapping HF with the heterogeneously distributed alkali metal and/or alkaline earth metal, thus making it possible to improve the long-term stability of the crosslinked structure of the silane crosslinked separator. In the case where $LiPF_6$ is contained in the electrolyte, the generation of an excessive amount of F anion due to variation in moisture content is considered, similarly. It has been experimentally found that the F anion can be trapped by providing an island structure containing calcium in the polyolefin substrate layer, and thus the stability of the siloxane bond can be ensured, similarly, and the crosslinked structure of the separator can be maintained over a long period of time.

<Various Properties of Separator for Electricity Storage Device>

The porosity of the separator for an electricity storage device is preferably 20% or more, more preferably 30% or more, and still more preferably 40% or more. When the porosity of the separator is 20% or more, the followability to rapid movement of ions tends to be further improved. Meanwhile, the porosity of the separator is preferably 80% or less, more preferably 70% or less, and still more preferably 60% or less. When the porosity of the separator is 80% or less, the membrane strength is further improved, and self-discharge tends to be further suppressed.

The air permeability of the separator for an electricity storage device is preferably 50 seconds or more, more preferably 60 seconds or more, and still more preferably 70 seconds or more, per 100 $cm^3$ of the volume of the membrane. When the air permeability of the separator is 50 seconds or more, the balance between the thickness, the porosity and the mean pore size tends to be further improved. The air permeability of the separator is preferably 400 seconds or less, more preferably 300 seconds or less, still more preferably 250 seconds or less, and yet more preferably 200 seconds or less, per 100 $cm^3$ of the volume of the membrane. When the air permeability of the separator is 400 seconds or less, the ion permeability tends to be further improved.

The membrane thickness of the separator for an electricity storage device is preferably 1.0 µm or more, more preferably 2.0 µm or more, and still more preferably 3.0 µm or more. When the membrane thickness separator is 1.0 µm or more, the membrane strength tends to be further improved. The membrane thickness of the separator is preferably 100 µm or less, more preferably 60 µm or less, and still more preferably 50 µm or less. When the membrane thickness separator is 100 µm or less, the ion permeability tends to be further improved.

The heat shrinkage factor at 150° C. of the separator for an electricity storage device and the heat shrinkage factor at 150° C. thereof in electrolyte solution are preferably 50% or less, more preferably 30% or less, and still more preferably 10% or less. When the heat shrinkage factor at 150° C. of the separator for an electricity storage device and the heat shrinkage factor at 150° C. thereof in electrolyte solution are 50% or less, the battery safety at the time of local short circuit generation can be further improved. The heat shrinkage factor at 150° C. of the separator for an electricity storage device and the heat shrinkage factor at 150° C. thereof in electrolyte solution are preferably 0.1% or more, more preferably 0.2% or more, and still more preferably 0.3% or less. When the heat shrinkage factor at 150° C. of the separator and the heat shrinkage factor at 150° C. thereof in electrolyte solution are 0.1% or more, the balance between the porosity and the puncture strength tends to be further improved.

When the battery causes abnormal heat generation due to internal short circuit, there is a possibility that the separator at high temperature may deform. As used herein, this phenomenon is referred to as "thermal response", and the area change rate of the separator due to the thermal response is referred to as "thermal response index". It is reported that the deformation of the crystalline polymer by heat occurs due to the non-orientation of the amorphous portions and the lamellar structure of the fiber structure of the crystal portions. It can be considered that the thermal response index of the separator is related to the number of molecular chains exceeding activation energy for causing the change by the crystal and amorphous portions among the molecular chain in the polymer resin constituting the polyolefin substrate layer. By the way, the molecular motion of the polymer is determined by the bending property of the main chain (in-molecule interaction) and intermolecular interaction. In particular, in the case of a polymer solid, the latter plays an important role, and when the temperature of the polymer is raised, intermolecular interaction is weakened, and micro-Brownian motion and macro-Brownian motion are activated, leading to the change of the crystal portions and amorphous portions. Therefore, it is considered that the activation energy for the transition to the lamellar structure of the polymer chain of the crystal portions and the non-orientation of the polymer chain of the amorphous portions depend on intermolecular interaction. The intermolecular interaction also depends on the molecular weight of the polymer. The molecular weight distribution of the polymer varies depending on the production method, but is often approximated by a distribution function such as a Zimm type distribution and a Wesslau type distribution (logarithmic normal distribution). Therefore, it is possible to consider that the distribution of the activation energy for each molecular chain in the polymer follows these distribution functions. Considering the thermal response index of the separator as the cumulative number of molecular chains exceeding the active energy, it is expected that the thermal response can be approximated by a cumulative distribution function, for example, a sigmoid function. In practice, the inventors carried out fitting of the relationship between the thermal response index and the temperature when the separator for an electricity storage device is heated to 150° C. at 2° C./min to the following formula $$\text{(Thermal Response Index)} = \frac{\max}{1 + \exp\frac{T_0 - T}{\text{rate}}} \quad \text{Formula (1)}$$

using the least squares method, and as a result, it has been found that there are max, To and rate such that the determination coefficient R2 becomes 0.95 or more. In the formula, max corresponds to the convergence value of the thermal response index, and $T_0$ corresponds to the inflection point of the thermal response index. In the formula, the rate is a gradient of the thermal response index, specifically, a parameter related to the severity of deformation. In the polyolefin microporous membrane, regarding the amount of deformation due to heating, when the relationship between the thermal response index and the temperature upon heating the electricity storage device separator after immersion in the internal void ratio electrolyte solution to 150° C./min is fitted to the formula (1) using the least squares method so that the determination coefficient R2 becomes 0.95 or more, the value of the rate is preferably 3.5 or more, more preferably 4.0 or more, and still more preferably 4.5 or more. The larger the rate, the more slowly the thermal response progresses, and the surrounding electrodes can be prevented from being involved in the thermal response of the separator. From the viewpoint of preventing destruction of the battery due to thermal response, the value of the rate is preferably 3.5 or more. The value of the rate is preferably 150 or less, more preferably 100 or less, and still more preferably 50 μm or less. The smaller the rate, the more rapidly the thermal response progresses, and the stress applied to the lithium dendrite increases when the local short circuit occurs. From the viewpoint of improving the battery safety when the local short circuit occurs, the value of the rate is preferably 150 or less.

In the above formula (1), the value of $T_0$ is preferably $110 \le T_0 \le 150$, more preferably $115 \le T_0 \le 140$, and still more preferably $120 \le T_0 \le 135$. The value of $T_0$ is related to the temperature at which the thermal response occurs. When the range of $T_0$ is within the above range, it is possible to prevent thermal response of the separator in the normal use temperature range of the battery, and to accurately fold the lithium dendrite when the local short circuit occurs, and stop the local short-circuit. In the above formula (1), the range of max is preferably $0.1 \le \max \le 30$, more preferably $0.2 \le \max \le 20$, and still more preferably $0.5 \le \max \le 10$. The value of max is related to the convergence value of the thermal response index. When the range of max is within the above range, it is possible to prevent the occurrence of internal short circuit due to the thermal response of the separator at the time of local short circuit.

In light of the above, examples of the method for controlling the values of the rate, To and max in the above formula (1) include a method for adjusting the molecular weight distribution of the polyolefin substrate and a method for controlling the mechanical strength of the inorganic coating layer having the effect of suppressing thermal deformation. For example, it is preferable to use a polyolefin (starting material b) having Mv=2,000,000 to 9,000,000 and a polyolefin (starting material c) having Mv=500,000 to 2,000,000 as a polyolefin starting material, and a silane-modified polyolefin (starting material a) having Mv=20,000 to 150,000 as a silane-modified polyolefin starting material, specifically three types in total. More preferably, the ratio of the content is adjusted in accordance with each molecular weight. More preferably, by adjusting the common logarithm of the ratio of the puncture strength divided by weight per unit area calculated by the following formula (2) and the weight per unit area of the inorganic coating layer, it is easy to keep the value of the rate, To and max within the above range. In the starting material composition mentioned above, the ratio of the starting material a in the total weight of the polyolefin substrate layer is 3 wt % to 70 wt %, and the ratio of the starting material b to the starting material c (weight of resin b/weight of resin c) is preferably 0.06 to 7.00. The common logarithm is preferably 0.1 to 3.

$$\log_{10}\left\{\frac{\text{Puncture strength divided by weight per unit area of polyolefin substrate layer}}{\text{Weight per unit area of inorganic coating layer}}\right\} \quad \text{Formula (2)}$$

I. Polyolefin Microporous Membrane in First Embodiment, and Method for Producing Separator for Electricity Storage Using Same <<Method for Producing Polyolefin Microporous Membrane>>

As a method for producing a separator, the case where the polyolefin microporous membrane is single-layer membrane (flat membrane) as the substrate will be described, but it is not intended to exclude forms other than flat membrane. The method for producing a microporous membrane can include the following steps:

(1) a sheet-forming step;
(2) a stretching step;
(3) a porous body-forming step; and
(4) a heat treatment step. The method for producing a microporous membrane may optionally include a resin-modifying step or a kneading step before the sheet-forming step (1) and/or a winding and slitting step after the heat treatment step (3), but preferably it does not include a crosslinked structure-forming step or a step of contacting with a crosslinking promoting catalyst from the viewpoint of maintaining the crosslinkability of the microporous membrane until housing in the electricity storage device.

The crosslinked structure-forming step includes (1) a secondary step in which a plurality of functional groups included in the microporous membrane are subjected to a condensation reaction, (2) a secondary step in which the functional groups included in the microporous membrane are reacted with a chemical substance in the electricity storage device, or (3) a secondary step in which the functional groups included in the microporous membrane are reacted with other functional groups. The crosslinking promoting catalyst is an optional catalyst capable of promoting a crosslinking reaction, for example, (I) a condensation reaction of a plurality of the same functional groups, (II) a reaction between a plurality of different functional groups, (III) a chain condensation reaction between the functional groups and an electrolyte solution, and (IV) a chain condensation reaction between the functional groups and an additive, described above.

In the kneading step, the polyolefin resin composition and the plasticizer used for the layer A are melt-kneaded to obtain a melt-kneaded mixture I, and then the polyolefin resin composition and the plasticizer used for the layer B are melt-kneaded to obtain a melt-kneaded mixture II. The melt-kneading method includes, for example, a method in which the polyolefin resin and, as necessary, other additives are kneaded with a pore-forming material introduced in an arbitrary ratio while heating and melting the resin components, using a resin kneading apparatus such as an extruder, a kneader, Labo Plastomill, a kneading roll or a Banbury mixer. From the viewpoint of suppressing the generation of resin aggregates during the production process and maintaining crosslinkability of the microporous membrane until housing in the electricity storage device, a master batch resin containing a crosslinking promoting catalyst is preferably not added to the kneaded mixture.

The polyolefin used in the kneading step or the sheet-forming step is not limited to an olefin homopolymer, and may be a polyolefin obtained by copolymerizing a monomer having a functional group, or a functional group-modified polyolefin. The functional group is a functional group which can be involved in the formation of a crosslinked structure, and may be, for example, functional groups A and/or B in the above-described reactions (I) to (V). The resin-modifying step can be eliminated by preparing a polyolefin starting material including a monomer unit having functional groups A and/or B in advance.

Meanwhile, when the polyolefin starting material has no functional group capable of being involved in the formation of the crosslinked structure or the molar fraction of such a functional group is less than a predetermined ratio, the polyolefin starting material is subjected to the resin-modifying step, and the functional group is incorporated in the resin backbone or the molar fraction of the functional group is increased to obtain the functional group-modified polyolefin. The resin-modifying step may be carried out by a known method. For example, the polyolefin starting material can be brought into contact with the reaction reagent by liquid spraying, gas spraying, dry mixing, immersion, or coating so that the functional groups A and/or B can be introduced into the polyolefin backbone.

The plasticizer is not particularly limited, and examples thereof include organic compounds which can form homogeneous solutions with polyolefins at temperatures below their boiling points. More specifically, these include decalin, xylene, dioctyl phthalate, dibutyl phthalate, stearyl alcohol, oleyl alcohol, decyl alcohol, nonyl alcohol, diphenyl ether, n-decane, n-dodecane and paraffin oil. Of these, paraffin oil and dioctyl phthalate are preferable. A plasticizer may be used alone, or two or more thereof may be used in combination. The proportion of the plasticizer is not particularly limited, but from the viewpoint of the porosity of the obtained microporous membrane, it is preferably 20 wt % or more, and from the viewpoint of the viscosity during melt kneading, it is preferably 90 wt % or less, as necessary, with respect to the total weight of the polyolefin and silane graft-modified polyolefin.

The sheet-forming step is a step of extruding a mixture of the obtained kneaded mixture or a mixture of a polyolefin and a plasticizer, cooling and solidifying the mixture, and molding the mixture into a sheet shape to obtain a sheet.

In the sheet forming step, for example, the melt-kneaded mixtures I and II are co-molded into a sheet by stacking into a two-type two-layer or two-type three-layer structure to obtain a sheet-shaped molded body. The method for producing the sheet-shaped molded body includes, for example: a method including co-extruding a melt-kneaded mixture into sheet form through a T-die, etc., bringing it into contact with a heat conductor, and cooling to a temperature sufficiently lower than the crystallization temperature of the resin component to solidify it; and a method including extruding the melt-kneaded mixture I and melt-kneaded mixture II separately from a T-die, and bringing them into contact with a heat conductor and cooling to form each sheet, followed by stacking into a two-type two-layer or two-type three-layer structure.

Examples of the heat conductor used for cooling solidification include metal, water, air or a plasticizer. Of these, a metal roll is preferably used for high heat conduction efficiency. When the extruded kneaded mixture is in contacted with the metal roll, it is preferably sandwiched between rolls because the heat conduction efficiency further increases while causing the sheet to become oriented and increasing the membrane strength, and also tending to improve the surface smoothness of the sheet. The die lip gap when extruding the melt-kneaded mixture into a sheet from a T-die is preferably 200 μm or more and 3,000 μm or less, and more preferably 500 μm or more and 2,500 μm or less. When the die lip gap is 200 μm or more, tip adhesion is reduced and less adverse effect on membrane quality such as streaks and defects is exerted, thus enabling reduction in risk of membrane rupture during the subsequent stretching step. Meanwhile, when the die lip gap is 3,000 μm or less, cooling irregularities can be prevented because of high cooling rate, and the thickness stability of the sheet can be maintained.

When the polyolefin or functional group-modified polyolefin copolymerized with a monomer having a functional group and other polyolefins are used in combination, from the viewpoint of the resin aggregates or the internal maximum heat generation rate in the separator, the weight ratio (polyolefin or functional group-modified polyolefin obtained by copolymerizing a monomer having functional group/ other polyolefins) in the sheet-forming step is more preferably 0.05 to 0.4/0.6 to 0.95, and still more preferably 0.06 to 0.38/0.62 to 0.94.

From the viewpoint of improving the safety by suppressing thermal runaway at the time of destruction of an electricity storage device while having low-temperature shutdown property of 150° C. or lower and membrane rupture resistance at high temperature of 180 to 220° C., in the sheet-forming step, it is preferable that the polyolefin or functional group-modified polyolefin copolymerized with a monomer having a functional group is preferably not a master batch resin containing a catalyst that promotes the crosslinking reaction of the functional group from before the sheet-forming step.

The stretching step is a step of extracting a plasticizer or an inorganic material from the obtained sheet if necessary, and further stretching the sheet in one or more directions. Examples of the method for stretching the sheet include an MD uniaxial stretching by a roll stretching machine, a TD uniaxial stretching by a tenter, a sequential biaxial stretching by a combination of a roll stretching machine and a tenter, or a tenter and a tenter, and a simultaneous biaxial stretching by simultaneous biaxial tenter or inflation molding. From the viewpoint of obtaining a more homogeneous membrane, it is preferable to carry out simultaneous biaxial stretching. From the viewpoint of the homogeneity of the thickness, the tensile elongation, the porosity and the mean pore size, the total area increase is preferably 8 times or more, more preferably 15 times or more, and still more preferably 20 times or more or 30 times or more. When the total area increase is 8 times or more, it tends to be easy to obtain high strength and satisfactory thickness distribution. The area increase may be 250 times or less from the viewpoint of preventing rupture.

The porous body-forming step is a step in which the plasticizer is extracted from the stretched sheet after the stretching step to form pores in the stretched sheet. Examples of the method of extracting the plasticizer include, but are not particularly limited to, a method of immersing the stretched sheet in an extraction solvent or a method of showering the stretched sheet with an extraction solvent. The extraction solvent used is not particularly limited, but it is preferably one that is a poor solvent for the polyolefin and a good solvent for the plasticizer or inorganic material, and that has a boiling point lower than the melting point of the polyolefin. Examples of such extraction solvent include, but are not particularly limited to, hydrocarbons such as n-hexane and cyclohexane; halogenated hydrocarbons such as methylene chloride, 1,1,1-trichloroethane and fluorocarbon-based compounds; alcohols such as ethanol and isopropanol; ketones such as acetone and 2-butanone; and alkali water. An extraction solvent may be used alone, or two or more thereof may be used in combination.

The heat treatment step is a step in which, after the stretching step, the plasticizer is also extracted from the sheet as necessary and heat treatment is further carried out to obtain a microporous membrane. Examples of method of heat treatment include, but are not particularly limited to, a heat setting method in which a tenter and/or roll stretcher is utilized for stretching and relaxation procedures. A relaxation procedure is a procedure of shrinking carried out at a prescribed temperature and relaxation factor, in the machine direction (MD) and/or transverse direction (TD) of the membrane. The relaxation factor is the value of the MD dimension of the membrane after the relaxation procedure divided by the MD dimension of the membrane before the procedure, or the value of the TD dimension after the relaxation procedure divided by the TD dimension of the membrane before the procedure, or the product of the relaxation factor in the MD and the relaxation factor in the TD, when both the MD and TD have been relaxed.

<Winding/Slitting Step/Post-Treatment Step>

The winding step is a step in which the obtained microporous membrane is slit as necessary and wound on a prescribed core.

When the obtained polyolefin microporous membrane is subjected to surface treatment, the coating solution is easily coated and the adhesion between the electrode and the surface layer is improved, which is preferable. Examples of the method for surface treatment include a corona discharge treatment method, a plasma treatment method, a mechanical roughening method, a solvent treatment method, an acid treatment method, and an ultraviolet oxidation method.

The polyolefin microporous membrane obtained by the method for producing a polyolefin microporous membrane in the first embodiment described above can be used by itself as a separator for an electricity storage device, particularly as a separator for a lithium battery or a lithium ion secondary battery. Optionally, an additional layer may be formed on the polyolefin microporous membrane in the first embodiment. Examples of the additional layer include a layer containing a polyolefin, a layer containing a resin other than the polyolefin, a layer containing inorganic particles or a heat-resistant resin, and an adhesive layer containing an adhesive polymer.

II. Regarding Method for Producing Separator for Electricity Storage Device in Second Embodiment <<Method for Producing Separator for Electricity Storage Device>>

(Method for Producing Polyolefin Substrate Layer)

The method for producing layer A and layer B as the polyolefin substrate layer can include the following steps:
  (1) a sheet-forming step;
  (2) a stretching step;
  (3) a porous body-forming step; and
  (4) a heat treatment step. The method for producing a polyolefin substrate layer may optionally include a kneading step before the sheet-forming step (1) and/or a winding and slitting step after the heat treatment step (3). Examples of the method for stacking layer A and layer B include a method in which the layer A and the layer B are stacked by coextrusion in the step (1), and a method in which the layer A and the layer B are separately produced, followed by stacking.

The kneading step is a step in which a starting material resin of a polyolefin substrate layer and, as necessary, a plasticizer and/or an inorganic filler are kneaded to obtain a kneaded mixture. It is possible to use, as the starting material resin of the polyolefin substrate layer, the polyolefin resin mentioned above. A kneading machine may be used for kneading. From the viewpoint of suppressing the generation of resin aggregates during the subsequent production process, a master batch resin containing a dehydrating condensation catalyst is preferably not added to the kneaded mixture. It is possible to use, as the plasticizer, organic compounds which can form homogeneous solutions with polyolefins at a temperature below the boiling point thereof. More specifically, these include decalin, xylene, dioctyl phthalate, dibutyl phthalate, stearyl alcohol, oleyl alcohol, decyl alcohol, nonyl alcohol, diphenyl ether, n-decane, n-dodecane and paraffin oil. Of these, paraffin oil and dioctyl phthalate are preferable. A plasticizer may be used alone, or two or more thereof may be used in combination. The proportion of the plasticizer with respect to the total weight of the polyolefin resin to be used is not particularly limited, but from the viewpoint of the porosity of the obtained microporous membrane, it is preferably 20 wt % or more, and from the viewpoint of the viscosity during melt kneading, it is preferably 90 wt % or less.

The sheet-forming step is a step in which the obtained kneaded mixture or a mixture of polyolefin resin starting materials and arbitrary plasticizers and/or inorganic fillers is extruded, cooled to solidification, and cast into a sheet form to obtain a sheet. The sheet forming method is not particularly limited, and may be, for example, a method of compressed-cooling solidification of a molten mixture obtained by melt kneading and extrusion. The cooling method may be a method of direct contact with a cooling medium such as cold air or cooling water; or a method of contact with a refrigerant-cooled roll and/or pressing machine, with a method of contact with a refrigerant-cooled roll and/or pressing machine being preferable for superior membrane thickness control.

From the viewpoint of suppressing the generation of resin aggregates in the polyolefin substrate layer, the weight ratio of a silane-modified polyolefin to a silane-unmodified polyethylene in the sheet-forming step (weight of silane-modified polyolefin/weight of polyethylene) is preferably 0.05/0.95 to 0.4/0.6, and more preferably 0.06/0.94 to 0.38/0.62. The silane-unmodified polyethylene is preferably an ultra-high molecular weight polyethylene (UHMWPE).

The stretching step is a step in which the obtained sheet is stretched in at least one direction to obtain a stretched sheet. The plasticizer and/or inorganic filler may be extracted from the obtained sheet as necessary before stretching. Examples of the method of stretching the sheet include MD uniaxial stretching with a roll stretcher, TD uniaxial stretching with a tenter, sequential biaxial stretching with a combination of a roll stretcher and tenter, or a tenter and tenter, and simultaneous biaxial stretching with a biaxial tenter or inflation molding. Simultaneous biaxial stretching is preferable from the viewpoint of obtaining a more homogeneous membrane. The total area increase is preferably 8 times or more, more preferably 15 times or more and still more preferably 20 times or more or 30 times or more, from the viewpoint of membrane thickness homogeneity, and balance between tensile elongation, porosity and mean pore size. If the total area increase is 8 times or more, it tends to be easier to obtain high strength and a satisfactory thickness distribution. The area increase is also 250 times or less from the viewpoint of preventing rupture.

The porous body-forming step is a step in which the plasticizer and/or the inorganic filler is/are extracted from the stretched sheet after the stretching step to form pores, thus obtaining a microporous membrane. Examples of the method of extracting the plasticizer include a method of immersing the stretched sheet in an extraction solvent or a method of showering the stretched sheet with an extraction solvent, for example. The extraction solvent used is not particularly limited, but it is preferably a solvent which is a poor solvent for the polyolefin and a satisfactory solvent for the plasticizer and/or inorganic filler, and a solvent having a boiling point which is lower than the melting point of the polyolefin. Examples of such extraction solvents include hydrocarbons such as n-hexane and cyclohexane; halogenated hydrocarbons such as methylene chloride, 1,1,1-trichloroethane and fluorocarbon-based compounds; alcohols such as ethanol and isopropanol; ketones such as acetone and 2-butanone; and alkali water. An extraction solvent may be used alone, or two or more thereof may be used in combination.

The heat treatment step is a step in which, after the stretching step, the microporous membrane is subjected to a heat treatment. The plasticizer may be further extracted from the microporous membrane as necessary before the heat treatment. Examples of the method of heat treatment include, but are not particularly limited, to a heat setting method in which a tenter and/or roll stretcher is utilized for stretching and relaxation procedures. A relaxation procedure is a procedure of shrinking carried out at a prescribed temperature and relaxation factor, in the machine direction (MD) and/or transverse direction (TD) of the membrane. The relaxation factor is the value of the MD dimension of the membrane after the relaxation procedure divided by the MD dimension of the membrane before the procedure, or the value of the TD dimension after the relaxation procedure divided by the TD dimension of the membrane before the procedure, or the product of the relaxation factor in the MD and the relaxation factor in the TD, when both the MD and TD have been relaxed.

The winding and slitting step is a step in which the obtained microporous membrane is slit as necessary and wound around a predetermined core for handleability in the subsequent step.

From the viewpoint of maintaining the crosslinkability until the polyolefin substrate layer is in contact with the electrolyte solution, the production process of the polyolefin substrate layer preferably does not include the crosslinking treatment step. In other words, the crosslinking treatment step is preferably carried out in the electricity storage device after the separator provided with the polyolefin substrate layer is incorporated in the electricity storage device. The crosslinking treatment step is generally a step in which the object to be treated which contains a silane-modified polyolefin is contacted with a mixture of an organometallic catalyst and water, or is immersed in a base solution or an acid solution, for silane dehydration condensation reaction to form oligosiloxane bonds. Examples of the organometallic catalyst include di-butyltin-di-laurate, di-butyltin-di-acetate, and di-butyltin-di-octoate. The base solution means an alkali solution which has a pH of higher than 7 and contains alkali hydroxide metals, alkaline earth metal hydroxides, alkali metal carbonates, alkali metal phosphates, ammonia or amine compounds. The acid solution means an acid solution which has a pH of below 7 and contains inorganic acids or organic acids.

<Method for Forming Island Structure>

In the production process of the polyolefin substrate layer, when starting materials are charged in an extruder in the sheet-forming step, an alkali metal and/or an alkaline earth metal compound having a constant concentration is/are mixed in the starting materials, whereby an island structure of the alkali metal and/or the alkaline earth metal can be formed in the separator. However, when using starting materials having a large molecular weight, it is difficult to homogeneously disperse the alkali metal and/or the alkaline earth metal compound into the resin starting materials since there is a difference in dissolution viscosity between the starting materials. Furthermore, in the case of melt mixing containing a silane-modified polyolefin, since there is a unit having a hetero-functional group, it is more difficult to disperse. In such a complicated mixed resin, the homogeneity of the dispersion of the alkali metal and/or the alkaline earth metal compound is improved by carrying out shear stirring by the extruder at high rotational speed, while the island structure is finely dispersed adjacent to each other, so that the F anion in the electrolyte solution is consumed more than necessary. Since shear stirring by the extruder at high rotational speed causes molecular weight deterioration of the polyolefin, the mechanical strength and the opening property of the separator are significantly impaired.

In order to control the construction of the island structure without impairing the mechanical strength and opening property, it is preferable to use those in which Mv=2,000,000 to 9,000,000 (starting material b) and Mv=500,000 to 2,000,000 (starting material c) as a polyolefin starting material, and those in which Mv=20,000 to 150,000 (starting material a) as a silane-modified polyolefin starting material, specifically, three types in total. More preferably, the ratio of the content is adjusted in accordance with each molecular weight. Thus, it is possible to control the construction of an island structure containing an alkali metal and/or an alkaline earth metal compound having a limited size and a degree of dispersion.

In the starting material composition mentioned above, the ratio of the starting material a in the whole is 3 wt % to 70 wt %, and the ratio of the starting material b to the starting material c contained in addition thereto (weight of resin b/weight of resin c) is preferably 0.06 wt % to 7.00 wt %.

<Surface Treatment of Polyolefin Substrate Layer>

The microporous membrane obtained by the method including various steps described above can be used as the polyolefin substrate layer of the separator for an electricity storage device. When the surface of the polyolefin substrate layer is subjected to surface treatment, it is preferable that the coating solution is easily applied and the adhesion between the substrate layer and the coating layer is improved. Examples of the surface treatment include a corona discharge treatment method, a plasma treatment method, a mechanical roughening method, a solvent treatment method, an acid treatment method, and an ultraviolet oxidation method.

<Method for Forming Inorganic Particle Layer>

The inorganic particle layer can be formed by coating a polyolefin substrate layer with a coating solution containing inorganic particles and an arbitrary resin binder in a solvent, and removing the solvent. The solvent is preferably water, or a poor solvent such as a mixed solvent of water and a water-soluble organic medium (for example, methanol or ethanol).

The coating method may be any method capable of realizing desired coating pattern, coating thickness and coating area. Examples thereof include die coating, curtain coating, impregnation coating, blade coating, rod coating and gravure coating.

The method of removing the solvent from the coating membrane after coating may be any method which does not adversely affect the polyolefin substrate layer and the inorganic particle layer. Examples thereof include a method of heating and drying the substrate at a temperature equal to or lower than the melting point of the substrate while fixing the substrate, and a method of vacuum drying at low temperature.

<Method for Forming Thermoplastic Polymer Layer>

The thermoplastic polymer layer can be formed by coating the inorganic particle layer with a coating solution containing a thermoplastic polymer in a solvent. In the case of producing the separator for an electricity storage device including no inorganic particle layer, the coating solution for the thermoplastic polymer layer may be directly applied on the polyolefin substrate layer. The coating solution may be synthesized by emulsion polymerization of a thermoplastic polymer, and the obtained emulsion may be used as a coating solution as it is. The coating solution preferably contains water, or a poor solvent such as a mixed solvent of water and a water-soluble organic medium (for example, methanol or ethanol).

The coating method may be any method capable of realizing desired coating pattern, coating thickness and coating area. Examples thereof include die coating, curtain coating, impregnation coating, blade coating, rod coating and gravure coating.

The method of removing the solvent from the coating membrane after coating may be any method that does not adversely affect the polyolefin substrate layer, the inorganic particle layer and the thermoplastic polymer layer. Examples thereof include a method of heating and drying the substrate at a temperature equal to or lower than the melting point of the substrate while fixing the substrate, and a method of vacuum drying at low temperature.

<<Electricity Storage Device>>

The electricity storage device of the present disclosure includes a positive electrode, a negative electrode, a polyolefin microporous membrane or a separator for an electricity storage device of the present disclosure disposed between the positive electrode and the negative electrode (hereinafter also collectively referred to as "separator for an electricity storage device", or simply referred to as "separator"), a nonaqueous electrolyte, and as necessary, an additive. The electricity storage device includes at least one electricity storage element in which a positive electrode, a negative electrode, and a separator for an electricity storage device are disposed therebetween. Typically, a plurality of positive electrodes and a plurality of negative electrodes are alternately stacked through a separator for an electricity storage device of the present disclosure therebetween to form a plurality of electricity storage elements. The electricity storage element is typically housed in the exterior body in a state of being impregnated with the nonaqueous electrolyte solution.

When the separator for an electricity storage device of the present disclosure is housed in the device exterior body, the functional group-modified polyethylene or the functional group graft copolymer polyethylene reacts with the chemical substance contained in the electrolyte solution or additive to form a crosslinked structure, so that the fabricated electricity storage device has a crosslinked structure. The functional group-modified polyethylene or the functional group graft copolymer polyethylene is not limited, but can be derived from a polyolefin starting material of a microporous membrane or derived from a polyolefin modified during a production process of a microporous membrane.

Specifically, examples of the electricity storage device of the present disclosure include a lithium battery, lithium secondary battery, lithium ion secondary battery, sodium secondary battery, sodium ion secondary battery, magnesium secondary battery, magnesium ion secondary battery, calcium secondary battery, calcium ion secondary battery, aluminum secondary battery, aluminum ion secondary battery, nickel hydrogen battery, nickel cadmium battery, electrical double layer capacitor, lithium ion capacitor, redox flow battery, lithium sulfur battery, lithium air battery, and zinc air battery. Of these, from the viewpoint of the practicality, a lithium battery, lithium secondary battery, lithium ion secondary battery, nickel hydrogen battery or lithium ion capacitor is preferable, and a lithium battery or lithium ion secondary battery is more preferable.

The lithium ion secondary battery (LIB) is a storage battery using a lithium-containing positive electrode, a negative electrode, and an electrolyte solution which contains an organic solvent containing a lithium salt such as $LiPF_6$. A known positive electrode for LiB can be used as the positive electrode. At the time of charge-discharge of the lithium ion secondary battery, ionized lithium reciprocates between the electrodes. Since the ionized lithium needs to move between the electrodes at relatively high speed while suppressing the contact between the electrodes, the separator is disposed between the electrodes.

Hereinafter, the case of a lithium ion secondary battery will be described as an example, but the electricity storage device of the present disclosure is not limited thereto.

<Positive Electrode>

The positive electrode typically includes a positive electrode current collector and a positive electrode active material layer disposed on one or both sides of the positive electrode current collector. The positive electrode active material layer contains a positive electrode active material, and further contains a conductive aid and/or a binder as necessary.

The positive electrode current collector is composed of, for example, a metal foil such as an aluminum foil, a nickel foil or a stainless steel foil. The positive electrode current collector may be carbon-coated, and may be processed into a mesh shape.

The positive electrode active material preferably contains a material capable of occluding and releasing lithium ions. More specifically, examples of the positive electrode active material include a positive electrode active material containing at least one transition metal element selected from the group consisting of Ni, Mn and Co. For example, it is possible to use a positive electrode capable of easily undergoing pyrolysis or releasing $O_2$, and the positive electrode is preferably, for example, at least one selected from the group consisting of a nickel-manganese-cobalt (NMC)-based lithium-containing positive electrode, an olivine-type lithium iron phosphate (LFP)-based positive electrode, a lithium cobaltate (LCO)-based positive electrode, a nickel-cobalt-aluminum (NCA)-based lithium-containing positive electrode and a lithium manganate (LMO)-based positive electrode. Since it is possible to reversibly and stably occlude and release lithium ions, and to achieve high energy density, a nickel-manganese-cobalt (NMC)-based lithium composite oxide is preferable. In the case of the NMC-based lithium composite oxide, the molar ratio of the amount of nickel (Ni) to the total amount of nickel, manganese and cobalt is preferably 4 to 9, 5 to 9, 6 to 9, 5 to 8, or 6 to 8.

The positive electrode active material may be an olivine-type lithium iron phosphate (LFP)-based positive electrode. Since the olivine-type lithium iron phosphate has an olivine-type structure and is excellent in thermal stability, it is often used at relatively high temperature such as 60° C. However, a normal separator having no crosslinked structure causes creep deformation (deformation of the microporous structure) at 60° C., resulting in a problem in cycle characteristics. Since the separator having the crosslinked structure according to the present disclosure can suppress creep deformation, the separator can be used in a temperature range having a problem in cycle characteristics by using in combination with an olivine-type lithium iron phosphate (LFP)-based positive electrode. The positive electrode active material may be a lithium cobaltate (LCO)-based positive electrode. Although the lithium cobaltate (LCO)-based positive electrode has high oxidation potential, it is possible to increase the operating voltage of the battery, however, lithium cobaltate has high hardness, and there is a tendency that foreign substance contamination due to metal wear tends to occur in the molding step. When the metal foreign substance is mixed during battery assembly, internal short circuit may occur. Since the separator having a crosslinked structure according to the present disclosure is excellent in fuse/meltdown characteristics, the electrochemical reaction can be safely stopped even when the internal short circuit occurs. By using the lithium cobaltate (LCO)-based positive electrode in combination with the separator of the present disclosure, it is possible to achieve both operating voltage of the battery and safety at the time of internal short circuit. The positive electrode active material may be a nickel-cobalt-aluminum (NCA)-based lithium-containing positive electrode. The use of the nickel-cobalt-aluminum (NCA)-based lithium-containing positive electrode makes it possible to produce a battery having excellent charge-discharge capacity at low cost. However, there is a tendency that a trace amount of moisture contained in the battery reacts with Li ions eluted from the positive electrode to produce a lithium compound, and the lithium compound reacts with the electrolyte solution to easily cause the generation of gas. The generation of gas may cause battery swelling. When lithium ions eluted from the positive electrode are consumed, the charge-discharge capacity may be reduced. A separator having a crosslinked structure according to the present disclosure has an island structure of alkali metal/alkali metal, the alkaline earth metal/alkaline earth metal react with HF, thus enabling control of the HF concentration. One of reactions occurring in the battery is a reaction of reacting moisture with an electrolyte salt such as $LiPF_6$ to produce HF, and it is possible to promote the reaction between moisture and the electrolyte salt and to efficiently consume moisture by controlling the HF concentration in the battery. By using the nickel-cobalt-aluminum (NCA)-based lithium-containing positive electrode in combination with the separator of the present disclosure, a decrease in charge-discharge capacity can be suppressed. The positive electrode active material may be a lithium manganate (LMO) positive electrode. lithium manganate has a strong crystal structure because of having a spinel structure (cubic crystal) and is excellent in safety, so that it is used at relatively high temperature such as 60° C. However, a normal separator having no crosslinked structure has a problem in cycle characteristics since creep deformation (heat shrinkage) occurs at 60° C. The separator having a crosslinked structure according to the present disclosure is capable of suppressing creep deformation, so that the separator can be used in a temperature range having a problem in cycle characteristics by using in combination with a lithium manganate (LMO)-based positive electrode.

The positive electrode active material may be an olivine-type lithium iron phosphate (LFP)-based positive electrode because it has an olivine structure (orthorhombic crystal) and is thermally stable and excellent in safety, and also contains no expensive element, leading to low cost. The positive electrode active material may be a lithium cobaltate (LCO)-based positive electrode because of the high operating voltage and ability thereof to achieve excellent cycle lifetime. The positive electrode active material may be a nickel-cobalt-aluminum (NCA)-based lithium-containing positive electrode because of the layered structure and excellent balance of capacity density, cost and thermal stability thereof. The positive electrode active material may also be a lithium manganate (LMO)-based positive electrode because of the spinel structure (cubic crystal) and strong crystal structure thereof, and thus it is thermally stable and excellent in safety.

Examples of the conductive aid of the positive electrode active material layer include carbon black typified by graphite, acetylene black and Ketjen black, and carbon fibers. The content of the conductive aid is preferably set at 10 parts by weight or less, and more preferably 1 to 5 parts by weight, based on 100 parts by weight of the positive electrode active material.

Examples of the binder of the positive electrode active material layer include polyvinylidene fluoride (PVDF), polytetrafluoroethylene (PTFE), polyacrylic acid, styrene-butadiene rubber and fluororubber. The content of the binder is preferably set at 6 parts by weight or less, and more preferably 0.5 to 4 parts by weight, based on 100 parts by weight of the positive electrode active material.

<Negative Electrode>

The negative electrode typically includes a negative electrode current collector and a negative electrode active material layer disposed on one or both sides of the negative electrode current collector. The negative electrode active material layer contains a negative electrode active material, and further contains a conductive aid and/or a binder as necessary.

The negative electrode current collector is composed of, for example, a metal foil such as a copper foil, a nickel foil or a stainless steel foil. The negative electrode current collector may be carbon-coated on the surface or may be processed into a mesh shape. The thickness of the negative electrode collector is preferably 5 to 40 μm, more preferably 6 to 35 μm, and still more preferably 7 to 30 μm.

The negative electrode active material preferably contains a material capable of occluding lithium ions at a potential lower than 0.4 V (vs. Li/Li$^+$). More specifically, examples of the negative electrode active material include, in addition to carbon materials typified by amorphous carbon (hard carbon), graphite (artificial graphite, natural graphite), pyrolytic carbon, coke, glassy carbon, calcined body of organic polymer compound, mesocarbon microbead, carbon fiber, activated carbon, carbon colloid and carbon black; metal lithium, metal oxide, metal nitride, lithium alloy, tin alloy, Si material, intermetallic compound, organic compound, an inorganic compound, metal complex and organic polymer compounds. A negative electrode active material is used alone, or in combination of two or more thereof. Examples of the Si material include silicon, Si alloy, and Si oxide.

Examples of the conductive aid of the negative electrode active material layer include carbon black typified by graphite, acetylene black and Ketjen black, and carbon fibers. The content of the conductive aid is preferably set at 20 parts by weight or less, and more preferably 0.1 to 10 parts by weight, based on 100 parts by weight of the negative electrode active material.

Examples of the binder of the negative electrode active material layer include carboxymethyl cellulose, polyvinylidene fluoride (PVDF), polytetrafluoroethylene (PTFE), polyacrylic acid and fluororubber. The binder also includes diene-based rubber, for example, styrene-butadiene rubber. The content of the binder is preferably set at 10 parts by weight or less, and more preferably 0.5 to 6 parts by weight, based on 100 parts by weight of the negative electrode active material.

<Separator for Electricity Storage Device>

It is possible to use, as the separator for an electricity storage device, a separator for an electricity storage device according to the present disclosure.

<Electrolyte Solution>

The electrolyte in the battery may contain moisture, and the moisture contained in the system after the fabrication of the battery may be moisture contained in the electrolyte solution or brought-in moisture contained in a member such as an electrode or a separator. The electrolyte solution may contain a nonaqueous solvent. Examples of the solvent contained in the nonaqueous solvent include alcohols such as methanol and ethanol; and aprotic solvents. Of these, an aprotic solvent is preferable as the nonaqueous solvent.

Examples of the aprotic solvent include cyclic carbonate, fluoroethylene carbonate, lactone, organic compound having a sulfur atom, chain fluorinated carbonate, cyclic ether, mononitrile, alkoxy group-substituted nitrile, dinitrile, cyclic nitrile, short-chain fatty acid ester, chain ether, fluorinated ether, ketone, and compounds in which a portion or all of H atoms in the aprotic solvent is substituted with a halogen atom.

Examples of the cyclic carbonate include ethylene carbonate, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, vinylene carbonate, 4,5-dimethylvinylene carbonate and vinyl ethylene carbonate.

Examples of the fluoroethylene carbonate include 4-fluoro-1,3-dioxolan-2-one, 4,4-difluoro-1,3-dioxolan-2-one, cis-4,5-difluoro-1,3-dioxolan-2-one, trans-4,5-difluoro-1,3-dioxolan-2-one, 4,4,5-trifluoro-1,3-dioxolane-2-one, 4,4,5,5-tetrafluoro-1,3-dioxolan-2-one, and 4,4,5-trifluoro-5-methyl-1,3-dioxolan-2-one.

Examples of the lactone include γ-butyrolactone, α-methyl-γ-butyrolactone, γ-valerolactone, γ-caprolactone, δ-valerolactone, δ-caprolactone and ε-caprolactone.

Examples of the organic compound having sulfur atom include ethylene sulfite, propylene sulfite, butylene sulfite, pentene sulfite, sulfolane, 3-sulfylene, 3-methylsulfolane, 1,3-propanesultone, 1,4-butanesultone, 1-propene 1,3-sultone, dimethyl sulfoxide, tetramethylene sulfoxide and ethylene glycol sulfite.

Examples of the chain carbonate include ethyl methyl carbonate, dimethyl carbonate, diethyl carbonate, methyl propyl carbonate, methyl isopropyl carbonate, dipropyl carbonate, methyl butyl carbonate, dibutyl carbonate and ethyl propyl carbonate.

Examples of the cyclic ether include tetrahydrofuran, 2-methyltetrahydrofuran, 1,4-dioxane and 1,3-dioxane.

Examples of the mononitrile include acetonitrile, propionitrile, butyronitrile, valeronitrile, benzonitrile and acrylonitrile.

Examples of the alkoxy group-substituted nitrile include methoxyacetonitrile and 3-methoxypropionitrile.

Examples of the dinitrile include malononitrile, succinonitrile, methylsuccinonitrile, glutaronitrile, 2-methylglutaronitrile, adiponitrile, 1,4-dicyanoheptane, 1,5-dicyanopentane, 1,6-dicyanohexane, 1,7-dicyanoheptane, 2,6-dicyanoheptane, 1,8-dicyanooctane, 2,7-dicyanooctane, 1,9-dicyanononane, 2,8-dicyanononane, 1,10-dicyanodecane, 1,6-dicyanodecane, 2,4-dimethylglutaronitrile, and ethylene glycol bis(propionitrile)ether.

Examples of the cyclic nitrile include benzonitrile.

Examples of the short-chain fatty acid ester include methyl acetate, methyl propionate, methyl isobutyrate, methyl butyrate, methyl isovalerate, methyl valerate, methyl pivalate, methyl hydroangelate, methyl caproate, ethyl acetate, ethyl propionate, ethyl isobutyrate, ethyl butyrate, ethyl isovalerate, ethyl valerate, ethyl pivalate, ethyl hydroangelate, ethyl caproate, propyl acetate, propyl propionate, propyl isobutyrate, propyl butyrate, propyl isovalerate, propyl valerate, propyl pivalate, propyl hydroangelate, propyl caproate, isopropyl acetate, isopropyl propionate, isopropyl isobutyrate, isopropyl butyrate, isopropyl isovalerate, isopropyl valerate, isopropyl pivalate, isopropyl hydroangelate, isopropyl caproate, butyl acetate, butyl propionate, butyl isobutyrate, butyl butyrate, butyl isovalerate, butyl valerate, butyl pivalate, butyl hydroangelate, butyl caproate, isobutyl acetate, isobutyl propionate, isobutyl isobutyrate, isobutyl butyrate, isobutyl isovalerate, isobutyl valerate, isobutyl pivalate, isobutyl hydroangelate, isobutyl caproate, tert-butyl acetate, tert-butyl propionate, tert-butyl isobutyrate, tert-butyl butyrate, tert-butyl isovalerate, tert-butyl valerate, tert-butyl pivalate, tert-butyl hydroangelate and tert-butyl caproate.

Examples of the chain ether include dimethoxyethane, diethyl ether, 1,3-dioxolane, diglyme, triglyme and tetraglyme. Examples of the fluorinated ether include compounds represented by the general formula $Rf_{a\ a}$—$OR_{b\ b}$ (wherein $Rf_{a\ a}$ is an alkyl group having a fluorine atom and $R_{b\ b}$ is an organic group which optionally has a fluorine atom). Examples of the ketone include acetone, methyl ethyl ketone and methyl isobutyl ketone.

Examples of the compound in which a portion or all of the H atoms in the aprotic solvent are substituted with a halogen atom include a compound in which a halogen atom is fluorine.

Examples of the fluoride of the chain carbonate include methyl trifluoroethyl carbonate, trifluorodimethyl carbonate, trifluorodiethyl carbonate, trifluoroethyl methyl carbonate, methyl 2,2-difluoroethyl carbonate, methyl 2,2,2-trifluoroethyl carbonate and methyl 2,2,2,3-tetrafluoropropyl carbonate. The fluorinated chain carbonate can be represented by the following general formula:

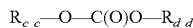

wherein $R_{cc}$ and $R_{dd}$ are at least one selected from the group consisting of $CH_3$, $CH_2CH_3$, $CH_2CH_2CH_3$, $CH(CH_3)_2$, and formula $CH_2Rf_{cc}$ (wherein $Rf_{cc}$ is an alkyl group having 1 to 3 carbon atoms in which hydrogen atoms are substituted with at least one fluorine atom), and $R_{cc}$ and/or $R_{dd}$ has/have at least one fluorine atom.

Examples of the fluoride of the short-chain fatty acid ester include fluorinated short-chain fatty acid esters typified by, for example, 2,2-difluoroethyl acetate, 2,2,2-trifluoroethyl acetate and 2,2,3,3-tetrafluoropropyl acetate. The fluorinated short chain fatty acid ester is represented by the following general formula:

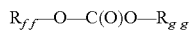

wherein $R_{ff}$ is at least one selected from the group consisting of $CH_3$, $CH_2CH_3$, $CH_2CH_2CH_3$, $CH(CH_3)_2$, $CF_3CF_2H$, $CFH_2$, $CF_2H$, $CF_2Rf_{hh}$, $CFHRf_{hh}$ and $CH_2Rf_{ii}$, $R_{gg}$ is at least one selected from the group consisting of $CH_3$, $CH_2CH_3$, $CH_2CH_2CH_3$, $CH(CH_3)_2$ and $CH_2Rf_{ii}$, $Rf_{hh}$ is an alkyl group having 1 to 3 carbon atoms in which a hydrogen atom is substituted with at least one fluorine atom, $Rf_{ii}$ is an alkyl group having 1 to 3 carbon atoms in which a hydrogen atom is substituted with at least one fluorine atom, and $R_{ff}$ and/or $R_{gg}$ has/have at least one fluorine atom, and when $R_{ff}$ is $CF_2H$, $R_{gg}$ is not $CH_3$.

As used herein, the nonaqueous electrolyte solution refers to an electrolyte solution containing an electrolyte in a nonaqueous solvent in which the amount of water is 1 wt % or less based on the total weight. The nonaqueous electrolyte preferably contains as little water as possible, but may contain a very small amount of moisture. The content of such moisture is preferably 300 ppm by weight or less, and more preferably 200 ppm by weight or less, based on the total amount of the nonaqueous electrolyte solution.

Examples of the nonaqueous solvent include alcohols such as methanol and ethanol, and aprotic solvents, and an aprotic solvent is preferable. Examples of the aprotic solvent include acetonitrile, mononitrile other than acetonitrile, alkoxy group-substituted nitrile, dinitrile, cyclic nitrile, chain carbonate, cyclic carbonate, fluorinated carbonate, fluoroethylene carbonate, short-chain fatty acid ester, lactone, ketone, organic compound having a sulfur atom, chain ether, cyclic ether, fluorinated ether, and compounds in which a portion or all of these H atoms are substituted with a halogen atom.

The electrolyte is preferably a lithium salt, and more preferably a fluorine-containing lithium salt that generates HF from the viewpoint of promoting the silane crosslinking reaction. Examples of the fluorine-containing lithium salt include lithium hexafluorophosphate ($LiPF_6$), lithium fluorosulfonate ($LiFSO_3$), lithium bis(trifluoromethanesulfonyl)imide ($LiN(SO_2CF_3)_2$), lithium bis(fluorosulfonyl)imide ($LiN(SO_2F)_2$), lithium borofluoride ($LiBF_4$) and lithium bis(oxalate)borate ($LiBC_4O_8$). While not wishing to be bound by any theory, when the electrolyte contains $LiPF_6$, for example, the $LiPF_6$ reacts with a slight amount of moisture (moisture contained in a member such as an electrode, a separator, or an electrolyte) to produce hydrogen fluoride (HF) or a fluorine-containing organic substance derived from HF. HF or the fluorine-containing organic substance derived from HF is dissolved in the electrolyte solution, and swollen and diffused to the amorphous portions in the polyolefin having a crosslinkable silane group, thus catalyzing the silane crosslinking reaction.

The nonaqueous electrolyte may include, in addition to the above, for example, an acid source such as an inorganic acid or an organic acid and an alkali source as a substance exerting a catalytic action on the silane crosslinking reaction. Examples of the alkali source include alkali metal hydroxides, alkaline earth metal hydroxides, alkali metal carbonates, alkali metal phosphates, ammonia, and amine compounds. Of these, alkali metal hydroxides or alkaline earth metal hydroxides are preferable, alkali metal hydroxides are more preferable, and sodium hydroxide is still more preferable, from the viewpoint of the safety and silane crosslinkability of the electricity storage device.

<Exterior Body>

A known exterior body can be used as the exterior body and, for example, a battery can or a laminate film exterior body may be used. It is possible to use, as the battery can, for example, a metal can made of steel, stainless steel, aluminum or a clad material. The laminate film exterior body can be used as the exterior body in a state where two sheets are stacked in a state where the hot melt resin side is directed inward, or two sheets are folded in a state where the hot melt resin side is directed inward, and then the end is sealed by heat sealing. When using the laminate film exterior body, a positive electrode lead body (or a lead tab connected to the positive electrode terminal and the positive electrode terminal) may be connected to the positive electrode current collector, and a negative electrode lead body (or a lead tab connected to the negative electrode terminal and the negative electrode terminal) may be connected to the negative electrode current collector. In this case, the laminate film exterior body may be sealed in a state where the end portions of the positive electrode lead body and the negative electrode lead body (or the lead tabs respectively connected to the positive electrode terminal and the negative electrode terminal) are drawn out to the outside of the exterior body. More specifically, it is possible to use, as the laminate film exterior body, for example, a laminate film having three-layer structure of hot melt resin/metal film/resin. The metal film is preferably an aluminum foil or a double-sided resin material, and preferably a polyolefin-based resin.

<Additive>

The additive may be at least one selected from the group consisting of dehydrating condensation catalysts, metal soaps such as calcium stearate or zinc stearate, ultraviolet absorbers, light stabilizers, antistatic agents, anti-fogging agents and dyes.

<Relationship Between Layer Structure of Separator and Prevention of Short Circuit>

When the separator of the present disclosure is a polyolefin microporous membrane having a two-layer structure, even in an electricity storage device in a high temperature (for example, 200° C. or higher) environment, at least one of the chemically crosslinkable porous layer of two layers does not penetrate into the electrodes facing the same, and thus short circuit between the electrodes can be prevented.

When the separator is a polyolefin microporous membrane having a three-layer structure (both surface layers are chemically crosslinked porous layers), the chemically crosslinked porous layer does not penetrate into both electrodes, and thus it is more effective in preventing short circuit at high temperature compared with the two-layer structure.

When the separator is a polyolefin microporous membrane having a three-layer structure (the intermediate layer is a chemically crosslinkable porous layer), the surface layer can be positively penetrated into the electrode. Therefore, in addition to having the effect of stopping conduction, it is also possible to have the effect of preventing short circuits between electrodes due to the chemical crosslinkability of the intermediate layer.

In the electricity storage device, the electrolyte solution in which the single layer of a polyolefin such as PE is swollen enables uniform penetration (supply) of the electrolyte solution in the crosslinking unit-containing layer, which is important for constructing a uniform crosslinked structure. Meanwhile, the physically entangled structure of the PE single layer having no crosslinked structure cannot be instantly relaxed even after crystal melting, and the entire entangled structure is viscoelastically maintained. As mentioned above, the compatibility between the chemically crosslinkable porous layer and the other layers can be suppressed, which is satisfactory for suppressing short circuit between the electrodes. From this point of view, a three-layer separator, in which a PE microporous membrane having a crosslinked structure is directed to face each of the positive electrode and the negative electrode, and a polyolefin microporous membrane having no crosslinked structure is formed in an intermediate layer between both electrodes, have significantly high ability to ensure the distance between electrodes at the time of melting, and is capable of achieving satisfactory passing rate in suppressing short circuit at high temperature (i.e., hot box testability).

A lithium ion secondary battery (LIB) is a storage battery using a lithium-containing positive electrode, a negative electrode, and an electrolyte solution containing an organic solvent containing a lithium salt such as $LiPF_6$. It is possible to use, as the positive electrode, a known positive electrode for LIB; a positive electrode which easily undergoes thermal decomposition or $O_2$ generation can be used; and positive electrode containing lithium cobalt oxide, lithium cobalt composite oxide, LAC-based positive electrode, and NMC-based positive electrode. It is possible to use, as the negative electrode, a carbon material such as graphite or graphite. The electrolyte solution described above for the electricity storage device assembly kit may also be used for the lithium ion secondary battery. For example, for the NMC-based positive electrode, the molar ratio of the amount of Ni to the total amount of NMC in the positive electrode is preferably 4 to 9, 5 to 9, 6 to 9, 5 to 8, or 6 to 8.

When charging or discharging a lithium-ion secondary battery, ionized lithium reciprocates between the electrodes. Since it is necessary for the ionized lithium to move between the electrodes at relatively high speed while suppressing contact between the electrodes, a separator is disposed between the electrodes.

<<Electricity Storage Device Assembly Kit>>

The present disclosure also provides an electricity storage device assembly kit including the above-described separator for an electricity storage device. The electricity storage device assembly kit includes the following two elements:

(A) an exterior body housing electrodes and a laminated body or a wound body of the separator for an electricity storage device described above; and (B) a container housing a nonaqueous electrolyte solution.

The laminate body or wound body includes at least one electricity storage element in which a positive electrode, a negative electrode and a separator for an electricity storage device are disposed therebetween. Typically, a plurality of positive electrodes and a plurality of negative electrodes are alternately stacked via the separator for an electricity storage device of the present disclosure to form a plurality of electricity storage elements. Details of the constituent members are desired to be referred to as the above "Electricity Storage Device".

The separator for an electricity storage device can be assembled by taking out the nonaqueous electrolyte from the container housing the nonaqueous electrolyte and injecting the nonaqueous electrolyte into the exterior body. The aspect of the container for storing the nonaqueous electrolyte solution is not limited as long as the nonaqueous electrolyte solution can be stored until the separator for an electricity storage device is assembled. After the separator for an electricity storage device is assembled, the container housing the nonaqueous electrolyte solution may be discarded or reused for the production of another kit.

When using the electricity storage device assembly kit, the separator in the element (A) and the nonaqueous electrolyte solution in the element (B) are brought into contact with each other, thereby bringing the electrolyte solution into contact with the laminate or the wound body in the exterior body, and/or by continuing the charge-discharge cycle of the assembled electricity storage device, it is possible to form a crosslinked structure in the separator, thus forming an electricity storage device that achieves both safety and output.

While not wishing to be bound by any theory, it is possible that when the electrolyte or electrolyte solution contacts with the electrodes and/or charge-discharge of the electricity storage device is carried out, the substance responsible for catalytic action during the crosslinking reaction or substances having functional groups that form part of the crosslinked structure, being present in the electrolyte solution, on the exterior body inner walls or on the electrode surfaces, dissolve into the electrolyte solution and evenly swell and diffuse into the amorphous portions of the polyolefin, thereby homogeneously promoting crosslinking reaction of the separator-containing laminated body or wound body. The substance responsible for catalytic action during the crosslinking reaction may be in the form of an acid solution or membrane, and when the electrolyte includes lithium hexafluorophosphate ($LiPF_6$), it may be hydrofluoric acid (HF) or a fluorine-containing organic substance derived from hydrofluoric acid (HF). Substances having functional groups that form part of the crosslinked structure may include the compound with functional group A and/or B mentioned above, or the electrolyte solution itself, or various additives.

From the viewpoint of promoting the crosslinking reaction of the separator, the nonaqueous electrolyte solution housed in the element (2) may contain, as the electrolyte, a fluorine (F)-containing lithium salt such as $LiPF_6$ that generates HF, an electrolyte having an unshared electron pair, such as $LiN(SO_2CF_3)_2$ or $LiSO_3CF_3$, or $LiBF_4$ or $LiBC_4O_8$ (LiBOB).

From the viewpoint of promoting the crosslinking reaction of the separator, the electricity storage device assembly kit may include, as an accessory (or an element (C)), another container housing a catalyst for promoting the crosslinking reaction, for example, a mixture of an organometallic catalyst and water, an acid solution, or a base solution.

<<Method for Producing Electricity Storage Device>>

In the first embodiment, the method for producing an electricity storage device is a method using a separator containing a polyolefin having one or more types of functional groups, the method being capable of including the following step: a crosslinking step in which (1) the functional groups are allowed to undergo a condensation reaction with each other, (2) the functional groups are reacted with a chemical substance inside the electricity storage device, or (3) the functional groups are reacted with other types of functional groups to form a crosslinked structure. The crosslinking step can be carried out in the same manner as the reaction for formation of the crosslinked structure in the separator, described above. Since the crosslinking step can also be carried out utilizing compounds in the electricity storage device or the surrounding environment of the device, it is possible to employ mild conditions such as a temperature of 5° C. to 90° C. and/or ambient atmosphere, without requiring excessive conditions such as electron beams or high temperature of 100° C. or higher.

By carrying out the crosslinking step during the production process for the electricity storage device, it is possible to eliminate the formation of a crosslinked structure either during or immediately after the process of forming the separator membrane, which can alleviate or eliminate stress and strain after the fabrication of the electricity storage device, and/or the separator can be imparted with a crosslinked structure without using relatively high energy such as photoirradiation or heating, thus allowing crosslinking unevenness, non-molten resin aggregate generation and environmental load to be reduced.

By carrying out (2) a reaction of functional groups with a chemical substance inside the electricity storage device or (3) a reaction of the functional groups of the polyolefin with other types of functional groups in the crosslinking step, a crosslinked structure is formed not only inside the separator but also between the separator and the electrodes or between the separator and the solid electrolyte interface (SEI), thus enabling an improvement in strength between a plurality of members of the electricity storage device.

In the second embodiment, the method for producing an electricity storage device according to the present disclosure includes, for example, the following steps:
(i) a preparation step of preparing an exterior body housing a laminate body or a wound body of an electrode and the separator for an electricity storage device according to the present disclosure, and a nonaqueous electrolyte solution;
(ii) a liquid injection step of injecting the nonaqueous electrolyte solution into the exterior body;
(iii) a terminal connection step of optionally connecting a lead terminal to an electrode in the exterior body or an electrode exposed from the exterior body; and
(iv) a charge-discharge step of carrying out at least one cycle charge-discharge. The steps (i) to (iv) can be carried out by a known method in this technical field, except that the separator for an electricity storage device of the present disclosure is used. In the steps (i) to (iv), the electrode and the nonaqueous electrolyte described in the item of "Electricity Storage Device" can be used, and it is also possible to use a positive electrode, a negative electrode, an electrolyte solution, an exterior body and a charge-discharge device known in this technical field.

It is preferable that the separator and the nonaqueous electrolyte are brought into contact with each other by the step (ii) to start the silane crosslinking reaction of the silane-modified polyolefin. From the viewpoint of reliably advancing the silane crosslinking reaction of the separator, the steps (iii) and (iv) are preferably carried out. While not wishing to be bound by any theory, it is considered that a substance exerting a catalytic action on the silane crosslinking reaction is produced in the electrolyte solution or on the surface of the electrode by the charge-discharge cycle, and thus the silane crosslinking reaction proceeds more efficiently.

In the method for producing an electricity storage device of the present disclosure, it is possible to use the electricity storage device assembly kit described above. In that case, the method for producing an electricity storage device includes the following steps:
(i) a step of preparing the electricity storage device assembly kit described above;
(ii) a step of combining an element (A) and an element (B) of an electricity storage device assembly kit, and carrying out (1) a condensation reaction of functional groups of a polyolefin contained in a separator, (2) a reaction of the functional groups with a chemical substance inside the electricity storage device, or (3) a reaction of the functional groups with other types of functional groups;
(iii) a step of optionally connecting a lead terminal to an electrode of the element (A); and
(iv) a step of optionally carrying out at least one cycle of charge-discharge. The steps (i) to (iv) can be carried out by a method known in this technical field, except for using the separator for an electricity storage device of the present disclosure, and in the steps (i) to (iv), it is possible to use a positive electrode, a negative electrode, an electrolyte solution, an exterior body and a charge-discharge device known in this technical field.

From the viewpoint of reliably carrying out the crosslinking reaction of the separator during or after the step (ii), the steps (iii) and (iv) are preferably carried out. By the charge-discharge cycle, a substance having a functional group as a part of a substance or a crosslinked structure exerting a catalytic action on the crosslinking reaction may be produced on the inner surface of the exterior body or the surface of the electrode in the electrolyte solution, thus achieving a crosslinking reaction.

When the electricity storage device separator is housed in the electricity storage device, since the crosslinked structure is formed, a crosslinking reaction occurs after producing the device while conforming to the conventional production process of the electricity storage device, thus making it possible to improve, for example, the heat resistance in a hot box test.

Since the electricity storage device produced as mentioned above, particularly LIB, includes a separator, the performance thereof (for example, hot box testability) can be further improved.

Unless otherwise specified, various physical properties, measured values and parameters mentioned above can be measured by the methods mentioned in the following Examples.

EXAMPLES

<<Measurements and Evaluation Methods>>

When the separator has a coating film (inorganic particle layer and thermoplastic polymer layer), regarding the methods for evaluation of the separator described below, for the measurements of TOF-SIMS analysis and image processing, detection of a silane-modified polyolefin contained in the separator, weight-average molecular weight, viscosity-average molecular weight, melt mass flow rate, weight per unit area of a polyolefin substrate layer, thickness of a polyolefin substrate layer, puncture strength, puncture strength divided by weight per unit area, and porosity, a coating membrane (inorganic particle layer and thermoplastic polymer layer) was removed from each separator, and the separator was immersed in a nonaqueous electrolyte solution for one week, and then the separator was evaluated after washing with methylene chloride. For heat shrinkage factor at 150° C., heat shrinkage factor at 150° C. in an electrolyte solution, membrane thickness, air permeability, dust fall-off properties, FUSE temperature and SHORT temperature, each separator was immersed in a nonaqueous electrolyte solution for one week, and then the separator was evaluated after cleaning with methylene chloride. For the electrode residual rate, the cycle test capacity retention rate of the battery, and the collapse test of the battery, the evaluation was carried out after fabrication of a single-layer laminate nonaqueous secondary battery using each separator.

<Method for Detecting Silane-Modified Polyolefin Contained in Separator>

When the silane-modified polyolefin contained in the separator is in a crosslinked state, it is insoluble or has insufficient solubility in an organic solvent, and it is therefore difficult to directly measure the content of the silane-modified polyolefin from the separator. In that case, as a pretreatment for the sample, the siloxane bonds are decomposed into methoxysilanol using methyl orthoformate which does not undergo a secondary reaction, and then solution NMR measurement is carried out, thus enabling detection of the silane-modified polyolefin contained in the separator and GPC measurement thereof. The pretreatment test can be carried out with reference to JP 3529854 B2 and JP 3529858 B2.

Specifically, $^1$H or $^{13}$C NMR identification of the silane-modified polyolefin as a starting material to be used for the production of a separator may be utilized in the method for detecting a silane-modified polyolefin contained in the separator. The following is an example of $^1$H and $^{13}$C-NMR measurement methods.

($^1$H-NMR Measurement)

The sample is dissolved in o-dichlorobenzene-d4 at 140° C. to obtain a $^1$H-NMR spectrum at a proton resonance frequency of 600 MHz. The $^1$H-NMR measuring conditions are as follows.

Apparatus: AVANCE NEO 600 manufactured by Bruker Corporation
Sample tube diameter: 5 mmφ
Solvent: o-dichlorobenzene-d4
Measuring temperature: 130° C.
Pulse angle: 300
Pulse delay time: 1 sec
Number of scans: 1,000 times or more
Sample concentration: 1 wt/vol %

($^{13}$C-NMR Measurement)

The sample is dissolved in o-dichlorobenzene-d4 at 140° C. and a 13C-NMR spectrum is obtained. The 13C-NMR measuring conditions are as follows.

Apparatus: AVANCE NEO 600 manufactured by Bruker Corporation
Sample tube diameter: 5 mmφ
Solvent: o-dichlorobenzene-d4
Measuring temperature: 130° C.
Pulse angle: 300
Pulse delay time: 5 sec
Number of scans: 10,000 times or more
Sample concentration: 10 wt/vol %

The $^1$H and/or $^{13}$C-NMR measurement(s) allow(s) the amount of silane unit modification and the amount of polyolefin alkyl group modification in the silane-modified polyolefin to be confirmed for a polyolefin starting material, and allow(s) the content of the silane-modified polyolefin contained in the separator to be determined (—CH$_2$—Si: $^1$H, 0.69 ppm, t; $^{13}$C, 6.11 ppm, s).

<Weight-Average Molecular Weight (Mw), Number-Average Molecular Weight (Mn)>

Standard polystyrene was measured using Model ALC/GPC 150C (trademark) by Waters Co. under the following conditions, and a calibration curve was drawn. The chromatogram for each polymer was also measured under the same conditions, and the weight-average molecular weight and the number-average molecular weight of each polymer were calculated by the following method, based on the calibration curve.

Column: GMH$_6$-HT (trademark)(2)+GMH$_6$-HTL (trademark)(2) manufactured by Tosoh Corporation
Mobile phase: o-dichlorobenzene
Detector: differential refractometer
Flow rate: 1.0 ml/min
Column temperature: 140° C.
Sample concentration: 0.1 wt %

(Weight-Average Molecular Weight and Number-Average Molecular Weight of Polyethylene and Polypropylene)

Each molecular weight component in the obtained calibration curve was multiplied by 0.43 (polyethylene Q factor/polystyrene Q factor=17.7/41.3) or 0.64 (polypropylene Q factor/polystyrene Q factor=26.4/41.3) to obtain a polyethylene-equivalent or polypropylene-equivalent molecular-weight distribution curve, and the weight-average molecular weight and the number-average molecular weight were calculated. Due to the performance of the chromatogram, it is difficult to accurately measure the molecular weight distribution in the region where the molecular weight is 1,000,000 or more.

(Weight-Average Molecular Weight of Resin Composition)

The weight-average molecular weight was calculated in the same manner as for polyethylene, except that the Q factor value for the polyolefin with the largest mass fraction was used.

<Viscosity-Average Molecular Weight (Mv)>

The limiting viscosity [η] at 135° C. in a decalin solvent was determined based on ASTM-D4020. Mv of a polyethylene was calculated by the following formula.

$$[\eta]=6.77\times10^{-4}Mv^{0.67}$$

Mv of a polypropylene was calculated by the following formula.

$$[\eta]=1.10\times10^{-4}Mv^{0.80}$$

<Melt Mass Flow Rate (MFR)(g/10 min)>

Using a melt mass-flow rate measuring device manufactured by Toyo Seiki Seisaku-sho, Ltd. (Melt Indexer F-F01), the weight of the resin extruded for 10 minutes under conditions of 190° C. and 2.16 kg pressure was determined as the MFR value.

<Membrane Thickness (μm)>

The membrane thickness of the separator for an electricity storage device was measured at room temperature of 23±2° C. and relative humidity of 60% by using a micro thickness gage KBM (trademark) manufactured by Toyo Seiki Seisaku-sho, Ltd. Specifically, the membrane thicknesses of five points were measured at substantially equal intervals over the entire width in the TD direction to obtain their average values. The thickness of the polyolefin substrate layer ("membrane thickness of substrate layer" in the table) was determined by measuring after removing the coating membrane (inorganic particle layer and thermoplastic polymer layer) from the separator for an electricity storage device. The thickness of the inorganic particle layer was calculated by removing the thermoplastic polymer layer from the separator for an electricity storage device, measuring the thickness (thickness of the polyolefin substrate layer and the inorganic coating layer), and further subtracting the thickness of the polyolefin substrate layer from the thickness of the polyolefin substrate layer and the inorganic coating layer. The thickness of the thermoplastic polymer layer was calculated by subtracting the thickness of the polyolefin substrate layer and the inorganic coating layer from the thickness of the separator for an electricity storage device.

<Porosity (%)>

A 10 cm×10 cm square sample was cut out from a separator for an electricity storage device, and the volume (cm³) and weight (g) thereof were determined and used together with the density (g/cm³) by the following formula to obtain a porosity. The density value used for the mixed composition was the value determined by calculation from the densities of the starting materials used and their mixing ratio.

Porosity (%)=(volume−weight/density of the mixed composition)/volume×100

<Air Permeability (sec/100 cm³)>

In accordance with JIS P-8117 (2009), the air permeability of the sample was measured by a Gurley type air permeability meter G-B2 (trademark) manufactured by Toyo Seiki Seisaku-sho, Ltd.

<Measurement of Crystallite Size and Degree of Crystallinity of Polyolefin>

Using an Ultima-IV X-ray diffraction apparatus manufactured by Rigaku Corp., XRD measurement of a polyolefin (for example, PE, PP) contained in the separator was carried out. Cu-Kα rays were directed onto the sample and the diffracted light was detected using a D/tex Ultra Detector manufactured by Rigaku Corp. KRD measurement was carried out under conditions with a sample/detector distance of 285 mm, an excitation voltage of 40 kV and a current of 40 mA. Using a centralized optic system as the optical system, measurement was carried out under slit conditions of DS=½°, SS=release and vertical slit=10 mm.

(Analysis)

In the Case of Polyethylene

The range from 2θ=9.7° to 2θ=29.0° in the obtained XRD profile was separated into three parts: an orthorhombic (110) plane diffraction peak, an orthorhombic (200) plane diffraction peak and an amorphous peak, and the crystallite size was calculated according to the Scherrer equation (formula below), based on the full width at half maximum of the (110) plane diffraction peak. The (110) plane diffraction peak and the (200) plane diffraction peak were approximated by the Voigt function, and the amorphous peak was approximated by the Gaussian function. The location of the amorphous peak was 2θ=19.6° and the full width at half maximum was fixed at 6.3°, while the peak locations and full widths at half maximum of the crystalline peaks were not specifically fixed and peak separation was carried out. The crystallite size was calculated according to the Scherrer equation (formula below), based on the full width at half maximum of the (110) plane diffraction peak calculated by peak separation. The degree of crystallinity can be obtained as a percentage value obtained by dividing the sum of the separated crystals and the amorphous peaks by the area of the crystal peaks.

In the Case of Polypropylene

Within the range from 2θ=6° to 2θ=31° of the obtained XRD profile, a diffraction peak derived from the crystal was separated into five parts: (110), (040), (130), (111) and (13-1)/(041) plane diffraction peaks of α crystal (monoclinic crystal), and a diffraction peak derived from the amorphous was separated into two parts. The separated diffraction peaks derived from the crystal and amorphous were approximated by the Gaussian function. Two amorphous peaks were fixed as follows and peak separation was carried out. The amorphous peak 1 was fixed at 2θ=14.9° and full width at half maximum of 4.7°, and the amorphous peak 2 was fixed at 2θ=19.18° and full width at half maximum of 7.0°. The crystallite size was calculated according to the Scherrer equation (formula below), based on the full width at half maximum of the (110) plane diffraction peak obtained by peak separation. The degree of crystallinity can be obtained as a percentage value obtained by dividing the sum of the separated crystals and the amorphous peaks by the area of the crystal peaks.

$D(110)=K\lambda/(\beta \cos \theta)$

D(110): Crystallite size (nm)

K: 0.9 (Constant)

λ: X-ray wavelength (nm)

$\beta: (\beta_1^2-\beta_2^2)^{0.5}$ $\beta_1$: Full width at half maximum of (hk1) peak calculated after peak separation (rad)

$\beta_2$: Full width at half maximum of incident beam (rad)

θ: Bragg angle

<Quantification of Resin Aggregates in Separator>

The resin aggregates in the separator were defined in a region with an area of 100 μm×100 μm and with no light permeation, when separators obtained by the membrane formation steps in the Examples and Comparative Examples mentioned below were observed using a transmitted light microscope. The number of resin aggregates per 1,000 m² area of the separator were counted during observation using a transmitted light microscope.

<Cycle Test and Heat Resistance Test in First Embodiment>

(Fabrication of Battery)

a. Fabrication of Positive Electrode

A slurry was prepared by dispersing 92.2 wt % of a lithium nickel manganese cobalt composite oxide $LiNi_{0.8}Mn_{0.1}Co_{0.1}O_2$ as a positive electrode active material, 2.3 wt % each of flaky graphite and acetylene black as conductive materials, and 3.2 wt % of polyvinylidene fluoride (PVDF) as a binder in N-methylpyrrolidone (NMP). The slurry was coated on one side of a 20 μm-thick aluminum foil as the positive electrode collector using a die coater, and then dried at 130° C. for 3 minutes, followed by compression molding using a roll press. During this time, the coating amount of the active material on the positive electrode was adjusted to 250 g/m² and the active material bulk density was adjusted to 3.00 g/cm³ b. Fabrication of Negative Electrode

A slurry was prepared by dispersing 96.9 wt % of artificial graphite as a negative electrode active material, 1.4 wt % of a carboxymethyl cellulose ammonium salt as a binder and 1.7 wt % of a styrene-butadiene copolymer latex in purified water. The slurry was coated on one side of a 12 μm-thick copper foil as the negative electrode collector using a die coater, and dried at 120° C. for 3 minutes, followed by compression molding using a roll press. During this time, the coating amount of the active material on the negative electrode was adjusted to 106 g/m² and the active material bulk density was adjusted to 1.35 g/cm³ c. Preparation of Nonaqueous Electrolyte Solution $LiPF_6$ as a solute was dissolved in a mixed solvent of ethylene carbonate:ethyl methyl carbonate=1:2 (volume ratio) so as to adjust the concentration to 1.0 mol/L, thus preparing a nonaqueous electrolyte solution.

d. Battery Assembly

The separator was cut out to a circle having a diameter of 18 mm, and the positive electrode and negative electrode was cut out to circles having diameters of 16 mm, and the positive electrode, separator and negative electrode were stacked in this order so that the active material sides of the positive electrode and negative electrode face each other, followed by housing in a covered stainless steel metal container. The container and cover were insulated, with the container in contact with the negative electrode copper foil and the cover in contact with the positive electrode aluminum foil. The nonaqueous electrolyte solution obtained in the above c. was injected into this container, followed by sealing. After being left to stand at room temperature for one day, initial charge of the fabricated battery was carried out for 6 hours in total by a method of charging to a cell voltage of 4.2 V at a current value of 3 mA (0.5 C) in an atmosphere of 25° C. and, after reaching that voltage, beginning to draw out a current of 3 mA while maintaining 4.2 V. The battery was then discharged to a cell voltage of 3.0 V at a current value of 3 mA (0.5 C).

(Evaluation of Cycle Characteristics)

Charge-discharge of the obtained battery was carried out for 1,000 cycles in an atmosphere at 60° C. Charging was carried out for 3 hours in a total by a method of charging to a cell voltage of 4.2 V at a current value of 6.0 mA (1.0 C) and, after reaching that voltage, beginning to draw out a current of 6.0 mA while maintaining 4.2 V. The battery was then discharged to a cell voltage of 3.0 V at a current value of 6.0 mA (1.0 C). The capacity retention rate was calculated from the discharge capacity of the 1,000th cycle and the discharge capacity of the 1st cycle. When the capacity retention rate was high, it was evaluated to have satisfactory cycle characteristics.

(Heat Resistance Test (Hot Box Test))

The battery obtained by the above "d. Battery Assembly" was stored in a hot box set at high temperature of 160° C. for one hour, and the state of the battery was observed during storage and after storage.

When the heat shrinkage of the microporous membrane housed in the battery as the separator progresses due to high-temperature storage, internal short circuit occurs in the positive electrode and the negative electrode, which are both electrodes of the battery, and ignition or explosion may be observed. Batteries in which such ignition or explosion was observed were rated as the failed products. Batteries in which ignition or explosion was not observed were rated as the accepted products.

The hot box test was carried out on 100 batteries for the same separator, and the passing rate (%) was calculated.

<Fuse/Meltdown (F/MD) Characteristics in First Embodiment>

A circular positive electrode, separator and negative electrode each having a diameter of 200 mm were cut out and stacked, and a nonaqueous electrolyte solution was added to the obtained laminated body and allowed to thoroughly permeate it. The laminated body was inserted between the center sections of a circular aluminum heater having a diameter of 600 mm, and the aluminum heater is pressed vertically with a hydraulic jack to 0.5 MPa. The laminated body was heated with the aluminum heater at a temperature-elevating rate of 2° C./min while measuring the resistance (Ω) between the electrodes. Resistance between the electrodes increases with fusing of the separator, and the temperature when the resistance first exceeds 1,000Ω was recorded as the fuse temperature (shutdown temperature). Heating was continued, and the temperature when the resistance falls below 1,000Ω was recorded as the meltdown temperature (membrane rupture temperature). An electric wire for resistance measurement was bonded to the back of the aluminum foil as the positive electrode fabricated by the item "a. Fabrication of Positive Electrode" of the above "Cycle Test and Heat Resistance Test" using a conductive silver paste. The electric wire for resistance measurement was also bonded to the back of the copper foil as the negative electrode fabricated by the item "b. Fabrication of Negative Electrode" of the above "Cycle Test and Heat Resistance Test" using a conductive silver paste. The electrolyte-containing electrolyte solution prepared by the item "c. Preparation of Nonaqueous Electrolyte Solution" of the above "Cycle Test and Heat Resistance Test" was also used in an F/MD characteristic test.

<TOF-SIMS Analysis and Image Processing>

The separator for an electricity storage device was subjected to TOF-SIMS analysis. A nano-TOF (TRIFLTV) manufactured by ULVAC-PHI, INCORPORATED was used as a TOF-SIMS mass spectrometer. The analysis conditions are as follows, and calcium ions (equivalent to positive ions of m/z=40) was detected.

[Image Measurement Conditions]

Primary ion: bismuth ($Bi_1^+$)

Acceleration voltage: 30 kV

Ion current: about 0.5 nA (as DC)

With bunching

Analysis area: 100 μm×100 μm

Analysis time: 90 minutes

Detection ion: positive ion (m/z=40)

Neutralization: electron gun+Ar monomer ion

Vacuum degree: about $5.0 \times 10^{-5}$ Pa

[Measurement Conditions in Depth Direction]

Analysis conditions

Primary ion: bismuth ($Bi_1^+$)

Acceleration voltage: 30 kV

Ion current: about 1.2 nA (as DC)

With bunching

Analysis area: 100 μm×100 μm

Analysis time: 5 frames/cycle

Detection ion: Positive ion (m/z=40)

Neutralization: electron gun+Ar monomer ion

Vacuum degree: about $5.0 \times 10^{-5}$ Pa

Sputtering Conditions

Sputter ion: GCIB ($Ar_{2500}^+$)

Acceleration voltage: 20 kV

Ion current: about 5 nA

Sputtering area: 400 μm×400 μm

Sputtering time: 30 seconds/cycle

Neutralization: electron gun+Ar monomer ion

The image data of the TOF-SIMS spectrum obtained as mentioned above was subjected to image processing in accordance with the following procedure.

(1) A filter having a beam shape (diameter of 2 μm and a pixel resolution of 0.39 μm) is fabricated. The filter value is calculated using the function fspecial of the Image Processing Toolbox of numerical calculation software MATLAB manufactured by Mathworks.

fspecial ('gaussian', [13 13], 1.69865)

(2) The fabricated filter is applied to two-dimensional data.

(3) The average value and the standard deviation of the two-dimensional data after the application of the filter are calculated.

(4) Average value+standard deviation×3 is binarized as a threshold value. In the case of the normal distribution, since 99.74% of the value falls within a range of the average value+the standard deviation×3, it is intended to numerically extract a specific portion.

(5) Expansion contraction for 7 pixels is carried out to connect an extraction region in the vicinity.

(6) A region having a small area (50 pixels or less) is removed.

(7) A parameter of each of the remaining regions is calculated.

extraction area (pixel), simple center of gravity position ($x_0$, $y_0$)

maximum value in region, average value of region, and distance between the weighted centers of gravity positions ($x_m$, $y_m$)

(8) A distance between the weighted centers of gravity positions is calculated.

Using WeightedCentroid option of the function regionprops of the Image Processing Toolbox of the numerical arithmetic software MATLAB manufactured by Mathworks, calculation was carried out.

regionprops (cc, I, 'WeightedCentroid')

Here, cc is a variable indicating the extracted region, and I is a variable storing the two-dimensional data after the application of the filter.

By the above processing, the island structure of the calcium ion was specified, and the number, the size and the distance between the weighted centers of gravity positions were calculated.

<Heat Shrinkage Factor at 150° C. (%)>

A sample strip sampled at 100 mm in the TD and 100 mm in the MD from the separator for an electricity storage device was left to stand for one hour in an oven at 150° C. During this time, the sample strip was sandwiched between two sheets so that the warm air did not directly contact with the sample strip. After removing the sample strip from the oven and cooling it, the area of the sample strip was measured, and the heat shrinkage factor at 150° C. was calculated by the following equation.

Heat shrinkage factor at 150° C. (%)={(10,000 (mm$^2$)−area of sample strip after heating (mm$^2$))/10,000 (mm$^2$)}×100

<Preparation of Nonaqueous Electrolyte Solution>

To a mixed solution of 5% by volume of acetonitrile, 62.5% by volume of ethyl methyl carbonate, 30% by volume of ethylene carbonate and 2.5% by volume of vinylene carbonate, 0.3 mol/L of lithium hexafluorophosphate (LiPF$_6$), 1 mol/L of lithium bis(fluorosulfonyl)imide (LiN(SO$_2$F)$_2$) and 20 ppm by weight of lithium fluorosulfonate (LiFSO$_3$) as electrolytes were added to prepare a nonaqueous electrolyte solution.

<Heat Shrinkage Factor at 150° C. in Electrolyte Solution (%)>

A sample strip sampled at 100 mm in the TD and 100 mm in the MD from the separator for an electricity storage device was placed in an aluminum pack, and the nonaqueous electrolyte solution was injected until the sample strip was completely immersed, and then the sample strip was left to stand for one week. Further, the sample strip was left to stand for one hour in an oven at 150° C. After removing the sample strip from the oven and cooling it, the area of the sample strip was measured, and the heat shrinkage factor at 150° C. while immersed in electrolyte solution was calculated by the following equation.

Heat shrinkage factor at 150° C. (%)={(10,000 (mm$^2$)−area of sample strip after heating (mm$^2$))/10,000 (mm$^2$)}×100

<Puncture Strength (Gf) and Puncture Strength Divided by Weight Per Unit Area (Gf/(g/m$^2$))>

A separator for an electricity storage device, in which a coating film was removed by a sample holder having a diameter of 11.3 mm of the opening, was fixed by using a handy compression tester "KES-G5 (trademark)" manufactured by KATO TECH CO., LTD. Next, a puncture test under an atmosphere at a temperature of 23° C. and a humidity of 40% was carried out at a radius of curvature of the tip of the needle of 0.5 mm and a punching speed of 2 mm/sec with respect to the center of the fixed separator for an electricity storage device, thus obtaining a green puncture strength (gf) as a maximum punching load. The value determined by converting the obtained puncture strength (gf) into a weight per unit area (gf/(g/m$^2$))(puncture strength divided by weight per unit area in the table) was also calculated.

<Weight per Unit Area (g/m$^2$)>

A 10 cm×10 cm square sample was cut off from a separator for an electricity storage device from which a thermoplastic polymer layer was removed, and the weight of a polyolefin substrate layer and an inorganic coating layer was measured using an electronic balance AEL-200 manufactured by Shimadzu Corporation. By multiplying the obtained weight by 100 times, the weight per unit area per 1 m$^2$ (g/m$^2$) of the polyolefin substrate layer and the inorganic coating layer was calculated. Next, a 10 cm×10 cm square sample was cut off from a separator for an electricity storage device from which a coating layer (inorganic coating layer and thermoplastic polymer layer) was removed, and the weight was measured by using an electronic balance AEL-200 manufactured by Shimadzu Corporation. By multiplying the obtained weight by 100 times, the weight per unit area per 1 m$^2$ (g/m$^2$) of the polyolefin substrate layer (weight per unit area of substrate layer in the table) was calculated. The weight per unit area per 1 m$^2$ (g/m$^2$) of the inorganic coating layer (amount of the inorganic coating layer supported on the polyolefin substrate layer, g/m$^2$) was calculated by subtracting the weight per unit area per 1 m$^2$ (g/m$^2$) of the polyolefin substrate layer from the weight per unit area per 1 m$^2$ (g/m$^2$) of the polyolefin substrate layer and the inorganic coating layer.

<Dust Fall-Off Properties (%)>

A 10 cm×10 cm square sample was cut off from a separator for an electricity storage device, and the weight (g) was weighed. After one side was affixed to a thick paper, a 900 g weight having a diameter of 5 cm covered with a cotton cloth was placed on the inorganic particle layer side, and these were rubbed at 50 rpm for 10 minutes. Thereafter, the weight (g) was accurately measured again, and the dust fall-off properties were measured by the following equation.

Dust fall-off properties (wt %)={(weight (g) before rubbing−weight (g) after rubbing)/weight before rubbing}×100

<Cycle Test Capacity Retention Rate of Battery in Second Embodiment (%)>

(1) Fabrication of Positive Electrode

After mixing 90.4 wt % of a nickel, manganese and cobalt composite oxide (LiNiMnCoO$_2$) (NMC)(Ni:Mn:Co=6:2:2 (element ratio), density: 3.50 g/cm$^3$) as the positive electrode active material, 1.6 wt % of a graphite powder (density: 2.26 g/cm$^3$, number-average particle size: 6.5 µm) and 3.8 wt % of an acetylene black powder (density: 1.95 g/cm$^3$, number-average particle size: 48 µm) as a conductive aid, and 4.2 wt % of PVDF (density: 1.75 g/cm$^3$) as a resin binder, the mixture was dispersed in NMP to prepare a slurry. This slurry was coated on one side of a 20 µm-thick aluminum foil sheet as the positive electrode collector using a die coater, and dried at 130° C. for 3 minutes, followed by compression molding using a roll press to fabricate a positive electrode. The coating amount of the positive electrode active material was 109 g/m$^2$.

(2) Fabrication of Negative Electrode 87.6 wt % of a graphite powder A (density: 2.23 g/cm$^3$, number-average particle size: 12.7 µm) and 9.7 wt % of a graphite powder B (density: 2.27 g/cm$^3$, number-average particle size: 6.5 µm) as negative electrode active materials, and 1.4 wt % (in terms of solid content) of a carboxymethyl cellulose ammonium salt (aqueous solution having 1.83 wt % in solid component concentration) and 1.7 wt % (in terms of solid content) of a diene rubber-based latex (aqueous solution having 40 wt % in solid component concentration) as resin binders were dispersed in purified water to prepare a slurry. This slurry was coated on one side of a 12 µm-thick copper foil sheet as the negative electrode collector using a die coater, and dried at 120° C. for 3 minutes, followed by compression molding using a roll press to fabricate a negative electrode. The coating amount of the negative electrode active material was 52 g/m$^2$.

(3) Preparation of Nonaqueous Electrolyte Solution

To a mixed solution of 5% by volume of acetonitrile, 62.5% by volume of ethyl methyl carbonate, 30% by volume of ethylene carbonate and 2.5% by volume of vinylene carbonate, 0.3 mol/L of lithium hexafluorophosphate (LiPF$_6$), 1 mol/L of lithium bis(fluorosulfonyl)imide (LiN(SO$_2$F)$_2$), and 20 ppm by weight of lithium fluorosulfonate (LiFSO$_3$) as electrolytes were added to prepare a nonaqueous electrolyte solution.

(4) Fabrication of Single-Layer Laminate Nonaqueous Secondary Battery

As mentioned above, the positive electrode and the negative electrode were stacked via a separator (a separator of the Examples or a separator of the Comparative Examples) so that the mixture containing surfaces of each electrode face each other to obtain a laminated electrode body. This laminated electrode body was housed in an aluminum laminate sheet exterior body of 100 mm×60 mm, and vacuum drying was carried out at 80° C. for 5 hours to remove moisture. The nonaqueous electrolyte solution was injected into the exterior body and the exterior body was sealed to fabricate a single-layer laminate (pouch) nonaqueous secondary battery. This single-layer laminate nonaqueous secondary battery had a design capacity value of 3 Ah and a rated voltage value of 4.2 V.

(5) Measurement of Cycle Test Capacity Retention Rate

The single-layer laminate nonaqueous secondary battery obtained as mentioned above was subjected to initial charging and cycle characteristic evaluation according to the following procedure. The charge-discharge was carried out using a charge-discharge device ACD-M01A (trade name) manufactured by ASKA ELECTRONIC CO., LTD. and a program thermostatic bath IN804 (trade name) manufactured by Yamato Scientific Co., Ltd. The term 1C means a current value which is expected to discharge the battery in a fully charged state at a constant current and to end the discharge within one hour. Specifically, in the following procedure, 1C means a current value which is expected to be discharged from a full charge state of 4.2 V to 3.0 V at a constant current to end discharge within one hour.

Initial Charging

The ambient temperature of the battery was set at 25° C. and charging was carried out at a constant current of 0.075 A corresponding to 0.025 C to reach 3.1 V, and then charging was carried out at a constant voltage of 3.1 V for 1.5 hours. Subsequently, after resting for 3 hours, the battery was charged at a constant current of 0.15 A corresponding to 0.05 C to reach 4.2 V, and then charging was carried out at a constant voltage of 4.2 V for 1.5 hours. Thereafter, the battery was discharged to 3.0 V at a constant current of 0.45 A corresponding to 0.15 C.

Cycle Test of Single-Layer Laminate Nonaqueous Secondary Battery

A cycle test was carried out for the battery subjected to initial charging-discharging. The cycle test was started 3 hours after setting the ambient temperature of the battery at 25° C. First, charging was carried out at a constant current of 3 A corresponding to 1 C to reach 4.2 V and then charging was carried out at a constant voltage of 4.2 V, specifically, charging was carried out for 3 hours in total. Thereafter, the battery was discharged to 3.0 V at a constant current of 3 A. The process of charging and discharging one time each was defined as one cycle, and 100 cycles of charging and discharging were carried out. The discharge capacity of the 100th cycle, when the discharge capacity of the 1st cycle was defined as 100%, was determined as the capacity retention rate (%) after 100 cycles.

<FUSE Temperature, SHORT Temperature in Second Embodiment (° C.)>

A circular positive electrode, separator and negative electrode having diameters of 200 mm were cut out and stacked, and a nonaqueous electrolyte solution was added to the obtained laminated body and allowed to thoroughly permeate it. The laminated body was inserted between the center sections of a circular aluminum heater having a diameter of 600 mm, and the aluminum heater is pressed vertically with a hydraulic jack to 0.5 MPa. The laminated body was heated with the aluminum heater at a temperature-elevating rate of 2° C./min while measuring the resistance (Ω) between the electrodes. Resistance between the electrodes increases with fusing of the separator, and the temperature when the resistance first exceeds 1,000Ω was recorded as the FUSE temperature. Heating was continued, and the temperature when the resistance falls below 1,000Ω was recorded as the SHORT temperature.

<Collapse Test of Battery>

The laminate cell after the low-temperature cycle test was set in a state where a 1 mm step is provided between the laminate cell and the sample stand, and both ends of the cell were gripped. Using a round bar made of SUS having a diameter of 15.8 mm, the cell was collapsed at a collapse speed of 0.2 mm/s and a force of 1.95 ton and the collapse test was carried out until the voltage reaches 4.1 V to 4.0 V, and then the time until the voltage reaches 4.1 V to 4.0 V was measured. This test was carried out for 100 cells, and the number of cells in which the time until the voltage reaches 4.1 V to 4.0 V was 5 seconds or more was compared.

<Electrode Residual Rate (%)>

A single-layer laminate nonaqueous secondary battery was fabricated by the methods (1) to (4) in the measurement of the cycle test capacity retention rate. After disassembling the fabricated single-layer laminate nonaqueous secondary battery, the separator and the electrode were peeled off and the negative electrode was photographed by a digital camera, and then the area ratio (%) of the negative electrode active material layer remaining on the copper foil (negative electrode current collector) was calculated.

<Thermal Response Index>

A sample strip sampled at 100 mm in the TD and 100 mm in the MD from the separator for an electricity storage device was left to stand for a predetermined time in an oven at 150° C. During this time, the sample strip was sandwiched between a plurality of sheets so that the warm air did not directly contact with the sample strip. A heat label "10R-104" manufactured by I.P. LABORATORIES, INC. was also sandwiched between a plurality of sheets so that the arrival temperature of the separator can be known. By adjusting the number of sheets to be sandwiched, the heating speed of the separator can be adjusted. The number of sheets to be sandwiched was adjusted so that the heating rate of the separator became 2° C./min. After removing the sample strip from the oven and cooling it, the area of the sample strip was measured, and the thermal response index at the indicated temperature of the heat label was calculated by the following equation.

Thermal Response Index (%)={(10,000 (mm$^2$)–area of sample strip after heating (mm$^2$))/10,000 (mm$^2$)}×100

The test was repeated while changing the predetermined time from 5 seconds to 3 minutes in increments of 5 seconds, and the thermal response index at each temperature was calculated.

I. Examples and Comparative Examples in First Embodiment

<Production of Silane Graft-Modified Polyolefin>

The polyolefin starting material to be used as the silane graft-modified polyolefin may have a viscosity-average molecular weight (Mv) of 100,000 or more and 1,000,000 or less, a weight-average molecular weight (Mw) of 30,000 or more and 920,000 or less and a number-average molecular weight of 10,000 or more and 150,000 or less, and may be a copolymerized α olefin of propylene or butene. After adding an organic peroxide (di-t-butyl peroxide) while melt kneading the polyethylene starting material with an extruder to generate radicals in the polymer chain of the α olefin, trimethoxyalkoxide-substituted vinylsilane is injected and an addition reaction is carried out to introduce alkoxysilyl groups into the α olefin polymer to form a silane-graft structure. A suitable amount of an antioxidant (pentaerythritol tetrakis[3-(3,5-di-t-butyl-4-hydroxyphenyl)propionate]) is simultaneously added to adjust the radical concentration in the system, thus suppressing a chain-style chain reaction (gelation) in the α olefin. The obtained silane-grafted polyolefin molten resin is cooled in water and pelletized, and after heat drying at 80° C. for 2 days, the moisture and unreacted trimethoxyalkoxide-substituted vinylsilane are removed. The residual concentration of the unreacted trimethoxyalkoxide-substituted vinylsilane in the pellets is about 1,000 to 1,500 ppm.

The silane graft-modified polyethylene obtained by the above method is indicated as the "silane-modified polyethylene" in Tables 8 and 9.

<Production of Modified PE Having Various Functional Groups Other than Silane-Modified PE, and Copolymer>

Modified PE having various functional groups other than silane-modified PE, and a copolymer were produced by the following method.

The molecular weight of all of the starting materials was adjusted to an MI within a range of 0.5 to 10. Modified PE having a hydroxyl group was produced by saponification and neutralization of an EVA copolymer. For an amine-modified or oxazoline-modified resin, a tungsten-based catalyst was reacted with the terminal vinyl groups of PE polymerized using a chromium catalyst, in the presence of hydrogen peroxide, for conversion of the vinyl groups into epoxy groups. Known functional group-converting organic reactions were then used to convert the respective reactive sites into the target functional groups, thus obtaining various modified PE molecules. For amine-modified PE, for example, modified PE having epoxy groups is melt kneaded in an extruder at 200° C. while injecting a primary or secondary amine into a liquid, and a reaction is carried out. The unreacted amine is then removed through a pressure reducing valve and the obtained amine-modified resin is extruded into a strand and cut into pellets.

The modified PE obtained by the above method is indicated as the "modified PE or copolymer (B)" in Tables 8 to 15.

Example 1

<Fabrication of Two-Layer Type Polyolefin Microporous Membrane>

A polyolefin microporous membrane having a two-type two-layer laminated structure was produced by the following procedure.

In order to form a microporous layer (CL) capable of forming a crosslinked structure, to 79.2 wt % of a polyethylene homopolymer with a weight-average molecular weight of 1,100,000 (UHMWPE (A)), 19.8 wt % of silane-grafted polyethylene (PE (B)) having MFR of 0.33 g/min, obtained using a polyolefin with a viscosity-average molecular weight of 120,000 as a starting material and a modification reaction with trimethoxyalkoxide-substituted vinylsilane (the respective contents of resin compositions (A) and (B) thus being 0.8 and 0.2) and 1 wt % of pentaerythrityl-tetrakis-[3-(3,5-di-t-butyl-4-hydroxyphenyl)propionate] as an antioxidant were added, followed by dry blending using a tumbler blender to obtain a mixture.

In order to form a polyethylene microporous membrane (PE), 100 parts by weight of a polyethylene homopolymer with a weight-average molecular weight of 500,000 was mixed with 0.3 wt % of tetrakis-(methylene-3-(3',5'-di-t-butyl-4'-hydroxyphenyl)propionate) as an antioxidant to obtain a mixture.

Each of the obtained mixtures was charged into a twin-screw extruder having a diameter of 25 mm and L/D=48 via a feeder. Further, liquid paraffin (kinetic viscosity of 75.90 cSt at 37.78° C.) as a pore-forming material was poured into each extruder by side feed, and adjusted with a feeder and pump so that the quantity ratio of liquid paraffin in the extruded polyolefin composition was 70 wt % (i.e., a polymer concentration of 30 wt %), followed by kneading at 200° C. and 200 rpm and further extruding from a T-die, which is disposed at the tip of the extruder and is capable of coextruding in a two-type two-layer structure, so as to obtain a thickness ratio of CL/PE shown in Table 8. The melt kneading conditions were as follows: preset temperature of 220° C., screw rotational speed of 240 rpm and discharge throughput of 18 kg/h.

Immediately after the extrusion, the sheet was cooled and solidified with a cast roll cooled to a surface temperature of 25° C. to obtain a raw gel sheet (sheet-shaped molded body).

The sheet-shaped molded body was then simultaneously fed into a biaxial tenter stretching machine for biaxial stretching to obtain a stretched sheet. The stretching conditions were as follows: an MD factor of 7.0, a TD factor of 6.0 (i.e., a factor of 7×6) and a biaxial stretching temperature of 126° C.

The stretched gel sheet was then fed into a dichloromethane tank and thoroughly immersed in the dichloromethane for extraction removal of the liquid paraffin, and then dichloromethane was dried off to obtain a porous body.

The porous body to be subjected to heat setting (HS) was then fed to a TD tenter and HS was carried out at a heat setting temperature of 129° C. and a stretch ratio of 2.1, and then relaxation was carried out to a factor of 1.9 in the TD direction to obtain a polyolefin microporous membrane having a two-type two-layer laminated structure having the number of stacks, porosity, air permeability, total thickness and thickness ratio shown in Table 8.

The obtained polyolefin microporous membrane was then cut at the edges and wound up as a mother roll with a width of 1,100 mm and a length of 5,000 m.

During the evaluation, the microporous membrane wound out from the mother roll was slit as necessary and used as a composite separator for evaluation, and then disposed on the battery so as to satisfy the conditions of "layer facing positive electrode", "layer not in contact with electrode" and "layer facing negative electrode" shown in Table 8. The separator and the battery for evaluation were subjected to various evaluations according to the above evaluation method. The evaluation results are shown in Table 8.

Examples 2 to 3

The same operation as in Example 1 was carried out, except that, as shown in Table 8, the conditions of polyethylene (PE) for forming the polyethylene microporous layer (PE), the layer structure conditions for the composite, the arrangement conditions in the battery, etc. were changed, and polyethylene microporous membranes having a two-type two-layer laminated structure, separators and batteries shown in Table 8 were obtained. The obtained separators and batteries were subjected to various evaluations according to the above evaluation method. The evaluation results are also shown in Table 8.

Example 4

<Fabrication of Three-Layer Type Polyolefin Microporous Membrane>

A polyolefin microporous membrane having a two-type three-layer laminated structure was produced by the following procedure.

In order to form a microporous layer (CL) capable of forming a crosslinked structure, to 79.2 wt % of a polyethylene homopolymer with a weight-average molecular weight of 1,100,000 (UHMWPE (A)), 19.8 wt % of silane-grafted polyethylene (PE (B)) having MFR of 0.33 g/min, obtained using a polyolefin with a viscosity-average molecular weight of 120,000 as a starting material and a modification reaction with trimethoxyalkoxide-substituted vinylsilane (the respective contents of resin compositions (A) and (B) thus being 0.8 and 0.2) and 1 wt % of pentaerythrityl-tetrakis-[3-(3,5-di-t-butyl-4-hydroxyphenyl)propionate] as an antioxidant were added, followed by dry blending using a tumbler blender to obtain a mixture.

In order to form a polyethylene microporous membrane (PE), 100 parts by weight of a polyethylene homopolymer with a weight-average molecular weight of 500,000 was mixed with 0.3 wt % of tetrakis-(methylene-3-(3',5'-di-t-butyl-4'-hydroxyphenyl)propionate) as an antioxidant to obtain a mixture.

Each of the obtained mixtures was charged into a twin-screw extruder having a diameter of 25 mm and L/D=48 via a feeder. Further, liquid paraffin (kinetic viscosity of 75.90 cSt at 37.78° C.) as a pore-forming material was poured into each extruder by side feed, and adjusted with a feeder and pump so that the quantity ratio of liquid paraffin in the extruded polyolefin composition was 70 wt % (i.e., a polymer concentration of 30 wt %), followed by kneading at 200° C. and 200 rpm and further extruding from a T-die, which is disposed at the tip of the extruder and is capable of coextruding in a two-type three-layer structure, so as to obtain a thickness ratio of CL/PE shown in Table 8. The melt kneading conditions were as follows: preset temperature of 220° C., screw rotational speed of 240 rpm and discharge throughput of 18 kg/h.

Immediately after the extrusion, the sheet was cooled and solidified with a cast roll cooled to a surface temperature of 25° C. to obtain a raw gel sheet (sheet-shaped molded body).

The sheet-shaped molded body was then simultaneously fed into a biaxial tenter stretching machine for biaxial stretching to obtain a stretched sheet. The stretching conditions were as follows: an MD factor of 7.0, a TD factor of 6.0 (i.e., a factor of 7×6) and a biaxial stretching temperature of 123° C.

The stretched gel sheet was then fed into a dichloromethane tank and thoroughly immersed in the dichloromethane for extraction removal of the liquid paraffin, and then dichloromethane was dried off to obtain a porous body.

The porous body to be subjected to heat setting (HS) was then fed to a TD tenter and HS was carried out at a heat setting temperature of 125° C. and a stretch ratio of 2.3, and then relaxation was carried out to a factor of 1.8 in the TD direction to obtain a polyolefin microporous membrane having a two-type three-layer laminated structure (CL layer-PE layer-CL layer) having the number of stacks, porosity, air permeability, total thickness and thickness ratio shown in Table 8.

The obtained polyolefin microporous membrane was then cut at the edges and wound up as a mother roll with a width of 1,100 mm and a length of 5,000 m.

During the evaluation, the microporous membrane wound out from the mother roll was slit as necessary and used as a composite separator for evaluation, and then disposed on the battery so as to satisfy the conditions of "layer facing positive electrode", "layer not in contact with electrode" and "layer facing negative electrode" shown in Table 8. The separator and the battery for evaluation were subjected to various evaluations according to the above evaluation method. The evaluation results are shown in Table 8.

Examples 5 to 26, Comparative Examples 1 to 4

The same operation as in Example 4 was carried out, except that, as shown in Tables 9 to 15, the resin composition conditions for forming the microporous layer (CL) capable of forming a crosslinked structure, the conditions of polyethylene (PE) for forming the polyethylene microporous layer (PE), the layer structure conditions for the composite, the presence or absence of crosslinking when a microporous membrane is fabricated, the arrangement conditions in the battery, the battery assembly conditions, the presence or absence of crosslinking after battery assembly, etc. were changed, and polyethylene microporous membranes having a two-type three-layer laminated structure, separators and batteries shown in Tables 9 to 15 were obtained. The obtained separators and batteries were subjected to various evaluations according to the above evaluation method. The evaluation results are also shown in Tables 9 to 15.

In Example 21, a positive electrode (LAC positive electrode) containing Li(Al,Co)O$_2$ layer as the positive electrode material was used in place of the positive electrode fabricated in the above "a. Fabrication of Positive Electrode".

In Example 22, the nonaqueous electrolyte solution used was a nonaqueous electrolyte solution prepared by using the same constituent components as in the nonaqueous electrolyte solution prepared in the above "c. Preparation of Nonaqueous Electrolyte Solution" so as to adjust the concentration of LiPF$_6$ to 5.0 mol/L.

In Comparative Examples 1 and 2, the obtained polyolefin microporous membranes were used for electron beam crosslinking by irradiation at a prescribed dose before battery assembly. Various evaluations of the obtained electron beam-crosslinked microporous membranes and batteries were carried out by the evaluation methods mentioned above.

In Comparative Example 3, in the fabrication of the polyolefin microporous membrane, a catalyst for forming a tin-based siloxane bond was added to the material to be extruded during the extrusion step, and moisture crosslinking was carried out in a steam box after separator molding.

In Comparative Example 4, in the fabrication of the polyolefin microporous membrane, a stretched gel sheet or a porous gel sheet was immersed in an in-line reaction tank containing a crosslinking catalyst for forming a tin-based siloxane bond during a liquid paraffin extraction step, and immersion crosslinking was carried out in the extraction step.

Comparative Examples 5 to 6

In Comparative Example 5, a single-layer microporous membrane was formed from a homopolymer polyethylene (PE) with a weight-average molecular weight of 500,000 and used as a separator. In Comparative Example 6, a single-layer microporous membrane capable of forming a crosslinked structure was formed based on the resin composition shown in Table 15, and used as a separator. The evaluation results are shown in Table 15.

TABLE 8

| | | | | Example 1 | Example 2 | Example 3 | Example 4 |
|---|---|---|---|---|---|---|---|
| Microporous layer capable of forming crosslinked structure (CL) | Composition of resin (wt %) | Modified PE or copolymer (B)* | UHMWPE (A) | 80 | 80 | 80 | 80 |
| | | | Silane-modified polyethylene | 20 | 20 | 20 | 20 |
| | | | —COOH-modified PE | — | — | — | — |
| | | | -Oxazoline-modified PE | — | — | — | — |
| | | | -Oxazoline, —OH-modified PE | — | — | — | — |
| | | | —OH-modified PE | — | — | — | — |
| | | | —OH, —NH-modified PE | — | — | — | — |
| | | | —OH, amine-modified PE | — | — | — | — |
| | Crosslinking | | Method | | | | |
| | | | Timing | | | | |
| | | | Apparatus/Conditions | | | | |
| | Resin aggregates in separator | | Aggregates/1,000 m$^2$ | 0 | 0 | 1 | 2 |
| | F/MD characteristics | Fuse temperature | °C. | 141 | 140 | 141 | 142 |
| | | Meltdown temperature | °C. | >200 | >200 | >200 | >200 |
| PE layer (PE) | Degree of crystallinity | | % | 70 | 72 | 71 | 76 |
| | Crystallite size | | nm | 25 | 23 | 27 | 26 |
| Composite configuration | Layer structure | | Number of stacks | 2 | 2 | 2 | 3 |
| | | | Porosity % | 50 | 51 | 50 | 50 |
| | | | Air permeability sec/100 cm$^3$ | 81 | 90 | 80 | 80 |
| | | | Total thickness μm | 20 | 20 | 10 | 5 |
| | | | Thickness ratio CL/PE | 1.00 | 1.00 | 0.11 | 0.67 |
| | Layer facing positive electrode | Component | — | CL | PE | CL | CL |
| | | Thickness | μm | 10 | 10 | 1 | 1 |
| | Layer not in contact with electrode | Component | — | — | — | — | PE |
| | | Thickness | μm | — | — | — | 3 |
| | Layer facing negative electrode | Component | — | PE | CL | PE | CL |
| | | Thickness | μm | 10 | 10 | 9 | 1 |
| Battery | Crosslinking | | Method** | I | I | I | I |
| | | | Reaction/Bonding | Dehydration condensation | Dehydration condensation | Dehydration condensation | Dehydration condensation |
| | | | Timing | Contact with electrolyte solution | Contact with electrolyte solution | Contact with electrolyte solution | Contact with electrolyte solution |
| | | | | Initial charging-discharging | Initial charging-discharging | Initial charging-discharging | Initial charging-discharging |
| | | Functional group of microporous membrane | A | Silanol group | Silanol group | Silanol group | Silanol group |
| | | | B | — | — | — | — |
| | | | Type of reaction | — | — | — | — |

TABLE 8-continued

|  |  |  | Example 1 | Example 2 | Example 3 | Example 4 |
|---|---|---|---|---|---|---|
|  |  | Type of catalyst | HF | HF | HF | HF |
|  |  | Type of molten metal | — | — | — | — |
|  |  | Additive**** | — | — | — | — |
| Capacity retention rate at 1,000 cycles of battery |  | % | 97 | 98 | 96 | 98 |
| Passing rate in hot box test |  | % | 99 | 98 | 98 | 89 |

TABLE 9

|  |  |  |  | Example 5 | Example 6 | Example 7 | Example 8 |
|---|---|---|---|---|---|---|---|
| Microporous layer capable of forming crosslinked structure (CL) | Composition of resin (wt %) | Modified PE or copolymer (B)* | UHMWPE (A) | 80 | 80 | 80 | 80 |
|  |  |  | Silane-modified polyethylene | 20 | 20 | 20 | 20 |
|  |  |  | —COOH-modified PE | — | — | — | — |
|  |  |  | -Oxazoline-modified PE | — | — | — | — |
|  |  |  | -Oxazoline, —OH-modified PE | — | — | — | — |
|  |  |  | —OH-modified PE | — | — | — | — |
|  |  |  | —OH, —NH-modified PE | — | — | — | — |
|  |  |  | —OH, Amine-modified PE | — | — | — | — |
|  | Crosslinking |  | Method |  |  |  |  |
|  |  |  | Timing |  |  |  |  |
|  |  |  | Apparatus/Conditions |  |  |  |  |
|  | Resin aggregates in separator |  | Aggregates/1,000 m² | 0 | 1 | 1 | 2 |
|  | F/MD characteristic | Fuse temperature | ° C. | 142 | 143 | 141 | 141 |
|  |  | Meltdown temperature | ° C. | >200 | >200 | >200 | >200 |
| PE layer (PE) | Degree of crystallinity |  | % | 75 | 68 | 69 | 72 |
|  | Crystallite size |  | nm | 23 | 22 | 24 | 22 |
| Composite configuration | Layer structure |  | Number of stacks | 3 | 3 | 3 | 3 |
|  |  | Porosity | % | 51 | 50 | 50 | 52 |
|  |  | Air permeability | sec/100 cm³ | 81 | 82 | 80 | 91 |
|  |  | Total thickness | μm | 20 | 15 | 20 | 5 |
|  |  | Thickness ratio CL/PE |  | 0.11 | 4.00 | 1.50 | 0.67 |
|  | Layer facing positive electrode | Component | — | CL | CL | CL | PE |
|  |  | Thickness | μm | 1 | 6 | 6 | 1 |
|  | Layer not in contact with electrode | Component | — | PE | PE | PE | CL |
|  |  | Thickness | μm | 18 | 3 | 8 | 3 |
|  | Layer facing negative electrode | Component | — | CL | CL | CL | PE |
|  |  | Thickness | μm | 1 | 6 | 6 | 1 |
| Battery | Crosslinking |  | Method** | I | I | I | I |
|  |  |  | Reaction/Bonding | Dehydration condensation | Dehydration condensation | Dehydration condensation | Dehydration condensation |
|  |  |  | Timing | Contact with electrolyte solution Initial charging-discharging | Contact with electrolyte solution Initial charging-discharging | Contact with electrolyte solution Initial charging-discharging | Contact with electrolyte solution Initial charging-discharging |
|  |  | Functional group of microporous membrane | A | Silanol group | Silanol group | Silanol group | Silanol group |
|  |  |  | B | — | — | — | — |
|  |  | Type of reaction |  | — | — | — | — |
|  |  | Type of catalyst |  | HF | HF | HF | HF |
|  |  | Type of molten metal |  | — | — | — | — |
|  |  | Additive**** |  | — | — | — | — |
|  | Capacity retention rate at 1,000 cycles of battery |  | % | 97 | 98 | 98 | 96 |
|  | Passing rate in hot box test |  | % | 97 | 98 | 97 | 87 |

TABLE 10

|  |  |  |  | Example 9 | Example 10 | Example 11 | Example 12 |
|---|---|---|---|---|---|---|---|
| Microporous layer capable of forming crosslinked structure (CL) | Composition of resin (wt %) | | UHMWPE (A) | 80 | 80 | 80 | 80 |
| | | Modified PE or copolymer (B)* | Silane-modified polyethylene | 20 | 20 | 20 | — |
| | | | —COOH-modified PE | — | — | — | 20 |
| | | | -Oxazoline-modified PE | — | — | — | — |
| | | | -Oxazoline, —OH-modified PE | — | — | — | — |
| | | | —OH-modified PE | — | — | — | — |
| | | | —OH, —NH-modified PE | — | — | — | — |
| | | | —OH, Amine-modified PE | — | — | — | — |
| | Crosslinking | | Method | | | | |
| | | | Timing | | | | |
| | | | Apparatus/Conditions | | | | |
| | Resin aggregates in separator | | Aggregates/1,000 m² | 1 | 3 | 2 | 0 |
| | F/MD characteristic | Fuse temperature | °C. | 141 | 140 | 141 | 142 |
| | | Meltdown temperature | °C. | >200 | >200 | >200 | >200 |
| PE layer (PE) | Degree of crystallinity | | % | 70 | 71 | 70 | 70 |
| | Crystallite size | | nm | 22 | 23 | 24 | 24 |
| Composite configuration | Layer structure | | Number of stacks | 3 | 3 | 3 | 3 |
| | | Porosity | % | 53 | 50 | 50 | 54 |
| | | Air permeability | sec/100 cm³ | 84 | 80 | 85 | 81 |
| | | Total thickness | μm | 20 | 20 | 20 | 20 |
| | | Thickness ratio CL/PE | | 0.11 | 5.67 | 1.50 | 1.50 |
| | Layer facing positive electrode | Component | — | PE | PE | PE | CL |
| | | Thickness | μm | 1 | 8.5 | 6 | 6 |
| | Layer not in contact with electrode | Component | — | CL | CL | CL | PE |
| | | Thickness | μm | 18 | 3 | 8 | 8 |
| | Layer facing negative electrode | Component | — | PE | PE | PE | CL |
| | | Thickness | μm | 1 | 8.5 | 6 | 6 |
| Battery | Crosslinking | | Method** | I | I | I | II |
| | | | Reaction/Bonding | Dehydration condensation | Dehydration condensation | Dehydration condensation | Esterification |
| | | | Timing | Contact with electrolyte solution Initial charging-discharging | Contact with electrolyte solution Initial charging-discharging | Contact with electrolyte solution Initial charging-discharging | Contact with electrolyte solution Initial charging-discharging |
| | | Functional group of microporous membrane | A | Silanol group | Silanol group | Silanol group | —OH |
| | | | B | — | — | — | —COOH |
| | | | Type of reaction | — | — | — | — |
| | | | Type of catalyst | HF | HF | HF | — |
| | | | Type of molten metal | — | — | — | — |
| | | | Additive**** | — | — | — | — |
| | Capacity retention rate at 1,000 cycles of battery | | % | 95 | 97 | 98 | 93 |
| | Passing rate in hot box test | | % | 98 | 99 | 98 | 89 |

TABLE 11

|  |  |  |  | Example 13 | Example 14 | Example 15 | Example 16 |
|---|---|---|---|---|---|---|---|
| Microporous layer capable of forming crosslinked structure (CL) | Composition of resin (wt %) | | UHMWPE (A) | 80 | 80 | 80 | 80 |
| | | Modified PE or copolymer (B)* | Silane-modified polyethylene | — | — | — | — |
| | | | —COOH-modified PE | 10 | — | — | — |
| | | | -Oxazoline-modified PE | — | — | 10 | — |
| | | | -Oxazoline, —OH-modified PE | — | 20 | — | — |
| | | | —OH-modified PE | 10 | — | 10 | 20 |
| | | | —OH, —NH-modified PE | — | — | — | — |
| | | | —OH, Amine-modified PE | — | — | — | — |
| | Crosslinking | | Method | | | | |
| | | | Timing | | | | |
| | | | Apparatus/Conditions | | | | |
| | Resin aggregates in separator | | Aggregates/1,000 m² | 2 | 2 | 2 | 0 |
| | F/MD characteristic | Fuse temperature | °C. | 142 | 144 | 141 | 143 |
| | | Meltdown temperature | °C. | >200 | >200 | >200 | >200 |

TABLE 11-continued

|  |  |  |  | Example 13 | Example 14 | Example 15 | Example 16 |
|---|---|---|---|---|---|---|---|
| PE layer (PE) Composite configuration | Degree of crystallinity | | % | 75 | 72 | 68 | 68 |
| | Crystallite size | | nm | 28 | 32 | 21 | 22 |
| | Layer structure | Number of stacks | | 3 | 3 | 3 | 3 |
| | | Porosity | % | 50 | 48 | 50 | 50 |
| | | Air permeability | sec/100 cm³ | 80 | 82 | 82 | 86 |
| | | Total thickness | μm | 20 | 20 | 20 | 20 |
| | | Thickness ratio CL/PE | | 1.50 | 1.50 | 1.50 | 1.50 |
| | Layer facing positive electrode | Component | — | CL | CL | CL | CL |
| | | Thickness | μm | 6 | 6 | 6 | 6 |
| | Layer not in contact with electrode | Component | — | PE | PE | PE | PE |
| | | Thickness | μm | 8 | 8 | 8 | 8 |
| | Layer facing negative electrode | Component | — | CL | CL | CL | CL |
| | | Thickness | μm | 6 | 6 | 6 | 6 |
| Battery | Crosslinking | Method** | | II | II | II | III |
| | | Reaction/Bonding | | Esterification | Amide bonding, Ether bonding | Amide bonding, Ether bonding | Chain condensation —O—CO—O— |
| | | Timing | | Contact with electrolyte solution Initial charging-discharging | Contact with electrolyte solution Initial charging-discharging | Contact with electrolyte solution Initial charging-discharging | Contact with electrolyte solution |
| | Functional group of microporous membrane | A | | —OH | Oxazoline | Oxazoline | —OH |
| | | B | | —COOH | —OH | —OH | — |
| | | Type of reaction | | — | — | — | EC*** |
| | | Type of catalyst | | — | — | — | — |
| | | Type of molten metal | | — | — | — | — |
| | | Additive**** | | — | — | — | — |
| | Capacity retention rate at 1,000 cycles of battery | | % | 94 | 87 | 85 | 91 |
| | Passing rate in hot box test | | % | 91 | 93 | 90 | 90 |

TABLE 12

|  |  |  |  | Example 17 | Example 18 | Example 19 | Example 20 |
|---|---|---|---|---|---|---|---|
| Microporous layer capable of forming crosslinked structure (CL) | Composition of resin (wt %) | | UHMWPE (A) | 80 | 80 | 80 | 80 |
| | | Modified PE or copolymer (B)* | Silane-modified polyethylene | — | — | — | — |
| | | | —COOH-modified PE | — | — | — | — |
| | | | -Oxazoline-modified PE | — | — | — | — |
| | | | -Oxazoline, —OH-modified PE | — | — | — | — |
| | | | —OH-modified PE | — | — | 20 | 20 |
| | | | —OH, —NH-modified PE | 20 | — | — | — |
| | | | —OH, Amine-modified PE | — | 20 | — | — |
| | Crosslinking | Method | | | | | |
| | | Timing | | | | | |
| | | Apparatus/Conditions | | | | | |
| | Resin aggregates in separator | | Aggregates/1,000 m² | 3 | 2 | 2 | 0 |
| | F/MD characteristic | Fuse temperature | ° C. | 142 | 143 | 141 | 141 |
| | | Meltdown temperature | ° C. | >200 | >200 | >200 | >200 |
| PE layer (PE) Composite configuration | Degree of crystallinity | | % | 72 | 67 | 75 | 75 |
| | Crystallite size | | nm | 23 | 34 | 24 | 21 |
| | Layer structure | Number of stacks | | 3 | 3 | 3 | 3 |
| | | Porosity | % | 49 | 51 | 52 | 51 |
| | | Air permeability | sec/100 cm³ | 79 | 80 | 81 | 78 |
| | | Total thickness | μm | 20 | 20 | 20 | 20 |
| | | Thickness ratio CL/PE | | 1.50 | 1.50 | 1.50 | 1.50 |
| | Layer facing positive electrode | Component | — | CL | CL | CL | CL |
| | | Thickness | μm | 6 | 6 | 6 | 6 |
| | Layer not in contact with electrode | Component | — | PE | PE | PE | PE |
| | | Thickness | μm | 8 | 8 | 8 | 8 |
| | Layer facing negative electrode | Component | — | CL | CL | CL | CL |
| | | Thickness | μm | 1 | 6 | 6 | 1 |

TABLE 12-continued

|  |  |  |  | Example 17 | Example 18 | Example 19 | Example 20 |
|---|---|---|---|---|---|---|---|
| Battery | Crosslinking | Method** |  | III | IV | IV | IV |
|  |  | Reaction/Bonding |  | Chain condensastion Tertiary amine | Nucleophilic substitution | Nucleophilic substitution | Epoxy ring-opening |
|  |  | Timing |  | Contact with electrolyte solution Initial charging-discharging | Contact with electrolyte solution Initial charging-discharging | Contact with electrolyte solution Initial charging-discharging | Contact with electrolyte solution Initial charging-discharging |
|  |  | Functional group of microporous membrane | A | —NH— | —NH2 | —OH | —OH |
|  |  |  | B | — | — | — | — |
|  |  | Type of reaction |  | EC*** | — | — | — |
|  |  | Type of catalyst |  | — | — | — | — |
|  |  | Type of molten metal |  | — | — | — | — |
|  |  | Additive**** |  | — | BS (PEG) 5 | Diisocyanate | Diepoxy compound |
| Capacity retention rate at 1,000 cycles of battery |  | % |  | 82 | 83 | 92 | 95 |
| Passing rate in hot box test |  | % |  | 91 | 89 | 90 | 93 |

TABLE 13

|  |  |  |  | Example 21 | Example 22 | Example 23 | Example 24 |
|---|---|---|---|---|---|---|---|
| Microporous layer capable of forming crosslinked structure (CL) | Composition of resin (wt %) | Modified PE or copolymer (B)* | UHMWPE (A) | 80 | 80 | 80 | 80 |
|  |  |  | Silane-modified polyethylene | — | — | 20 | 20 |
|  |  |  | —COOH-modified PE | 20 | 20 | — | — |
|  |  |  | -Oxazoline-modified PE | — | — | — | — |
|  |  |  | -Oxazoline, —OH-modified PE | — | — | — | — |
|  |  |  | —OH-modified PE | — | — | — | — |
|  |  |  | —OH, —NH-modified PE | — | — | — | — |
|  |  |  | —OH, Amine-modified PE | — | — | — | — |
|  | Crosslinking | Method |  |  |  |  |  |
|  |  | Timing |  |  |  |  |  |
|  |  | Apparatus/Conditions |  |  |  |  |  |
|  | Resin aggregates in separator |  | Aggregates/1,000 m² | 1 | 2 | 0 | 0 |
|  | F/MD characteristic | Fuse temperature | ° C. | 143 | 141 | 148 | 141 |
|  |  | Meltdown temperature | ° C. | >200 | >200 | >200 | >200 |
| PE layer (PE) | Degree of crystallinity |  | % | 72 | 71 | 72 | 73 |
|  | Crystallite size |  | nm | 24 | 25 | 9 | 52 |
| Composite configuration | Layer structure | Number of stacks |  | 3 | 3 | 3 | 3 |
|  |  | Porosity | % | 47 | 52 | 51 | 50 |
|  |  | Air permeability | sec/100 cm³ | 79 | 80 | 81 | 82 |
|  |  | Total thickness | μm | 20 | 20 | 20 | 20 |
|  |  | Thickness ratio CL/PE |  | 1.50 | 1.50 | 1.50 | 1.50 |
|  | Layer facing positive electrode | Component | — | CL | CL | CL | CL |
|  |  | Thickness | μm | 6 | 6 | 6 | 6 |
|  | Layer not in contact with electrode | Component | — | PE | PE | PE | PE |
|  |  | Thickness | μm | 8 | 8 | 8 | 8 |
|  | Layer facing negative electrode | Component | — | CL | CL | CL | CL |
|  |  | Thickness | μm | 6 | 6 | 6 | 6 |
| Battery | Crosslinking | Method** |  | V | V | I | I |
|  |  | Reaction/Bonding |  | Coordinate bonding | Coordinate bonding | Dehydration condensation | Dehydration condensation |
|  |  | Timing |  | Contact with electrolyte solution Initial charging-discharging | Contact with electrolyte solution Initial charging-discharging | Contact with electrolyte solution Initial charging-discharging | Contact with electrolyte solution Initial charging-discharging |
|  |  | Functional group of microporous membrane | A | —OH | —OH | silanol group | silanol group |
|  |  |  | B | —COOH | —COOH | — | — |
|  |  | Type of reaction |  | — | — | — | — |
|  |  | Type of catalyst |  | HF, H₂O | HF, H₂O | HF | HF |

TABLE 13-continued

|  |  |  | Example 21 | Example 22 | Example 23 | Example 24 |
|---|---|---|---|---|---|---|
|  | Type of molten metal |  | Al³⁺ | Li⁺ | — | — |
|  | Additive**** |  | — | — | — | — |
|  | Capacity retention rate at 1,000 cycles of battery | % | 93 | 92 | 87 | 91 |
|  | Passing rate in hot box test | % | 92 | 94 | 73 | 68 |

TABLE 14

|  |  |  |  | Example 25 | Example 26 | Comparative Example 1 | Comparative Example 2 |
|---|---|---|---|---|---|---|---|
| Microporous layer capable of forming crosslinked structure (CL) | Composition of resin (wt %) |  | UHMWPE (A) | 80 | 80 | 100 | 100 |
|  |  | Modified PE or copolymer (B)* | Silane-modified polyethylene | 20 | 20 | — | — |
|  |  |  | —COOH-modified PE | — | — | — | — |
|  |  |  | -Oxazoline-modified PE | — | — | — | — |
|  |  |  | -Oxazoline, —OH-modified PE | — | — | — | — |
|  |  |  | —OH-modified PE | — | — | — | — |
|  |  |  | —OH, —NH-modified PE | — | — | — | — |
|  |  |  | —OH, Amine-modified PE | — | — | — | — |
|  | Crosslinking | Method |  |  |  | Electron beam irradiation | Electron beam irradiation |
|  |  | Timing |  |  |  | After membrane formation to before battery assembling | After membrane formation to before battery assembling |
|  |  | Apparatus/Conditions |  |  |  | EB apparatus/ 20 kGy | EB apparatus/ 120 kGy |
|  | Resin aggregates in separator | Aggregates/1,000 m² |  | 2 | 2 | 1 | 2 |
|  | F/MD characteristic | Fuse temperature | ° C. | 142 | 140 | 156 | 181 |
|  |  | Meltdown temperature | ° C. | >200 | >200 | >200 | >200 |
| PE layer (PE) | Degree of crystallinity |  | % | 72 | 71 | 70 | 72 |
|  | Crystallite size |  | nm | 23 | 25 | 27 | 23 |
| Composite configuration | Layer structure | Number of stacks |  | 3 | 3 | 3 | 3 |
|  |  | Porosity | % | 50 | 51 | 48 | 51 |
|  |  | Air permeability | sec/100 cm³ | 83 | 82 | 78 | 77 |
|  |  | Total thickness | μm | 13 | 15 | 20 | 20 |
|  |  | Thickness ratio CL/PE |  | 0.08 | 6.50 | 1.50 | 1.50 |
|  | Layer facing positive electrode | Component | — | CL | CL | CL | CL |
|  |  | Thickness | μm | 0.5 | 6.5 | 6 | 6 |
|  | Layer not in contact with electrode | Component | — | PE | PE | PE | PE |
|  |  | Thickness | μm | 12 | 2 | 8 | 2 |
|  | Layer facing negative electrode | Component | — | CL | CL | CL | CL |
|  |  | Thickness | μm | 0.5 | 6.5 | 6 | 6 |
| Battery | Crosslinking | Method** |  | I | I |  |  |
|  |  | Reaction/Bonding |  | Dehydration condensation | Dehydration condensation |  |  |
|  |  | Timing |  | Contact with electrolyte solution Initial charging-discharging | Contact with electrolyte solution Initial charging-discharging |  |  |
|  |  | Functional group of microporous membrane | A | silanol group | silanol group |  |  |
|  |  |  | B | — | — |  |  |
|  |  | Type of reaction |  | — | — |  |  |
|  |  | Type of catalyst |  | HF | HF |  |  |
|  |  | Type of molten metal |  | — | — |  |  |
|  |  | Additive**** |  |  |  |  |  |
|  | Capacity retention rate at 1,000 cycles of battery | % |  | 62 | 68 | 32 | 12 |
|  | Passing rate in hot box test | % |  | 78 | 76 | 0 | 27 |

TABLE 15

| | | | | Comparative Example 3 | Comparative Example 4 | Comparative Example 5 | Comparative Example 6 |
|---|---|---|---|---|---|---|---|
| Microporous layer capable of forming crosslinked structure (CL) | Composition of resin (wt %) | Modified PE or copolymer (B)* | UHMWPE (A) | 80 | 80 | 100 | 80 |
| | | | Silane-modified polyethylene | 20 | 20 | — | 20 |
| | | | —COOH-modified PE | — | — | — | — |
| | | | -Oxazoline-modified PE | — | — | — | — |
| | | | -Oxazoline, —OH-modified PE | — | — | — | — |
| | | | —OH-modified PE | — | — | — | — |
| | | | —OH, —NH-modified PE | — | — | — | — |
| | | | —OH, Amine-modified PE | — | — | — | — |
| | Crosslinking | | Method | Formation of tin-based siloxane in extrusion step | Formation of tin-based siloxane in extrusion step | | |
| | | | Timing | Addition of formation catalyst | Addition of formation catalyst | | |
| | | | Apparatus/Conditions | Moisture crosslinking after formation of separator | Crosslinking in extraction step | | |
| | Resin aggregates in separator | | Aggregates/1,000 m² | 3 | 1,920 | 3 | 2 |
| | F/MD characteristic | Fuse temperature | °C. | 143 | 142 | 142 | 143 |
| | | Meltdown temperature | °C. | >200 | 160 | 150 | >200 |
| PE layer (PE) | Degree of crystallinity | | % | 76 | 72 | | 72 |
| | Crystallite size | | nm | 28 | 27 | | 25 |
| Composite configuration | Layer structure | | Number of stacks | 3 | 3 | 1 | 1 |
| | | Porosity | % | 50 | 49 | 50 | 51 |
| | | Air permeability | sec/100 cm³ | 91 | 92 | 82 | 81 |
| | | Total thickness | μm | 20 | 20 | | |
| | | Thickness ratio CL/PE | | 1.50 | 1.50 | | |
| | Layer facing positive electrode | Component | — | CL | CL | | |
| | | Thickness | μm | 6 | 6 | | |
| | Layer not in contact with electrode | Component | — | PE | PE | | |
| | | Thickness | μm | 8 | 8 | | |
| | Layer facing negative electrode | Component | — | CL | CL | | |
| | | Thickness | μm | 6 | 6 | | |
| Battery | Crosslinking | | Method** | I | I | | I |
| | | | Reaction/Bonding | Dehydration condensation | Dehydration condensation | | Dehydration condensation |
| | | | Timing | Extraction step | Extraction step | | Contact with electrolyte solution Initial charging-discharging |
| | | Functional group of microporous membrane | A | Silanol group | Silanol group | | Silanol group |
| | | | B | — | — | | — |
| | | | Type of reaction | — | — | | — |
| | | | Type of catalyst | — | — | | — |
| | | | Type of molten metal | — | — | | — |
| | | | Additive**** | — | — | | — |
| | Capacity retention rate at 1,000 cycles of battery | | % | 3 | 8 | 98 | 97 |
| | Passing rate in hot box test | | % | 0 | 12 | 0 | 30 |

<Description of Abbreviations in Tables 8 to 15>

*"Silane-modified polyethylene" is a silane-modified polyethylene having a density of 0.95 g/cm³ and the melt flow rate (MFR) at 190° C. of 0.33 g/min, which is obtained by a modification reaction of trimethoxy-alkoxide-substituted vinylsilane using a polyolefin with a viscosity-average molecular weight of 120,000 as a starting material.

All of "—COOH-modified PE", "-oxazoline-modified PE", "-oxazoline, —OH-modified PE", "—OH-modified PE", "—OH, —NH-modified PE" and "—OH, amine-modified PE" are modified PE obtained by the above [Method for Producing Modified PE having Various Functional Groups other than Silane-Modified PE, and Copolymer].

**(I) condensation reaction of a plurality of the same functional groups,
(II) reaction between a plurality of different functional groups,
(III) chain condensation reaction between a functional group and the electrolyte solution,
(IV) reaction between a functional group and an additive, and (V) reaction in which a plurality of the same functional groups crosslink via coordinate bonding with eluting metal ions.

***EC: Ethylene carbonate

****BS(PEG)$_5$: Both terminal succinimides, EO unit repetition number of 5

Diisocyanate: Compound in which both terminal isocyanates are linked to hexane unit via urethane bonding Diepoxy compound: Compound in which both terminal epoxide group and butane unit are linked II. Examples and Comparative Examples in Second Embodiment <<Production of Separator for Electricity Storage Device>>
<Production of Silane Graft-Modified Polyolefin>

A polyethylene with a viscosity-average molecular weight (Mv) of 120,000 was used as a polyethylene starting material of a silane-modified polyethylene (resin a). While melt kneading the polyethylene starting material with an extruder, an organic peroxide (di-t-butyl peroxide) was added to generate radicals in the polymer chain of α olefin. Thereafter, trimethoxyalkoxide-substituted vinylsilane was injected into the melt kneaded mixture to cause an addition reaction. By the addition reaction, alkoxysilyl groups were introduced into the α olefin polymer to form a silane-graft structure. A suitable amount of an antioxidant (pentaerythritoltetrakis[3-(3,5-di-t-butyl-4-hydroxyphenyl)propionate]) was simultaneously added to adjust the radical concentration in the system and suppress a chain-style chain reaction (gelation) in the α olefin. The obtained silane-grafted polyolefin molten resin was cooled in water and pelletized, and after heat-drying at 80° C. for 2 days, the moisture and unreacted trimethoxyalkoxide-substituted vinylsilane were removed. The residual concentration of the unreacted trimethoxyalkoxide-substituted vinylsilane in the pellets was about 3,000 ppm or less.

<Fabrication of Substrate Layers (Layer A and Layer B)

As the resin material of the layer A, 30 wt % of the previously obtained silane-modified polyethylene (resin a), 30 wt % of an ultra-high molecular weight polyethylene (resin b) as a homopolymer with a viscosity-average molecular weight of 4,500,000, and 40 wt % of an ultra-high molecular weight polyethylene (resin c) as a homopolymer with a viscosity-average molecular weight of 700,000 were used. Further, 1,000 ppm by weight of pentaerythrityl-tetrakis-[3-(3,5-di-t-butyl-4-hydroxyphenyl)propionate] based on the total weight of the resin material and 3,000 ppm by weight of calcium stearate based on the weight of the ultra-high molecular weight polyethylene (resin b) were added as antioxidants, followed by dry blending with a tumbler blender to obtain a starting material mixture of the layer A.

As the resin material of the layer B, 30 wt % of the resin b and 70 wt % of the resin c were used. Further, 1,000 ppm by weight of pentaerythrityl-tetrakis-[3-(3,5-di-t-butyl-4-hydroxyphenyl)propionate] based on the total weight of the resin material and 3,000 ppm by weight of calcium stearate based on the weight of the ultra-high molecular weight polyethylene (resin b) were added as antioxidants, followed by dry blending with a tumbler blender to obtain a starting material mixture of the layer B.

Each of the obtained starting material mixtures of the layer A and the layer B was supplied to each different twin-screw extruder through a feeder in a nitrogen atmosphere, and liquid paraffin (kinematic viscosity at 37.78° C.: 7.59×10$^{-5}$ m$^2$/s) was injected into each extruder cylinder by a plunger pump. The starting material mixture melt-kneaded with liquid paraffin in an extruder and adjusted with a feeder and pump so that the quantity ratio of liquid paraffin in the extruded polyolefin composition was 70 wt % based on the total weight of the melt kneaded mixture to be extruded. The melt kneading conditions were as follows: a preset temperature of 230° C., a screw rotational speed of 240 rpm and a discharge throughput of 18 kg/h. The melt kneaded mixture was then coextruded through a common T-die so as to form a three-layer structure of layer A-layer B-layer A. The coextruded melt kneaded mixture was extrusion cast on a cooling roll controlled to a surface temperature of 25° C. to obtain a gel sheet (sheet-shaped molded body) having a raw membrane thickness of 1,370 μm.

The gel sheet was then simultaneously fed into a biaxial tenter stretching machine for biaxial stretching to obtain a stretched sheet. The stretching conditions were as follows: an MD factor of 7.0, a TD factor of 6.4 (i.e., a factor of 7×6.3), and a biaxial stretching temperature of 122° C. The stretched gel sheet was subsequently fed into a dichloromethane tank and thoroughly immersed in dichloromethane for extraction removal of the liquid paraffin, and then dichloromethane was dried off to obtain a porous sheet. The porous sheet was fed to a TD tenter and heat setting (HS) was carried out at a heat setting temperature of 133° C. and a stretch ratio of 1.9, and then relaxation was carried out to a factor of 1.75 in the TD direction to obtain a microporous membrane substrate. The edges of the microporous membrane substrate were cut and rolled into a mother roll having a width of 1,100 mm and a length of 5,000 m. The obtained microporous membrane substrate had a membrane thickness of 10 μm.

<Formation of Inorganic Particle Layer (Layer C)>

The acrylic latex to be used as the resin binder of the inorganic particle layer was produced by the following method. In a reactor equipped with a stirrer, a reflux condenser, a drip tank and a thermometer, 70.4 parts by weight of ion-exchanged water, 0.5 part by weight of "AQUALON KH1025" (registered trademark, aqueous 25% solution manufactured by Dai-ichi Kogyo Seiyaku Co., Ltd.) as an emulsifier, and 0.5 part by weight of "ADEKA REASOAP SR1025" (registered trademark, aqueous 25% solution manufactured by Adeka Corporation) were charged. The temperature inside the reactor was then raised to 80° C., and 7.5 parts by weight of an aqueous 2% solution of ammonium persulfate was added while keeping the temperature at 80° C., to obtain an initial mixture. Five minutes after completion of the addition of the aqueous ammonium persulfate solution, the emulsified liquid was added dropwise from the drip tank into the reactor over a period of 150 minutes. The emulsified liquid was prepared by forming a mixture of 70 parts by weight of butyl acrylate, 29 parts by weight of methyl methacrylate, 1 part by weight of methacrylic acid, 3 parts by weight of "AQUALON KH1025" (registered trademark, aqueous 25% solution manufactured by Dai-ichi Kogyo Seiyaku Co., Ltd.) and 3 parts by weight of "ADEKA REASOAP SR1025" (registered trademark, aqueous 25% solution manufactured by Adeka Corporation) as emulsifiers, 7.5 parts by weight of an aqueous 2% solution of ammonium persulfate, and 52 parts by weight of ion-exchanged water, and mixing the mixture with a homomixer for 5 minutes. After completion of the dropwise addition of the emulsified liquid, the temperature inside the reactor was kept at 80° C. for 90 minutes, followed by cooling to room temperature. The obtained emulsion was adjusted to a pH of 8.0 with an aqueous 25% ammonium hydroxide solution, and then a small amount of water was added to obtain an acrylic latex with a solid content of 40%. The obtained acrylic latex had a number-average particle size of 145 nm and a glass transition temperature of −23° C.

A dispersion was prepared by uniformly dispersing 95 parts by weight of aluminum hydroxide oxide (boehmite, mean particle size: 1.4 μm) as inorganic particles and 0.4 part by weight (in terms of solid content) of an aqueous ammonium polycarboxylate solution (SN dispersant 5468 manufactured by SAN NOPCO LIMITED, solid component concentration: 40%) as an ionic dispersing agent, in 100 parts by weight of water. The obtained dispersion was shredded with a bead mill (cell volume: 200 cc, zirconia bead diameter: 0.1 mm, filling volume: 80%) and the particle size distribution of the inorganic particles was adjusted to D50=1.0 μm, to prepare an inorganic particle-containing slurry. To the dispersion with adjusted particle size distribution, 2.0 parts by weight (in terms of solid content) of the acrylic latex produced above as a resin binder was added to obtain an inorganic particle-containing slurry. The substrate was then continuously wound out from a mother roll of the microporous substrate and both surfaces of the substrate was coated with the inorganic particle-containing slurry using a gravure reverse coater, followed by drying with a dryer at 60° C. to remove water, thus obtaining a substrate having an inorganic particle layer on both surfaces. The substrate was wound up to obtain a separator mother roll of the substrate having an inorganic particle layer. The amount of aluminum hydroxide oxide contained in the inorganic particle layer was 95 wt %, and the thickness of the inorganic particle layer was 5 μm in total of both surfaces (one side: about 2.5 μm).

<Formation of Thermoplastic Polymer Layer (Layer D)>

The coating solution of the acrylic resin was prepared by the following method. In a reactor equipped with a stirrer, a reflux condenser, a drip tank and a thermometer, 70.4 parts by weight of ion-exchanged water and 0.5 part by weight of "AQUALON KH1025" (registered trademark, aqueous 25% solution manufactured by Dai-ichi Kogyo Seiyaku Co., Ltd.) and 0.5 part by weight of "ADEKA REASOAP SR1025" (registered trademark, aqueous 25% solution manufactured by Adeka Corporation) were charged. The temperature inside the reactor was then raised to 80° C., and 7.5 parts by weight of ammonium persulfate (aqueous 2% solution) was added while keeping the temperature at 80° C. Five minutes after addition of the aqueous ammonium persulfate solution, the emulsified liquid was prepared by forming a mixture of 15.9 parts by weight of methyl methacrylate, 74.5 parts by weight of n-butyl acrylate, 2 parts by weight of 2-ethylhexyl acrylate, 0.1 part by weight of methacrylic acid, 0.1 part by weight of acrylic acid, 2 parts by weight of 2-hydroxyethyl methacrylate, 5 parts by weight of acrylamide, 0.4 parts by weight of glycidyl methacrylate, 0.4 part by weight of trimethylolpropane triacrylate (A-TMPT, manufactured by SHIN-NAKAMURA CHEMICAL CO., LTD.), 3 parts by weight of "AQUALON KH1025" (registered trademark, aqueous 25% solution manufactured by Dai-ichi Kogyo Seiyaku Co., Ltd.), 3 parts by weight of "ADEKA REASOAP SR1025" (registered trademark, aqueous 25% solution manufactured by Adeka Corporation), 0.05 part by weight of sodium p-styrenesulfonate, 7.5 parts by weight of ammonium persulfate (aqueous 2% solution), 0.3 part by weight of γ-methacryloxypropyltrimethoxysilane, and 52 parts by weight of ion-exchanged water, and mixing the mixture with a homomixer for 5 minutes to prepare an emulsified liquid. The obtained emulsified liquid was added dropwise from the drip tank into the reactor over a period of 150 minutes. After completion of the dropwise addition of the emulsified liquid, the temperature inside the reactor was kept at 80° C. for 90 minutes, followed by cooling to room temperature. The obtained emulsion was adjusted to a pH of 9.0 with an ammonium hydroxide solution (aqueous 25% solution) to obtain an acrylic resin (acrylic copolymer latex) with the concentration of 40%. This acrylic resin was diluted with ion-exchanged water so as to adjust to the solid content of 5% by weight, to prepare a coating solution.

A coating solution of polyvinylidene fluoride-hexafluoropropylene (PVDF-HFP) was prepared as follows. A coating solution was prepared by diluting a PVDF-HFP copolymer emulsion manufactured by Arkema Inc. (Kynar Flex 2501-20, Tg: −40° C.) with ion-exchanged water so as to adjust to the solid content of 5% by weight.

A coating solution of the acrylic resin or PVDF-HFP prepared above was coated on both surfaces of a mother roll of a substrate having an inorganic particle layer using a gravure coater to form a thermoplastic polymer layer having the thickness and the coverage area ratio shown in Table 16, which was slit as necessary to obtain a separator for an electricity storage device.

Examples 2.1 to 2.72

The stacking system, material, thickness, etc. of the layer A to the layer D were changed as shown in Tables 16 to 23 to produce separators for an electricity storage device. The evaluation results are shown in Tables 16 to 23.

In Example 70, a positive electrode containing a LiCoO$_2$ layer as a positive electrode material (LCO positive electrode) was used in place of the positive electrode fabricated in the above "a. Fabrication of Positive Electrode". In Example 2.71, when the inorganic particle layer is formed in the above "Formation of Inorganic Particle Layer (Layer C)", "EPOCROS K-2010E" (registered trademark, NIPPON SHOKUBAI CO., LTD., glass transition temperature: −50° C.) was used as the resin binder in place of the acrylic latex. In Example 2.72, when the inorganic particle layer is formed in the above "Formation of Inorganic Particle Layer (Layer C)", "JE-1056" (registered trademark, Seiko PMC Corporation, glass transition temperature: 82° C.) was used as the resin binder in place of the acrylic latex.

Comparative Examples 2.1 to 2.7

The stacking system, material, thickness, etc. of the layer A to the layer D were changed as shown in Table 23 to produce separators for an electricity storage device. The evaluation results are shown in Table 23.

In Comparative Example 2.5, the obtained polyolefin microporous membrane was irradiated with 120 kGy of electron beams using an EB irradiation apparatus, EYE Compact EB (trademark) manufactured by IWASAKI ELECTRIC CO., LTD. The obtained electron beam cross-linked microporous membranes and batteries were subjected to various evaluations according to the above evaluation methods.

In Comparative Examples 2.6 and 2.7, in the fabrication of polyolefin microporous membranes, a catalyst for forming the tin-based siloxane bond was added to the material to be extruded during the extrusion step, and moisture cross-linking after separator molding and crosslinking in the liquid paraffin extraction step were carried out.

TABLE 16

| | | | Example 2.1 | Example 2.2 | Example 2.3 | Example 2.4 | Example 2.5 |
|---|---|---|---|---|---|---|---|
| Layer A | Resin a: Silane-modified PE | % | 30 | 69.9 | 69.9 | 69.9 | 69.9 |
| | Resin b: 2,000,000 or more | % | 30 | 24.2 | 23.6 | 23.0 | 12.9 |
| | Resin c: less than 2,000,000 | % | 40 | 5.9 | 6.5 | 7.1 | 17.2 |
| Layer B | Resin a: Silane-modified PE | % | 0 | 0 | 0 | 0 | 0 |
| | Resin b: 2,000,000 or more | % | 30 | 30 | 30 | 30 | 30 |
| | Resin c: less than 2,000,000 | % | 70 | 70 | 70 | 70 | 70 |
| Substrate layer | Stacking method | — | A-B-A | A-B-A | A-B-A | A-B-A | A-B-A |
| | Weight per unit area of substrate layer | g/m² | 5.22 | 5.22 | 5.17 | 5.27 | 5.17 |
| | Thickness of substrate layer | μm | 10.0 | 10.0 | 9.9 | 10.1 | 9.9 |
| | Porosity | % | 45 | 45 | 45 | 45 | 45 |
| | Puncture strength | gf | 444 | 313 | 315 | 327 | 336 |
| | Puncture strength divided by weight per unit area | gf·m²/g | 85 | 60 | 61 | 62 | 65 |
| Layer C | Coating surface of inorganic layer | — | Both sides | Both sides | Both sides | Both sides | Both sides |
| | Type of inorganic particles | — | Boehmite | Boehmite | Boehmite | Boehmite | Boehmite |
| | Content of inorganic particles | % | 95 | 95 | 95 | 95 | 95 |
| | Glass transition temperature of binder | °C | −23 | −23 | −23 | −23 | −23 |
| | Weight per unit area of inorganic coating layer | g/m² | 6.70 | 6.70 | 6.70 | 6.70 | 6.71 |
| | Thickness of inorganic coating layer | μm | 5 | 5 | 5 | 5 | 5 |
| Layer D | Type of thermoplastic polymer | — | Acrylic resin | Acrylic resin | Acrylic resin | Acrylic resin | Acrylic resin |
| | Surface coverage ratio | % | 30 | 30 | 30 | 30 | 30 |
| | Thickness of thermoplastic polymer layer | μm | 0.5 | 0.5 | 0.5 | 0.5 | 0.5 |
| Evaluation of physical properties | TOF-SIMS island structure | Number | Number | 7 | 63 | 37 | 26 | 11 |
| | | Size Min. | μm² | 16 | 50 | 54 | 60 | 45 |
| | | Size Max. | μm² | 93 | 244 | 243 | 243 | 242 |
| | | Weighted centers of gravity positions Min. | μm | 9 | 12 | 14 | 15 | 15 |
| | | Weighted centers of gravity positions Max. | μm | 108 | 27 | 37 | 46 | 80 |
| | Thermal response index | Rate | — | 10 | 49.5 | 48 | 48.7 | 49 |
| | | $T_0$ | — | 130 | 128 | 128 | 128 | 128 |
| | | Max | — | 1.9 | 0.6 | 0.4 | 0.5 | 0.5 |
| | Heat shrinkage factor at 150°C in electrolyte solution | % | 2.5 | 1 | 1 | 0.9 | 1.1 |
| | Heat shrinkage factor at 150°C | % | 2.0 | 0.3 | 0.3 | 0.4 | 0.4 |
| | Membrane thickness | μm | 15.5 | 15.5 | 15.4 | 15.6 | 15.4 |
| | Air permeability | sec./100 cc | 95 | 299 | 251 | 249 | 199 |
| | Formula (2) common logarithm | log (gf·m⁴/g²) | 1.10 | 0.95 | 0.96 | 0.97 | 0.99 |
| | Dust fall-off properties | % | 0.5 | 0.6 | 0.7 | 0.7 | 0.8 |
| | FUSE temperature | °C | 143 | 141 | 141 | 141 | 141 |
| | SHORT temperature | °C | ≥200 | ≥200 | ≥200 | ≥200 | ≥200 |
| | Electrode residual rate | % | <5 | <5 | <5 | <5 | <5 |
| Evaluation of battery | Cycle test capacity retention rate | % | 97 | 50 | 55 | 65 | 67 |
| | Evaluation of collapse test | % | 99 | 84 | 87 | 90 | 90 |

| | | | Example 2.6 | Example 2.7 | Example 2.8 | Example 2.9 | Example 2.10 |
|---|---|---|---|---|---|---|---|
| Layer A | Resin a: Silane-modified PE | % | 69.9 | 69.9 | 69.9 | 69.9 | 59.9 |
| | Resin b: 2,000,000 or more | % | 7.1 | 6.5 | 5.9 | 1.8 | 17.2 |
| | Resin c: less than 2,000,000 | % | 23.0 | 23.6 | 24.2 | 28.3 | 22.9 |
| Layer B | Resin a: Silane-modified PE | % | 0 | 0 | 0 | 0 | 0 |
| | Resin b: 2,000,000 or more | % | 30 | 30 | 30 | 30 | 30 |
| | Resin c: less than 2,000,000 | % | 70 | 70 | 70 | 70 | 70 |
| Substrate layer | Stacking method | — | A-B-A | A-B-A | A-B-A | A-B-A | A-B-A |
| | Weight per unit area of substrate layer | g/m² | 5.22 | 5.22 | 5.27 | 5.17 | 5.17 |
| | Thickness of substrate layer | μm | 10.0 | 10.0 | 10.1 | 9.9 | 9.9 |
| | Porosity | % | 45 | 45 | 45 | 45 | 45 |
| | Puncture strength | gf | 324 | 313 | 321 | 269 | 470 |
| | Puncture strength divided by weight per unit area | gf·m²/g | 62 | 60 | 61 | 52 | 91 |
| Layer C | Coating surface of inorganic layer | — | Both sides | Both sides | Both sides | Both sides | Both sides |
| | Type of inorganic particles | — | Boehmite | Boehmite | Boehmite | Boehmite | Boehmite |
| | Content of inorganic particles | % | 95 | 95 | 95 | 95 | 95 |
| | Glass transition temperature of binder | °C | −23 | −23 | −23 | −23 | −23 |
| | Weight per unit area of inorganic coating layer | g/m² | 6.72 | 6.70 | 6.68 | 6.70 | 6.71 |
| | Thickness of inorganic coating layer | μm | 5 | 5 | 5 | 5 | 5 |
| Layer D | Type of thermoplastic polymer | — | Acrylic resin | Acrylic resin | Acrylic resin | Acrylic resin | Acrylic resin |
| | Surface coverage ratio | % | 30 | 30 | 30 | 30 | 30 |
| | Thickness of thermoplastic polymer layer | μm | 0.5 | 0.5 | 0.5 | 0.5 | 0.5 |
| Evaluation of physical properties | TOF-SIMS island structure | Number | Number | 5 | 5 | 4 | 4 | 11 |
| | | Size Min. | μm² | 45 | 50 | 30 | 20 | 25 |
| | | Size Max. | μm² | 241 | 243 | 244 | 243 | 234 |
| | | Weighted centers of gravity positions Min. | μm | 35 | 20 | 35 | 45 | 15 |
| | | Weighted centers of gravity positions Max. | μm | 105 | 112 | 120 | 134 | 80 |

TABLE 16-continued

|  |  |  |  |  |  |  |  |
|---|---|---|---|---|---|---|---|
|  | Thermal response index | Rate | — | 45.7 | 47.8 | 47 | 47.6 | 4.4 |
|  |  | $T_0$ | — | 128 | 128 | 128 | 128 | 130 |
|  |  | Max | — | 0.5 | 0.4 | 0.4 | 0.1 | 3.9 |
|  | Heat shrinkage factor at 150° C. in electrolyte solution |  | % | 1.3 | 1.1 | 1 | 9.8 | 4.5 |
|  | Heat shrinkage factor at 150° C. |  | % | 0.4 | 0.3 | 0.3 | 0.2 | 4 |
|  | Membrane thickness |  | μm | 15.5 | 15.5 | 15.6 | 15.4 | 15.4 |
|  | Air permeability |  | sec./100 cc | 249 | 255 | 289 | 397 | 93 |
|  | Formula (2) common logarithm |  | log (gf · m⁴/g²) | 0.97 | 0.95 | 0.96 | 0.89 | 1.13 |
|  | Dust fall-off properties |  | % | 0.8 | 0.5 | 0.8 | 0.7 | 0.7 |
|  | FUSE temperature |  | ° C. | 141 | 141 | 141 | 141 | 143 |
|  | SHORT temperature |  | ° C. | ≥200 | ≥200 | ≥200 | ≥200 | ≥200 |
|  | Electrode residual rate |  | % | <5 | <5 | <5 | <5 | <5 |
| Evaluation of battery | Cycle test capacity retention rate |  | % | 65 | 56 | 50 | 45 | 45 |
|  | Evaluation of collapse test |  | % | 90 | 87 | 84 | 69 | 93 |

TABLE 17

|  |  |  |  | Example 2.11 | Example 2.12 | Example 2.13 | Example 2.14 | Example 2.15 |
|---|---|---|---|---|---|---|---|---|
| Layer A | Resin a: Silane-modified PE |  | % | 49.9 | 3.1 | 5.9 | 8.1 | 3.1 |
|  | Resin b: 2,000,000 or more |  | % | 21.5 | 84.7 | 82.3 | 80.4 | 84.7 |
|  | Resin c: less than 2,000,000 |  | % | 28.6 | 12.2 | 11.8 | 11.5 | 12.2 |
| Layer B | Resin a: Silane-modified PE |  | % | 0 | 0 | 0 | 0 | 0 |
|  | Resin b: 2,000,000 or more |  | % | 30 | 30 | 30 | 30 | 30 |
|  | Resin c: less than 2,000,000 |  | % | 70 | 70 | 70 | 70 | 70 |
| Substrate layer | Stacking method |  | — | A-B-A | A-B-A | A-B-A | A-B-A | A-B-A |
|  | Weight per unit area of substrate layer |  | g/m² | 5.22 | 5.22 | 5.17 | 5.27 | 5.27 |
|  | Thickness of substrate layer |  | μm | 10.0 | 10.0 | 9.9 | 10.0 | 10.1 |
|  | Porosity |  | % | 45 | 45 | 45 | 45 | 45 |
|  | Puncture strength |  | gf | 465 | 522 | 491 | 485 | 501 |
|  | Puncture strength divided by weight per unit area |  | gf · m²/g | 89 | 100 | 95 | 93 | 95 |
| Layer C | Coating surface of inorganic layer |  | — | Both sides | Both sides | Both sides | Both sides | Both sides |
|  | Type of inorganic particles |  | — | Boehmite | Boehmite | Boehmite | Boehmite | Boehmite |
|  | Content of inorganic particles |  | % | 95 | 95 | 95 | 95 | 95 |
|  | Glass transition temperature of binder |  | ° C. | −23 | −23 | −23 | −23 | −23 |
|  | Weight per unit area of inorganic coating layer |  | g/m² | 6.72 | 6.72 | 6.69 | 6.72 | 6.71 |
|  | Thickness of inorganic coating layer |  | μm | 5 | 5 | 5 | 5 | 5 |
| Layer D | Type of thermoplastic polymer |  | — | Acrylic resin | Acrylic resin | Acrylic resin | Acrylic resin | Acrylic resin |
|  | Surface coverage ratio |  | % | 30 | 30 | 30 | 30 | 30 |
|  | Thickness of thermoplastic polymer layer |  | μm | 0.5 | 0.5 | 0.5 | 0.5 | 0.5 |
| Evaluation of physical properties | TOF-SIMS island structure | Number |  | Number | 12 | 6 | 8 | 9 | 9 |
|  |  | Size | Min. | μm² | 40 | 9.5 | 10.5 | 10.5 | 9.5 |
|  |  |  | Max. | μm² | 213 | 75 | 110 | 101 | 115 |
|  |  | Weighted centers of gravity positions | Min. | μm | 15 | 6 | 6 | 6 | 9 |
|  |  |  | Max. | μm | 75 | 120 | 107 | 100 | 95 |
|  | Thermal response index | Rate | — | 20 | 3.6 | 3.9 | 4.1 | 3.6 |
|  |  | $T_0$ | — | 131 | 134 | 131 | 131 | 131 |
|  |  | Max | — | 2 | 29.6 | 18.8 | 17.5 | 28.2 |
|  | Heat shrinkage factor at 150° C. in electrolyte solution |  | % | 2.7 | 59.8 | 19.1 | 17.9 | 28.7 |
|  | Heat shrinkage factor at 150° C. |  | % | 2 | 29.4 | 18.6 | 17.4 | 28.2 |
|  | Membrane thickness |  | μm | 15.5 | 15.5 | 15.4 | 15.5 | 15.6 |
|  | Air permeability |  | sec./100 cc | 95 | 102 | 103 | 107 | 108 |
|  | Formula (2) common logarithm |  | log (gf · m⁴/g²) | 1.12 | 1.17 | 1.15 | 1.14 | 1.15 |
|  | Dust fall-off properties |  | % | 0.5 | 0.7 | 0.7 | 0.8 | 0.5 |
|  | FUSE temperature |  | ° C. | 144 | 144 | 144 | 144 | 144 |
|  | SHORT temperature |  | ° C. | ≥200 | ≥200 | ≥200 | ≥200 | ≥200 |
|  | Electrode residual rate |  | % | <5 | <5 | <5 | <5 | <5 |
| Evaluation of battery | Cycle test capacity retention rate |  | % | 55 | 41 | 49 | 45 | 45 |
|  | Evaluation of collapse test |  | % | 96 | 69 | 75 | 78 | 69 |

|  |  |  |  | Example 2.16 | Example 2.17 | Example 2.18 | Example 2.19 | Example 2.20 |
|---|---|---|---|---|---|---|---|---|
| Layer A | Resin a: Silane-modified PE |  | % | 3.1 | 3.4 | 3.1 | 3.1 | 6.7 |
|  | Resin b: 2,000,000 or more |  | % | 84.5 | 6.7 | 9.5 | 10.4 | 5.3 |
|  | Resin c: less than 2,000,000 |  | % | 12.4 | 89.9 | 87.4 | 86.5 | 88 |
| Layer B | Resin a: Silane-modified PE |  | % | 0 | 0 | 0 | 0 | 0 |
|  | Resin b: 2,000,000 or more |  | % | 30 | 30 | 30 | 30 | 30 |
|  | Resin c: less than 2,000,000 |  | % | 70 | 70 | 70 | 70 | 70 |

TABLE 17-continued

| | | | | | | | |
|---|---|---|---|---|---|---|---|
| Substrate layer | Stacking method | — | A-B-A | A-B-A | A-B-A | A-B-A | A-B-A |
| | Weight per unit area of substrate layer | g/m² | 5.27 | 5.22 | 5.22 | 5.17 | 5.22 |
| | Thickness of substrate layer | μm | 10.1 | 10.0 | 10.0 | 9.9 | 10.0 |
| | Porosity | % | 45 | 45 | 45 | 45 | 45 |
| | Puncture strength | gf | 495 | 397 | 397 | 388 | 407 |
| | Puncture strength divided by weight per unit area | gf·m²/g | 94 | 76 | 76 | 75 | 78 |
| Layer C | Coating surface of inorganic layer | — | Both sides | Both sides | Both sides | Both sides | Both sides |
| | Type of inorganic particles | — | Boehmite | Boehmite | Boehmite | Boehmite | Boehmite |
| | Content of inorganic particles | % | 95 | 95 | 95 | 95 | 95 |
| | Glass transition temperature of binder | °C. | −23 | −23 | −23 | −23 | −23 |
| | Weight per unit area of inorganic coating layer | g/m² | 6.69 | 6.71 | 6.68 | 6.69 | 6.72 |
| | Thickness of inorganic coating layer | μm | 5 | 5 | 5 | 5 | 5 |
| Layer D | Type of thermoplastic polymer | — | Acrylic resin | Acrylic resin | Acrylic resin | Acrylic resin | Acrylic resin |
| | Surface coverage ratio | % | 30 | 30 | 30 | 30 | 30 |
| | Thickness of thermoplastic polymer layer | μm | 0.5 | 0.5 | 0.5 | 0.5 | 0.5 |
| Evaluation of physical properties | TOF-SIMS island structure | Number | Number | 7 | 4 | 4 | 4 | 4 |
| | | Size Min. | μm² | 9.5 | 9.5 | 9.2 | 9 | 10.5 |
| | | Size Max. | μm² | 150 | 10 | 9.5 | 10 | 11 |
| | | Weighted centers of gravity positions Min. | μm | 11 | 131 | 125 | 111 | 132 |
| | | Weighted centers of gravity positions Max. | μm | 110 | 135 | 128 | 124 | 134 |
| | Thermal response index | Rate | — | 4.1 | 3.6 | 3.9 | 4.1 | 3.9 |
| | | $T_0$ | — | 131 | 130 | 130 | 130 | 130 |
| | | Max | — | 27.0 | 25.4 | 25.9 | 27.1 | 22.9 |
| | Heat shrinkage factor at 150° C. in electrolyte solution | % | 27.6 | 25.6 | 26.2 | 27.3 | 23.1 |
| | Heat shrinkage factor at 150° C. | % | 27.0 | 25.2 | 25.8 | 27.0 | 22.8 |
| | Membrane thickness | μm | 15.6 | 15.5 | 15.5 | 15.4 | 15.5 |
| | Air permeability | sec./100 cc | 109 | 90 | 96 | 95 | 99 |
| | Formula (2) common logarithm | log (gf·m⁴/g²) | 1.15 | 1.05 | 1.06 | 1.05 | 1.06 |
| | Dust fall-off properties | % | 0.7 | 0.8 | 0.5 | 0.6 | 0.6 |
| | FUSE temperature | °C. | 144 | 143 | 143 | 143 | 143 |
| | SHORT temperature | °C. | ≥200 | ≥200 | ≥200 | ≥200 | ≥200 |
| | Electrode residual rate | % | <5 | <5 | <5 | <5 | <5 |
| Evaluation of battery | Cycle test capacity retention rate | % | 53 | 88 | 89 | 83 | 80 |
| | Evaluation of collapse test | % | 72 | 69 | 69 | 72 | 75 |

TABLE 18

| | | | Example 2.21 | Example 2.22 | Example 2.23 | Example 2.24 | Example 2.25 |
|---|---|---|---|---|---|---|---|
| Layer A | Resin a: Silane-modified PE | % | 9.9 | 15.9 | 10.1 | 25.8 | 17.2 |
| | Resin b: 2,000,000 or more | % | 5.1 | 5.1 | 78.6 | 39.9 | 59.9 |
| | Resin c: less than 2,000,000 | % | 85 | 79 | 11.3 | 34.3 | 22.9 |
| Layer B | Resin a: Silane-modified PE | % | 0 | 0 | 0 | 0 | 0 |
| | Resin b: 2,000,000 or more | % | 30 | 30 | 30 | 30 | 30 |
| | Resin c: less than 2,000,000 | % | 70 | 70 | 70 | 70 | 70 |
| Substrate layer | Stacking method | — | A-B-A | A-B-A | A-B-A | A-B-A | A-B-A |
| | Weight per unit area of substrate layer | g/m² | 5.22 | 5.22 | 5.17 | 5.27 | 5.22 |
| | Thickness of substrate layer | μm | 10.0 | 10.0 | 9.9 | 10.1 | 10.0 |
| | Porosity | % | 45 | 45 | 45 | 45 | 45 |
| | Puncture strength | gf | 402 | 402 | 465 | 458 | 459 |
| | Puncture strength divided by weight per unit area | gf·m²/g | 77 | 77 | 90 | 87 | 88 |
| Layer C | Coating surface of inorganic layer | — | Both sides | Both sides | Both sides | Both sides | Both sides |
| | Type of inorganic particles | — | Boehmite | Boehmite | Boehmite | Boehmite | Boehmite |
| | Content of inorganic particles | % | 95 | 95 | 95 | 95 | 95 |
| | Glass transition temperature of binder | °C. | −23 | −23 | −23 | −23 | −23 |
| | Weight per unit area of inorganic coating layer | g/m² | 6.68 | 6.72 | 6.69 | 6.71 | 6.70 |
| | Thickness of inorganic coating layer | μm | 5 | 5 | 5 | 5 | 5 |
| Layer D | Type of thermoplastic polymer | — | Acrylic resin | Acrylic resin | Acrylic resin | Acrylic resin | Acrylic resin |
| | Surface coverage ratio | % | 30 | 30 | 30 | 30 | 30 |
| | Thickness of thermoplastic polymer layer | μm | 0.5 | 0.5 | 0.5 | 0.5 | 0.5 |
| Evaluation of physical properties | TOF-SIMS island structure | Number Number | 4 | 4 | 89 | 5 | 6 |
| | | Size Min. μm² | 10 | 10.2 | 11 | 21 | 19 |
| | | Size Max. μm² | 10.5 | 10.8 | 25 | 97 | 93 |
| | | Weighted centers of gravity positions Min. μm | 131 | 130.5 | 6 | 29 | 29 |
| | | Weighted centers of gravity positions Max. μm | 133 | 134 | 8 | 111 | 100 |
| | Thermal response index | Rate — | 4.1 | 4.4 | 4.4 | 20 | 4.4 |
| | | $T_0$ — | 130 | 130 | 131 | 130 | 130 |
| | | Max — | 10.2 | 10.2 | 21.1 | 4.3 | 6.9 |

TABLE 18-continued

|  |  |  | | | | | |
|---|---|---|---|---|---|---|---|
|  | Heat shrinkage factor at 150° C. in electrolyte solution | % | 10.9 | 10.9 | 21.5 | 4.6 | 7.6 |
|  | Heat shrinkage factor at 150° C. | % | 10.1 | 10.1 | 21.0 | 4 | 7 |
|  | Membrane thickness | μm | 15.5 | 15.5 | 15.4 | 15.6 | 15.5 |
|  | Air permeability | sec./100 cc | 94 | 91 | 81 | 73 | 83 |
|  | Formula (2) common logarithm | log (gf · m$^4$/g$^2$) | 1.06 | 1.06 | 1.13 | 1.11 | 1.12 |
|  | Dust fall-off properties | % | 0.5 | 0.7 | 0.8 | 0.8 | 0.6 |
|  | FUSE temperature | ° C. | 143 | 143 | 144 | 143 | 143 |
|  | SHORT temperature | ° C. | ≥200 | ≥200 | ≥200 | ≥200 | ≥200 |
|  | Electrode residual rate | % | <5 | <5 | <5 | <5 | <5 |
| Evaluation of battery | Cycle test capacity retention rate | % | 88 | 87 | 43 | 86 | 86 |
|  | Evaluation of collapse test | % | 78 | 84 | 81 | 96 | 90 |

|  |  |  | Example 2.26 | Example 2.27 | Example 2.28 | Example 2.29 | Example 2.30 |
|---|---|---|---|---|---|---|---|
| Layer A | Resin a: Silane-modified PE | % | 12.9 | 25.1 | 20.1 | 30.4 | 30 |
|  | Resin b: 2,000,000 or more | % | 69.9 | 25 | 20 | 60.8 | 30 |
|  | Resin c: less than 2,000,000 | % | 17.2 | 49.9 | 59.9 | 8.8 | 40 |
| Layer B | Resin a: Silane-modified PE | % | 0 | 0 | 0 | 0 | 0 |
|  | Resin b: 2,000,000 or more | % | 30 | 30 | 30 | 30 | 30 |
|  | Resin c: less than 2,000,000 | % | 70 | 70 | 70 | 70 | 70 |
| Substrate layer | Stacking method | — | A-B-A | A-B-A | A-B-A | A-B-A | A-B-A |
|  | Weight per unit area of substrate layer | g/m$^2$ | 5.27 | 5.17 | 5.17 | 5.22 | 1.1 |
|  | Thickness of substrate layer | μm | 10.1 | 9.9 | 9.9 | 10.0 | 2.1 |
|  | Porosity | % | 45 | 45 | 45 | 45 | 45 |
|  | Puncture strength | gf | 458 | 414 | 398 | 392 | 99 |
|  | Puncture strength divided by weight per unit area | gf · m$^2$/g | 87 | 80 | 77 | 75 | 90 |
| Layer C | Coating surface of inorganic layer | — | Both sides | Both sides | Both sides | Both sides | Both sides |
|  | Type of inorganic particles | — | Boehmite | Boehmite | Boehmite | Boehmite | Boehmite |
|  | Content of inorganic particles | % | 95 | 95 | 95 | 95 | 95 |
|  | Glass transition temperature of binder | ° C. | −23 | −23 | −23 | −23 | −23 |
|  | Weight per unit area of inorganic coating layer | g/m$^2$ | 6.70 | 6.68 | 6.71 | 6.69 | 6.69 |
|  | Thickness of inorganic coating layer | μm | 5 | 5 | 5 | 5 | 5 |
| Layer D | Type of thermoplastic polymer | — | Acrylic resin | Acrylic resin | Acrylic resin | Acrylic resin | Acrylic resin |
|  | Surface coverage ratio | % | 30 | 30 | 30 | 30 | 30 |
|  | Thickness of thermoplastic polymer layer | μm | 0.5 | 0.5 | 0.5 | 0.5 | 0.5 |
| Evaluation of physical properties | TOF-SIMS island structure Number | Number | 5 | 5 | 7 | 7 | 4 |
|  | Size Min. | μm$^2$ | 22 | 25 | 16 | 21 | 26 |
|  | Size Max. | μm$^2$ | 95 | 82 | 101 | 104 | 104 |
|  | Weighted centers of gravity positions Min. | μm | 23 | 29 | 17 | 21 | 28 |
|  | Weighted centers of gravity positions Max. | μm | 119 | 104 | 101 | 100 | 119 |
|  | Thermal response index Rate | — | 4.6 | 20 | 4.4 | 4.6 | 30 |
|  | Thermal response index $T_0$ | — | 130 | 130 | 130 | 130 | 130 |
|  | Thermal response index Max | — | 9.3 | 5.2 | 8.2 | 10.2 | 0.5 |
|  | Heat shrinkage factor at 150° C. in electrolyte solution | % | 9.6 | 5.6 | 9 | 10.5 | 1 |
|  | Heat shrinkage factor at 150° C. | % | 9 | 5 | 8 | 10.1 | 0.2 |
|  | Membrane thickness | μm | 15.6 | 15.4 | 15.4 | 15.5 | 7.6 |
|  | Air permeability | sec./100 cc | 71 | 72 | 70 | 87 | 61 |
|  | Formula (2) common logarithm | log (gf · m$^4$/g$^2$) | 1.11 | 1.08 | 1.06 | 1.05 | 1.13 |
|  | Dust fall-off properties | % | 0.8 | 0.6 | 0.6 | 0.8 | 0.8 |
|  | FUSE temperature | ° C. | 143 | 143 | 143 | 143 | 143 |
|  | SHORT temperature | ° C. | ≥200 | ≥200 | ≥200 | ≥200 | ≥200 |
|  | Electrode residual rate | % | <5 | <5 | <5 | <5 | <5 |
| Evaluation of battery | Cycle test capacity retention rate | % | 80 | 86 | 85 | 82 | 85 |
|  | Evaluation of collapse test | % | 87 | 96 | 93 | 87 | 79 |

TABLE 19

|  |  |  | Example 2.31 | Example 2.32 | Example 2.33 | Example 2.34 | Example 2.35 |
|---|---|---|---|---|---|---|---|
| Layer A | Resin a: Silane-modified PE | % | 30 | 30 | 30 | 30 | 30 |
|  | Resin b: 2,000,000 or more | % | 30 | 30 | 30 | 30 | 30 |
|  | Resin c: less than 2,000,000 | % | 40 | 40 | 40 | 40 | 40 |
| Layer B | Resin a: Silane-modified PE | % | 0 | 0 | 0 | 0 | 0 |
|  | Resin b: 2,000,000 or more | % | 30 | 30 | 30 | 30 | 30 |
|  | Resin c: less than 2,000,000 | % | 70 | 70 | 70 | 70 | 70 |
| Substrate layer | Stacking method | — | A-B-A | A-B-A | A-B-A | A-B-A | A-B-A |
|  | Weight per unit area of substrate layer | g/m$^2$ | 1.62 | 15.14 | 5.22 | 5.27 | 5.27 |
|  | Thickness of substrate layer | μm | 3.1 | 29.0 | 10.0 | 10.1 | 10.1 |
|  | Porosity | % | 44.9 | 45 | 45 | 45 | 45 |
|  | Puncture strength | gf | 133 | 1241 | 433 | 422 | 427 |

TABLE 19-continued

|  |  |  |  |  |  |  |  |
|---|---|---|---|---|---|---|---|
|  | Puncture strength divided by weight per unit area | gf · m²/g | 82 | 82 | 83 | 80 | 81 |
| Layer C | Coating surface of inorganic layer | — | Both sides | Both sides | one side | Both sides | Both sides |
|  | Type of inorganic particles | — | Boehmite | Boehmite | Boehmite | Alumina | Silica |
|  | Content of inorganic particles | % | 95 | 95 | 95 | 95 | 95 |
|  | Glass transition temperature of binder | ° C. | −23 | −23 | −23 | −23 | −23 |
|  | Weight per unit area of inorganic coating layer | g/m² | 6.69 | 6.69 | 6.69 | 6.69 | 6.69 |
|  | Thickness of inorganic coating layer | μm | 5 | 5 | 5 | 5 | 5 |
| Layer D | Type of thermoplastic polymer | — | Acrylic resin | Acrylic resin | Acrylic resin | Acrylic resin | Acrylic resin |
|  | Surface coverage ratio | % | 30 | 30 | 30 | 30 | 30 |
|  | Thickness of thermoplastic polymer layer | μm | 0.5 | 0.5 | 0.5 | 0.5 | 0.5 |
| Evaluation of physical properties | TOF-SIMS island structure | Number | Number | 5 | 6 | 6 | 6 | 2 |
|  |  | Size Min. | μm² | 22 | 30 | 23 | 21 | 21 |
|  |  | Max. | μm² | 86 | 109 | 102 | 106 | 80 |
|  |  | Weighted centers of gravity positions Min. | μm | 29 | 27 | 20 | 26 | 28 |
|  |  | Max. | μm | 104 | 102 | 108 | 103 | 105 |
|  | Thermal response index | Rate | — | 25 | 4.6 | 4.8 | 12.6 | 4.4 |
|  |  | $T_0$ | — | 130 | 130 | 130 | 130 | 130 |
|  |  | Max | — | 0.3 | 17.5 | 3.9 | 3 | 8.3 |
|  | Heat shrinkage factor at 150° C. in electrolyte solution |  | % | 1 | 17.9 | 4.6 | 3.7 | 9 |
|  | Heat shrinkage factor at 150° C. |  | % | 0.3 | 17.4 | 4 | 3 | 8 |
|  | Membrane thickness |  | μm | 8.6 | 34.5 | 15.5 | 15.6 | 15.6 |
|  | Air permeability |  | sec./100 cc | 71 | 299 | 91 | 80 | 83 |
|  | Formula (2) common logarithm |  | log (gf · m⁴/g²) | 1.09 | 1.09 | 1.09 | 1.08 | 1.08 |
|  | Dust fall-off properties |  | % | 0.5 | 0.5 | 0.8 | 0.5 | 0.6 |
|  | FUSE temperature |  | ° C. | 143 | 143 | 143 | 143 | 143 |
|  | SHORT temperature |  | ° C. | ≥200 | ≥200 | ≥200 | ≥200 | ≥200 |
|  | Electrode residual rate |  | % | <5 | <5 | <5 | <5 | <5 |
| Evaluation of battery | Cycle test capacity retention rate |  | % | 80 | 66 | 80 | 82 | 85 |
|  | Evaluation of collapse test |  | % | 84 | 89 | 89 | 97 | 82 |

|  |  |  |  | Example 2.36 | Example 2.37 | Example 2.38 | Example 2.39 | Example 2.40 |
|---|---|---|---|---|---|---|---|---|
| Layer A | Resin a: Silane-modified PE |  | % | 30 | 30 | 30 | 30 | 30 |
|  | Resin b: 2,000,000 or more |  | % | 30 | 30 | 30 | 30 | 30 |
|  | Resin c: less than 2,000,000 |  | % | 40 | 40 | 40 | 40 | 40 |
| Layer B | Resin a: Silane-modified PE |  | % | 0 | 0 | 0 | 0 | 0 |
|  | Resin b: 2,000,000 or more |  | % | 30 | 30 | 30 | 30 | 30 |
|  | Resin c: less than 2,000,000 |  | % | 70 | 70 | 70 | 70 | 70 |
| Substrate layer | Stacking method |  | — | A-B-A | A-B-A | A-B-A | A-B-A | A-B-A |
|  | Weight per unit area of substrate layer |  | g/m² | 5.22 | 5.17 | 5.22 | 5.17 | 5.27 |
|  | Thickness of substrate layer |  | μm | 10.0 | 9.9 | 10.0 | 9.9 | 10.1 |
|  | Porosity |  | % | 45 | 45 | 45 | 45 | 45 |
|  | Puncture strength |  | gf | 423 | 429 | 418 | 429 | 443 |
|  | Puncture strength divided by weight per unit area |  | gf · m²/g | 81 | 83 | 80 | 83 | 84 |
| Layer C | Coating surface of inorganic layer |  | — | Both sides | Both sides | Both sides | Both sides | Both sides |
|  | Type of inorganic particles |  | — | Titania | Boehmite | Boehmite | Boehmite | Boehmite |
|  | Content of inorganic particles |  | % | 95 | 4 | 6 | 9 | 11 |
|  | Glass transition temperature of binder |  | ° C. | −23 | −23 | −23 | −23 | −23 |
|  | Weight per unit area of inorganic coating layer |  | g/m² | 6.69 | 6.10 | 6.37 | 6.39 | 6.43 |
|  | Thickness of inorganic coating layer |  | μm | 5 | 5 | 5 | 5 | 5 |
| Layer D | Type of thermoplastic polymer |  | — | Acrylic resin | Acrylic resin | Acrylic resin | Acrylic resin | Acrylic resin |
|  | Surface coverage ratio |  | % | 30 | 30 | 30 | 30 | 30 |
|  | Thickness of thermoplastic polymer layer |  | μm | 0.5 | 0.5 | 0.5 | 0.5 | 0.5 |
| Evaluation of physical properties | TOF-SIMS island structure | Number | Number | 5 | 5 | 5 | 6 | 6 |
|  |  | Size Min. | μm² | 25 | 18 | 24 | 25 | 18 |
|  |  | Max. | μm² | 80 | 109 | 107 | 84 | 80 |
|  |  | Weighted centers of gravity positions Min. | μm | 16 | 21 | 24 | 29 | 16 |
|  |  | Max. | μm | 119 | 120 | 119 | 102 | 113 |
|  | Thermal response index | Rate | — | 5 | 3.9 | 4.1 | 4.2 | 4.3 |
|  |  | $T_0$ | — | 130 | 130 | 130 | 130 | 130 |
|  |  | Max | — | 9 | 27.0 | 16.9 | 12.1 | 12.2 |
|  | Heat shrinkage factor at 150° C. in electrolyte solution |  | % | 9.7 | 27.5 | 17.4 | 12.5 | 12.5 |
|  | Heat shrinkage factor at 150° C. |  | % | 9 | 27.0 | 16.8 | 12.0 | 12.0 |
|  | Membrane thickness |  | μm | 15.5 | 15.4 | 15.5 | 15.4 | 15.6 |
|  | Air permeability |  | sec./100 cc | 81 | 396 | 296 | 243 | 90 |
|  | Formula (2) common logarithm |  | log (gf · m⁴/g²) | 1.08 | 1.13 | 1.10 | 1.12 | 1.12 |
|  | Dust fall-off properties |  | % | 0.6 | 0.6 | 0.8 | 0.5 | 0.6 |
|  | FUSE temperature |  | ° C. | 143 | 143 | 143 | 143 | 143 |
|  | SHORT temperature |  | ° C. | ≥200 | ≥200 | ≥200 | ≥200 | ≥200 |
|  | Electrode residual rate |  | % | <5 | <5 | <5 | <5 | <5 |

TABLE 19-continued

| | | | | | | | |
|---|---|---|---|---|---|---|---|
| Evaluation of battery | Cycle test capacity retention rate | % | 82 | 54 | 56 | 58 | 65 |
| | Evaluation of collapse test | % | 81 | 73 | 82 | 91 | 96 |

TABLE 20

| | | | Example 2.41 | Example 2.42 | Example 2.43 | Example 2.44 | Example 2.45 |
|---|---|---|---|---|---|---|---|
| Layer A | Resin a: Silane-modified PE | % | 30 | 30 | 30 | 30 | 30 |
| | Resin b: 2,000,000 or more | % | 30 | 30 | 30 | 30 | 30 |
| | Resin c: less than 2,000,000 | % | 40 | 40 | 40 | 40 | 40 |
| Layer B | Resin a: Silane-modified PE | % | 0 | 0 | 0 | 0 | 0 |
| | Resin b: 2,000,000 or more | % | 30 | 30 | 30 | 30 | 30 |
| | Resin c: less than 2,000,000 | % | 70 | 70 | 70 | 70 | 70 |
| Substrate layer | Stacking method | — | A-B-A | A-B-A | A-B-A | A-B-A | A-B-A |
| | Weight per unit area of substrate layer | g/m$^2$ | 5.27 | 5.22 | 5.27 | 5.27 | 5.27 |
| | Thickness of substrate layer | μm | 10.1 | 10.0 | 10.1 | 10.1 | 10.1 |
| | Porosity | % | 45 | 45 | 45 | 45 | 45 |
| | Puncture strength | gf | 422 | 423 | 422 | 443 | 422 |
| | Puncture strength divided by weight per unit area | gf · m$^2$/g | 80 | 81 | 80 | 84 | 80 |
| Layer C | Coating surface of inorganic layer | — | Both sides | Both sides | Both sides | Both sides | Both sides |
| | Type of inorganic particles | — | Boehmite | Boehmite | Boehmite | Boehmite | Boehmite |
| | Content of inorganic particles | % | 97 | 99 | 95 | 95 | 95 |
| | Glass transition temperature of binder | °C. | −23 | −23 | 71 | 71 | 71 |
| | Weight per unit area of inorganic coating layer | g/m$^2$ | 6.73 | 6.76 | 1.47 | 2.81 | 7.89 |
| | Thickness of inorganic coating layer | μm | 5 | 5 | 1.1 | 2.1 | 5.9 |
| Layer D | Type of thermoplastic polymer | — | Acrylic resin | Acrylic resin | Acrylic resin | Acrylic resin | Acrylic resin |
| | Surface coverage ratio | % | 30 | 30 | 30 | 30 | 30 |
| | Thickness of thermoplastic polymer layer | μm | 0.5 | 0.5 | 0.5 | 0.5 | 0.5 |
| Evaluation of physical properties | TOF-SIMS island structure Number | Number | 6 | 6 | 5 | 5 | 5 |
| | Size Min. | μm$^2$ | 28 | 18 | 30 | 25 | 16 |
| | Size Max. | μm$^2$ | 110 | 93 | 105 | 104 | 87 |
| | Weighted centers of gravity positions Min. | μm | 16 | 15 | 23 | 26 | 18 |
| | Weighted centers of gravity positions Max. | μm | 111 | 116 | 113 | 110 | 116 |
| | Thermal response index Rate | — | 8.8 | 9.3 | 4.1 | 4.7 | 20 |
| | $T_0$ | — | 130 | 130 | 130 | 130 | 130 |
| | Max | — | 7.9 | 6 | 17.6 | 9.3 | 0.7 |
| | Heat shrinkage factor at 150° C. in electrolyte solution | % | 9 | 6.7 | 17.7 | 9.5 | 1.3 |
| | Heat shrinkage factor at 150° C. | % | 8 | 6 | 17.4 | 9 | 0.4 |
| | Membrane thickness | μm | 15.6 | 15.5 | 11.7 | 12.7 | 16.5 |
| | Air permeability | sec./100 cc | 95 | 90 | 88 | 89 | 94 |
| | Formula (2) common logarithm | log (gf · m$^4$/g$^2$) | 1.10 | 1.11 | 1.10 | 1.12 | 1.10 |
| | Dust fall-off properties | % | 0.8 | 0.6 | 0.7 | 0.6 | 0.5 |
| | FUSE temperature | °C. | 143 | 143 | 143 | 143 | 143 |
| | SHORT temperature | °C. | ≥200 | ≥200 | ≥200 | ≥200 | ≥200 |
| | Electrode residual rate | % | <5 | <5 | <5 | <5 | <5 |
| Evaluation of battery | Cycle test capacity retention rate | % | 85 | 84 | 85 | 83 | 84 |
| | Evaluation of collapse test | % | 95 | 94 | 83 | 93 | 92 |

| | | | Example 2.46 | Example 2.47 | Example 2.48 | Example 2.49 | Example 2.50 |
|---|---|---|---|---|---|---|---|
| Layer A | Resin a: Silane-modified PE | % | 30 | 30 | 30 | 30 | 30 |
| | Resin b: 2,000,000 or more | % | 30 | 30 | 30 | 30 | 30 |
| | Resin c: less than 2,000,000 | % | 40 | 40 | 40 | 40 | 40 |
| Layer B | Resin a: Silane-modified PE | % | 0 | 0 | 0 | 0 | 0 |
| | Resin b: 2,000,000 or more | % | 30 | 30 | 30 | 30 | 30 |
| | Resin c: less than 2,000,000 | % | 70 | 70 | 70 | 70 | 70 |
| Substrate layer | Stacking method | — | A-B-A | A-B-A | A-B-A | A-B-A | A-B-A |
| | Weight per unit area of substrate layer | g/m$^2$ | 5.27 | 5.17 | 5.17 | 5.22 | 5.27 |
| | Thickness of substrate layer | μm | 10.1 | 9.9 | 9.9 | 10.0 | 10.1 |
| | Porosity | % | 45 | 45 | 45 | 45 | 45 |
| | Puncture strength | gf | 422 | 419 | 434 | 423 | 427 |
| | Puncture strength divided by weight per unit area | gf · m$^2$/g | 80 | 81 | 84 | 81 | 81 |
| Layer C | Coating surface of inorganic layer | — | Both sides | Both sides | Both sides | Both sides | Both sides |
| | Type of inorganic particles | — | Boehmite | Boehmite | Boehmite | Boehmite | Boehmite |
| | Content of inorganic particles | % | 95 | 95 | 95 | 95 | 95 |
| | Glass transition temperature of binder | °C. | −23 | −23 | −23 | −23 | −23 |
| | Weight per unit area of inorganic coating layer | g/m$^2$ | 6.69 | 6.70 | 6.70 | 6.69 | 6.69 |
| | Thickness of inorganic coating layer | μm | 5 | 5 | 5 | 5 | 5 |

TABLE 20-continued

|  |  |  |  |  |  |  |  |
|---|---|---|---|---|---|---|---|
| Layer D | Type of thermoplastic polymer |  | — | PVDF | Acrylic resin | Acrylic resin | Acrylic resin | Acrylic resin |
|  | Surface coverage ratio |  | % | 30 | 21 | 51 | 30 | 30 |
|  | Thickness of thermoplastic polymer layer |  | μm | 0.5 | 0.5 | 0.5 | 0.4 | 0.6 |
| Evaluation of physical properties | TOF-SIMS island structure | Number | Number | 6 | 7 | 6 | 6 | 6 |
|  |  | Size Min. | μm² | 16 | 24 | 28 | 16 | 26 |
|  |  | Max. | μm² | 89 | 98 | 98 | 107 | 109 |
|  |  | Weighted centers of gravity positions Min. | μm | 19 | 18 | 26 | 17 | 18 |
|  |  | Max. | μm | 104 | 100 | 102 | 106 | 104 |
|  | Thermal response index | Rate | — | 11 | 13.6 | 14.5 | 12.3 | 11.3 |
|  |  | $T_0$ | — | 130 | 130 | 130 | 130 | 130 |
|  |  | Max | — | 6.2 | 6.3 | 6.1 | 6.2 | 4.9 |
|  | Heat shrinkage factor at 150° C. in electrolyte solution |  | % | 7 | 6.7 | 6.5 | 6.7 | 5.9 |
|  | Heat shrinkage factor at 150° C. |  | % | 6 | 6 | 6 | 6 | 5 |
|  | Membrane thickness |  | μm | 15.6 | 15.4 | 15.4 | 15.4 | 15.7 |
|  | Air permeability |  | sec./100 cc | 94 | 75 | 90 | 81 | 82 |
|  | Formula (2) common logarithm |  | log (gf · m⁴/g²) | 1.10 | 1.11 | 1.12 | 1.11 | 1.11 |
|  | Dust fall-off properties |  | % | 0.7 | 0.6 | 0.8 | 0.7 | 0.5 |
|  | FUSE temperature |  | ° C. | 143 | 143 | 143 | 143 | 143 |
|  | SHORT temperature |  | ° C. | ≥200 | ≥200 | ≥200 | ≥200 | ≥200 |
|  | Electrode residual rate |  | % | <5 | 10 | <5 | 10 | <5 |
| Evaluation of battery | Cycle test capacity retention rate |  | % | 82 | 82 | 84 | 81 | 81 |
|  | Evaluation of collapse test |  | % | 94 | 81 | 92 | 83 | 93 |

TABLE 21

|  |  |  |  | Example 2.51 | Example 2.52 | Example 2.53 | Example 2.54 | Example 2.55 |
|---|---|---|---|---|---|---|---|---|
| Layer A | Resin a: Silane-modified PE |  | % | 30 | 30 | 30 | 30 | 30 |
|  | Resin b: 2,000,000 or more |  | % | 30 | 30 | 30 | 30 | 30 |
|  | Resin c: less than 2,000,000 |  | % | 40 | 40 | 40 | 40 | 40 |
| Layer B | Resin a: Silane-modified PE |  | % | 0 | 0 | 0 | 0 | 0 |
|  | Resin b: 2,000,000 or more |  | % | 30 | 30 | 30 | 30 | 30 |
|  | Resin c: less than 2,000,000 |  | % | 70 | 70 | 70 | 70 | 70 |
| Substrate layer | Stacking method |  | — | A-B-A | A-B-A | A-B-A | A-B-A | A-B-A |
|  | Weight per unit area of substrate layer |  | g/m² | 5.27 | 5.27 | 6.55 | 5.6 | 3.85 |
|  | Thickness of substrate layer |  | μm | 10.1 | 10.1 | 10.0 | 10.0 | 9.9 |
|  | Porosity |  | % | 45 | 45 | 31 | 41 | 59 |
|  | Puncture strength |  | gf | 427 | 443 | 544 | 454 | 316 |
|  | Puncture strength divided by weight per unit area |  | gf · m²/g | 81 | 84 | 83 | 81 | 82 |
| Layer C | Coating surface of inorganic layer |  | — | Both sides | Both sides | Both sides | Both sides | Both sides |
|  | Type of inorganic particles |  | — | Boehmite | Boehmite | Boehmite | Boehmite | Boehmite |
|  | Content of inorganic particles |  | % | 95 | 95 | 95 | 95 | 95 |
|  | Glass transition temperature of binder |  | ° C. | −23 | −23 | −23 | −23 | −23 |
|  | Weight per unit area of inorganic coating layer |  | g/m² | 6.71 | 6.70 | 6.70 | 6.71 | 6.70 |
|  | Thickness of inorganic coating layer |  | μm | 5 | 5 | 5 | 5 | 5 |
| Layer D | Type of thermoplastic polymer |  | — | Acrylic resin | Acrylic resin | Acrylic resin | Acrylic resin | Acrylic resin |
|  | Surface coverage ratio |  | % | 30 | 30 | 30 | 30 | 30 |
|  | Thickness of thermoplastic polymer layer |  | μm | 0.9 | 1.1 | 0.5 | 0.5 | 0.5 |
| Evaluation of physical properties | TOF-SIMS island structure | Number | Number | 5 | 6 | 5 | 6 | 5 |
|  |  | Size Min. | μm² | 24 | 21 | 26 | 18 | 18 |
|  |  | Max. | μm² | 85 | 94 | 105 | 81 | 107 |
|  |  | Weighted centers of gravity positions Min. | μm | 30 | 22 | 27 | 22 | 27 |
|  |  | Max. | μm | 102 | 107 | 115 | 100 | 118 |
|  | Thermal response index | Rate | — | 10 | 8.3 | 20 | 11.6 | 12.7 |
|  |  | $T_0$ | — | 130 | 130 | 130 | 130 | 130 |
|  |  | Max | — | 5.2 | 5.1 | 6.1 | 6.2 | 7.2 |
|  | Heat shrinkage factor at 150° C. in electrolyte solution |  | % | 5.6 | 5.7 | 6.7 | 6.7 | 8 |
|  | Heat shrinkage factor at 150° C. |  | % | 5 | 5 | 6 | 6 | 7 |
|  | Membrane thickness |  | μm | 16.0 | 16.2 | 15.5 | 15.5 | 15.4 |
|  | Air permeability |  | sec./100 cc | 150 | 211 | 150 | 95 | 90 |
|  | Formula (2) common logarithm |  | log (gf · m⁴/g²) | 1.11 | 1.12 | 1.12 | 1.11 | 1.11 |
|  | Dust fall-off properties |  | % | 0.6 | 0.8 | 0.8 | 0.8 | 0.7 |
|  | FUSE temperature |  | ° C. | 143 | 143 | 143 | 143 | 143 |
|  | SHORT temperature |  | ° C. | ≥200 | ≥200 | ≥200 | ≥200 | ≥200 |
|  | Electrode residual rate |  | % | <5 | <5 | <5 | <5 | <5 |
| Evaluation of battery | Cycle test capacity retention rate |  | % | 80 | 80 | 71 | 84 | 84 |
|  | Evaluation of collapse test |  | % | 94 | 91 | 94 | 94 | 96 |

TABLE 21-continued

|  |  |  | Example 2.56 | Example 2.57 | Example 2.58 | Example 2.59 | Example 2.60 |
|---|---|---|---|---|---|---|---|
| Layer A | Resin a: Silane-modified PE | % | 3.1 | 70.1 | 70.1 | 2.9 | 2.9 |
|  | Resin b: 2,000,000 or more | % | 84.7 | 12.8 | 1.6 | 85.1 | 2.9 |
|  | Resin c: less than 2,000,000 | % | 12.2 | 17.1 | 28.3 | 12 | 94.2 |
| Layer B | Resin a: Silane-modified PE | % | 0 | 0 | 0 | 0 | 0 |
|  | Resin b: 2,000,000 or more | % | 30 | 30 | 30 | 30 | 30 |
|  | Resin c: less than 2,000,000 | % | 70 | 70 | 70 | 70 | 70 |
| Substrate layer | Stacking method | — | A-B-A | A-B-A | A-B-A | A-B-A | A-B-A |
|  | Weight per unit area of substrate layer | g/m² | 5.24 | 5.22 | 5.22 | 5.24 | 5.2 |
|  | Thickness of substrate layer | μm | 10.1 | 10.1 | 10.1 | 10.1 | 10.1 |
|  | Porosity | % | 47.8 | 45.5 | 45.5 | 45.3 | 45.8 |
|  | Puncture strength | gf | 576 | 235 | 235 | 576 | 385 |
|  | Puncture strength divided by weight per unit area | gf · m²/g | 110 | 45 | 45 | 110 | 74 |
| Layer C | Coating surface of inorganic layer | — | Both sides | Both sides | Both sides | Both sides | Both sides |
|  | Type of inorganic particles | — | Boehmite | Boehmite | Boehmite | Boehmite | Boehmite |
|  | Content of inorganic particles | % | 95 | 95 | 95 | 95 | 95 |
|  | Glass transition temperature of binder | °C. | −23 | −23 | −23 | −23 | −23 |
|  | Weight per unit area of inorganic coating layer | g/m² | 6.69 | 6.71 | 6.71 | 6.69 | 6.71 |
|  | Thickness of inorganic coating layer | μm | 5 | 5 | 5 | 5 | 5 |
| Layer D | Type of thermoplastic polymer | — | Acrylic resin | Acrylic resin | Acrylic resin | Acrylic resin | Acrylic resin |
|  | Surface coverage ratio | % | 30 | 30 | 30 | 30 | 30 |
|  | Thickness of thermoplastic polymer layer | μm | 0.5 | 0.5 | 0.5 | 0.5 | 0.5 |
| Evaluation of physical properties | TOF-SIMS island structure | Number | Number | 6 | 9 | 4 | 15 | 4 |
|  |  | Size Min. | μm² | 9.5 | 30 | 40 | 5 | 5 |
|  |  | Max. | μm² | 75 | 251 | 253 | 45 | 50 |
|  | Weighted centers of gravity positions | Min. | μm | 6 | 25 | 55 | 5 | 100 |
|  |  | Max. | μm | 120 | 81 | 142 | 75 | 145 |
|  | Thermal response index | Rate | — | 20 | 3.6 | 50.2 | 3.2 | 3.2 |
|  |  | $T_0$ | — | 112 | 148 | 127 | 131 | 130 |
|  |  | Max | — | 4 | 0.4 | 0.4 | 29.8 | 24.8 |
|  | Heat shrinkage factor at 150° C. in electrolyte solution | % | 4.5 | 1.3 | 1.3 | 29.9 | 24.9 |
|  | Heat shrinkage factor at 150° C. | % | 4 | 0.5 | 0.5 | 29.8 | 24.6 |
|  | Membrane thickness | μm | 15.6 | 15.5 | 15.6 | 15.6 | 15.6 |
|  | Air permeability | sec./100 cc | 420 | 401 | 401 | 105 | 90 |
|  | Formula (2) common logarithm | log (gf · m⁴/g²) | 1.21 | 0.83 | 0.83 | 1.21 | 1.04 |
|  | Dust fall-off properties | % | 0.5 | 0.7 | 0.8 | 0.6 | 0.5 |
|  | FUSE temperature | °C. | 143 | 144 | 140 | 144 | 143 |
|  | SHORT temperature | °C. | ≥200 | ≥200 | ≥200 | 180 | 180 |
|  | Electrode residual rate | % | <5 | <5 | <5 | <5 | <5 |
| Evaluation of battery | Cycle test capacity retention rate | % | 82 | 41 | 27 | 22 | 80 |
|  | Evaluation of collapse test | % | 69 | 54 | 62 | 71 | 65 |

TABLE 22

|  |  |  | Example 2.61 | Example 2.62 | Example 2.63 | Example 2.64 | Example 2.65 |
|---|---|---|---|---|---|---|---|
| Layer A | Resin a: Silane-modified PE | % | 45 | 70.1 | 45 | 2 | 30 |
|  | Resin b: 2,000,000 or more | % | 2 | 12.8 | 52 | 50 | 30 |
|  | Resin c: less than 2,000,000 | % | 53 | 17.1 | 3 | 48 | 40 |
| Layer B | Resin a: Silane-modified PE | % | 0 | 0 | 0 | 0 | 0 |
|  | Resin b: 2,000,000 or more | % | 30 | 30 | 30 | 30 | 30 |
|  | Resin c: less than 2,000,000 | % | 70 | 70 | 70 | 70 | 70 |
| Substrate layer | Stacking method | — | A-B-A | A-B-A | A-B-A | A-B-A | A-B-A |
|  | Weight per unit area of substrate layer | g/m² | 5.2 | 5.2 | 5.2 | 5.2 | 8.532 |
|  | Thickness of substrate layer | μm | 10.1 | 10.1 | 10.1 | 10.1 | 16 |
|  | Porosity | % | 46.8 | 47.8 | 48.8 | 49.8 | 53 |
|  | Puncture strength | gf | 333 | 328 | 572 | 442 | 685 |
|  | Puncture strength divided by weight per unit area | gf · m²/g | 64 | 63 | 110 | 85 | 82 |
| Layer C | Coating surface of inorganic layer | — | Both sides | Both sides | Both sides | Both sides | Both sides |
|  | Type of inorganic particles | — | Boehmite | Boehmite | Boehmite | Boehmite | Boehmite |
|  | Content of inorganic particles | % | 95 | 95 | 95 | 95 | 95 |
|  | Glass transition temperature of binder | °C. | −23 | −23 | −23 | −23 | −23 |
|  | Weight per unit area of inorganic coating layer | g/m² | 6.70 | 6.69 | 6.69 | 6.70 | 6.71 |
|  | Thickness of inorganic coating layer | μm | 5 | 5 | 5 | 5 | 5 |
| Layer D | Type of thermoplastic polymer | — | Acrylic resin | Acrylic resin | Acrylic resin | Acrylic resin | Acrylic resin |
|  | Surface coverage ratio | % | 30 | 30 | 30 | 30 | 30 |
|  | Thickness of thermoplastic polymer layer | μm | 0.5 | 0.5 | 0.5 | 0.5 | 00.5 |

TABLE 22-continued

| | | | | | | | | |
|---|---|---|---|---|---|---|---|---|
| Evaluation of physical properties | TOF-SIMS island structure | Number | Number | 4 | 9 | 27 | 4 | 5 |
| | | Size Min. | μm² | 25 | 30 | 15 | 4 | 21 |
| | | Max. | μm² | 120 | 251 | 70 | 85 | 102 |
| | | Weighted centers of Min. | μm | 35 | 25 | 5 | 50 | 27 |
| | | gravity positions Max. | μm | 140 | 81 | 55 | 110 | 112 |
| | Thermal response index | Rate | — | 30 | 20 | 1.1 | 2.1 | 4.2 |
| | | $T_0$ | — | 130 | 121 | 130 | 130 | 130 |
| | | Max | — | 2.3 | 4 | 29.8 | 26.9 | 7.1 |
| | Heat shrinkage factor at 150° C. in electrolyte solution | | % | 12 | 4.5 | 29.6 | 27.5 | 7.6 |
| | Heat shrinkage factor at 150° C. | | % | 2 | 4 | 29.4 | 27.0 | 7 |
| | Membrane thickness | | μm | 15.6 | 15.6 | 15.6 | 15.6 | 21.05 |
| | Air permeability | | sec./100 cc | 410 | 420 | 130 | 90 | 75 |
| | Formula (2) common logarithm | | log (gf · m⁴/g²) | 0.98 | 0.97 | 1.21 | 1.10 | 1.11 |
| | Dust fall-off properties | | % | 0.7 | 0.5 | 0.7 | 0.7 | 0.8 |
| | FUSE temperature | | ° C. | 143 | 143 | 143 | 143 | 143 |
| | SHORT temperature | | ° C. | ≥200 | ≥200 | ≥200 | 180 | ≥200 |
| | Electrode residual rate | | % | <5 | <5 | <5 | <5 | 60 |
| Evaluation of battery | Cycle test capacity retention rate | | % | 86 | 82 | 84 | 83 | 85 |
| | Evaluation of collapse test | | % | 63 | 64 | 65 | 66 | 63 |

| | | | | Example 2.66 | Example 2.67 | Example 2.68 | Example 2.69 | Example 2.70 |
|---|---|---|---|---|---|---|---|---|
| Layer A | Resin a: Silane-modified PE | | % | 30 | 30 | 30 | 30 | 30 |
| | Resin b: 2,000,000 or more | | % | 30 | 30 | 30 | 30 | 30 |
| | Resin c: less than 2,000,000 | | % | 40 | 40 | 40 | 40 | 40 |
| Layer B | Resin a: Silane-modified PE | | % | 0 | 0 | 0 | 0 | 0 |
| | Resin b: 2,000,000 or more | | % | 30 | 30 | 30 | 30 | 30 |
| | Resin c: less than 2,000,000 | | % | 70 | 70 | 70 | 70 | 70 |
| Substrate layer | Stacking method | | — | A-B | B-A | B-A-B | A-B-A | A-B-A |
| | Weight per unit area of substrate layer | | g/m² | 5.17 | 5.22 | 5.22 | 10 | 5.22 |
| | Thickness of substrate layer | | μm | 9.9 | 10 | 10 | 10.1 | 10.0 |
| | Porosity | | % | 45 | 45 | 45 | 47 | 45 |
| | Puncture strength | | gf | 419 | 433 | 428 | 465 | 444 |
| | Puncture strength divided by weight per unit area | | gf · m²/g | 81 | 83 | 82 | 46.5 | 85 |
| Layer C | Coating surface of inorganic layer | | — | Both sides | Both sides | Both sides | Both sides | Both sides |
| | Type of inorganic particles | | — | Boehmite | Boehmite | Boehmite | Boehmite | Boehmite |
| | Content of inorganic particles | | % | 95 | 95 | 95 | 95 | 95 |
| | Glass transition temperature of binder | | ° C. | −23 | −23 | −23 | −23 | −23 |
| | Weight per unit area of inorganic coating layer | | g/m² | 6.70 | 6.71 | 6.70 | 6.69 | 6.70 |
| | Thickness of inorganic coating layer | | μm | 5 | 5 | 5 | 5 | 5 |
| Layer D | Type of thermoplastic polymer | | — | Acrylic resin | Acrylic resin | Acrylic resin | — | Acrylic resin |
| | Surface coverage ratio | | % | 30 | 30 | 30 | — | 30 |
| | Thickness of thermoplastic polymer layer | | μm | 0.5 | 0.5 | 0.5 | — | 0.5 |
| Evaluation of physical properties | TOF-SIMS island structure | Number | Number | 8 | 7 | 7 | 6 | 7 |
| | | Size Min. | μm² | 17 | 28 | 22 | 10 | 16 |
| | | Max. | μm² | 86 | 80 | 97 | 86 | 93 |
| | | Weighted centers of Min. | μm | 22 | 18 | 18 | 12 | 9 |
| | | gravity positions Max. | μm | 104 | 113 | 113 | 99 | 108 |
| | Thermal response index | Rate | — | 9 | 14.2 | 13.3 | 7 | 10 |
| | | $T_0$ | — | 130 | 130 | 130 | 143 | 130 |
| | | Max | — | 2.9 | 2.9 | 3 | 5.2 | 1.9 |
| | Heat shrinkage factor at 150° C. in electrolyte solution | | % | 3.7 | 3.5 | 4 | 6 | 2.5 |
| | Heat shrinkage factor at 150° C. | | % | 3 | 3 | 3 | 5 | 2.0 |
| | Membrane thickness | | μm | 15.4 | 15.5 | 15.5 | 15 | 15.5 |
| | Air permeability | | sec./100 cc | 93 | 93 | 90 | 92 | 95 |
| | Formula (2) common logarithm | | log (gf · m⁴/g²) | 1.082 | 1.092 | 1.088 | 0.968 | 1.10 |
| | Dust fall-off properties | | % | 0.6 | 0.5 | 0.5 | 3.7 | 0.5 |
| | FUSE temperature | | ° C. | 141 | 141 | 141 | 141 | 143 |
| | SHORT temperature | | ° C. | ≥200 | ≥200 | ≥200 | ≥200 | ≥200 |
| | Electrode residual rate | | % | <5 | <5 | <5 | <5 | <5 |
| Evaluation of battery | Cycle test capacity retention rate | | % | 75 | 74 | 70 | 82 | 90 |
| | Evaluation of collapse test | | % | 93 | 92 | 94 | 60 | 96 |

TABLE 23

| | | | Example 2.71 | Example 2.72 | Comparative Example 2.1 | Comparative Example 2.2 | Comparative Example 2.3 | Comparative Example 2.4 | Comparative Example 2.5 | Comparative Example 2.6 | Comparative Example 2.7 |
|---|---|---|---|---|---|---|---|---|---|---|---|
| Layer A | Resin a: Silane-modified PE | % | 30 | 30 | 30 | 0 | 30 | — | 0 | 20 | 20 |
| | Resin b: 2,000,000 or more | % | 30 | 30 | 30 | 70 | 30 | — | 40 | 32 | 32 |
| | Resin c: less than 2,000,000 | % | 40 | 40 | 40 | 30 | 40 | — | 60 | 48 | 48 |
| Layer B | Resin a: Silane-modified PE | % | 0 | 0 | 0 | 0 | — | — | 0 | 0 | 0 |
| | Resin b: 2,000,000 or more | % | 30 | 30 | 30 | 30 | — | — | 30 | 30 | 30 |
| | Resin c: less than 2,000,000 | % | 70 | 70 | 70 | 70 | — | — | 70 | 70 | 70 |
| Substrate layer | Stacking method | — | A-B-A | A-B-A | A-B-A | A-B-A | — | — | — | A-B-A | A-B-A |
| | Weight per unit area of substrate layer | g/m² | 5.22 | 5.22 | 10 | 9 | 5.27 | 5.17 | 5.23 | 5.23 | 5.22 |
| | Thickness of substrate layer | μm | 10.0 | 10.0 | 10 | 10.1 | 10.4 | 9.9 | 10.1 | 10 | 9.9 |
| | Porosity | % | 45 | 45 | 49 | 49 | 45 | 49 | 45 | 45 | 45 |
| | Puncture strength | gf | 444 | 444 | 430 | 608 | 444 | 608 | 392 | 387 | 380 |
| | Puncture strength divided by weight per unit area | gf · m²/g | 85 | 85 | 43 | 67.6 | 85 | 67.6 | 75 | 74 | 72.8 |
| Layer C | Coating surface of inorganic layer | — | Both sides | Both sides | — | Both sides | Both sides | — | Both sides | Both sides | Both sides |
| | Type of inorganic particles | — | Boehmite | Boehmite | — | Boehmite | Boehmite | — | Boehmite | Boehmite | Boehmite |
| | Content of inorganic particles | % | 95 | 95 | — | 95 | 95 | — | 95 | 95 | 95 |
| | Glass transition temperature of binder | °C | −50 | 82 | — | −23 | 95 | — | −23 | −23 | −23 |
| | Weight per unit area of inorganic coating layer | g/m² | 6.70 | 6.70 | — | 6.69 | 6.71 | — | 6.71 | 6.7 | 6.7 |
| | Thickness of inorganic coating layer | μm | 5 | 5 | — | 5 | 5 | — | 5 | 5 | 5 |
| Layer D | Type of thermoplastic polymer | — | Acrylic resin | Acrylic resin | Acrylic resin | Acrylic resin | Acrylic resin | — | Acrylic resin | Acrylic resin | Acrylic resin |
| | Surface coverage ratio | % | 30 | 30 | 30 | 30 | 30 | — | 30 | 30 | 30 |
| | Thickness of thermoplastic polymer layer | μm | 0.5 | 0.5 | 0.5 | 0.5 | 0.5 | — | 0.5 | 0.5 | 0.5 |
| Evaluation of physical properties | TOF-SIMS island structure Number | Number | 7 | 7 | 7 | 7 | 7 | — | 9 | 7 | 7 | 6 |
| | Size Min. | μm² | 16 | 16 | 16 | 19 | 16 | | 23 | 18 | 19 | 20 |
| | Size Max. | μm² | 93 | 93 | 94 | 95 | 93 | | 83 | 90 | 93 | 90 |
| | Weighted centers of gravity positions Min. | μm | 9 | 9 | 24 | 24 | 9 | | | | | |
| | Weighted centers of gravity positions Max. | μm | 108 | 108 | 110 | 118 | 108 | | | | | |
| | Thermal response index Rate | — | 10 | 10 | 3.2 | 3.1 | 10 | | | | | |
| | Thermal response index $T_0$ | — | 130 | 130 | 130 | 130 | 130 | | | | | |
| | Thermal response index Max | — | 1.9 | 1.9 | 48 | 19.3 | 1.9 | | | | | |
| | Heat shrinkage factor at 150° C. in electrolyte solution | % | 2.5 | 2.5 | 49 | 19.7 | 2.5 | | | | | |
| | Heat shrinkage factor at 150° C. | % | 2.0 | 2.0 | 48 | 19.2 | 2.0 | | | | | |
| | Membrane thickness | μm | 15.5 | 15.5 | 10 | 14 | 15.5 | | | | | |
| | Air permeability | sec./100 cc | 110 | 85 | 81 | 92 | 95 | | | | | |
| | Formula (2) common logarithm | log (gf · m⁴/g²) | 1.10 | 1.10 | — | 1.131 | 1.10 | | | | | |
| | Dust fall-off properties | % | 0.5 | 6 | — | 0.7 | 0.5 | | | | | |
| | FUSE temperature | °C | 143 | 143 | 143 | 150 | 143 | | | | | |
| | SHORT temperature | °C | ≥200 | ≥200 | ≥200 | 160 | ≥200 | | | | | |
| | Electrode residual rate | % | <5 | 60 | <5 | <5 | <5 | | | | | |
| Evaluation of battery | Cycle test capacity retention rate | % | 67 | 77 | 94 | 75 | 97 | | | | | |
| | Evaluation of collapse test | % | 50 | 46 | 4 | 3 | 60 | | | | | |

TABLE 23-continued

|  |  |  |  |  |  |  |  |
|---|---|---|---|---|---|---|---|
|  | Weighted centers of | Min. | μm | 15 | 12 | 13 | 15 |
|  | gravity positions | Max. | μm | 102 | 100 | 98 | 90 |
|  | Thermal | Rate | — | 3.1 | 10 | 15 | 13 |
|  | response | $T_0$ | — | 142 | 130 | 130 | 130 |
|  | index | Max | — | 35.9 | 8.1 | 9.2 | 9.2 |
|  | Heat shrinkage factor at | | % | 35.9 | 8 | 9 | 9 |
|  | 150° C. in electrolyte solution | | | | | | |
|  | Heat shrinkage factor at 150° C. | | % | 32 | 7 | 7 | 8 |
|  | Membrane thickness | | μm | 14 | 15.5 | 15.5 | 15.5 |
|  | Air permeability | | sec./100 cc | 92 | 95 | 96 | 99 |
|  | Formula (2) common logarithm | | log (gf · m$^4$/g$^2$) | 1.131 | 1.16 | 1.15 | 1.04 |
|  | Dust fall-off properties | | % | 0.8 | 0.7 | 0.8 | 0.9 |
|  | FUSE temperature | | ° C. | 150 | 150 | 143 | 143 |
|  | SHORT temperature | | ° C. | 161 | ≥200 | ≥200 | 160 |
|  | Electrode residual rate | | % | <5 | <5 | <5 | <5 |
| Evaluation | Cycle test capacity retention rate | | % | 73 | 32 | 34 | 20 |
| of battery | Evaluation of collapse test | | % | 2 | 5 | 6 | 1 |

INDUSTRIAL APPLICABILITY

The separator for an electricity storage device of the present disclosure can be used as a separator for an electricity storage device, and examples of the electricity storage device include a battery and a capacitor, of which a lithium ion secondary battery is preferable. The lithium ion secondary battery can be mounted on small electronic devices such as mobile phones and laptops, and electrically driven vehicles such as electric cars and electric motorcycles.

REFERENCE SIGNS LIST

1a: Non-crosslinked polyolefin substrate layer
1b: Crosslinked polyolefin substrate layer
2: Inorganic particle layer
3: Thermoplastic polymer layer
4: Stress
5: Buckling fracture of inorganic particle layer
6: Tensile fracture of substrate layer
7: Local short circuit
9: Island structure
10: Separator
20: Fixing jig
30: Positive electrode
40: Negative electrode
100: Electricity storage device
d: Distance between island structures

The invention claimed is:

1. An electricity storage device comprising a positive electrode, a negative electrode, a separator for an electricity storage device, and a nonaqueous electrolyte solution, wherein the separator for the electricity storage device comprises a polyolefin microporous membrane having a laminated structure, comprising at least each one of layer A containing a polyolefin and layer B containing a polyolefin, wherein
the polyolefin contained in at least one of the layer A and the layer B has one or more types of functional groups, and a crosslinked structure formed after housing in an electricity storage device and under a surrounding environment of the electricity storage device by (1) the functional groups undergoing a condensation reaction with each other, (2) the functional groups reacting with a chemical substance inside the electricity storage device, or (3) the functional groups reacting with other types of functional groups, to form the crosslinked structure.

2. The electricity storage device according to claim 1, wherein the chemical substance is any of an electrolyte, an electrolyte solution, an electrode active material, an additive or decomposition products thereof, which are contained in the polyolefin microporous membrane.

3. The electricity storage device according to claim 1, wherein the layer A or the layer B is a layer having no functional group, and a ratio of the thickness of a layer having the functional group to a thickness of the layer having no functional group is 0.08 to 6.50.

4. The electricity storage device according to claim 1, wherein the layer A or the layer B is a layer having no functional group, a polyethylene is contained in the layer having no functional group, and the polyethylene has a degree of crystallinity of 60% to 99%.

5. The electricity storage device according to claim 4, wherein the polyethylene has a crystallite size of 10 nm to 50 nm.

6. The electricity storage device according to claim 1, wherein the crosslinked structure is an amorphous crosslinked structure in which an amorphous portion of the polyolefin is crosslinked.

7. The electricity storage device according to claim 6, wherein the amorphous portion is selectively crosslinked.

8. The electricity storage device according to claim 1, wherein the polyolefin is a functional group-modified polyolefin, or a polyolefin in which a monomer having a functional group is copolymerized.

9. The electricity storage device according to claim 1, wherein the crosslinked structure is formed by a reaction via any of covalent bonding, hydrogen bonding or coordinate bonding.

10. The electricity storage device according to claim 9, wherein the reaction via covalent bonding is at least one selected from the group consisting of the following reactions (I) to (IV):
(I) condensation reaction of a plurality of identical functional groups;
(II) reaction between a plurality of different functional groups;
(III) chain condensation reaction between a functional group and an electrolyte solution; and
(IV) reaction of a functional group with an additive.

11. The electricity storage device according to claim 10, wherein the reaction via coordinate bonding comprises the following reaction (V):
(V) reaction in which a plurality of the same functional groups crosslink via coordinate bonding with metal ions.

12. The electricity storage device according to claim 10, wherein the reaction(s) (I) and/or (II) is/are catalytically accelerated by a chemical substance inside the electricity storage device.

13. The electricity storage device according to claim 10, wherein the reaction (I) is a condensation reaction of a plurality of silanol groups.

14. The electricity storage device according to claim 10, wherein the reaction (IV) is a nucleophilic substitution reaction, a nucleophilic addition reaction or a ring-opening reaction between a compound Rx constituting the separator for an electricity storage device and a compound Ry constituting the additive, the compound Rx has a functional group x, and the compound Ry includes a linking reaction unit $y_1$.

15. The electricity storage device according to claim 14, wherein the reaction (IV) is a nucleophilic substitution reaction, the functional group x of the compound Rx is at least one selected from the group consisting of —OH, —NH$_2$, —NH—, —COOH and —SH, and the linking reaction unit $y_1$ of the compound Ry is at least two selected from the group consisting of CH$_3$SO$_2$—, CF$_3$SO$_2$—, ArSO$_2$—, CH$_3$SO$_3$—, CF$_3$SO$_3$—, ArSO$_3$—, and a monovalent group represented by the following formulas ($y_1$-1) to ($y_1$-6):

($y_1$-1)

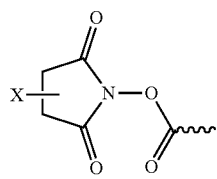

wherein X is a hydrogen atom or a monovalent substituent;

($y_1$-2)

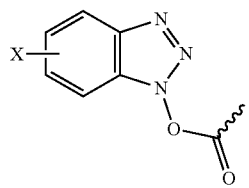

wherein X is a hydrogen atom or a monovalent substituent;

($y_1$-3)

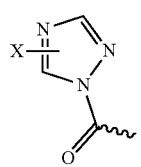

wherein X is a hydrogen atom or a monovalent substituent;

($y_1$-4)

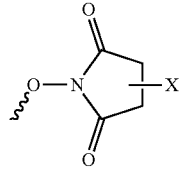

wherein X is a hydrogen atom or a monovalent substituent;

($y_1$-5)

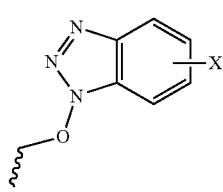

wherein X is a hydrogen atom or a monovalent substituent; and ($y_1$-6)

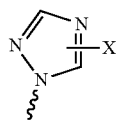

wherein X is a hydrogen atom or a monovalent substituent.

16. The electricity storage device according to claim 14, wherein the reaction (IV) is a nucleophilic substitution reaction, the compound Ry includes a straight-chain unit $y_2$ in addition to the linking reaction unit $y_1$, and the straight-chain unit $y_2$ is at least one selected from the group consisting of divalent groups represented by the following formulas ($y_2$-1) to ($y_2$-6):

($y_2$-1)

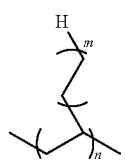

wherein m is an integer of 0 to 20, and n is an integer of 1 to 20;

($y_2$-2)

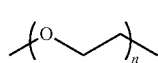

wherein n is an integer of 1 to 20;

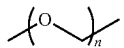  (y₂-3)

wherein n is an integer of 1 to 20;

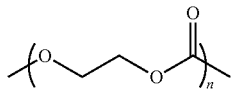  (y₂-4)

wherein n is an integer of 1 to 20;

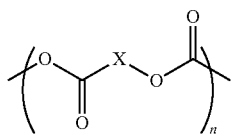  (y₂-5)

wherein X is an alkylene group having 1 to 20 carbon atoms or an arylene group, and n is an integer of 1 to 20; and

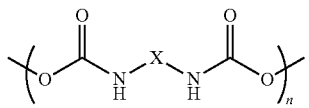  (y₂-6)

wherein X is an alkylene group having 1 to 20 carbon atoms or an arylene group, and n is an integer of 1 to 20.

17. The electricity storage device according to claim 14, wherein
the reaction (IV) is a nucleophilic addition reaction,
the functional group x of the compound Rx is at least one selected from the group consisting of —OH, —NH$_2$, —NH—, —COOH and —SH, and
the linking reaction unit y$_1$ of the compound Ry is at least one selected from the group consisting of groups represented by the following formulas (Ay$_1$-1) to (Ay$_1$-6):

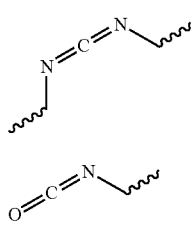

(Ay₁-1)

(Ay₁-2)

(Ay₁-3)

(Ay₁-4)

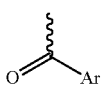

wherein R is a hydrogen atom or a monovalent organic group;

(Ay₁-5)

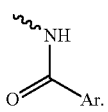

(Ay₁-6)

18. The electricity storage device according to claim 14, wherein
the reaction (IV) is a ring-opening reaction,
the functional group x of the compound Rx is at least one selected from the group consisting of —OH, —NH$_2$, —NH—, —COOH and —SH, and
the linking reaction unit y$_1$ of the compound Ry is at least two groups represented by the following formula (ROY$_1$-1):

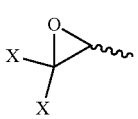  (ROy₁-1)

wherein a plurality of X are each independently a hydrogen atom or a monovalent substituent.

19. The electricity storage device according to claim 11, wherein, in the following reaction (V), the metal ion is at least one selected from the group consisting of Zn$^{2+}$, Mn$^{2+}$, Co$^{3+}$, Ni$^{2+}$ and Li$^+$.

20. The electricity storage device according to claim 1, wherein the positive electrode is at least one selected from the group consisting of a nickel-manganese-cobalt (NMC)-based lithium-containing positive electrode, an olivine-type lithium iron phosphate (LFP)-based positive electrode, a lithium cobaltate (LCO) positive electrode, a nickel-cobalt-aluminum (NCA)-based lithium-containing positive electrode and a lithium manganate (LMO)-based positive electrode.

* * * * *